United States Patent
Gong et al.

(10) Patent No.: US 12,516,133 B2
(45) Date of Patent: Jan. 6, 2026

(54) TGFβ/PD-L1 BISPECIFIC BINDING PROTEINS

(71) Applicants: SHANGHAI EPIMAB BIOTHERAPEUTICS CO., LTD., Shanghai (CN); EPIMAB BIOTHERAPEUTICS (SUZHOU) CO., LTD., Jiangsu (CN)

(72) Inventors: Shiyong Gong, Shanghai (CN); Xuan Wu, Shanghai (CN); Chengbin Wu, Shanghai (CN)

(73) Assignee: SHANGHAI EPIMAB BIOTHERAPEUTICS CO., LTD, Shanghai (CN)

( * ) Notice: Subject to any disclaimer, the term of this patent is extended or adjusted under 35 U.S.C. 154(b) by 825 days.

(21) Appl. No.: 17/780,238

(22) PCT Filed: Nov. 27, 2020

(86) PCT No.: PCT/CN2020/132169
§ 371 (c)(1),
(2) Date: May 26, 2022

(87) PCT Pub. No.: WO2021/104434
PCT Pub. Date: Jun. 3, 2021

(65) Prior Publication Data
US 2023/0242675 A1    Aug. 3, 2023

(30) Foreign Application Priority Data

Nov. 27, 2019    (WO) ................ PCT/CN2019/121321

(51) Int. Cl.
*C07K 16/46* (2006.01)
*A61P 35/00* (2006.01)

(52) U.S. Cl.
CPC ............ *C07K 16/468* (2013.01); *A61P 35/00* (2018.01); *C07K 2317/24* (2013.01); *C07K 2317/31* (2013.01); *C07K 2317/565* (2013.01)

(58) Field of Classification Search
CPC .............. C07K 16/468; C07K 2317/24; C07K 2317/31; C07K 2317/565; C07K 2317/33; C07K 2317/622; C07K 2317/76; C07K 2317/90; C07K 2317/92; C07K 2317/94; C07K 2319/30; C07K 14/71; C07K 16/2863; C07K 16/2827; C07K 2317/64; A61P 35/00
See application file for complete search history.

(56) References Cited

FOREIGN PATENT DOCUMENTS

| CN | 105658672 A | 6/2016 |
|---|---|---|
| CN | 106103488 A | 11/2016 |
| CN | 106459182 A | 2/2017 |
| CN | 109195993 A | 1/2019 |
| TW | 201613962 A | 4/2016 |
| TW | 201731873 A | 9/2017 |
| TW | 201900674 A | 1/2019 |
| WO | WO 2011/109789 A2 | 9/2011 |
| WO | WO 2018/205985 A1 | 11/2018 |

OTHER PUBLICATIONS

Hu, M. et al., "Advances of bifunctional anti-PD-L1/TGF-β fusion protein M7824", *J Int Oncol.*, vol. 46, No. 5, May 8, 2019, pp. 281-283.
International Search Report received in International Application No. PCT/CN2020/132169 mailed on Feb. 22, 2021 (8 pages).
Jochems, Caroline et al. "Analyses of functions of an anti-PD-L1/TGFβR2 bispecific fusion protein (M7824)", *Oncotarget*, vol. 8, No. 43, Sep. 8, 2017, pp. 75217-75231.

*Primary Examiner* — Misook Yu
*Assistant Examiner* — Grace H Lunde
(74) *Attorney, Agent, or Firm* — Finnegan, Henderson, Farabow, Garrett & Dunner, LLP

(57) ABSTRACT

The present invention relates to bispecific binding proteins that bind TGFβ and PD-L1, and novel anti-PD-L1 antibodies, methods of making the bispecific binding proteins and antibodies, compositions comprising the bispecific binding proteins or antibodies, and methods of using the bispecific binding proteins for blocking TGFβ-mediated suppression of T cell activation, for blocking PD-L1-mediated suppression of T cell activation, and for treating cancer.

13 Claims, 9 Drawing Sheets
Specification includes a Sequence Listing.

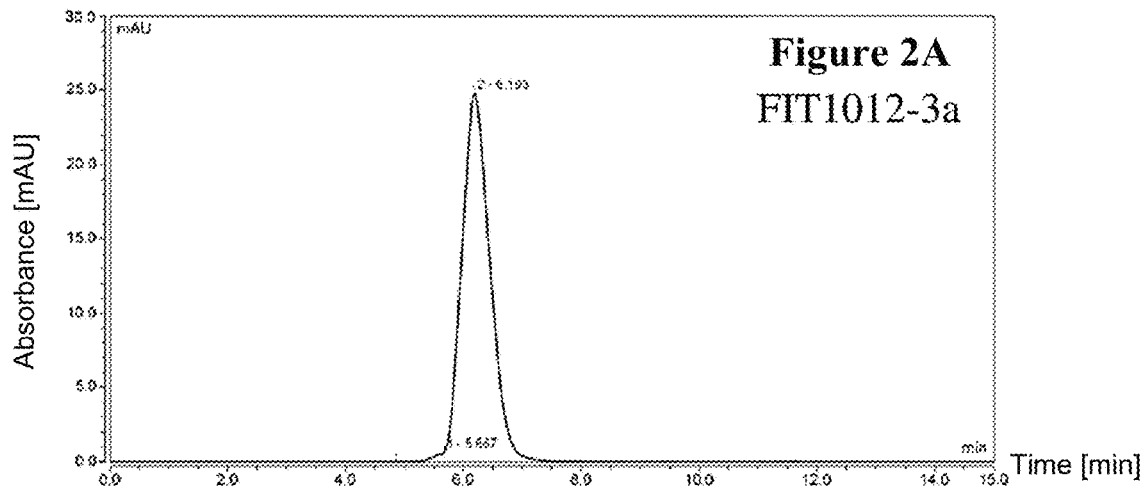
Figure 2A FIT1012-3a
| No. | Peak name | Retention time | Area mAU*min | Height mAU | Relative Area % | Relative Height % | Amount n.a. |
|---|---|---|---|---|---|---|---|
| 1 | | 5.667 | 0.135 | 0.681 | 0.97 | 2.67 | n.a. |
| 2 | | 6.193 | 13.758 | 24.829 | 99.03 | 97.33 | n.a. |
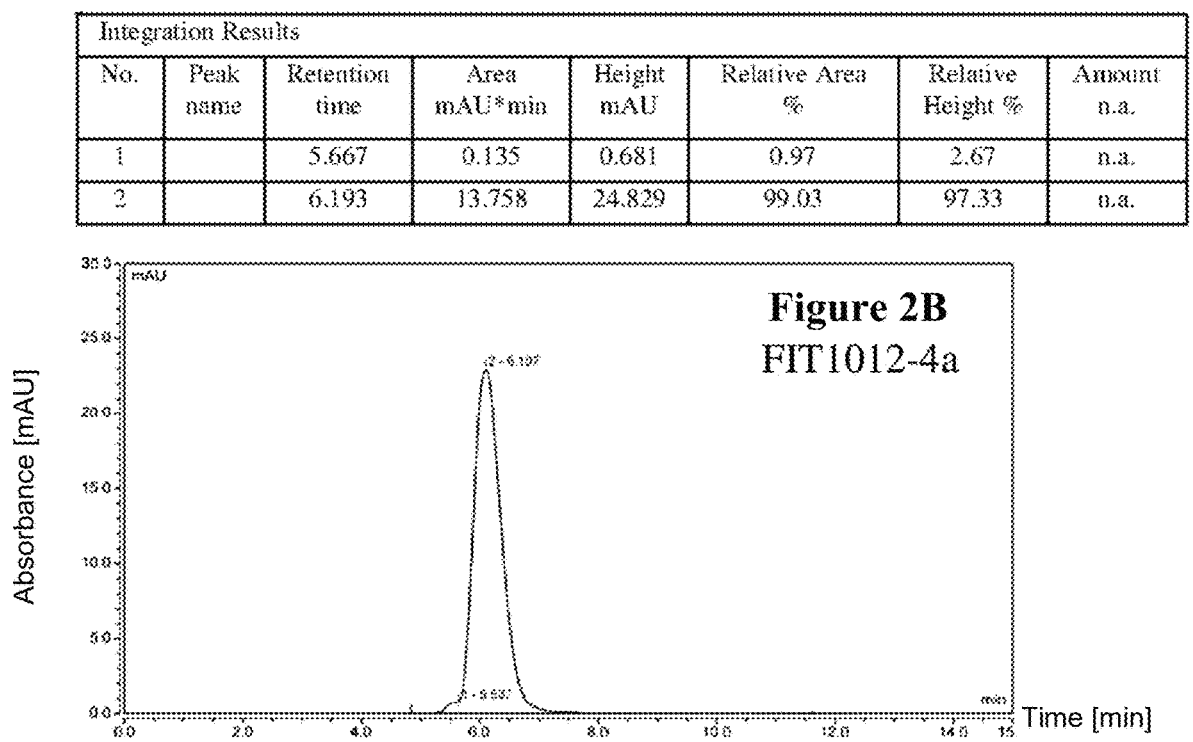
Figure 2B FIT1012-4a
| No. | Peak name | Retention time | Area mAU*min | Height mAU | Relative Area % | Relative Height % | Amount n.a. |
|---|---|---|---|---|---|---|---|
| 1 | | 5.637 | 0.169 | 0.740 | 1.33 | 3.13 | n.a. |
| 2 | | 6.107 | 12.523 | 22.932 | 98.67 | 96.87 | n.a. |

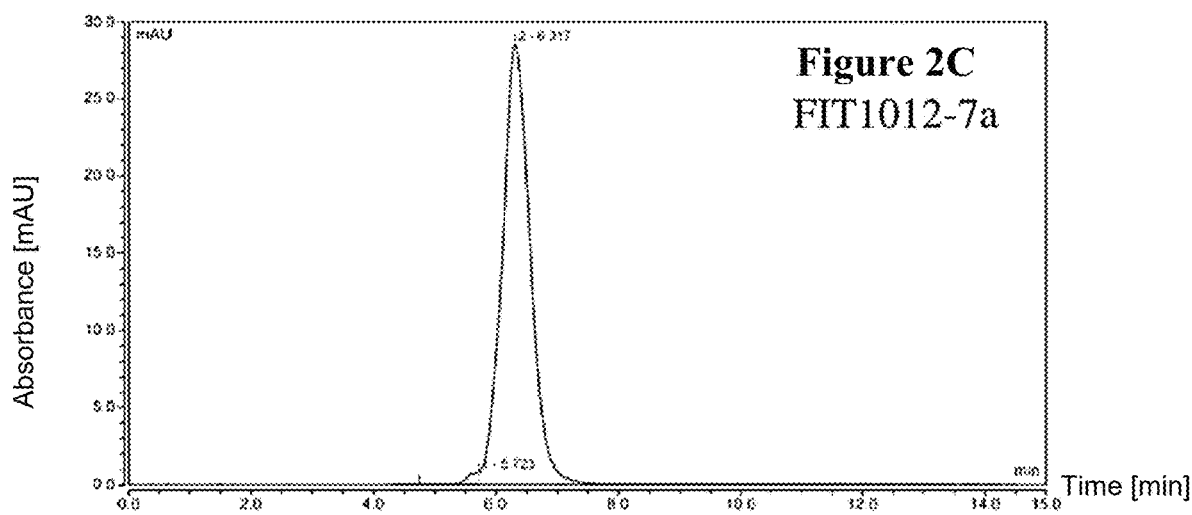

Coat TGFβ1 bind FIT1012 and TGFβ-RII ELISA

Coat TGFβII bind FIT1012 and TGFβ-RII ELISA

Coat TGFβIII bind FIT1012 and TGFβ-RII ELISA

| | EC50 |
|---|---|
| FIT1012-3a | 0.1055 |
| FIT1012-4a | 0.09189 |
| FIT1012-7a | 0.09745 |
| M7824 | 0.2009 |
| TGFbRII-ECD-Fc | 0.2205 |

TGFβ/PD-L1 BISPECIFIC BINDING PROTEINS

RELATED APPLICATIONS

This application is a U.S. national stage entry under 35 U.S.C. § 371 of international application no. PCT/CN2020/132169, filed Nov. 27, 2020, which designates the U.S. and claims the benefit of priority of international application no. PCT/CN2019/121321, filed Nov. 27, 2019, each of which is incorporated herein by reference in its entirety.

FIELD OF THE INVENTION

The present invention relates to new engineered bispecific binding proteins recognizing transforming growth factor beta (TGFβ) and Programmed Death Ligand 1 (PD-L1). The bispecific binding proteins are useful in the treatment of cancer and other diseases associated with PD-L1 and TGFβ.

SEQUENCE LISTING

The instant application contains a Sequence listing which has been submitted electronically in ASCII plain text format and is hereby incorporated by reference in its entirety. Said ASCII plain text copy, created on Apr. 6, 2023, is named PF 200769USP_sequence_ST25 and is 104,750 bytes in size.

BACKGROUND OF THE INVENTION

One hallmark of cancer cells is their capacity to evade or escape destruction by the immune system by altering or co-opting an individual's normal systems by which an immune response can be suppressed. Such systems of suppressing immune responses are referred to as "immune checkpoints," which are normally involved in maintaining such beneficial features as self-tolerance and the prevention of extensive damage to local tissue at which an immune response is directed or even extending to more distal tissues if the response remains unchecked. With respect to T cells, an immune checkpoint to inhibit or suppress a particular pathway of an immune response is typically triggered when an immune checkpoint surface receptor of a T cell binds to a cognate immune checkpoint ligand expressed on the surface of an antigen-presenting cell. A large variety of cognate pairs of such ligand-receptor checkpoint proteins have been identified. It is now clear that cancer cells can co-opt one or more immune checkpoint pathways by expressing one or more checkpoint surface ligands that will be bound by a corresponding checkpoint surface receptor on T cells and thereby suppress one or more pathways of the immune response that would otherwise activate a robust anti-cancer T cell response. See, for example, Pardoll, *Nat. Rev. Cancer*, 12: 252-264 (2012) and Bonnefoy et al., *OncoImmunology*, 4:5, e1003015 (2015).

Programmed Death Ligand 1 (PD-L1)

Programmed Death Ligand 1 (also referred to as PD-L1, CD274, or B7-H1) is one of a pair of immune checkpoint proteins of interest as a therapeutic target for treating cancer. PD-L1 is a type I transmembrane glycoprotein of approximately 40 kilodaltons (kD) in size. In healthy humans, PD-L1 is expressed on a number of immune cell types including activated and anergic/exhausted T cells, naive and activated B cells, myeloid dendritic cells (DCs), monocytes, mast cells, and other antigen presenting cells (APCs). It is also expressed on non-immune cells including islets of the pancreas, Kupffer cells of the liver, vascular endothelium, and selected epithelia, for example, airway epithelia and renal tubule epithelia, where its expression is enhanced during inflammatory episodes. PD-L1 was recognized as playing a role in tumor immunity by increasing apoptosis of antigen-specific T-cell clones. Dong et al., *Nat. Med.*, 8:793-800 (2002). In addition, PD-L1 may be involved in intestinal mucosal inflammation, and inhibition of PD-L1 suppresses wasting disease associated with colitis. Kanai et al., *J. Immunol.*, 171: 4156-63 (2003).

PD-L1 binds Programmed Cell Death Protein 1 (PD-1, CD279), which is a member of the CD28 family of receptors that also includes CD28, CTLA-4, ICOS, PD-1, and BTLA. Expression of PD-1 is frequently found in immune cells such as T cells, B cells, monocytes, and natural killer (NK) cells. PD-L1 and PD-L2 (also referred to as CD273 or B7-DC) are both cell surface glycoprotein ligands bound by PD-1. The binding of PD-1 expressed on T cells to PD-L1 or PD-L2 expressed on antigen-presenting cells signals an immune checkpoint that downregulates T cell activation and accompanying cytokine secretion thereby suppressing escalation of an immune response. This downregulation of T cell activation in turn reduces T cell proliferation as well as secretion of the IL-2 cytokine, IFN-γ, and other growth factors and cytokines that would otherwise stimulate a robust T cell response. Freeman et al., *J. Exp. Med.*, 192: 1027-1034 (2000); Latchman et al., *Nat. Immunol.*, 2: 261-8 (2001); Carter et al., *Eur. J. Immunol.*, 32: 634-43 (2002); Ohigashi et al., *Clin. Cancer Res.*, 11: 2947-53 (2005). Normal signaling via the PD-1/PD-L1 interaction is believed to serve critical, non-redundant functions within the immune system, by negatively regulating T cell responses. This regulation is involved in T cell development in the thymus, in regulation of chronic inflammatory responses, and in maintenance of both peripheral tolerance and immune privilege. The critical nature of these functions is exemplified in PD-1-deficient mice, which exhibit an autoimmune phenotype. PD-1 deficiency in C57BL/6 mice results in chronic progressive lupus-like glomerulonephritis and arthritis. In Balb/c mice, PD-1 deficiency leads to severe cardiomyopathy due to the presence of heart-tissue-specific self-reacting antibodies.

That PD-L1 plays a role in tumor immunity by increasing apoptosis of antigen-specific T-cell clones was indicated by studies conducted nearly two decades ago. See, for example, Dong et al., *Nat. Med.*, 8:793-800 (2002). It has also been suggested that PD-L1 might be involved in intestinal mucosal inflammation, and inhibition of PD-L1 suppresses wasting disease associated with colitis. Kanai et al., *J. Immunol.*, 171: 4156-63 (2003). In general, the inhibition of PD-L1 signaling has been proposed as a means to enhance T cell immunity for the treatment of cancer (e.g., to overcome tumor immunity) and infection, including both acute and chronic (e.g., persistent) infection.

PD-L1 is expressed at increased levels on a number of malignant tumors including, but not limited to, breast cancer, colon cancer, colorectal cancer, lung cancer, renal cancer (including renal cell carcinoma), gastric cancer, bladder cancer, non-small cell lung cancer (NSCLC), hepatocellular cancer (HCC), pancreatic cancer, and melanoma. Expression of PD-L1 on the cell surface has also been shown to be upregulated through IFN-γ stimulation. The binding of PD-1 expressed on T cells to PD-L1 or PD-L2 expressed on cancer cells signals a similar inhibition of T cell activation and cytokine secretion as in the normal PD-1/PD-L1 checkpoint pathway and thereby inhibiting an immune response to the cancer cells.

It is now known that immune checkpoints of the immune system typically involve defined ligand-receptor interactions. Owing to their involvement in down-regulating the immune response, including the suppression of anti-tumor immune responses, the PD-L1, PD-L2, and PD-1 immune checkpoint proteins are among the most widely studied therapeutic targets for developing anti-cancer therapies. Recent success in anti-cancer therapy has been achieved by blocking either or both members of a defined pair of checkpoint proteins from associating to signal suppression of one or more pathways of an immune response. See, for example, Pardoll, *Nat. Rev. Cancer,* 12: 252-264 (2012) and Bonnefoy et al., *OncoImmunology,* 4:5, e1003015 (2015). Clinical studies using immune checkpoint inhibitors, such as antibodies targeting PD-1, PD-L1, or CTLA-4, have led to promising results, however, it has been observed that only a subset of patients initially respond to current inhibitors, and increasing clinical evidence indicates that a substantial proportion of initial responders ultimately relapse, with lethal, drug-resistant disease months or years later. Syn et al., *The Lancet Oncology,* 18(12): e731-e741 (2017). Accordingly, blocking a single immune checkpoint of the immune response may not be sufficient to provide a therapeutically effective treatment for treating cancer in all patients.

Transforming Growth Factor β (TGFβ)

Transforming growth factor beta (also referred to as "TGFβ" or "TGF-beta") is involved in a variety of developmental and metabolic processes in humans and other mammals. TGFβ also functions as a cytokine to regulate immune responses. For example, TGFβ has an ongoing critical role in the inhibition of activation of T cells to maintain immune quiescence and self-tolerance when bound to TGFβ receptors expressed on the surface of T cells. See, for example, the review by Oh et al., *J. Immunol.,* 191(8): 3973-3979 (2013). However, the same TGFβ-dependent process to maintain T cell quiescence and avoid autoimmunity may also suppress T cell activation to cancer and other foreign cells.

There are three major isoforms of TGFβ (TGFβ1, TGFβ2, TGFβ3), all three of which may be bound by one or more TGFβ receptors expressed on the surface of cells. The binding of TGFβ to TGFβ receptors expressed on the surface of cells signals phosphorylation of transcription factors Smad2 and Smad3, which form complexes with Smad4. The complexes are in turn transported into the cell nucleus and associate with DNA-binding cofactors to inhibit the transcription of various genes, including those that are relevant to activation in the case of T cells. Recent findings indicate that binding of TGFβ to the TGFβ type 1 receptor (also referred to by various other synonyms, including "TGFβR1," "TGFbetaR1," "TβRI," "TGFβRI," "TGFR1", and "ALK-5") is the critical ligand/receptor pair involved in this TGFβ-dependent signaling pathway that suppresses T cell activation. See, for example, Tu et al., *Immunity,* 48: 748-759 (2018). TGFβR2 and TGFβR3 are two other TGFβ receptor isotypes present in the human body. The three TGFβ receptors of the TGFβ superfamily of protein ligands can be distinguished from one another by their structural and functional properties. For example, TGFβR1 and TGFβR2 have a similar high affinity for TGFβ1 and low affinity for TGFβ2, whereas TGFβR3 has a high affinity for both homodimeric TGFβ1 and TGFβ2. See, for example, Cheifetz et al, *J. Biol. Chem.,* 263 (32): 16984-16991 (1988). All three TGFβ receptors also bind TGFβ3. On the cell surface, the TGFβR2/TGFβ complex or TGFβR3/TGF13 complex recruits TGFβR1 to form the signaling complex. See, Won et al., *Cancer Res.,* 59: 1273-7 (1999). TGFβR3 (also known as "betaglycan") occurs naturally as a 280-330 kilodalton (kD) glucosaminoglycan (GAG)-glycoprotein with an extracellular domain of 762 amino acid residues. Vilchis-Landeros et al., *Biochem. J.,* 355: 215-222 (2001). TGFβR3 binds to various members of the TGFβ superfamily of protein ligands via its core protein and can also bind basic fibroblast growth factor (bFGF) via its heparan sulfate chains, although bFGF is not involved directly in TGFβ signal transduction. See, Andres et al., *J. Biol. Chem.,* 267(9): 5927-5930 (1992).

The roles that PD-L1 and TGFβ play in blocking activation and proliferation of T cells is of particular concern because both pathways contribute to suppressing a robust T cell response to cancer cells arising in an individual. Accordingly, blocking both PD-L1 and TGFβ signaling pathways to release T cell activation from such suppression is accepted as a promising therapeutic approach to treat cancer or other diseases associated with suppression of T cell immune responses. Thus, there is a continuing need for therapeutic agents that are capable of blocking or inhibiting both PD-L1-mediated and TGFβ-mediated cellular signaling pathways.

SUMMARY OF THE INVENTION

The present invention addresses the above need by providing engineered bispecific binding proteins that bind human TGFβ and human PD-L1. Bispecific binding proteins of the present invention effectively inhibit or block separate signaling pathways in T cells that suppress T cell activation and/or proliferation in response to cancer cells that arise or are present in an individual (human or other mammal). Accordingly, by blocking both TGFβ-dependent and PD-L1-dependent immune suppression pathways, the "TGFβ/PD-L1" bispecific binding proteins of the invention are useful in treating cancer in an individual by stimulating (i.e., by de-suppressing) the individual's own T cell immune responses to cancer cells.

In an embodiment, the invention provides a TGFβ/PD-L1 bispecific binding protein that binds human TGFβ and human PD-L1 comprising three polypeptide chains wherein:
  the first polypeptide chain comprises, from amino terminus to carboxy terminus, TGFβR2(ECD)-CL-$VH_{PD-L1}$-CH1-Fc, wherein TGFβR2(ECD) is fused directly to CL and wherein CL is fused directly to $VH_{PD-L1}$-CH1-Fc;
  the second polypeptide chain comprises, from amino terminus to carboxy terminus, TGFβR2(ECD)-CH1, wherein TGFβR2(ECD) is fused directly to CH1; and
  the third polypeptide chain comprises, from amino terminus to carboxy terminus, $VL_{PD-L1}$-CL, wherein $VL_{PD-L1}$ is fused directly to CL;
  wherein each TGFβR2(ECD) moiety is an extracellular domain of human transforming growth factor beta receptor 2 (also referred to as "TGFβR2", "TGFβRII", "TGFbetaRII", and like synonyms) that comprises a TGFβ-binding domain that is capable of binding transforming growth factor 13 (also referred to as "TGFβ", "TGF-beta", or other synonyms), CL is an antibody light chain constant domain, $VH_{PD-L1}$ is an antibody heavy chain variable domain of a parental monoclonal antibody that binds human PD-L1, CH1 is a first constant domain of an antibody heavy chain, Fc is a heavy chain constant region of a human antibody (such as a human IgG antibody) comprising hinge-CH2-CH3 domains, and VL$_{PD-L1}$ is an antibody light chain variable domain of said parental monoclonal antibody that binds human PD-L1.

In describing the component chains of the bispecific binding proteins of the invention, "fused directly" signifies that no artificial peptide linkers are inserted between the recited domains.

When expressed in competent host cells, the polypeptide chains of the bispecific binding proteins of the invention associate in the same manner as natural immunoglobulins, such that two of said first polypeptide chains, two of said second polypeptide chains, and two of said third polypeptide chains are capable of associating to provide a monomeric, bispecific binding protein comprising six polypeptide chains and capable of binding both TGFβ and PD-L1. See FIG. 1.

In a preferred embodiment, a TGFβ/PD-L1 bispecific binding protein described herein is at least 98% fully-assembled, six-chain monomer. More preferably, a TGFβ/PD-L1 bispecific binding protein described herein is at least 98.5% monomer, and even more preferably, at least 99% monomer.

In an embodiment, a TGFβ/PD-L1 bispecific binding protein described herein comprises no more than 10 percent aggregates. More preferably, a TGFβ/PD-L1 bispecific binding protein described herein comprises less than 10 percent protein aggregates. Even more preferably, a TGFβ/PD-L1 bispecific binding protein described herein comprises 2 percent or less protein aggregates. Still more preferably, a TGFβ/PD-L1 bispecific binding protein described herein comprises less than 1.5% protein aggregates.

A TGFβR2(ECD) domain of a TGFβ/PD-L1 bispecific binding protein of the invention comprises a TGFβ-binding domain capable of binding human TGFβ. Preferably, the TGFβR2(ECD) domain of the TGFβ/PD-L1 bispecific binding protein of the invention comprises an amino acid sequence consisting of:

```
                                        (SEQ ID NO: 1)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPD.
```

The invention also provides anti-human PD-L1 monoclonal antibodies (mAbs) that bind human PD-L1 and that may be used to produce TGFβ/PD-L1 bispecific binding proteins according the invention. Such an anti-PD-L1 mAb is referred to as a "parental" or "donor" mAb because it provides one or more structural domains or even its entire antibody structure to make a TGFβ/PD-L1 bispecific binding protein of the invention. The one or more structural domains provided by a parental anti-PD-L1 mAb to make a TGFβ/PD-L1 bispecific binding protein of the invention may include, without limitation, a PD-L1 binding domain (antigen-binding domain) consisting of the antibody heavy and light chain variable domains (VH::VL), a Fab binding domain comprising the antibody PD-L1 binding domains and antibody CH1 and CL domains (VH-CH1::VL-CL), the antibody light chain (VL-CL), the antibody heavy chain (VH-CH1-hinge-CH2-CH3), the CL domain, and combinations thereof.

Preferably, an anti-human PD-L1 parental monoclonal antibody (mAb) used to make a TGFβ/PD-L1 bispecific binding protein of the invention is an IgG antibody.

In an embodiment, a preferred parental anti-PD-L1 mAb used to make a TGFβ/PD-L1 bispecific binding protein according to the invention has a binding affinity expressed as an equilibrium dissociation constant ($K_D$) for human PD-L1 of less than or equal to 1 nanomolar (nM). More preferably, a parental anti-PD-L1 mAb used to make a TGFβ/PD-L1 bispecific binding protein of the invention has a binding affinity ($K_D$) for human PD-L1 of less than 1 nM, i.e., a sub-nanomolar affinity for human PD-L1.

In another embodiment, an anti-PD-L1 mAb used in the compositions and methods of the invention is a humanized anti-PD-L1 mAb such as described herein. More preferably, an anti-PD-L1 mAb used to make a TGFβ/PD-L1 bispecific binding protein of the present invention is a humanized anti-PD-L1 mAb selected from the group consisting of: HuEM0005-86-2 with a G55A substitution (i.e., substitution of an alanine (A) residue for glycine (G) at position 55 (by Kabat numbering) of the VH region), in CDR-H2 (Example 2.1, below), HuEM0005-86-6 with a G55A substitution in CDR-H2 (Examples 2.1 and 3.2, below), HuEM0005-87-1 (Examples 2.2 and 3.2, below), and HuEM0005-90-1 with a G55A substitution in CDR-H2 (Examples 2.3 and 3.2, below).

More preferably, an anti-PD-L1 mAb used to make a TGFβ/PD-L1 bispecific binding protein of the present invention is a humanized anti-PD-L1 mAb selected from the group consisting of: HuEM0005-86-6 with a G55A mutation in CDR-H2 (Example 2.1 and 3.2, below), HuEM0005-87-1 (Examples 2.2 and 3.2, below), and HuEM0005-90-1 with a G55A mutation in CDR-H2 (Examples 2.3 and 3.2, below).

In a further embodiment, the invention provides a TGFβ/PD-L1 bispecific binding protein that binds TGFβ and human PD-L1 and comprises VH$_{PD-L1}$ and VL$_{PD-L1}$ domains of a PD-L1 binding site of a parental monoclonal antibody that binds human PD-L1, wherein the VH$_{PD-L1}$ and VL$_{PD-L1}$ domains comprise a set of six CDRs, i.e., CDR-H1, CDR-H2, CDR-H3, CDR-L1, CDR-L2, and CDR-L3, selected from the group of CDR sets defined below:

TABLE 1

Amino Acid Sequences of CDR Sets of Parental Anti-PD-L1 Monoclonal Antibodies

| CDR Set No. | CDR | CDR Amino Acid Sequence 12345678901234567890 | Sequence Identifier |
|---|---|---|---|
| 1 | CDR-H1 | TYGIN | SEQ ID NO: 2 |
|  | CDR-H2 | YIYIGNAYTEYNEKFKG | SEQ ID NO: 3 |
|  | CDR-H3 | DLMVIAPKTMDY | SEQ ID NO: 4 |
|  | CDR-L1 | KASQDVGTAVA | SEQ ID NO: 5 |
|  | CDR-L2 | WASTRHT | SEQ ID NO: 6 |
|  | CDR-L3 | QQYSSYPYT | SEQ ID NO: 7 |
| 2 | CDR-H1 | DYYIN | SEQ ID NO: 8 |
|  | CDR-H2 | ETIPNTGGTTYNQKFKA | SEQ ID NO: 9 |
|  | CDR-H3 | YQSGSPFAY | SEQ ID NO: 10 |
|  | CDR-L1 | KASQNVGTAVA | SEQ ID NO: 11 |
|  | CDR-L2 | SASNRYT | SEQ ID NO: 12 |
|  | CDR-L3 | QQHYSTPYT | SEQ ID NO: 13 |
| 3 | CDR-H1 | SHSIN | SEQ ID NO: 14 |
|  | CDR-H2 | YMYIGNAYTEYNEKFKG | SEQ ID NO: 15 |
|  | CDR-H3 | ITPVVAPYVMDY | SEQ ID NO: 16 |
|  | CDR-L1 | KASQDVGTAVA | SEQ ID NO: 17 |
|  | CDR-L2 | WASTRHT | SEQ ID NO: 18 |
|  | CDR-L3 | QQYSSYPYT | SEQ ID NO: 19 |

In another embodiment, a TGFβ/PD-L1 bispecific binding protein according to the invention binds TGFβ and PD-L1 and comprises $VH_{PD-L1}$ and $VL_{PD-L1}$ domains of a PD-L1 binding site of a parental anti-PD-L1 monoclonal antibody that binds human PD-L1, wherein the $VH_{PD-L1}$ and $VL_{PD-L1}$ domains comprise amino acid sequences selected from the following pairs of VH and VL domain sequences in Table 2:

TABLE 2

Amino Acid Sequences of VH and VL Domains of Preferred Parental Humanized Anti-PD-L1 Monoclonal Antibodies*

| Amino Acid Sequence of Heavy Chain Variable (VH) Domain 123456789012345678901234567890 | Amino Acid Sequence of Light Chain Variable (VL) Domain 123456789012345678901234567890 |
|---|---|
| EVQLVQSGAEVKKPGASVKVSCKTSGYTFT TYGINWVRQAPGQGLEWIGYIYIGNAYTFT NEKFKGKATLTSDPSTRTAYMELSSLRSDD TAVYYCARDLMVIAPKTMDYWGQGTTVTVS S (SEQ ID NO: 20) | DIQMTQSPSSVSASVGDRVTITCKASQDVG TAVAWYQQKPGKAPKLLIYWASTRHTGVPD RFTGSGSGTDFTLTISSLQPEDFATYYCQQ YSSYPYTFGGGTKVEIK (SEQ ID NO: 21) |
| EVQLVQSGAEVKKPGASVKVSCKASGYTFT DYYINWVRQAPGQGLEWMGETIPNTGGTTY NQKFKARVTMTVDTSTSTVYMELSSLRSED TAVYYCARYQSGSPFAYWGQGTTVTVSS (SEQ ID NO: 22) | DIVMTQSPDSLAVSLGERATINCKASQNVG TAVAWYQQKPGQPPKLLIYSASNRYTGVPD RFTGSGSGTDFTLTISSLQAEDVAVYYCQQ HYSTPYTFGGGTKLEIK (SEQ ID NO: 23) |
| EVQLVQSGAEVKKPGASVKVSCKASGYTFT SHSINWVRQATGQGLEWMGYMYIGNAYTEY NEKFKGRVTLTSNTSISTAYMELSSLRSED TAVYYCAKITPVVAPYVMDYWGQGTSVTVS S (SEQ ID NO: 24) | DIQLTQSPSFLSASVGDRVTITCKASQDVG TAVAWYQQKPGKAPKLLIYWASTRHTGVPS RFSGSGSGTEFTLTISSLQPEDFATYYCQQ YSSYPYTFGQGTKLEIK (SEQ ID NO: 25) |

*CDR sequences indicated by underlining

In an embodiment of the invention, a TGFβ/PD-L1 bispecific binding protein comprises:

a first polypeptide chain comprising the amino acid sequence:
(SEQ ID NO: 26)
TIPPHVQKSVNNDMIVTDNNGAVKEPQLCKFCDVRFSTCDNQKSCMSNCS
ITSICEKPQEVCVAVWRKNDENITLETVCHDPKLPYHDFILEDAASPKCI
MKEKKKPGETFFMCSCSSDECNDNIIFSEEYNTSNPDRTVAAPSVFIFPP
SDEQLKSGTASVVCLLNNFYPREAKVQWKVDNALQSGNSQESVTEQDSKD
STYSLSSTLTLSKADYEKHKVYACEVTHQGLSSPVTKSFNRGECEVQLVQ
SGAEVKKPGASVKVSCKTSGYTFTTYGINWVRQAPGQGLEWIGYIYIGNA
YTEYNEKFKGKATLTSDPSTRTAYMELSSLRSDDTAVYYCARDLMVIAPK
TMDYWGQGTTVTVSSASTKGPSVFPLAPSSKSTSGGTAALGCLVKDYFPE
PVTVSWNSGALTSGVHTFPAVLQSSGLYSLSSVVTVPSSSLGTQTYICNV
NHKPSNTKVDKKVEPKSCDKTHTCPPCPAPELLGGPSVFLFPPKPKDTLM
ISRTPEVTCVVVDVSHEDPEVKFNWYVDGVEVHNAKTKPREEQYNSTYRV
VSVLTVLHQDWLNGKEYKCKVSNKALPAPIEKTISKAKGQPREPQVYTLP
PSREEMTKNQVSLTCLVKGFYPSDIAVEWESNGQPENNYKTTPPVLDSDG
SFFLYSKLTVDKSRWQQGNVFSCSVMHEALHNHYTQKSLSLSPGK, a second polypeptide chain comprising the amino acid sequence:
(SEQ ID NO: 27)
TIPPHVQKSVNNDMIVTDNNGAVKFPQLCKFCDVRFSTCDNQKSCMSNCS
ITSICEKPQEVCVAVWRKNDENITLETVCHDPKLPYHDFILEDAASPKCI
MKEKKKPGETFFMCSCSSDECNDNIIFSEEYNTSNPDASTKGPSVFPLAP
SSKSTSGGTAALGCLVKDYFPEPVTVSWNSGALTSGVHTFPAVLQSSGLY
SLSSVVTVPSSSLGTQTYICNVNHKPSNTKVDKKVEPKSC;
and a third polypeptide chain comprising the amino acid sequence:
(SEQ ID NO: 28)
DIQMTQSPSSVSASVGDRVTITCKASQDVGTAVAWYQQKPGKAPKLLIYW
ASTRHTGVPDRFTGSGSGTDFTLTISSLQPEDFATYYCQQYSSYPYTFGG
GTKVEIKRTVAAPSVFIFPPSDEQLKSGTASVVCLLNNEYPREAKVQWKV
DNALQSGNSQESVTEQDSKDSTYSLSSTLTLSKADYEKHKVYACEVTHQG
LSSPVTKSFNRGEC.

In another embodiment, a TGFβ/PD-L1 bispecific binding protein comprises:

a first polypeptide chain comprising the amino acid sequence:
(SEQ ID NO: 29)
TIPPHVQKSVNNDMIVTDNNGAVKFPQLCKFCDVRFSTCDNQKSCMSNCS
ITSICEKPQEVCVAVWRKNDENITLETVCHDPKLPYHDFILEDAASPKCI
MKEKKKPGETFFMCSCSSDECNDNIIFSEEYNTSNPDRTVAAPSVFIFPP
SDEQLKSGTASVVCLLNNFYPREAKVQWKVDNALQSGNSQESVTEQDSKD
STYSLSSTLTLSKADYEKHKVYACEVTHQGLSSPVTKSFNRGECEVQLVQ
SGAEVKKPGASVKVSCKASGYTFTDYYINWVRQAPGQGLEWMGETIPNTG
GTTYNQKFKARVTMTVDTSTSTVYMELSSLRSEDTAVYYCARYQSGSPFA
YWGQGTTVTVSSASTKGPSVFPLAPSSKSTSGGTAALGCLVKDYFPEPVT
VSWNSGALTSGVHTFPAVLQSSGLYSLSSVVTVPSSSLGTQTYICNVNHK
PSNTKVDKKVEPKSCDKTHTCPPCPAPELLGGPSVFLFPPKPKDTLMISR
TPEVTCVVVDVSHEDPEVKFNWYVDGVEVHNAKTKPREEQYNSTYRVVSV
LTVLHQDWLNGKEYKCKVSNKALPAPIEKTISKAKGQPREPQVYTLPPSR
EEMTKNQVSLTCLVKGFYPSDIAVEWESNGQPENNYKTTPPVLDSDGSFF
LYSKLTVDKSRWQQGNVFSCSVMHEALHNHYTQKSLSLSPGK;

a second polypeptide chain comprising the amino acid sequence:
(SEQ ID NO: 27)
TIPPHVQKSVNNDMIVTDNNGAVKFPQLCKFCDVRFSTCDNQKSCMSNCS
ITSICEKPQEVCVAVWRKNDENITLETVCHDPKLPYHDFILEDAASPKCI
MKEKKKPGETFFMCSCSSDECNDNIIFSEEYNTSNPDASTKGPSVFPLAP
SSKSTSGGTAALGCLVKDYFPEPVTVSWNSGALTSGVHTFPAVLQSSGLY
SLSSVVTVPSSSLGTQTYICNVNHKPSNTKVDKKVEPKSC;
and -continued a third polypeptide chain comprising the amino
acid sequence:
(SEQ ID NO: 30)
DIVMTQSPDSLAVSLGERATINCKASQNVGTAVAWYQQKPGQPPKLLIYS
ASNRYTGVPDRFTGSGSGTDFTLTISSLQAEDVAVYYCQQHYSTPYTFGG
GTKLEIKRTVAAPSVFIFPPSDEQLKSGTASVVCLLNNFYPREAKVQWKV
DNALQSGNSQESVTEQDSKDSTYSLSSTLTLSKADYEKHKVYACEVTHQG
LSSPVTKSFNRGEC.

In another embodiment, a TGFβ/PD-L1 bispecific binding protein comprises:

a first polypeptide chain comprising the amino
acid sequence:
(SEQ ID NO: 31)
TIPPHVQKSVNNDMIVTDNNGAVKFPQLCKFCDVRFSTCDNQKSCMSNCS
ITSICEKPQEVCVAVWRKNDENITLETVCHDPKLPYHDFILEDAASPKCI
MKEKKKPGETFFMCSCSSDECNDNIIFSEEYNTSNPDRTVAAPSVFIFPP
SDEQLKSGTASVVCLLNNFYPREAKVQWKVDNALQSGNSQESVTEQDSKD
STYSLSSTLTLSKADYEKHKVYACEVTHQGLSSPVTKSFNRGECEVQLVQ
SGAEVKKPGASVKVSCKASGYTFTSHSINWVRQATGQGLEWMGYMYIGNA
YTEYNEKFKGRVTLTSNTSISTAYMELSSLRSEDTAVYYCAKITPVVAPY
VMDYWGQGTSVTVSSASTKGPSVFPLAPSSKSTSGGTAALGCLVKDYFPE
PVTVSWNSGALTSGVHTFPAVLQSSGLYSLSSVVTVPSSSLGTQTYICNV
NHKPSNTKVDKKVEPKSCDKTHTCPPCPAPELLGGPSVFLFPPKPKDTLM
ISRTPEVTCVVVDVSHEDPEVKFNWYVDGVEVHNAKTKPREEQYNSTYRV
VSVLTVLHQDWLNGKEYKCKVSNKALPAPIEKTISKAKGQPREPQVYTLP
PSREEMTKNQVSLTCLVKGEYPSDIAVEWESNGQPENNYKTTPPVLDSDG
SFELYSKLTVDKSRWQQGNVFSCSVMHEALHNHYTQKSLSLSPGK;

a second polypeptide chain comprising the amino
acid sequence:
(SEQ ID NO: 27)
TIPPHVQKSVNNDMIVTDNNGAVKFPQLCKFCDVRFSTCDNQKSCMSNCS
ITSICEKPQEVCVAVWRKNDENITLETVCHDPKLPYHDFILEDAASPKCI
MKEKKKPGETFFMCSCSSDECNDNIIFSEEYNTSNPDASTKGPSVFPLAP
SSKSTSGGTAALGCLVKDYFPEPVTVSWNSGALTSGVHTFPAVLQSSGLY
SLSSVVTVPSSSLGTQTYICNVNHKPSNTKVDKKVEPKSC;
and a third polypeptide chain comprising the amino
acid sequence:
(SEQ ID NO: 32)
DIQLTQSPSFLSASVGDRVTITCKASQDVGTAVAWYQQKPGKAPKLLIYW
ASTRHTGVPSRFSGSGSGTEFTLTISSLQPEDFATYYCQQYSSYPYTFGQ
GTKLEIKRTVAAPSVFIFPPSDEQLKSGTASVVCLLNNFYPREAKVQWKV
DNALQSGNSQESVTEQDSKDSTYSLSSTLTLSKADYEKHKVYACEVTHQG
LSSPVTKSFNRGEC.

In another embodiment, a TGFβ/PD-L1 bispecific binding protein described herein is glycosylated. Preferably, the glycosylation is a human glycosylation pattern.

The invention also provides methods of making and using anti-PD-L1 antibodies and TGFβ/PD-L1 bispecific binding proteins described herein as well as various compositions that may be used in methods of detecting PD-L1 and/or TGFβ in a sample.

The invention also provides one or more isolated nucleic acids encoding one, two, or all three component polypeptide chains of a TGFβ/PD-L1 bispecific antibody as described herein.

In another embodiment, the invention provides one or more isolated nucleic acids encoding a first polypeptide chain, a second polypeptide, and a third polypeptide of a TGFβ/PD-L1 bispecific antibody as described herein, wherein:
the first polypeptide chain comprises an amino acid sequence of SEQ ID NO:26, the second polypeptide chain comprises an amino acid sequence of SEQ ID NO:27, and the third polypeptide chain comprises an amino acid sequence of SEQ ID NO:28; or
the first polypeptide chain comprises an amino acid sequence of SEQ ID NO:29, the second polypeptide chain comprises an amino acid sequence of SEQ ID NO:27, and the third polypeptide chain comprises an amino acid sequence of SEQ ID NO:30; or
the first polypeptide chain comprises an amino acid sequence of SEQ ID NO:31, the second polypeptide chain comprises an amino acid sequence of SEQ ID NO:27, and the third polypeptide chain comprises an amino acid sequence of SEQ ID NO:32.

In an embodiment, the invention provides an isolated nucleic acid molecule encoding an amino acid sequence for the first polypeptide chain of a TGFβ/PD-L1 bispecific binding protein described herein that comprises, from amino terminus to carboxy terminus, TGFβR2(ECD)-CL-VH$_{PD\text{-}L1}$-CH1-Fc, wherein TGFβR2(ECD) is fused directly to CL, and CL is fused directly to VH$_{PD\text{-}L1}$, and wherein TGFβR2 (ECD) is an extracellular domain of transforming growth factor β receptor 2 protein that comprises a TGFβ-binding domain capable of binding human TGFβ, CL is an antibody light chain constant domain, VH$_{PD\text{-}L1}$ is an antibody heavy chain variable domain of a parental monoclonal antibody that binds human PD-L1, CH1 is a first constant domain of an antibody heavy chain, Fc is a heavy chain constant region of a human antibody comprising hinge-CH2-CH3 domains. Preferably, the amino acid sequence of the first polypeptide chain encoded on the isolated nucleic acid molecule comprises any one of SEQ ID NO:26, SEQ ID NO:29, and SEQ ID NO:31.

In another embodiment, the invention provides a vector comprising one or more isolated nucleic acids encoding one, two, or all three of the component polypeptide chains of a TGFβ/PD-L1 bispecific binding protein described herein. Such a vector may be an autonomously replicating vector or a vector that incorporates the one or more isolated nucleic acids present in the vector into a host cell genome. A vector according to the invention may be used to replicate an isolated nucleic acid encoding one or more polypeptides of a TGFβ/PD-L1 bispecific binding protein described herein to provide more nucleic acid. Isolated nucleic acids encoding one, two, or all three component polypeptide chains of a TGFβ/PD-L1 bispecific binding protein described herein may be inserted into a vector for carrying out various genetic analyses, for expressing a TGFβ/PD-L1 bispecific binding protein described herein, for expressing one or more polypeptide chains of a TGFβ/PD-L1 bispecific binding protein described herein, or for characterizing or improving one or more properties of a TGFβ/PD-L1 bispecific binding protein described herein.

In an embodiment, a vector according to the invention is an expression vector comprising one, two, or all three isolated nucleic acids, wherein the one, two, or three isolated nucleic acids encode one, two, or all three of the component polypeptide chains of a TGFβ/PD-L1 bispecific binding protein described herein. Such expression vectors can be used to express a TGFβ/PD-L1 bispecific binding protein described herein or one or more component polypeptide chains in a host cell that is compatible with and transfected with such expression vectors.

In another embodiment, each of three isolated nucleic acid molecules encoding one of the three component polypeptide chains of a TGFβ/PD-L1 bispecific binding protein is inserted into a separate expression vector, wherein each isolated nucleic acid molecule is operably linked to appropriate transcriptional and/or translational sequences to permit expression of the encoded polypeptide chain, wherein all three encoded polypeptide chains can be expressed together to form the TGFβ/PD-L1 bispecific binding protein in a host cell that is compatible with and transfected with the three expression vectors.

Preferred vectors for cloning and expressing nucleic acids described herein include, but are not limited to, pcDNA3.1, pcDNA3.1 TOPO, pcDNA, pTT (Durocher et al, *Nucleic Acids Res.*, 30(2e9): 1-9 (2002)), pTT3 (pTT with additional multiple cloning sites), pEFBOS (Mizushima and Nagata, *Nucleic Acids Res.*, 18(17): 5322 (1990)), pBV, pJV, pEF6 TOPO and pBJ, and modifications thereof as required for expressing a TGFβ/PD-L1 bispecific binding protein described herein in a particular host cell. An isolated host cell comprising one or more expression vectors, wherein said one or more vectors encodes the three polypeptide chains that form a TGFβ/PD-L1 bispecific binding protein.

The invention also provides an isolated host cell comprising a vector described above.

In another embodiment, the invention provides an isolated host cell comprising one or more vectors comprising one or more isolated nucleic acids encoding one, two, or all three polypeptide chains of a TGFβ/PD-L1 bispecific binding protein described herein.

In a preferred embodiment, an isolated host cell of the invention comprises three expression vectors, wherein each expression vector comprises an isolated nucleic acid encoding one of the three component polypeptide chains of a TGFβ/PD-L1 bispecific binding protein described herein so that each of the three component polypeptide chains can be expressed and form the TGFβ/PD-L1 bispecific binding protein in the isolated host cell.

An isolated host cell comprising a vector described herein may be an isolated prokaryotic cell or an isolated eukaryotic cell.

In an embodiment of the invention, an isolated prokaryotic host cell comprising a vector described herein is a bacterial host cell. The bacterial host cell may be a Gram positive, Gram negative, or Gram variable bacterial cell. Preferably, the bacterial host cell comprising a vector described herein is a Gram negative bacterium. Even more preferably, a bacterial host cell comprising a vector described herein is an *Escherichia coli* cell.

In a further embodiment of the invention, an isolated host cell comprising one or more vectors described herein is a eukaryotic host cell. Preferred isolated eukaryotic host cells comprising one or more vectors described herein may include, without limitation, a mammalian host cell, an insect host cell, a plant host cell, a fungal host cell, a eukaryotic algal host cell, a nematode host cell, a protozoan host cell, and a fish host cell. Preferably, an isolated host cell comprising one or more vectors described herein is a mammalian host cell. More preferably, an isolated mammalian host cell comprising one or more vectors described herein is selected from the group consisting of: a human embryonic kidney (HEK 293) cell and derivatives (e.g., HEK 293T, HEK 293E, HEK 293 F, HEK 293 FT), a Chinese Hamster Ovary (CHO) cell, a COS cell, a Vero cell, an SP2/0 cell, an NS/0 myeloma cell, a baby hamster kidney (BHK) cell, a HeLa cell, a human B cell, a CV-1/EBNA cell, an L cell, a 3T3 cell, an HEPG2 cell, a PerC6 cell, and an MDCK cell.

A preferred isolated fungal host cell comprising one or more vectors described herein is selected from the group consisting of: *Aspergillus, Neurospora, Saccharomyces, Pichia, Hansenula, Schizosaccharomyces, Kluyveromyces, Yarrowia,* and *Candida*. More preferably, a *Saccharomyces* host cell comprising one or more vectors described herein is a *Saccharomyces cerevisiae* cell.

Also provided is a method of producing a TGFβ/PD-L1 bispecific binding protein that binds TGFβ and human PD-L1 as described herein comprising culturing an isolated host cell comprising one, two, or three vectors comprising nucleic acid encoding all three polypeptide chains of the bispecific binding protein under conditions sufficient to produce the bispecific binding protein.

Another aspect of the invention is a bispecific binding protein that binds TGFβ and PD-L1 as described herein produced by a method described above.

The invention also provides anti-PD-L1 monoclonal antibodies, and antigen-binding portions thereof, capable of binding human PD-L1. Preferably, an anti-PD-L1 monoclonal antibody, or antigen-binding portion thereof, comprises a set of six CDRs, CDR-H1, CDR-H2, CDR-H3, CDR-L1, CDR-L2, and CDR-L3, selected from the from group of CDR sets below:

| CDR Set No. | CDR | CDR Amino Acid Sequence 12345678901234567890 | Sequence Identifier |
|---|---|---|---|
| 1 | CDR-H1 | TYGIN | SEQ ID NO: 2 |
|  | CDR-H2 | YIYIGNAYTEYNEKFKG | SEQ ID NO: 3 |
|  | CDR-H3 | DLMVIAPKTMDY | SEQ ID NO: 4 |
|  | CDR-L1 | KASQDVGTAVA | SEQ ID NO: 5 |
|  | CDR-L2 | WASTRHT | SEQ ID NO: 6 |
|  | CDR-L3 | QQYSSYPYT | SEQ ID NO: 7 |
| 2 | CDR-H1 | DYYIN | SEQ ID NO: 8 |
|  | CDR-H2 | ETIPNTGGTTYNQKFKA | SEQ ID NO: 9 |
|  | CDR-H3 | YQSGSPFAY | SEQ ID NO: 10 |
|  | CDR-L1 | KASQNVGTAVA | SEQ ID NO: 11 |
|  | CDR-L2 | SASNRYT | SEQ ID NO: 12 |
|  | CDR-L3 | QQHYSTPYT | SEQ ID NO: 13 |
| 3 | CDR-H1 | SHSIN | SEQ ID NO: 14 |
|  | CDR-H2 | YMYIGNAYTEYNEKFKG | SEQ ID NO: 15 |
|  | CDR-H3 | ITPVVAPYVMDY | SEQ ID NO: 16 |
|  | CDR-L1 | KASQDVGTAVA | SEQ ID NO: 17 |
|  | CDR-L2 | WASTRHT | SEQ ID NO: 18 |
|  | CDR-L3 | QQYSSYPYT | SEQ ID NO: 19 |

In another embodiment, a monoclonal antibody, or antigen-binding portion thereof, capable of binding human PD-L1 as described herein is a humanized monoclonal antibody, or antigen-binding portion thereof. More preferably, the humanized monoclonal antibody, or antigen-binding portion thereof, comprises a heavy chain variable (VH) domain and a light chain variable (VL) domain comprising amino acid sequences selected from the following pairs of heavy and light chain variable domain sequences:

| Amino Acid Sequence of Heavy Chain Variable (VH) Domain 12345678901234567890123456789012345678 90 | Amino Acid Sequence of Light Chain Variable (VL) Domain 12345678901234567890123456789012345678 90 |
|---|---|
| EVQLVQSGAEVKKPGASVKVSCKTSGYTFT TYGINWVRQAPGQGLEWIGYIYIGNAYTEY | DIQMTQSPSSVSASVGDRVTITCKASQDVG TAVAWYQQKPGKAPKLLIYWASTRHTGVPD |

| Amino Acid Sequence of Heavy Chain Variable (VH) Domain 12345678901234567890123456789012345678 90 | Amino Acid Sequence of Light Chain Variable (VL) Domain 12345678901234567890123456789012345678 90 |
|---|---|
| NEKFKGKATLTSDPSTRTAYMELSSLRSDD TAVYYCARDLMVIAPKTMDYWGQGTTVTVS S (SEQ ID NO: 20) | RFTGSGSGTDFTLTISSLQPEDFATYYCQQ YSSYPYTFGGGTKVEIK (SEQ ID NO: 21) |
| EVQLVQSGAEVKKPGASVKVSCKASGYTFT DYYINWVRQAPGQGLEWMGETIPNTGGTTY NQKFKARVTMTVDTSTSTVYMELSSLRSED TAVYYCARYQSGSPFAYWGQGTTVTVSS (SEQ ID NO: 22) | DIVMTQSPDSLAVSLGERATINCKASQNVG TAVAWYQQKPGQPPKLLIYSASNRYTGVPD RFTGSGSGTDFTLTISSLQAEDVAVYYCQQ HYSTPYTFGGGTKLEIK (SEQ ID NO: 23) |
| EVQLVQSGAEVKKPGASVKVSCKASGYTFT SHSINWVRQATGQGLEWMGYMYIGNAYTEY NEKFKGRVTLTSNTSISTAYMELSSLRSED TAVYYCAKITPVVAPYVMDYWGQGTSVTVS S (SEQ ID NO: 24) | DIQLTQSPSFLSASVGDRVTITCKASQDVG TAVAWYQQKPGKAPKLLIYWASTRHTGVPS RFSGSGSGTEFTLTISSLQPEDFATYYCQQ YSSYPYTFGQGTKLEIK (SEQ ID NO: 25) |

In an embodiment, an anti-PD-L1 monoclonal antibody, or antigen binding portion thereof, described herein is useful as a parental monoclonal antibody for producing a TGFβ/PD-L1 bispecific binding protein of the invention.

In an embodiment, an anti-PD-L1 monoclonal antibody, or antigen-binding portion thereof, described herein is capable of binding human PD-L1 and blocking (de-suppressing) PD-L1-mediated suppression of T cell activation.

In another embodiment, an anti-PD-L1 monoclonal antibody, or antigen binding portion thereof, described herein is useful to treat cancer or other disease associated with PD-L1-mediated suppression of T cell activation.

Anti-PD-L1 monoclonal antibodies, or antigen-binding portions thereof, and TGFβ/PD-L1 bispecific binding proteins described herein are capable of binding human PD-L1 and blocking (de-suppressing) PD-L1 signaling that suppresses T cell activation. TGFβ/PD-L1 bispecific binding proteins described herein bind both TGFβ and human PD-L1 and are capable of blocking both TGFβ and PD-L1 signaling pathways that suppress T cell activation. Such dual suppression of both TGFβ and PD-L1 signaling pathways is expected to provide a greater enhancement in T cell activation than blocking the PD-L1 pathway alone. Accordingly, anti-PD-L1 antibodies and TGFβ/PD-L1 bispecific binding proteins described herein are useful in treating cancer or other disease in which T cell activation is beneficial by releasing from suppression T cell activation and thereby enhancing a patient's immune response to the cancer or other disease.

An anti-PD-L1 monoclonal antibody, antigen-binding portion thereof, or a TGFβ/PD-L1 bispecific binding protein described herein may be used in the manufacture of a medicament for treating cancer or other disease associated with TGFβ- and/or PD-L1-mediated suppression of T cell activation.

The invention provides pharmaceutical compositions comprising an anti-PD-L1 monoclonal antibody, antigen-binding portion thereof, or a TGFβ/PD-L1 bispecific binding protein described herein and a pharmaceutically acceptable carrier. Pharmaceutical compositions of the invention are useful in treating cancer or other disease associated with TGFβ- and/or PD-L1-mediated inhibition or suppression of a T cell immune response. A pharmaceutical composition of the invention comprising an anti-PD-L1 antibody, antigen-binding portion thereof, or a TGFβ/PD-L1 bispecific binding protein described herein may also comprise one or more additional agents that provide an additional desirable or beneficial property. Such additional agents include, but are not limited to, an additional therapeutic agent (other than the anti-PD-L1 antibody, antigen-binding portion thereof, or the TGFβ/PD-L1 bispecific binding protein of the invention present in the composition), an imaging agent, and a cytotoxic agent. Examples of additional therapeutic agents that can be incorporated into a pharmaceutical composition of the invention include, but are not limited to, an antibiotic, an anti-viral compound, an anti-cancer compound (other than the anti-PD-L1 antibody or TGFβ/PD-L1 bispecific binding protein of the invention present in the composition), a sedative, a stimulant, a local anesthetic, a corticosteroid, an analgesic, an anti-histamine, a non-steroid anti-inflammatory drug (NSAID), and combinations thereof.

In an embodiment, a pharmaceutical composition described herein may be prepared for administration to an individual by a parenteral or non-parenteral route.

In another embodiment, a pharmaceutical composition described herein may be prepared for administration to an individual by at least any one of the following modes: parenteral, subcutaneous, intramuscular, intravenous, intrarticular, intrabronchial, intraabdominal, intracapsular, intracartilaginous, intracavitary, intracelial, intracerebellar, intracerebroventricular, intracolic, intracervical, intragastric, intrahepatic, intramyocardial, intraosteal, intrapelvic, intrapericardiac, intraperitoneal, intrapleural, intraprostatic, intrapulmonary, intrarectal, intrarenal, intraretinal, intraspinal, intrasynovial, intrathoracic, intrauterine, intravesical, bolus, vaginal, rectal, buccal, sublingual, intranasal, and transdermal.

In a preferred embodiment, the invention provides a method of treating or preventing cancer in an individual (human or other mammal) comprising administering to the individual a TGFβ/PD-L1 bispecific binding protein that is capable of binding TGFβ and human PD-L1 as describe herein.

According to the invention, a method of treating cancer in a patient comprises administering to the patient a TGFβ/PD-L1 bispecific binding protein or anti-PD-L1 monoclonal antibody, or antigen-binding portion thereof, described herein.

In an embodiment of a method of treating cancer in a patient according to the invention, the cancer is an epithelial cancer.

In another embodiment, the cancer that is treated according to a method of the invention is selected from the group consisting of: a melanoma (e.g., metastatic malignant melanoma), renal cancer (e.g. clear cell carcinoma), prostate cancer (e.g., hormone refractory prostate adenocarcinoma), pancreatic adenocarcinoma, breast cancer, colon cancer, lung cancer (e.g., non-small cell lung cancer), esophageal cancer, squamous cell carcinoma of the head and neck, liver cancer, ovarian cancer, cervical cancer, thyroid cancer, glioblastoma, glioma, leukemia, lymphoma, and other neoplastic malignancies.

In a particular embodiment, the invention provides a method of treating a cancer in an individual comprising the step of administering to the individual a TGFβ/PD-L1 bispecific binding protein described herein that binds TGFβ (for example, TGFβ present in a cancer microenvironment) and human PD-L1 expressed on the surface of a cancer cell, wherein the binding of the bispecific binding protein to TGFβ and/or PD-L1 in the individual activates T cells to produce an immune response that is detrimental to the cancer cell.

In another embodiment, a beneficial effect of administering anti-PD-L1 monoclonal antibody, antigen-binding portion thereof, or a TGFβ/PD-L1 bispecific binding protein described herein may be to opsonize and/or clear cancer cells expressing PD-L1.

A TGFβ/PD-L1 bispecific binding protein, an anti-PD-L1 monoclonal antibody, or antigen-binding portion thereof, as described herein is useful to inhibit PD-L1-mediated suppression of T cell activation, either in vitro or in vivo.

A TGFβ/PD-L1 bispecific binding protein described herein is useful to inhibit TGFβ-mediated suppression of T cell activation, either in vitro or in vivo.

An anti-PD-L1 monoclonal antibody, or antigen-binding portions thereof, described herein is useful for detecting or measuring PD-L1 in any of a variety of immunoassay formats known in the art, either in vitro or in vivo.

A TGFβ/PD-L1 bispecific binding protein described herein is useful for detecting or measuring TGFβ or PD-L1 in any of a variety of immunodetection or purification formats known in the art for detecting, quantitating, or isolating TGFβ, PD-L1, both TGFβ and PD-L1, or cells expressing PD-L1, either in vitro or in vivo.

Assay and formats adaptable for use with an anti-PD-L1 antibody, antigen-binding portion thereof, or a TGFβ/PD-L1 bispecific binding protein described herein include, but are not limited to, immunoblot assays (for example, a Western blot); immunoaffinity chromatography, for example, wherein a bispecific binding protein described herein is adsorbed or linked to a chromatography resin or bead; immunoprecipitation assays; immunochips; tissue immunohistochemistry assays; flow cytometry (including fluorescence activated cell sorting); sandwich immunoassays; immunochips, wherein a bispecific binding protein is immobilized or bound to a substrate; radioimmunoassays (RIAs); enzyme immunoassays (EIAs); enzyme-linked immunosorbent assay (ELISAs); competitive-inhibition immunoassays; fluorescence polarization immunoassay (FPIA); enzyme multiplied immunoassay technique (EMIT); bioluminescence resonance energy transfer (BRET); and homogenous chemiluminescent assays.

The invention further provides a method for detecting TGFβ or PD-L1 in a sample (for example, a mixture, composition, solution, or biological sample) comprising contacting the sample with a TGFβ/PD-L1 bispecific binding protein that binds TGFβ and PD-L1 as described herein, where the sample comprises or is suspected of comprising TGFβ or PD-L1. Biological samples that can serve as a sample for an immunodetection assay of the invention include, without limitation, whole blood, plasma, serum, cell lysates, tissue extracts, tears, saliva, urine, perspiration, and other bodily fluids.

An anti-PD-L1 monoclonal antibody, antigen-binding portion thereof, or a TGFβ/PD-L1 bispecific binding protein described herein may be directly or indirectly labeled with a detectable substance to facilitate detection of the bound or unbound anti-PD-L1 monoclonal antibody, antigen-binding portion thereof, or TGFβ/PD-L1 bispecific binding protein.

A TGFβ/PD-L1 bispecific binding protein or an anti-PD-L1 monoclonal antibody described herein may be conjugated to another compound, for example, within or at the C-terminus of either or both of the paired CH3 domains of the Fc regions in an analogous manner to other binding proteins and antibodies that comprise an Fc region. Compounds that may be conjugated to a TGFβ/PD-L1 bispecific binding protein or an anti-PD-L1 monoclonal antibody bispecific binding protein described herein include, but are not limited to, a cytotoxic agent, an imaging agent, and a therapeutic agent. Preferred imaging agents that may be conjugated to a TGFβ/PD-L1 bispecific binding protein or an anti-PD-L1 monoclonal antibody described herein include, without limitation, a radiolabel, an enzyme, a fluorescent label, a luminescent label, a bioluminescent label, a magnetic label, biotin, streptavidin, and avidin. Radiolabels that may be conjugated to a TGFβ/PD-L1 bispecific binding protein or an anti-PD-L1 monoclonal antibody described herein include, but are not limited to, $^{3}$H, $^{14}$C, $^{35}$S, $^{90}$Y, $^{99}$Tc, $^{111}$In, $^{131}$I, $^{177}$Lu, $^{166}$Ho, and $^{153}$Sm. Preferred cytotoxic or therapeutic compounds that may be conjugated to a TGFβ/PD-L1 bispecific binding protein or an anti-PD-L1 monoclonal antibody described herein include, but are not limited to, an anti-metabolite, an alkylating agent, an antibiotic, a growth factor, a cytokine, an anti-angiogenic agent, an anti-mitotic agent, an anthracycline, a toxin, and an apoptotic agent. A preferred enzyme useful in an immunodetection assay of the invention that may be conjugated to a TGFβ/PD-L1 bispecific binding protein or an anti-PD-L1 monoclonal antibody described herein is one that can provide a detectable signal when brought into contact with one or more reagents. Such enzymes include, but are not limited to, horseradish peroxidase, alkaline phosphatase, β-galactosidase, or acetylcholinesterase. Examples of suitable fluorescent materials that may be used in an immunodetection assay of the invention include, but are not limited to, umbelliferone, fluorescein, fluorescein isothiocyanate, rhodamine, dichlorotriazinylamine fluorescein, dansyl chloride, and phycoerythrin. An example of a luminescent material that may be used in an immunodetection assay of the invention is luminol.

BRIEF DESCRIPTION OF THE DRAWINGS

FIGS. 2A, 2B, and 2C show elution profiles (chromatograms) of TGFβ/PD-L1 bispecific binding proteins applied to size exclusion chromatography (SEC) HPLC column after purification over a Protein A chromatography column. FIG. 2A shows the SEC elution profile of the TGFβ/PD-L1 bispecific binding protein designated FIT1012-3a. FIG. 2B shows the SEC elution profile of the TGFβ/PD-L1 bispecific binding protein designated FIT1012-4a. FIG. 2C shows the SEC elution profile of the TGFβ/PD-L1 bispecific binding protein designated FIT1012-7a. The results indicate that the TGFβ/PD-L1 bispecific binding protein can be expressed efficiently as a homogenous six-chain, monomeric proteins in the HEK293 E cells transient expression system. See, Example 3.2 for additional details.

FIG. 4A shows results of the assay to determine the simultaneous dual-binding activity of each binding protein for TGFβ isoform 1 and PD-L1. FIG. 4B shows the results of the assay to determine the simultaneous dual-binding activity of each binding protein for TGFβ isoform 2 and PD-L1. FIG. 4c shows the results of the assay to determine the simultaneous dual-binding activity of each binding protein for TGFβ isoform 3 and PD-L1. The results indicate that TGFβ/PD-L1 bispecific binding proteins can simultaneously bind to PD-L1 and TGFβ isoform proteins. The recombinant TGFbRII-ECD-Fc fusion protein, which is monospecific for TGFβ isoform proteins, does not have this ability. See, Example 5.2 for additional details.

FIG. 5A shows the concentration of IL-2 (pg/ml) in the medium versus concentration of each of the binding proteins and the negative control human IgG1 antibody. FIG. 5B shows the concentration of IFN-γ (pg/ml) in the medium versus concentration of each of the binding proteins and the negative control human IgG1 antibody. The results indicate that the anti-PD-L1 moieties of the TGFβ/PD-L1 bispecific binding proteins and of bintrafusp alfa (as a positive control) are functional in binding PD-L1 and de-suppressing T cell activation without interference from the TGFβ binding moiety. See, Example 6.1 for additional details.

FIG. 6A shows the results of an assay to detect inhibition of Smad2 phosphorylation in MDA-MB-231 cancer cells (ATCC), which express TGFβ receptors, in the presence of varying concentrations of TGFβ/PD-L1 bispecific binding proteins FIT1012-3a, FIT1012-4a, FIT1012-7a, and bintrafusp alfa, and also a human IgG1 antibody ("Hu IgG control"), which served a negative control for the assay. FIG. 6B shows anti-tumor efficacy of FIT1012-7a in the Detroit 562 human pharyngeal carcinoma xenograft model in nude mice in comparison with bintrafusp alfa. FIG. 6C shows anti-tumor efficacy of the FIT1012-7a in the A375 human melanoma xenograft model in PBMC engrafted M-NSG mice in comparison with HuEM0005-90-1 and bintrafusp alfa.

DETAILED DESCRIPTION OF THE INVENTION

Figure 1:
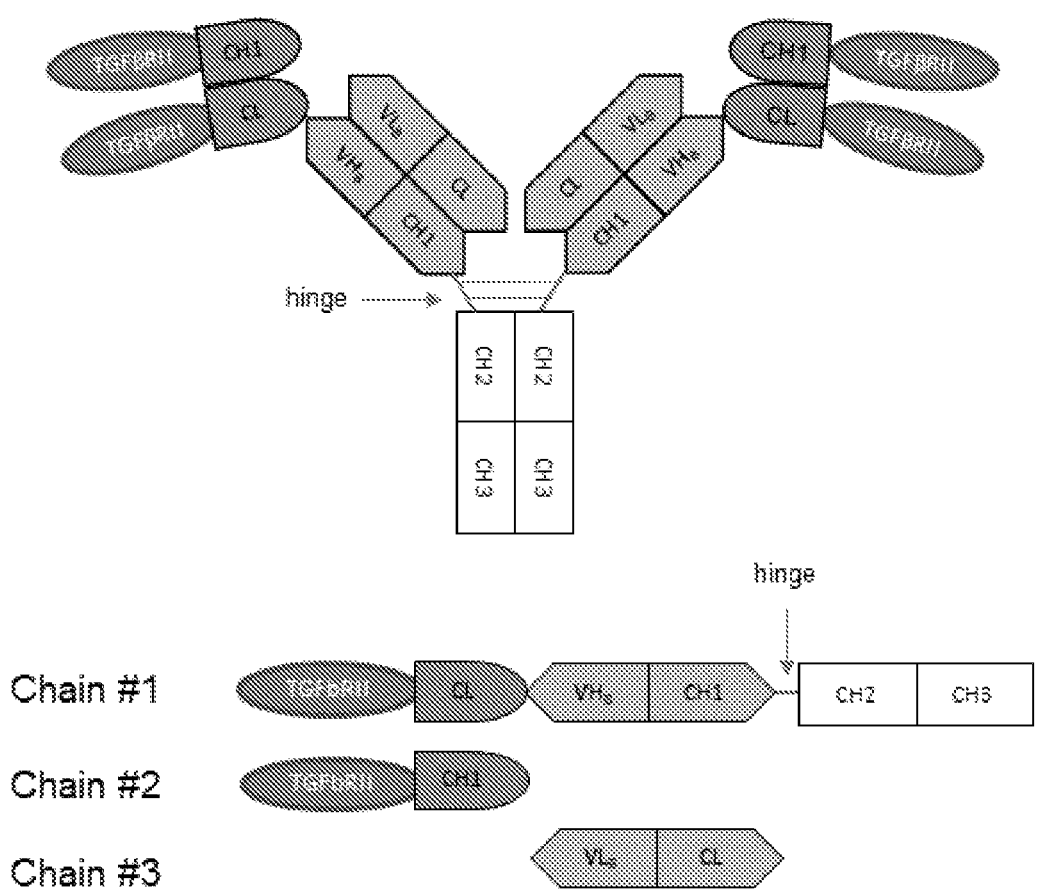
FIG. 1 provides a schematic diagram of a TGFβ/PD-L1 bispecific binding protein of the present invention along with diagrams of the structural organization of the component first (#1), second (#2), and third (#3) polypeptide chains, which associate to form the six-chain, bispecific TGFβ/PD-L1 binding protein comprising two of the first polypeptide chain, two of the second polypeptide chain, and two of the third polypeptide chain. "TGFβRII" in the figure refers to an extracellular domain (ECD) of a TGFβ Receptor 2 protein comprising a TGFβ-binding domain. "VH$_B$" and "VL$_B$" refer to respective heavy and light chain variable domains of a parental anti-PD-L1 monoclonal antibody that binds human PD-L1. "CL" refers to an antibody light chain constant domain. "CH1" refers to a first antibody heavy chain constant domain. The term "hinge" refers to an antibody heavy chain hinge region that forms disulfide bonds, indicated by horizontal lines, that stabilize the dimerization of two first (#1) polypeptide chains. CH2 and CH3 refer to respective antibody heavy chain second and third constant domains. No artificial linkers are inserted between adjacent domains.

This invention provides bispecific binding proteins that bind human TGFβ and human PD-L1 and that inhibition or block both a TGFβ-mediated suppression of T cell activation and a PD-L1-mediated suppression of T cell activation. Owing to the ability to inhibit or block both a TGFβ-mediated suppression of T cell activation and a PD-L1-mediated suppression of T cell activation, a bispecific binding protein of the invention is particularly useful in treating cancer and other diseases where both suppression systems can operate to allow cancer cells to escape from a T cell-mediated immune response.

A TGFβ/PD-L1 bispecific binding protein according to the invention is capable of binding human TGFβ and human PD-L1 and comprises three polypeptide chains wherein:

the first polypeptide chain comprises, from amino terminus to carboxy terminus, TGFβR2(ECD)-CL-$VH_{PD-L1}$-CH1-Fc, wherein TGFβR2(ECD) is fused directly to CL, CL is fused directly to $VH_{PD-L1}$, and wherein there is no artificial linker inserted between TGFβR2(ECD) and CL and there are no artificial linkers inserted between adjacent antibody variable and constant domains;

the second polypeptide chain comprises, from amino terminus to carboxy terminus, TGFβR2(ECD)-CH1, wherein there is no artificial linker inserted between TGFβR2(ECD) and CH1; and the third polypeptide chain comprises, from amino terminus to carboxy terminus, $VL_{PD-L1}$-CL, wherein there is no artificial linker inserted between $VL_{PD-L1}$ and CL;

wherein TGFβR2(ECD) is an extracellular domain of human transforming growth factor beta receptor 2 protein (also referred to as "TGFβR2", "TGFβRII", and other synonyms) capable of binding human transforming growth factor 13 (also referred to as "TGFβ", "TGR-beta"), CL is an antibody light chain constant domain, $VH_{PD-L1}$ is an antibody heavy chain variable domain of a parental monoclonal antibody that binds human PD-L1, CH1 is a first constant domain of an antibody heavy chain, Fc is a heavy chain constant region of a human IgG antibody comprising hinge-CH2-CH3 domains, and $VL_{PD-L1}$ is an antibody light chain variable domain of said parental monoclonal antibody that binds human PD-L1; and wherein two of said first polypeptide chain, two of said second polypeptide chain, and two of said third polypeptide chain are capable of associating to provide a bispecific, multivalent binding protein comprising six polypeptide chains having four N-terminal TGFβ-binding domains and two PD-L1 binding domains of said parental anti-PD-L1 monoclonal antibody, and wherein said binding protein binds both TGFβ and PD-L1.

Preferably, the TGFβR2(ECD) of the TGFβ/PD-L1 bispecific binding protein described above has an amino acid sequence consisting of:

(SEQ ID NO: 1)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPD.

So that the present invention may be more readily understood, the selected terms are defined below.

Owing to the ability to bind both TGFβ and to PD-L1, a bispecific binding protein of the invention may also be referred to with the prefix "TGFβ/PD-L1" or "PD-L1/TGFβ." Accordingly, the terms "TGFβ/PD-1 bispecific binding protein," "TGFβ/PD-1 binding protein," "PD-1/TGFβ bispecific binding protein," and "PD-1/TGFβ bispecific binding protein" are acceptable terms to describe a bispecific binding protein according the invention.

The term "tumor" has the meaning known in the fields of medicine and oncology and includes the definition according to the National Cancer Institute ("NCI", a division of the National Institutes of Health, Bethesda, Maryland, United States of America). Thus, according to the NCI, a "tumor" is an abnormal mass of tissue that results when cells divide more than they should or do not die when they should. Tumors may be benign (not cancer), or malignant (cancer). Another term for a tumor is "neoplasm."

A "benign" tumor is an abnormal mass of tissue that grows slowly and is self-limiting in that it does not have the capacity to invade nearby tissues and spread beyond its original site. A benign tumor is not a cancer.

The term "cancer" has the meaning known in the fields of medicine and oncology and includes the definition according to the National Cancer Institute ("NCI", a division of the National Institutes of Health, Bethesda, Maryland, United States of America). Thus, according to the NCI, "cancer" is a term for diseases in which abnormal cells divide without control and that can invade and damage or destroy nearby tissues. Cancer cells can also slough off of primary tumors and spread (metastasize) to other parts of the body through the blood and/or lymph systems and establish "secondary tumors," which are also referred to as "metastatic tumors" or "metastatic cancer". Thus, the term "cancer" refers to a malignant tumor in which its cells grow uncontrollably and can penetrate and damage or destroy adjacent tissue, and that can metastasize through the circulation to distant parts of the body and form new tumors.

An "anti-cancer" compound or drug is one that blocks, inhibits, or halts the growth of cancer cells. A preferred anti-cancer compound is cytotoxic to cancer cells.

Unless otherwise differentiated, the terms "intravenous" (or "intravenously") and "systemic" (or "systemically") are used interchangeably with respect to a route for introducing a compound or a composition of the invention into the circulatory system of a cancer patient.

As used herein, the terms "treatment" and "treating" generally refer to any regimen that alleviates one or more symptoms or manifestations of cancer, that inhibits progression of cancer, that arrests progression or reverses progression of a cancer, that prevents onset of secondary (metastatic) cancer, that provides significant killing of metastatic cancer cells, that decreases the size of a primary or secondary (metastatic) cancer tumor, that increases remission of one or more secondary (metastatic) tumors over a period of time, that slows progression of primary or secondary (metastatic) tumors, that decreases the number of secondary (metastatic) tumors over a period of time, that decreases the number of new secondary (metastatic) tumors over a period of time, that increases organ or tissue function in a patient suffering from a cancer, that increases the vigor of a patient suffering from a cancer, that prolongs the life of a patient, or combinations thereof.

"Metastasis" has the same meaning known and used by persons skilled in the fields of oncology or medicine and refers to the process in which cancer cells spread from a primary tumor to another location in a patient's body. "Metastatic" cancer cells are cancer cells that have sloughed off or otherwise detached from a primary tumor and are in the process of traveling or already have traveled, usually through the blood or lymph, from the primary tumor to another location in a patient's body. In such a case, the cancer or its cells are said to have "metastasized". A "metastatic" tumor is thus a tumor that has developed as the result of metastatic cancer cells traveling from a primary tumor to a different location in a patient's body where the cancer cells have established another ("secondary", "metastatic") tumor, which is the same type of tumor as the primary tumor. For example, a metastatic intestinal tumor in the liver is initiated by and composed of intestinal cancer cells that have metastasized from a primary intestinal tumor and traveled through the blood to the liver, where the cancer cells then established a secondary (metastatic) intestinal tumor. It is also understood that a metastatic tumor can also be a further source of metastatic cancer cells that can travel to other tissues and organs and establish additional metastatic tumors.

Unless indicated otherwise, when the terms "about" and "approximately" are used in combination with an amount, number, or value, then that combination describes the recited amount, number, integer, or value alone as well as the amount, number, or value plus or minus 5% of that amount, number, or value. By way of example, the phrases "about 40" and "approximately 40" disclose both "40" and "from 38 to 42, including 38 and 40".

The term "polypeptide" refers to any polymeric chain of amino acids. The terms "peptide" and "protein" are used interchangeably with the term polypeptide and also refer to a polymeric chain of amino acids. The term "polypeptide" encompasses native or artificial proteins, protein fragments and polypeptide analogs of a protein amino acid sequence.

The term "polypeptide" encompasses fragments and variants (including fragments of variants) thereof, unless otherwise contradicted by context. For an "antigenic polypeptide," a fragment of a polypeptide optionally contains at least one contiguous or nonlinear epitope of the polypeptide. The precise boundaries of the at least one epitope fragment can be confirmed using ordinary skill in the art. The fragment comprises at least about 5 contiguous amino acids, such as at least about 8 contiguous amino acids, at least about 10 contiguous amino acids, at least about 15 contiguous amino acids, or at least about 20 contiguous amino acids.

The term "isolated protein" or "isolated polypeptide" is a protein or polypeptide that by virtue of its origin or source of derivation is not associated with naturally associated components that accompany it in its native state, is substantially free of other proteins from the same species, is expressed by a cell from a different species, or does not occur in nature. Thus, a polypeptide that is chemically synthesized or synthesized in a cellular system different from the cell from which it naturally originates will be "isolated" from its naturally associated components. A protein consisting of one or more polypeptide chains may also be rendered substantially free of naturally associated components by isolation, using protein purification techniques well known in the art.

The term "recovering" refers to the process of rendering a chemical species such as a polypeptide substantially free of naturally associated components by isolation, e.g., using protein purification techniques well known in the art.

The term "biological activity" of TGFβ or of PD-L1 refers to any or all inherent biological properties of TGFβ or of PD-L1, respectively. Of particular interest to the current invention, is the ability of PD-L1 and of TGFβ to suppress activation of T cells by separate signaling pathways, and especially the ability of PD-L1 and of TGFβ by separate signaling pathways to suppress activation of T cells in response to cancer cells present in an individual (human or other mammal).

The term "specific binding" or "specifically binding" in reference to the interaction of an antibody, a binding protein, or a peptide with a second chemical species, means that the interaction is dependent upon the presence of a particular structure (e.g., an antigenic determinant or epitope) on the second chemical species. For example, an antibody recognizes and binds to a specific protein structure rather than to proteins generally. If an antibody is specific for epitope "A", the presence of a molecule containing epitope A (or free, unlabeled A), in a reaction containing labeled "A" and the antibody, will reduce the amount of labeled A bound to the antibody. Bispecific binding proteins described herein comprise two Fab binding units that specifically bind PD-L1 that are derived from an anti-PD-L1 antibody and four TGFβ ligand binding domains (or "traps") that specifically bind TGFβ and that are derived from human transforming growth factor beta receptor 2 (TGFβR2).

The term "antibody" broadly refers to any immunoglobulin (Ig) molecule comprised of four polypeptide chains, two heavy (H) chains and two light (L) chains, or any functional fragment, mutant, variant, or derivation thereof, which retains the essential epitope binding features of an Ig molecule. Such mutant, variant, or derivative antibody formats are known in the art. Nonlimiting embodiments of which are discussed below.

In a full-length antibody, each heavy chain is comprised of a heavy chain variable region (abbreviated herein as VH) and a heavy chain constant region. The heavy chain constant region is comprised of three domains: CH1, CH2, and CH3. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDRs), interspersed with regions that are more conserved, termed framework regions (FRs). Each VH and VL is comprised of three CDRs and four FRs, arranged from amino-terminus to carboxy-terminus in the following order: FR1, CDR1, FR2, CDR2, FR3, CDR3, FR4. First, second and third CDRs of a VH domain are commonly enumerated as CDR-H1, CDR-H2, and CDR-H3; likewise, first, second and third CDRs of a VL domain are commonly enumerated as CDR-L1, CDR-L2, and CDR-L3. Immunoglobulin molecules can be of any type (e.g., IgG, IgE, IgM, IgD, IgA and IgY), class (e.g., IgG1, IgG2, IgG3, IgG4, IgA1 and IgA2) or subclass.

In general, the term "Fc region", or simply "Fc", refers to the C-terminal region of an antibody heavy chain, which may be generated by papain digestion of an intact antibody. The Fc region may be a native sequence Fc region or a variant Fc region. The Fc region generally comprises two constant domains, i.e., a CH2 domain and a CH3 domain, and optionally comprises a CH4 domain, for example, as in the case of the Fc regions of IgM and IgE antibodies. The Fc region of IgG, IgA, and IgD antibodies comprises a hinge region, a CH2 domain, and a CH3 domain. In contrast, the Fc region of IgM and IgE antibodies lacks a hinge region but comprises a CH2 domain, a CH3 domain and a CH4 domain. Variant Fc regions having replacements of amino acid residues in the Fc portion to alter antibody effector function are known in the art (see, e.g., Winter et al., U.S. Pat. Nos. 5,648,260 and 5,624,821). Unless otherwise indicated, an "Fc region" of a binding protein described herein is an Fc region that is derived from a human IgG1 antibody, that comprises a hinge region, CH2 domain, and CH3 domain.

The Fc region of an antibody mediates several important effector functions, for example, cytokine induction, antibody-dependent cell-mediated cytotoxicity (ADCC), phagocytosis, complement dependent cytotoxicity (CDC), and half-life/clearance rate of antibody and antigen-antibody complexes. In some cases, these effector functions are desirable for therapeutic antibody but in other cases might be unnecessary or even deleterious, depending on the therapeutic objectives. Certain human IgG isotypes, particularly IgG1 and IgG3, mediate ADCC and CDC via binding to Fc gamma receptors (FcγRs) and complement C1q, respectively. Unless indicated otherwise, the Fc region used in a binding protein described herein retains at least one or more or all of the same functional properties as the Fc region had in its original donor antibody In an embodiment, at least one amino acid residue is replaced in an Fc region such that one or more effector functions of the antibody are altered. As in an IgG antibody, the dimerization of two identical heavy chains of a binding protein described herein is mediated by the dimerization of CH3 domains and is stabilized by the disulfide bonds within the hinge region that connects a CH1 domain to the Fc constant domains (e.g., CH2 and CH3). The anti-inflammatory activity of IgG is completely dependent on sialylation of the N-linked glycan of the IgG Fc fragment. The precise glycan requirements for anti-inflammatory activity have been determined, such that an appropriate IgG1 Fc fragment can be created, thereby generating a fully recombinant, sialylated IgG1 Fc with greatly enhanced potency (see, Anthony et al., Science, 320:373-376 (2008)). Such a sialylated Fc region may be used in a binding protein described herein.

The terms "antigen-binding portion" and "antigen-binding fragment" or "functional fragment" of an antibody are used interchangeably and refer to one or more fragments of an antibody that retain the ability to specifically bind to an antigen, i.e., the same antigen (e.g., PD-L1) as the full-length antibody from which the portion or fragment is derived. It has been shown that the antigen-binding function of an antibody can be performed by fragments of a full-length antibody. Such antibody embodiments may also be bispecific, dual specific, or multi-specific formats; specifically binding to two or more different antigens. Examples of binding fragments encompassed within the term "antigen-binding portion" of an antibody include (i) a Fab fragment (Fab binding unit), a monovalent fragment consisting of the VL, VH, CL, and CH1 domains; (ii) a F(ab')$_2$ fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment (Ward et al., Nature, 341: 544-546 (1989); International Publication No. WO 90/05144), which comprises a single variable domain; and (vi) an isolated complementarity determining region (CDR). Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see, for example, Bird et al., Science, 242: 423-426 (1988); and Huston et al., Proc. Natl. Acad. Sci. USA, 85: 5879-5883 (1988)). Such single chain antibodies are also intended to be encompassed within the term "antigen-binding portion" of an antibody and equivalent terms given above. Other forms of single chain antibodies, such as diabodies are also encompassed. Diabodies are bivalent, bispecific antibodies in which VH and VL domains are expressed on a single polypeptide chain, but using a linker that is too short to allow for pairing between the two domains on the same chain, thereby forcing the domains to pair with complementary domains of another chain and creating two antigen binding sites (see, for example, Holliger et al., Proc. Natl. Acad. Sci. USA, 90: 6444-6448 (1993). Such antibody binding portions are known in the art (Kontermann and Dübel eds., *Antibody Engineering* (Springer-Verlag, New York, 2001), p. 790 (ISBN 3-540-41354-5)). In addition, single chain antibodies also include "linear antibodies" comprising a pair of tandem Fv segments (VH—CH1-VH-CH1) which, together with complementary light chain polypeptides, form a pair of antigen binding regions (Zapata et al., *Protein Eng.*, 8(10): 1057-1062 (1995); and U.S. Pat. No. 5,641,870)).

Unless indicated otherwise, the terms "donor antibody" and "parental antibody" refer to any antibody or antigen-binding fragment that is used to make a bispecific binding protein described herein. Such a parental or donor antibody may be used in its entirety or a portion thereof, including but not limited to, an antibody variable domain, CDRs from a variable domain, an antibody constant domain, a Fab binding unit, or an Fc region. A non-natural or engineered antibody may also serve as a donor or parental antibody for making a binding protein described herein.

An antibody (or immunoglobulin) constant (C) domain refers to an antibody heavy constant domain (such as CH1, CH2, CH3) or light chain constant domain (CL). Amino acid sequences of human, murine, rat, and a variety of other mammalian immunoglobulin heavy chain and light chain constant domains are known in the art.

The term "monoclonal antibody" or "mAb" refers to an antibody obtained from a population of substantially homogeneous antibodies, i.e., the individual antibodies comprising the population are identical except for possible naturally occurring mutations that may be present in minor amounts. Monoclonal antibodies are highly specific, being directed against a single antigenic determinant (epitope). Furthermore, in contrast to polyclonal antibody preparations that typically include different antibodies directed against different determinants (epitopes), each mAb is directed against a single determinant on the antigen. The modifier "monoclonal" is not to be construed as requiring production of the antibody by any particular method.

The term "human antibody" includes antibodies having variable and constant regions derived from human germline immunoglobulin sequences. The human antibodies of the invention may include amino acid residues not encoded by human germline immunoglobulin sequences (e.g., mutations introduced by random or site-specific mutagenesis in vitro or by somatic mutation in vivo), for example in the CDRs and in particular CDR3. However, the term "human antibody" does not include antibodies in which CDR sequences derived from the germline of another mammalian species, such as a mouse, have been grafted onto human framework sequences.

The term "recombinant human antibody" includes all human antibodies that are prepared, expressed, created, or isolated by recombinant means, such as antibodies expressed using a recombinant expression vector transfected into a host cell, antibodies isolated from a recombinant, combinatorial human antibody library (Hoogenboom, H. R., *Trends Biotechnol.*, 15: 62-70 (1997); Azzazy and Highsmith, *Clin. Biochem.*, 35: 425-445 (2002); Gavilondo and Larrick, *BioTechniques*, 29: 128-145 (2000); Hoogenboom and Chames, Immunol. Today, 21: 371-378 (2000)), antibodies isolated from an animal (e.g., a mouse) that is transgenic for human immunoglobulin genes (see, e.g., Taylor et al., *Nucl. Acids Res.*, 20: 6287-6295 (1992); Kellermann and Green, *Curr. Opin. Biotechnol.*, 13: 593-597 (2002); Little et al., Immunol. Today, 21: 364-370 (2000)); or antibodies prepared, expressed, created or isolated by any other means that involves splicing of human immunoglobulin gene sequences to other DNA sequences. Such recombinant human antibodies have variable and constant regions derived from human germline immunoglobulin sequences. In certain embodiments, however, such recombinant human antibodies are subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline VH and VL sequences, may not naturally exist within the human antibody germline repertoire in vivo.

The term "chimeric antibody" refers to antibodies that comprise heavy and light chain variable region sequences from one species and constant region sequences from another species, such as antibodies having murine heavy and light chain variable regions linked to human constant regions.

The term "CDR-grafted antibody" refers to antibodies that comprise heavy and light chain variable region sequences from one species but in which the sequences of one or more of the CDR regions of VH and/or VL are replaced with CDR sequences of another species, such as antibodies having human heavy and light chain variable regions in which one or more of the human CDRs has been replaced with murine CDR sequences.

The term "humanized antibody" refers to antibodies that comprise heavy and light chain variable region sequences from a non-human species (e.g., a mouse) but in which at least a portion of the VH and/or VL sequence has been altered to be more "human-like", i.e., more similar to human germline variable sequences. One type of humanized antibody is a CDR-grafted antibody, in which CDR sequences from a non-human species (e.g., mouse) are introduced into human VH and VL framework sequences. A humanized antibody is an antibody or a variant, derivative, analog, or fragment thereof which immunospecifically binds to an antigen of interest and which comprises framework regions and constant regions having substantially the amino acid sequence of a human antibody but complementarity determining regions (CDRs) having substantially the amino acid sequence of a non-human antibody. As used herein, the term "substantially" in the context of a CDR refers to a CDR having an amino acid sequence at least 80%, at least 85%, at least 90%, at least 95%, at least 98% or at least 99% identical to the amino acid sequence of a non-human antibody CDR. A humanized antibody comprises substantially all of at least one, and typically two, variable domains (Fab, Fab', F(ab')2, Fv) in which all or substantially all of the CDR regions correspond to those of a non-human immunoglobulin (i.e., donor antibody) and all or substantially all of the framework regions are those of a human immunoglobulin consensus sequence. In an embodiment, a humanized antibody also comprises at least a portion of an immunoglobulin constant region (Fc), typically that of a human immunoglobulin. In some embodiments, a humanized antibody contains both the light chain as well as at least the variable domain of a heavy chain. The antibody also may include the CHL hinge, CH2, CH3, and CH4 regions of the heavy chain. In some embodiments, a humanized antibody only contains a humanized light chain. In some embodiments, a humanized antibody only contains a humanized heavy chain. In specific embodiments, a humanized antibody only contains a humanized variable domain of a light chain and/or humanized heavy chain.

A humanized antibody may be selected from any class of immunoglobulins, including IgM, IgG, IgD, IgA and IgE, and any isotype, including without limitation IgG1, IgG2, IgG3, and IgG4. The humanized antibody may comprise sequences from more than one class or isotype, and particular constant domains may be selected to optimize desired effector functions using techniques well known in the art.

The framework and CDR regions of a humanized antibody need not correspond precisely to the parental sequences, e.g., the donor antibody CDR or the acceptor framework may be mutagenized by substitution, insertion and/or deletion of at least one amino acid residue so that the CDR or framework residue at that site does not correspond to either the donor antibody or the consensus framework. In an exemplary embodiment, such mutations, however, will not be extensive. Usually, at least 80%, preferably at least 85%, more preferably at least 90%, and most preferably at least 95% of the humanized antibody residues will correspond to those of the parental FR and CDR sequences. Back mutation at a particular framework position to restore the same amino acid that appears at that position in the donor antibody is often utilized to preserve a particular loop structure or to correctly orient the CDR sequences for contact with target antigen.

The term "CDR" refers to the complementarity determining regions within antibody variable domain sequences. There are three CDRs in each of the variable regions of the heavy chain and the light chain, which are designated CDR-H1, CDR-H2, CDR-H3, CDR-L1, CDR-L2, and CDR-L3. The term "CDR set" as used herein refers to a group of three CDRs that occur in a single variable region capable of binding the antigen. The exact boundaries of these CDRs have been defined differently according to different systems. The system described by Kabat (Kabat et al., *Sequences of Proteins of Immunological Interest* (National Institutes of Health, Bethesda, Maryland (1987) and (1991)) not only provides an unambiguous residue numbering system applicable to any variable region of an antibody, but also provides precise residue boundaries defining the three CDRs.

The term "Kabat numbering", which is recognized in the art, refers to a system of numbering amino acid residues which are more variable (i.e., hypervariable) than other amino acid residues in the heavy and light chain variable regions of an antibody or an antigen-binding portion thereof. See, Kabat et al., Ann. NY Acad. Sci., 190: 382-391 (1971); and Kabat et al., *Sequences of Proteins of Immunological Interest, Fifth Edition*, U.S. Department of Health and Human Services, NIH Publication No. 91-3242 (1991).

The growth and analysis of extensive public databases of amino acid sequences of variable heavy and light regions over the past twenty years have led to the understanding of the typical boundaries between framework regions (FRs) and CDR sequences within variable region sequences and have enabled persons skilled in the art to accurately determine the CDRs according to Kabat numbering, Chothia numbering, or other systems. See, e.g., Martin, "Protein Sequence and Structure Analysis of Antibody Variable Domains," In Kontermann and Dübel, eds., *Antibody Engineering* (Springer-Verlag, Berlin, 2001), chapter 31, pages 432-433.

The term "bispecific binding protein" refers to a binding protein capable of binding two target proteins of different specificity. A bispecific binding protein of the present invention binds TGFβ and PD-L1. The term "bispecific binding protein" may also include a prefix such as "TGFβ/PD-L1" or "PD-L1/TGFβ" to indicate the two target proteins that it specifically binds. Each of the two binding domains for PD-L1 of a TGFβ/PD-L1 bispecific binding protein described herein is a PD-L1 antigen-binding domain (or "antigen-binding site") of a parental anti-PD-L1 monoclonal antibody. Each of the four binding domains for TGFβ of a TGFβ/PD-L1 bispecific binding protein described herein is a TGFβ-binding domain derived from a TGFβ receptor 2 protein (TGFβR2) and is also referred to as a "trap" (or "TGFβ trap") to distinguish the binding domain as a ligand-binding domain derived from a receptor instead of an antigen-binding domain derived from an antibody.

The term "multivalent binding protein" denotes a binding protein comprising two or more recombinant target protein binding domains. A multivalent binding protein is preferably engineered to have three or more target protein binding domains and is generally not a naturally occurring antibody. A TGFβ/PD-L1 bispecific binding protein described herein have multiple binding domains for target proteins: four TGFβ-binding domains derived from TGFβR2 receptor proteins and two binding domains for PD-L1 derived from an anti-PD-L1 monoclonal antibody. Accordingly, TGFβ/PD-L1 bispecific binding protein described herein is tetravalent with respect to TGFβ (TGFβ monomer) and divalent (bivalent) with respect to PD-L1. A TGFβ/PD-L1 bispecific binding protein described herein may also bind via its Fc region to an Fc gamma receptor (FcγR); however, unless otherwise indicated, valency terms such as "multivalent" and "tetravalent" are reserved for describing the number of binding domains available for binding the TGFβ and PD-L1 target proteins.

The term "activity" includes properties such as the ability to bind a target protein with specificity, the affinity of an antibody or binding protein for a protein, the ability to neutralize the biological activity of a target protein, the ability to inhibit interaction of a target protein with its natural receptor(s) or natural ligand(s), and the like. Activities of a TGFβ/PD-L1 bispecific binding protein of the present invention may include, but are not limited to, inhibiting TGFβ binding to a cognate TGFβ receptor, inhibiting TGFβ signaling, inhibiting PD-L1 binding to PD-1, inhibiting PD-1/PD-L1 signaling, stimulating T cell activation, upregulating a T cell response to cancer, killing cancer cells, inhibiting cancer cell growth, inhibiting cancer cell survival, and inhibiting spread of cancer cells.

The term "$k_{on}$" (also "Kon", "kon"), as used herein, is intended to refer to the on-rate constant for association of a binding protein (e.g., antibody or receptor) to a target antigen or target ligand protein to form an association complex (e.g., antibody/antigen complex or ligand/receptor) as is known in the art. The "km" also is known by the terms "association rate constant", or "ka", as used interchangeably herein. For example, this value can indicate the binding rate of an antibody to its target antigen or the rate of complex formation between an antibody and antigen as is shown by the equation below:

Antibody ("Ab")+Antigen ("Ag")→Ab-Ag.

It will also be appreciated that the kon value may also refer to the binding rate of a receptor (or ligand binding domain of a receptor) to its cognate ligand or the rate of complex formation between the receptor (or ligand binding domain of a receptor) and its cognate ligand.

The terms "$k_{off}$" (also "Koff", "koff") and "$k_{dis}$" (also, "Kdis", "kdis") as used herein, are synonymous and intended to refer to the off-rate constant for dissociation, or "dissociation rate constant", of a binding protein (e.g., an antibody or receptor) from an association complex (e.g., an antibody/antigen complex or receptor/ligand complex) as is known in the art. For example, this value can indicate the dissociation rate of an antibody from its target antigen or separation of an Ab-Ag complex over time into free antibody and free (unbound) antigen as shown by the equation below:

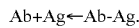

Ab+Ag←Ab-Ag.

It will also be appreciated that the koff (or kdis) value may also refer to the dissociation rate of a receptor (or ligand binding domain of a receptor) from its cognate ligand or separation of a receptor-ligand complex (or ligand binding domain-ligand complex) over time into unbound receptor and unbound ligand (or unbound ligand binding domain and unbound ligand).

The term "$K_D$" (also referred to as "KD" or "Kd"), as used herein, refers to the "equilibrium dissociation constant," and refers to the binding affinity (binding strength) that a binding protein (for example, an antibody or receptor protein) has for a target molecule (for example, a target antigen or target ligand). The affinity ($K_D$) is the value obtained in a titration measurement at equilibrium or by dividing the dissociation rate constant "$k_{off}$" by the association rate constant ("$k_{on}$"). A $K_D$ is expressed as a molarity (M). A km is expressed as an inverse molarity-seconds, such as, $M^{-1} sec^{-1}$ or $M^{-1} s^{-1}$. A $k_{off}$ ($k_{dis}$) is expressed as an inverse time, such as 1/seconds, $sec^{-1}$, or $s^{-1}$. Methods for determining association rate constant ($k_{on}$) and dissociation rate constant ($k_{off}$) are well known in the art. Using fluorescence-based techniques offers high sensitivity and the ability to examine samples in physiological buffers at equilibrium. Other experimental approaches and instruments such as a BIAcore® (biomolecular interaction analysis) assay can be used (e.g., instrument available from BIAcore International AB, a GE Healthcare company, Uppsala, Sweden). Biolayer interferometry (BLI) using, e.g., the Octet® RED96 system (Pall ForteBio LLC), is another affinity assay technique. Additionally, a KinExA® (Kinetic Exclusion Assay) assay (available from Sapidyne Instruments, Boise, Idaho) can also be used.

The term "isolated nucleic acid" shall mean a polynucleotide (e.g., of genomic, cDNA, or synthetic origin, or some combination thereof) that, by human intervention, is not associated with all or a portion of the polynucleotides with which it is found in nature, is operably linked to a polynucleotide that it is not linked to in nature, or does not occur in nature as part of a larger sequence.

The term "vector", as used herein, is intended to refer to a nucleic acid molecule capable of transporting another nucleic acid to which it has been linked. One type of vector is a "plasmid", which refers to a circular double stranded DNA loop into which additional DNA segments may be ligated. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "recombinant expression vectors" (or simply, "expression vectors"). In general, expression vectors of utility in recombinant DNA techniques are often in the form of plasmids. In the present specification, "plasmid" and "vector" may be used interchangeably as the plasmid is the most commonly used form of vector. However, the invention is intended to include such other forms of expression vectors, such as viral vectors (e.g., replication defective retroviruses, adenoviruses and adeno-associated viruses), which serve equivalent functions.

The term "operably linked" refers to a juxtaposition wherein the components described are in a relationship permitting them to function in their intended manner. A control sequence "operably linked" to a coding sequence is ligated in such a way that expression of the coding sequence is achieved under conditions compatible with the control sequence. "Operably linked" sequences include both expression control sequences that are contiguous with the gene of interest and expression control sequences that act in trans or at a distance to control the gene of interest. The term "expression control sequence" as used herein refers to polynucleotide sequences that are necessary to effect the expression and processing of coding sequences to which they are ligated. Expression control sequences include appropriate transcription initiation, termination, promoter and enhancer sequences; efficient RNA processing signals such as splicing and polyadenylation signals; sequences that stabilize cytoplasmic mRNA; sequences that enhance translation efficiency (i.e., Kozak consensus sequence); sequences that enhance protein stability; and when desired, sequences that enhance protein secretion. The nature of such control sequences differs depending upon the host organism; in prokaryotes, such control sequences generally include promoters, ribosomal binding sites, and transcription termination sequences; in eukaryotes, generally, such control sequences include promoters, enhancers, Kozak sequences, and transcription termination sequences. The term "control sequence" is intended to include components whose presence is essential for expression and maturation (processing) and can also include additional components whose presence is advantageous, for example, signal peptide sequences (also referred to as "leader sequences") and fusion partner sequences.

"Transfection," as defined herein, refers to any process by which exogenous DNA enters a host cell. Transfection may occur under natural or artificial conditions using various methods well known in the art. Transfection may rely on any known method for the insertion of foreign nucleic acid sequences into a prokaryotic or eukaryotic host cell. The method is selected based on the host cell being transfected and may include, but is not limited to, viral infection, transformation, electroporation, lipofection, and particle bombardment. Such "transfected" cells include stably transfected cells in which the inserted DNA is capable of replication either as an autonomously replicating plasmid or as part of the host chromosome. Transfected cells also include cells which transiently express the inserted DNA or RNA for limited periods of time.

The term "recombinant host cell" (or simply "host cell"), is intended to refer to a cell into which exogenous DNA has been introduced. In an embodiment, the host cell comprises two or more (e.g., multiple) nucleic acids encoding antibodies or binding proteins, such as the host cells described in U.S. Pat. No. 7,262,028, for example. Such terms are intended to refer not only to the particular subject cell, but also to the progeny of such a cell. Because certain modifications may occur in succeeding generations due to either mutation or environmental influences, such progeny may not, in fact, be identical to the parent cell, but are still included within the scope of the term "host cell" as used herein. In an embodiment, host cells include prokaryotic and eukaryotic cells. In another embodiment, eukaryotic cells include protist, fungal, plant, and animal cells. A particularly useful, prokaryotic, host cell, is the bacterium *Escherichia coli* and derivatives thereof. Particularly useful mammalian cell lines include, but are not limited to, CHO, HEK293, COS, NSO, SP2 and PER.C6. HEK 293E cells are particularly useful as mammalian host cells in a transient expression system for recombinant proteins. CHO cells are particularly useful as stable transfected mammalian host cells for producing recombinant proteins. A particularly useful insect cell line is the Sf9 cell line and derivatives thereof. A particularly useful fungal host cell is *Saccharomyces cerevisiae* and derivatives thereof.

Standard techniques may be used for recombinant DNA, oligonucleotide synthesis, cell culture, tissue culture, and transfection (e.g., electroporation, lipofection, transformation). Enzymatic reactions and purification techniques may be performed according to manufacturer's specifications or as commonly accomplished in the art or as described herein. The foregoing techniques and procedures may be generally performed according to conventional methods well known in the art and as described in various general and more specific references that are cited and discussed throughout the present specification. See, e.g., Sambrook et al., *Molecular Cloning: A Laboratory Manual,* 2nd ed. (Cold Spring Harbor Laboratory Press, Cold Spring Harbor, N.Y., 1989).

The term "agonist", as used herein, refers to a modulator that, when contacted with a particular molecule of interest, causes an increase in the magnitude of a certain activity or function of the molecule compared to the magnitude of the activity or function observed in the absence of the agonist. The terms "antagonist" and "inhibitor", as used herein, refer to a modulator that, when contacted with a particular molecule of interest causes a decrease in the magnitude of a certain activity or function of the molecule compared to the magnitude of the activity or function observed in the absence of the antagonist. A TGFβ/PD-L1 bispecific binding protein described herein may be viewed as an agonist or antagonist depending on the activity. For example, a TGFβ/PD-L1 bispecific binding protein described herein acts as an agonist when it binds TGFβ or PD-L1 and stimulates T cell activation, T cell proliferation, T cell cytokine secretion, or a T cell-mediated response, for example, to cancer cells. Alternatively, a TGFβ/PD-L1 bispecific binding protein described herein may be viewed as an antagonist that blocks or inhibits TGFβ from binding to a TGFβ receptor, that blocks or inhibits PD-L1 from binding to PD-1, that blocks or inhibits TGFβ signaling, that blocks or inhibits PD-L1 signaling, that blocks or inhibits one or more cancer-promoting activities of TGFβ signaling, that blocks or inhibits cancer-promoting activities of PD-L1 signaling, and any combination thereof.

As used herein, the term "effective amount" refers to the amount of a therapy that is sufficient to reduce or ameliorate the severity and/or duration of a disease or one or more symptoms thereof; prevent the advancement of a disease; cause regression of a disease; prevent the recurrence, development, or progression of one or more symptoms associated with a disease; or enhance or improve the prophylactic or therapeutic effect(s) of another therapy (e.g., prophylactic or therapeutic agent). An "effective amount" may also refer to the amount of a protein required to detect another protein.

Unless otherwise defined herein, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition. Further, unless otherwise required by context, singular terms shall include pluralities and plural terms shall include the singular. In this application, the use of "or" means "and/or" unless stated otherwise. Furthermore, the use of the term "including", as well as other forms, such as "includes" and "included", is not limiting. Also, terms such as "element" or "component" encompass both elements and components comprising one unit and elements and components that comprise more than one subunit unless specifically stated otherwise.

A composition or method described herein as "comprising" one or more named elements or steps is open-ended, meaning that the named elements or steps are essential, but other elements or steps may be added within the scope of the composition or method. To avoid prolixity, it is also understood that any composition or method described herein as "comprising" (or "which comprises") one or more named elements or steps also describes the corresponding, more limited, composition or method "consisting essentially of" (or "which consists essentially of") the same named elements or steps, meaning that the composition or method includes the named essential elements or steps and may also include additional elements or steps that do not materially affect the basic and novel characteristic(s) of the composition or method. It is also understood that any composition or method described herein as "comprising" or "consisting essentially of" one or more named elements or steps also describes the corresponding, more limited, and close-ended composition or method "consisting of" (or "which consists of") the named elements or steps to the exclusion of any other unnamed element or step. In any composition or method disclosed herein, known or disclosed equivalents of any named essential element or step may be substituted for that element or step.

Unless otherwise defined herein, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition. Further, unless otherwise required by context, singular terms shall include pluralities and plural terms shall include the singular. In this application, the use of "or" means "and/or" unless stated otherwise. Furthermore, the use of the term "including", as well as other forms, such as "includes" and "included", is not limiting. Also, terms such as "element" or "component" encompass both elements and components comprising one unit and elements and components that comprise more than one subunit unless specifically stated otherwise.

Generally, nomenclatures used in connection with, and techniques of, cell and tissue culture, molecular biology, immunology, microbiology, oncology, genetics, and biochemistry are those that are well known and commonly used in the art. The methods and techniques of the present invention are generally performed according to conventional methods that are well known in the art and as described in various general and more specific references that are cited and discussed throughout the present specification unless otherwise indicated. Enzymatic reactions and purification techniques are performed according to manufacturer's specifications, as commonly accomplished in the art, or as described herein. The nomenclatures used in connection with, and the laboratory procedures and techniques of, analytical chemistry, synthetic organic chemistry, and medicinal and pharmaceutical chemistry described herein are those that are well known and commonly used in the art. Standard techniques are used for chemical syntheses, chemical analyses, pharmaceutical preparation, formulation, delivery, and treatment of patients.

Features of a TGFβ/PD-L1 Binding Protein of the Invention

As shown in the schematic diagram of FIG. 1, a TGFβ/PD-L1 bispecific binding protein according to the invention is a recombinant fusion protein comprising a first (heavy) polypeptide chain, a second (first light) polypeptide chain, and a third (second light) polypeptide, wherein two of the first polypeptide chains, two of the second polypeptide chains, and two of the third polypeptide chains associate to form the TGFβ/PD-L1 bispecific binding protein comprising four, N-terminal, functional, TGFβ ligand-binding domains, each derived from a human TGFβ Receptor 2 protein (also referred to as "TGFβR2", "TGFβRII", and other synonyms) and two, internal, functional, PD-L1 binding domains (antigen-binding sites) of a parental anti-PD-L1 monoclonal antibody (mAb) that binds human PD-L1.

In accordance with terms in the art, an isolated and recombined ligand-binding domain of a receptor is also referred to as a "trap" to distinguish the binding domain as a ligand-binding domain derived from a receptor protein instead of an antigen-binding domain (or "antigen-binding site") derived from an antibody. Accordingly, a TGFβ/PD-L1 bispecific binding protein of the invention is also described as comprising four "TGFβ traps" and two "PD-L1 antigen-binding domains" (or "PD-LL-binding domains"). In addition, no artificial peptide linkers are used to link receptor binding domains to adjacent antibody domains or to link adjacent antibody domains to one another.

The first polypeptide chain (heavy chain) of a TGFβ/PD-L1 bispecific binding protein comprises, from amino terminus to carboxy terminus, the structural formula: TGFβR2(ECD)-CL-VH$_{PD-L1}$-CH1-Fc, wherein "TGFβR2(ECD)" is an extracellular domain of a human TGFβ receptor 2 (TGFβR2) that is a TGFβ-binding domain of the receptor, CL is an antibody light chain constant domain, VH$_{PD-L1}$ is a VH domain of a parental anti-PD-L1 monoclonal antibody, CH1 is a first constant domain of an antibody heavy chain, and Fc is a heavy chain constant region of a human IgG antibody consisting of hinge-CH2-CH3 domains. All of the domains are fused directly to one another in the order of the structural formula for the first polypeptide chain without the insertion of any artificial linker.

The second polypeptide chain (first light chain) of a TGFβ/PD-L1 bispecific binding protein comprises, from amino terminus to carboxy terminus, the structural formula: TGFβR2(ECD)-CH1, wherein "TGFβR2(ECD)" is an extracellular domain of a human TGFβ receptor 2 (TGFβR2) that comprises a TGFβ-binding domain of the receptor and CH1 is first constant domain of an antibody heavy chain. The amino terminal TGFβR2(ECD) domain and the carboxy terminal CH1 domain of the second polypeptide chain are fused directly to one another without the insertion of any artificial linker. Note further that, by design, the structural formula "TGFβR2(ECD)-CH1" of this second polypeptide chain directs the polypeptide chain to preferentially pair with the first (heavy) polypeptide chain and thereby bring into proximity each of the TGFβ-binding domains of the respective N-terminal TGFβR2(ECD) domains of the first and second polypeptide chains.

The third polypeptide chain (second light chain) of a TGFβ/PD-L1 bispecific binding protein of the invention comprises, from amino terminus to carboxy terminus, the structural formula: VL$_{PD-L1}$-CL, wherein VL$_{PD-L1}$ is a VL domain of the parental anti-PD-L1 monoclonal antibody and CL is an antibody light chain constant domain. The VL$_{PD-L1}$ and CL domains are fused directly to one another in the order of the structural formula without the insertion of any artificial linker. By design, the structural formula "VL$_{PD-L1}$-CL" of this third polypeptide chain directs the polypeptide chain to preferentially pair with the C-terminal "VH$_{PD-L1}$-CH1-Fc" portion of the TGFβR2(ECD)-CL-VH$_{PD-L1}$-CH1-Fc structure of the first polypeptide chain so that VL$_{PD-L1}$ domain of the third polypeptide chain and VH$_{PD-L1}$ domain of the first polypeptide chain form a functional, PD-L1 binding domain that is stabilized by the pairing of the CL domain of the third polypeptide chain with the CH1 domain of the first polypeptide chain and a interchain disulfide bond between the CL and CH1 domains. Thus, the association of the third polypeptide chain and the first polypeptide chain form a Fab binding unit that has a classical Fab structure (VH-CH1::VL-CL) found in naturally occurring antibodies and in the parental anti-PD-L1 monoclonal antibody.

Selection of TGFβR2 Extracellular Domain

In order to be useful in a variety of tissue environments, a TGFβ/PD-L1 bispecific binding protein of the invention should be capable of binding all three TGFβ isoforms (TGFβ1, TGFβ2, and TGFβ3). The three TGFβ isoform proteins are bound to varying extents by each of three TGFβ receptor isotypes (TGFβR1, TGFβR2, and TGFβR3). The three TGFβ receptor isotypes can be distinguished from one another by their structural and functional properties. For example, all three TGFβ isoforms are known to bind to a single TGFβR2 monomer, with the TGFβ1 and TGFβ3 isoforms binding to the TGFβR2 isotype with a higher affinity than to the TGFβR1 isotype. See, Heldin et al., "Signaling Receptors for TGF-β Family Members," Cold Spring Harb. Perspect. Biol., doi: 10.1101/cshperspect.a022053. TGFβR3 (also known as "betaglycan") occurs naturally as a 280-330 kilodalton (kD) glucosaminoglycan (GAG)-glycoprotein with an extracellular domain of 762 amino acid residues. Vilchis-Landeros et al., Biochem. 1, 355: 215-222 (2001). TGFβR3 is considered too large and too complex for use in producing a TGFβ/PD-L1 bispecific binding protein of the invention. Accordingly, as compared to TGFβR1 and the TGFβR3, the TGFβR2 isotype is preferred as the source of the four N-terminal domains ("TGFβR2(ECD)") comprising the four TGFβ-binding domains of a TGFβ/PD-L1 bispecific binding protein of the invention.

A preferred TGFβR2(ECD) domain present in the first and second polypeptide chains of a TGFβ/PD-L1 bispecific binding protein of the invention has the sequence: TIPPHVQKSVNNDMIVIDNNGAVKFPQLCKFCDVRFSTCDNQKSCMSNCSITSICEKPQEVCVAVWRK NDENITLETVCHDPKLPYHDFILEDAASPKCIMKEKKKPGETFFMCSCSSDECNDNIIFSEEYNTSNP D (SEQ ID NO:1). This sequence is based on canonical sequence isoform 1 (identifier P37173-1) in the UniProt database.

Mature TGFβ proteins form homodimers, wherein two TGFβ monomers are assembled in an anti-parallel manner and held together by an interchain disulfide bond. While not wishing to be limited to or bound by any particular mechanism, it appears that each of the four N-terminal TGFβ-binding domains of a TGFβ/PD-L1 bispecific binding protein of the invention is capable of binding a separate TGFβ protein monomer, and each pair of adjacent N-terminal TGFβ-binding domains that are held in proximity to one another, by pairing of the CL domain of the first (heavy) polypeptide chain with the CH1 domain of the second polypeptide chain, is capable of binding each of the mature TGFβ proteins of a single TGFβ homodimer. See, for example, Heldin and Moustakas, Cold Spring Harb. Perspect. Biol., doi: 10.1101/cshperspect.a022053; Lan et al., Sci. Transl. Med., 10, eaan5488 (2018); Poniatowski et al., Mediators Inflamm., http://dx.doi.org/10.1155/2015/137823.

Selecting Preferred Anti-PD-L1 Antibodies

Useful criteria that should be considered in selecting an antibody for further development as a therapeutic antibody and/or use as a parental antibody for making a TGFβ/PD-L1 bispecific binding protein according to the invention include: (1) sub-nanomolar affinity for human PD-L1, (2) CDR amino acid sequences that are considered to be significantly or distinctly different from those of other anti-PD-L1 antibodies, (3) similar binding activity for human and cynomolgus PD-L1, (4) greater than 90% inhibition of PD-1/PD-L1 binding in a receptor blocking assay (RBA), (5) an acceptable purity of greater than 90% monomeric species (fully assembled antibody) after one-step affinity purification (e.g., one-step Protein A affinity chromatograph) as determined, for example, using size exclusion chromatography (SEC), (6) a low propensity to form aggregates, preferably less than 10% aggregates, for example, as detected using SEC after a one-step affinity purification, and (7) with respect to selecting between two humanized antibodies with similar properties, a lower number of back-mutations.

Criteria (1), (3), (4), (5), and (6) are readily determined by methods and assays such as those described herein. Regarding criterion (3), the ability to run assays with cynomolgus PD-L1 protein is important in the routine pre-clinical analysis and development of a candidate as a therapeutic anti-PD-L1 antibody or for use in making a therapeutic TGFβ/PD-L1 bispecific binding protein according to the invention. With respect to criterion (6), an antibody with a propensity to form aggregates, especially greater than 10%, for example, as determined using size exclusion chromatography, is not preferred either for development as a therapeutic antibody or for use in preparing TGFβ/PD-L1 bispecific binding protein according to the invention. An antibody with a propensity to form aggregates will typically lead to undesired aggregate formation in a TGFβ/PD-L1 bispecific binding protein produced using the antibody. With respect to criterion (2) regarding CDR sequence diversity, the point is not only to avoid characterizing previously isolated or highly similar anti-PD-L1 antibodies, but also to carry forward structurally distinct antibodies that typically will be further modified and improved (for example, during humanization) prior to use as a therapeutic antibody or as a parental antibody to make a TGFβ/PD-L1 bispecific binding protein according to the invention.

Regarding criterion (7), a lower number of back-mutations means that a humanized antibody retains more human residues and is less likely to be recognized as a foreign protein in a human. As between two humanized antibodies that are similar with respect to the other criteria, the antibody with fewer back mutations is usually preferred, assuming the other criteria are approximately the same. Of particular importance is the propensity of a humanized antibody to form aggregates. As explained above, an antibody with a propensity to form aggregates is likely to cause aggregates in a TGFβ/PD-L1 bispecific binding protein that is made using the antibody. Back-mutations are not typically the source of aggregate formation. Therefore, a humanized antibody with a relatively low aggregate formation (especially less than 10%) would be preferred over a humanized antibody with a relatively higher aggregate formation (especially greater than 10%) and a lower number of back mutations. Accordingly, a humanized antibody with a lower number of back mutations is usually preferred when a selection is being made between two humanized antibodies that have similar properties for criteria (1)-(6).

A preferred anti-PD-L1 monoclonal antibody (mAb) for use in making a TGFβ/PD-L1 bispecific binding protein of the present invention is a humanized mAb having all or most of the criteria described above.

In an embodiment, a preferred parental anti-PD-L1 mAb used to make a TGFβ/PD-L1 bispecific binding protein of the invention has an equilibrium dissociation constant ($K_D$) of less than or equal to 1 nM. More preferably, a parental anti-PD-L1 mAb used to make a TGFβ/PD-L1 bispecific binding protein of the invention has a $K_D$ of less than 1 nM.

The amino acid sequence of the CDR-H2 of a VH domain of the parental anti-PD-L1 mAb may also need to be mutated for use in a TGFβ/PD-L1 bispecific binding protein of the invention. In particular, an Asn-Gly ("NG") sequence within a CDR-H2 of an antibody VH domain is known to be a potential source of deamidation reactions that can lead to heterogeneous species during production of an antibody or binding protein comprising the CDR-H2 sequence. A recognized solution is to mutate the glycine residue of the NG sequence to an alanine (A). Such a mutation to convert an NG sequence to NA is the "G55A" mutation according to the Kabat numbering system. Accordingly, as demonstrated below, whenever a CDR-H2 of a parental anti-PD-L1 mAb contained an NG sequence, the G55A mutation was used to convert the NG sequence to NA in the amino acid sequence of the VH domain of the TGFβ/PD-L1 bispecific binding protein.

A preferred humanized anti-PD-L1 mAb for producing TGFβ/PD-L1 bispecific binding protein of the invention is selected from the group consisting of: HuEM0005-86-2 with a G55A mutation (Kabat numbering system) in CDR-H2 (Example 2.1, below), HuEM0005-86-6 with a G55A mutation in CDR-H2 (Examples 2.1 and 3.2, below), HuEM0005-87-1 (Examples 2.2 and 3.2, below), and HuEM0005-90-1 with a G55A mutation (Kabat numbering system) in CDR-H2 (Examples 2.3 and 3.2, below). Even more preferably, an anti-PD-L1 mAb used to make a TGFβ/PD-L1 bispecific binding protein of the present invention is selected from HuEM0005-86-6 with a G55A mutation in CDR-H2, HuEM0005-87-1, and HuEM0005-90-1 with a G55A mutation in CDR-H2.

A preferred bispecific TGFβ/PD-L1 binding protein of the invention binds TGFβ and PD-L1 and comprises $VH_{PD-L1}$ and $VL_{PD-L1}$ domains of a PD-L1 binding site of a parental anti-PD-L1 mAb that binds human PD-L1, wherein the $VH_{PD-L1}$ and $VL_{PD-L1}$ domains comprise a set of six CDRs, i.e., CDR-H1, CDR-H2, CDR-H3, CDR-L1, CDR-L2, and CDR-L3, selected from the group of CDR sets defined below:

TABLE 3

Amino Acid Sequences of CDR Sets of Parental Anti-PD-L1 Monoclonal Antibodies

| CDR Set No. | CDR | CDR Amino Acid Sequence 12345678901234567890 | Sequence Identifier |
|---|---|---|---|
| 1 | CDR-H1 | TYGIN | SEQ ID NO: 2 |
|  | CDR-H2 | YIYIGNAYTEYNEKFKG | SEQ ID NO: 3 |
|  | CDR-H3 | DLMVIAPKTMDY | SEQ ID NO: 4 |
|  | CDR-L1 | KASQDVGTAVA | SEQ ID NO: 5 |
|  | CDR-L2 | WASTRHT | SEQ ID NO: 6 |
|  | CDR-L3 | QQYSSYPYT | SEQ ID NO: 7 |
| 2 | CDR-H1 | DYYIN | SEQ ID NO: 8 |
|  | CDR-H2 | ETIPNTGGTTYNQKFKA | SEQ ID NO: 9 |
|  | CDR-H3 | YQSGSPFAY | SEQ ID NO: 10 |
|  | CDR-L1 | KASQNVGTAVA | SEQ ID NO: 11 |
|  | CDR-L2 | SASNRYT | SEQ ID NO: 12 |
|  | CDR-L3 | QQHYSTPYT | SEQ ID NO: 13 |
| 3 | CDR-H1 | SHSIN | SEQ ID NO: 14 |
|  | CDR-H2 | YMYIGNAYTEYNEKFKG | SEQ ID NO: 15 |
|  | CDR-H3 | ITPVVAPYVMDY | SEQ ID NO: 16 |
|  | CDR-L1 | KASQDVGTAVA | SEQ ID NO: 17 |
|  | CDR-L2 | WASTRHT | SEQ ID NO: 18 |
|  | CDR-L3 | QQYSSYPYT | SEQ ID NO: 19 |

A preferred TGFβ/PD-L1 bispecific binding protein according to the invention binds TGFβ and PD-L1 and comprises $VH_{PD-L1}$ and $VL_{PD-L1}$ domains of a PD-L1 binding site of a parental anti-PD-L1 monoclonal antibody, wherein the $VH_{PD-L1}$ and $VL_{PD-L1}$ domains have amino acid sequences selected the following pairs of heavy and light chain variable domain sequences shown in Table 4, below, where the amino acid sequences of individual CDRs are indicated by (single) underlining and murine back-mutated residues are indicated by double underlining. The potential deamidation site NG (Asn-Gly) in CDR-H2 of SEQ ID NO:20, 22 and 26 has been eliminated by substitution of glycine (G) with alanine (A).

TABLE 4

Amino Acid Sequences of VH and VL Domains of Parental Humanized Anti-PD-L1 Monoclonal Antibodies*

| Amino Acid Sequence of Heavy Chain Variable (VH) Domain 12345678901234567890123456789 0 | Amino Acid Sequence of Light Chain Variable (VL) Domain 12345678901234567890123456789 0 |
|---|---|
| EVQLVQSGAEVKKPGASVKVSCK_TS_GYTFT TYGINWVRQAPGQGLEW_I_GYIYIGNAYTEY NEKFKGK_AT_L_TS_D_P_STR_TAYMELSSLRSDD TAVYYCARDLMVIAPKTMDYWGQGTTVTVS S (SEQ ID NO: 20) | DIQMTQSPSSVSASVGDRVTITCKASQDVG TAVAWYQQKPGKAPKLLIYWASTRHTGVPD RFTGSGSGTDFTLTISSLQPEDFATYYCQQ YSSYPYTFGGGTKVEIK (SEQ ID NO: 21) |
| EVQLVQSGAEVKKPGASVKVSCKASGYTFT DYYINWVRQAPGQGLEWMGETIPNTGGTTY NQKFKARVTMT_V_DTSTSTVYMELSSLRSED TAVYYCARYQSGSPFAYWGQGTTVTVSS (SEQ ID NO: 22) | DIVMTQSPDSLAVSLGERATINCKASQNVG TAVAWYQQKPGQPPKLLIYSASNRYTGVPD RFTGSGSGTDFTLTISSLQAEDVAVYYCQQ HYSTPYTFGGGTKLEIK (SEQ ID NO: 23) |
| EVQLVQSGAEVKKPGASVKVSCKASGYTFT SHSINWVRQATGQGLEWMGYMYIGNAYTEY NEKFKGRVTL_TS_NTSISTAYMELSSLRSED TAVYYCAKITPVVAPYVMDYWGQGTSVTVS S (SEQ ID NO: 24) | DIQLTQSPSFLSASVGDRVTITCKASQDVG TAVAWYQQKPGKAPKLLIYWASTRHTGVPS RFSGSGSGTEFTLTISSLQPEDFATYYCQQ YSSYPYTFGQGTKLEIK (SEQ ID NO: 25) |

*CDR sequences indicated by underlining; back-mutations indicated by double underlining.

A preferred TGFβ/PD-L1 bispecific binding protein of the invention exhibits no significant aggregate formation after a one-step purification from cell culture media using a Protein A affinity chromatography. As shown herein, after purification over a Protein A affinity chromatography, the column eluate containing TGFβ/PD-L1 bispecific binding protein can be analyzed for the presence of aggregates using size exclusion chromatography (e.g., size exclusion chromatography using a high performance liquid chromatography (HPLC) column). Size exclusion chromatography (SEC) will separate molecules based on size and therefore will separate molecules having the molecular weight expected for the fully assembled, six-polypeptide chain, also referred to as the six-chain "monomer", from other species having higher or lower molecule weights. The TGFβ/PD-L1 bispecific binding protein, six-chain, monomer expressed in mammalian cells is glycosylated and has a molecular weight of approximately 250,000 daltons. A particularly preferred TGFβ/PD-L1 bispecific binding protein of the invention that has been purified from culture media using Protein A affinity chromatography has less than 2% aggregates. That is, at least 98% of a TGFβ/PD-L1 bispecific binding protein of the invention produced in mammalian cell culture will be present as a fully-assembled, six-chain monomer. A level of less than or equal to 2% of protein aggregates is considered an insignificant amount that does not prevent efficient pre-clinical and clinical assessments of the TGFβ/PD-L1 bispecific binding protein as an anti-cancer drug.

Glycosylated TGFβ/PD-L1 Bispecific Binding Proteins

A TGFβ/PD-L1 bispecific binding protein of the invention may comprise one or more carbohydrate residues. Preferably, a TGFβ/PD-L1 bispecific binding protein described herein is glycosylated. More preferably, the glycosylation is a human glycosylation pattern.

Nascent in vivo protein production may undergo further processing, known as post-translational modification. In particular, sugar (glycosyl) residues may be added enzymatically, a process known as glycosylation. The resulting proteins bearing covalently linked oligosaccharide side chains are known as glycosylated proteins or glycoproteins.

Naturally occurring antibodies are glycoproteins with one or more carbohydrate residues in the Fc domain, as well as the variable domain. Carbohydrate residues in the Fc domain have important effects on the effector function of the Fc domain, with minimal effect on antigen binding or half-life of the antibody (Jefferis, Biotechnol. Prog., 21: 11-16 (2005)). In contrast, glycosylation of the variable domain may have an effect on the antigen binding activity of the antibody. Glycosylation in the variable domain may have a negative effect on antigen binding affinity, likely due to steric hindrance (Co, M. S., et al., Mol. Immunol., 30: 1361-1367 (1993)), or may result in increased affinity for the antigen (Wallick et al., J. Exp. Med., 168:1099-1109 (1988); Wright, A., et al., EMBO J., 10: 2717-2723 (1991)).

One aspect of the present invention is directed to generating glycosylation site mutants in which the O- or N-linked glycosylation site of a TGFβ/PD-L1 bispecific binding protein has been mutated. One skilled in the art can generate such mutants using standard well-known technologies. Glycosylation site mutants that retain the biological activity but have increased or decreased binding activity are another object of the present invention.

In still another embodiment, the glycosylation of a TGFβ/PD-L1 bispecific binding protein of the invention is modified. For example, an aglycoslated TGFβ/PD-L1 bispecific binding protein can be made (i.e., the binding protein lacks glycosylation). Glycosylation can be altered, for example, to increase the affinity of the TGFβ/PD-L1 bispecific binding protein for one or both target proteins. Such carbohydrate modifications can be accomplished by, for example, altering one or more sites of glycosylation within the binding protein sequence. For example, one or more amino acid substitutions can be made that result in elimination of one or more variable region glycosylation sites to thereby eliminate glycosylation at that site. Such aglycosylation may increase the affinity of a TGFβ/PD-L1 bispecific binding protein for a target protein. Such an approach is described in further detail in International Publication No. WO 2003/016466, and U.S. Pat. Nos. 5,714,350 and 6,350,861.

Additionally, or alternatively, a modified TGFβ/PD-L1 bispecific binding protein of the invention can be made that has an altered type of glycosylation, such as a hypofucosylated antibody having reduced amounts of fucosyl residues (see Kanda et al., J. Biotechnol., 130(3): 300-310 (2007)) or an antibody having increased bisecting GlcNAc structures. Such altered glycosylation patterns have been demonstrated to increase the ADCC ability of antibodies. Such carbohydrate modifications can be accomplished, for example, by expressing the antibody in a host cell with altered glycosylation machinery. Cells with altered glycosylation machinery have been described in the art and can be used as host cells in which to express recombinant antibodies of the invention to thereby produce an antibody with altered glycosylation. See, for example, Shields et al., J. Biol. Chem., 277: 26733-26740 (2002); Umana et al., Nat. Biotech., 17: 176-180 (1999), as well as, European Patent No: EP 1 176 195; International Publication Nos. WO 2003/035835 and WO 1999/54342.

Protein glycosylation depends on the amino acid sequence of the protein of interest, as well as the host cell in which the protein is expressed. Different organisms may produce different glycosylation enzymes (e.g., glycosyltransferases and glycosidases), and have different substrates (nucleotide sugars) available. Due to such factors, protein glycosylation pattern, and composition of glycosyl residues, may differ depending on the host system in which the particular protein is expressed. Glycosyl residues useful in the invention may include, but are not limited to, glucose, galactose, mannose, fucose, N-acetylglucosamine and sialic acid. Preferably the glycosylated TGFβ/PD-L1 bispecific binding protein comprises glycosyl residues such that the glycosylation pattern is human.

It is known to those skilled in the art that differing protein glycosylation may result in differing protein characteristics. For instance, the efficacy of a therapeutic protein produced in a microorganism host, such as yeast, and glycosylated utilizing the yeast endogenous pathway may be reduced compared to that of the same protein expressed in a mammalian cell, such as a CHO cell line. Such glycoproteins may also be immunogenic in humans and show reduced half-life in vivo after administration. Specific receptors in humans and other animals may recognize specific glycosyl residues and promote the rapid clearance of the protein from the bloodstream. Other adverse effects may include changes in protein folding, solubility, susceptibility to proteases, trafficking, transport, compartmentalization, secretion, recognition by other proteins or factors, antigenicity, or allergenicity. Accordingly, a practitioner may prefer a TGFβ/PD-L1 bispecific binding protein with a specific composition and pattern of glycosylation, for example glycosylation composition and pattern identical, or at least similar, to that produced in human cells or in the species-specific cells of the intended subject animal.

Expressing glycosylated TGFβ/PD-L1 bispecific binding protein different from that of a host cell may be achieved by genetically modifying the host cell to express heterologous glycosylation enzymes. Using techniques known in the art, a practitioner may generate a TGFβ/PD-L1 bispecific binding protein exhibiting human protein glycosylation. For example, yeast strains have been genetically modified to express non-naturally occurring glycosylation enzymes such that glycosylated proteins (glycoproteins) produced in these yeast strains exhibit protein glycosylation identical to that of animal cells, especially human cells (for example, U.S. Patent Publication Nos. 2004/0018590 and 2002/0137134).

Conjugates

Primarily owing to the presence of a dimerized Fc region, a TGFβ/PD-L1 bispecific binding protein of the invention can be conjugated to any of a variety of other molecules that are currently conjugated to IgG antibodies. For example, a TGFβ/PD-L1 bispecific binding protein described herein can be conjugated to a molecule selected from the group consisting of: an immunoadhesion molecule, an imaging agent, a therapeutic agent, and a cytotoxic agent. A preferred imaging agent that may be conjugated to a TGFβ/PD-L1 bispecific binding protein of the invention is selected from the group consisting of: a radiolabel, an enzyme, a fluorescent label, a luminescent label, a bioluminescent label, a magnetic label, biotin, streptavidin, and avidin. Radiolabels that may be conjugated to a TGFβ/PD-L1 bispecific binding protein described herein include, but are not limited to, $^{3}H$, $^{14}C$, $^{35}S$, $^{90}Y$, $^{99}Tc$, $^{111}In$, $^{131}I$, $^{177}Lu$, $^{166}Ho$, and $^{153}Sm$. Preferred cytotoxic or therapeutic compounds that may conjugated to a TGFβ/PD-L1 bispecific binding protein described herein include, but are not limited to, an antimetabolite, an alkylating agent, an antibiotic, a growth factor, a cytokine, an anti-angiogenic agent, an anti-mitotic agent, an anthracycline, a toxin, and an apoptotic agent. In some cases, a TGFβ/PD-L1 bispecific binding protein is conjugated directly to another molecule. Alternatively, a TGFβ/PD-L1 bispecific binding protein is conjugated to the agent via a linker. Suitable linkers include, but are not limited to, amino acid and polypeptide linkers disclosed herein. Linkers may be cleavable or non-cleavable.

Production of TGFβ/PD-L1 Bispecific Binding Proteins

The invention provides methods of producing a TGFβ/PD-L1 bispecific binding protein described herein comprising culturing an isolated host cell comprising one or more vectors encoding the three polypeptide chains of the TGFβ/PD-L1 bispecific binding protein under conditions sufficient to produce the TGFβ/PD-L1 bispecific binding protein. The desired TGFβ/PD-L1 bispecific binding protein that is expressed by such methods is a six-polypeptide chain TGFβ/PD-L1 bispecific binding protein that comprises four functional, N-terminal ("outer") TGFβ binding domains derived from a TGFβ receptor 2 protein (TGFBR2) and two functional ("inner") PD-L1-binding domains derived from a parental anti-PD-L1 monoclonal antibody that binds human PD-L1.

A variety of expression systems comprising expression vectors and compatible prokaryotic or eukaryotic host cells are available for expressing recombinant heterologous proteins. An example of a prokaryotic host cell that is often used to express a recombinant protein is an *Escherichia coli* cell. Eukaryotic host cells that may be used to express recombinant proteins include, without limitation, mammalian host cells, insect host cells, plant host cells, fungal host cells, algal host cells, nematode host cells, protozoan host cells, and fish host cells. Fungal host cells that may be used for expressing recombinant proteins include, but are not limited to: *Aspergillus, Neurospora, Saccharomyces, Pichia, Hansenula, Schizosaccharomyces, Kluyveromyces, Yarrowia*, and *Candida*. A preferred *Saccharomyces* host cell for expressing recombinant proteins is a *Saccharomyces cerevisiae* cell. An insect cell useful as a host cell according to the invention is an insect Sf9 cell.

Typically, each polypeptide chain of a TGFβ/PD-L1 bispecific binding protein is encoded on an isolated nucleic acid molecule along with an amino terminal signal sequence (signal peptide), which directs the nascent polypeptide chain into the lumen of the endoplasmic reticulum (ER) and then into the Golgi apparatus for secretion.

Nucleic acid molecules encoding one, two, or all three polypeptide chains of a TGFβ/PD-L1 bispecific binding protein described herein can be made using chemical DNA synthesis methods, using recombinant DNA methods, or using a combination of both methodologies.

In a non-limiting example, one or more isolated nucleic acid molecules encoding the three polypeptide chains of a TGFβ/PD-L1 bispecific binding protein described herein can be inserted into an expression vector, wherein the one or more nucleic acid molecules is operably linked to appropriate transcriptional and/or translational sequences that permit expression of the three polypeptide chains in a host cell that is compatible with and transfected with the expression vector. In an alternative but non-limiting example, each of three isolated nucleic acid molecules encoding one of the three polypeptide chains of a TGFβ/PD-L1 bispecific binding protein can be inserted into a separate expression vector, wherein each isolated nucleic acid molecule is operably linked to appropriate transcriptional and/or translational sequences to permit expression of the encoded polypeptide chain from the vector and so that all three polypeptide chains can be expressed together in a host cell that is compatible with and transfected with the three expression vectors.

A vector may be an autonomously replicating vector or a vector that incorporates the isolated nucleic acid that is present in the vector into a host cell genome. Preferred vectors for cloning and expressing nucleic acids described herein include, but are not limited, pcDNA3.1, pcDNA3.1 TOPO, pcDNA, pTT (Durocher et al, *Nucleic Acids Res.*, 30(2e9): 1-9 (2002)), pTT3 (pTT with additional multiple cloning sites), pEFBOS (Mizushima and Nagata, *Nucleic Acids Res.*, 18(17): 5322 (1990)), pBV, pJV, pEF6 TOPO and pBJ, and modifications thereof as required for expressing a TGFβ/PD-L1 bispecific binding protein described herein in a particular host cell.

In addition to producing a TGFβ/PD-L1 bispecific binding protein described herein, isolated nucleic acid molecules encoding one, two, or all three polypeptide chains of a TGFβ/PD-L1 bispecific binding protein may be inserted into a vector for carrying out various genetic analyses or for characterizing or improving one or more properties of a TGFβ/PD-L1 bispecific binding protein described herein.

In a preferred protocol for producing a TGFβ/PD-L1 bispecific binding protein described herein, the TGFβ/PD-L1 bispecific binding is expressed in an isolated mammalian host cell transfected with three expression vectors, wherein each expression vector comprises a nucleic acid encoding one of the three component polypeptide chains of the a TGFβ/PD-L1 bispecific binding protein.

Preferably, an isolated mammalian host cell comprising a vector described herein is selected from the group consisting of: a Chinese Hamster Ovary (CHO) cell, a COS cell, a Vero cell, an SP2/0 cell, an NS/0 myeloma cell, a human embryonic kidney (HEK293) cell, a baby hamster kidney (BHK)

cell, a HeLa cell, a human B cell, a CV-1/EBNA cell, an L cell, a 3T3 cell, an HEPG2 cell, a PerC6 cell, an MDCK cell, and derivatives thereof.

Various modifications of the original HEK293 cell line have been made to provide additional features to the host cells. Such derivative cell lines include, without limitation, HEK293E, HEK293T, HEK293F, and HEK293 FT cell lines. Cells of the original HEK293 cell line and such derivative lines are broadly and collectively referred to as HEK293 cells.

Transfected HEK293 cells are routinely used as a transient transfection system, which can provide short term production of recombinant proteins, including engineered antibodies and binding proteins, for example, from 4 to 10 days post-transfection. Transfected HEK293 cells are routinely employed for initial laboratory cloning, production, and analysis of recombinant proteins, thereby avoiding the time and labor required to isolate a stably transfected production cell line, such as a stable transfected CHO cell line. To practitioners familiar with production of engineered antibodies and binding proteins, a level of expression of less than 10 mg/L in cultures of transiently transfected cells is too low to expect that the adequate amounts of the binding protein will be available to conduct initial pre-clinical assessments, for example, biological activity studies, preliminary stability studies, pharmacokinetic (PK) studies, and efficacy in animal models. In addition, practitioners in this field also recognize that a level of expression of less than 10 mg/L in cultures of transiently transfected HEK293 cells indicates that the isolation of a stably transfected CHO cell with high expression (for example, greater than 1 g/L) is not likely to be successful, even with extensive investments of time and labor. In contrast, an expression level for a TGFβ/PD-L1 bispecific binding protein of greater than 10 mg/L in cultures of transiently transfected HEK293 cells is considered sufficiently high to provide amounts of the binding protein to conduct early discovery stage assessments prior to generation of a stably transfected CHO cell and also indicative of a likely successful isolation of a stably transfected CHO cell required for producing much higher amounts required for both later pre-clinical stage and clinical stage assessments.

TGFβ/PD-L1 bispecific binding proteins according to the invention can be expressed in cultures of transfected HEK293 cells at levels greater than 10 mg of EGFR/PD-L1 FIT-Ig binding protein per liter of cell culture (>10 mg/L). As shown below, TGFβ/PD-L1 bispecific binding proteins were produced in HEK293 cells in the range of about 40 mg/L to more than 60 mg/L. See, Example 3.2 and Table 24, below. Such yields were obtained when three recombinant pcDNA3.1 expression vectors for expressing each of the three component polypeptide chains for each of three TGFβ/PD-L1 bispecific binding proteins (i.e., FIT1012-3a, FIT1012-4a, FIT1012-7a) were co-transfected into HEK 293E cells at a ratio of 1:3:3, i.e., 1 vector for expressing the first (heavy) polypeptide chain: 3 vectors for expressing the second polypeptide chain: 3 vectors for expressing the third polypeptide chain.

Pharmaceutical Compositions

A pharmaceutical composition of the invention comprises an anti-PD-L1 monoclonal antibody (mAb), an antigen-binding portion of an anti-PD-L1 mAb, or a TGFβ/PD-L1 bispecific binding protein described herein and a pharmaceutically acceptable carrier (vehicle, buffer). In addition to a pharmaceutically acceptable carrier, a pharmaceutical composition comprising an anti-PD-L1 mAb, an antigen-binding portion of an anti-PD-L1 mAb, or a TGFβ/PD-L1 bispecific binding protein described herein may also comprise one or more other pharmaceutically acceptable components, such as, an excipient, and/or other ingredient. By "pharmaceutically acceptable" is meant that a carrier, compound, component, or other ingredient of a composition comprising an anti-PD-L1 mAb, an antigen-binding portion of an anti-PD-L1 mAb, or a TGFβ/PD-L1 bispecific binding protein described herein is compatible with the physiology of a human subject and also is not deleterious to the desired binding specificity of the anti-PD-L1 mAb, antigen-binding portion of an anti-PD-L1 mAb, or TGFβ/PD-L1 bispecific binding protein, or to any other desired property or activity of any other component that may be present in a composition that is to be administered to a human subject. Examples of pharmaceutically acceptable carriers that may be used in a pharmaceutical composition of the invention include, but are not limited to, water, saline, phosphate buffered saline, dextrose, glycerol, ethanol, and the like, as well as combinations thereof. In some cases, it may be preferable to include isotonic agents, including, but not limited to, sugars; polyalcohols, such as mannitol or sorbitol; sodium chloride; and combinations thereof.

Pharmaceutically acceptable compositions of the invention may further comprise one or more excipients, minor amounts of auxiliary substances such as wetting or emulsifying agents, fillers, preservatives, or buffers to enhance the shelf life or effectiveness of the pharmaceutical composition. An excipient is generally any compound or combination of compounds that provides a beneficial property or feature to a pharmaceutical composition other than a primary therapeutic compound or activity. With respect to a pharmaceutical composition comprising an anti-PD-L1 mAb, an antigen-binding portion of an anti-PD-L1 mAb, or a TGFβ/PD-L1 bispecific binding protein described herein (as the primary therapeutic compound), an excipient provides a desired beneficial feature other than the desired binding specificity of the anti-PD-L1 mAb, antigen-binding portion of an anti-PD-L1 mAb, or TGFβ/PD-L1 bispecific binding protein, or anti-cancer activity owing to the anti-PD-L1 mAb, antigen-binding portion of an anti-PD-L1 mAb, or TGFβ/PD-L1 bispecific binding protein.

In another embodiment, a pharmaceutical composition of the invention comprises an anti-PD-L 1 mAb, an antigen-binding portion of an anti-PD-L1 mAb, or a TGFβ/PD-L1 bispecific binding protein as described herein, a pharmaceutically acceptable carrier, and an adjuvant, wherein the adjuvant provides a general stimulation of the human immune system.

The pH may be adjusted in a pharmaceutical composition as necessary, for example, to promote or maintain solubility of component ingredients, to maintain stability of one or more component ingredients in the formulation, and/or to deter undesired growth of microorganisms that potentially may be introduced into the composition.

A pharmaceutical composition comprising an anti-PD-L1 mAb, an antigen-binding portion of an anti-PD-L1 mAb, or a TGFβ/PD-L1 bispecific binding protein described herein may be prepared to provide a sustained or time-delayed release of the binding protein. A variety of methods for the preparation of such controlled release or time-delayed compositions are known to those skilled in the art, including, but not limited to, implants, transdermal patches, and microencapsulated delivery systems. Biodegradable, biocompatible polymers can also be used, such as ethylene vinyl acetate, a polyanhydride, a polyglycolic acid, a collagen, a polyorthoester, a polylactic acid, and combinations thereof, to prepare controlled released or time-delayed compositions comprising an anti-PD-L1 mAb, an antigen-binding portion of an anti-PD-L1 mAb, or a TGFβ/PD-L1 bispecific binding protein described herein.

A pharmaceutical composition comprising an anti-PD-L1 mAb, an antigen-binding portion of an anti-PD-L1 mAb, or a TGFβ/PD-L1 bispecific binding protein described herein may further comprise one or more additional therapeutic agents (or "therapeutic compounds"). Examples of such additional therapeutic agents that may be incorporated into a pharmaceutical composition of the invention include, but are not limited to, an anti-cancer agent that is different from the anti-PD-L1 mAb, antigen-binding portion of an anti-PD-L1 mAb, or TGFβ/PD-L1 bispecific binding protein (for example, a cytotoxic metal-containing anti-cancer compound or a cytotoxic radioisotope-based anti-cancer compound, and combinations thereof), an antibiotic, an anti-viral compound, a sedative, a stimulant, a local anesthetic, an anti-inflammatory steroid (for example, natural or synthetic anti-inflammatory steroids and combinations thereof), an analgesic (for example, acetylsalicylic acid, acetaminophen, naproxen, ibuprofen, a COX-2 inhibitor, morphine, oxycodone, and combinations thereof), an anti-histamine, a non-steroidal anti-inflammatory drug ("NSAID," for example, acetylsalicylic acid, ibuprofen, naproxen, a COX-2 inhibitor, and combinations thereof), and combinations thereof.

A pharmaceutical composition according to the invention is formulated for administration by any of a variety of parental or non-parental routes known in the art. Preferred routes for administration include, but are not limited to: parenteral, intravenous (systemic), subcutaneous, intramuscular, oral, sub-lingual, buccal, intranasal (e.g., inhalation), transdermal (e.g., topical), intratumoral, transmucosal, intraarticular, intrabronchial, intracapsular, intracartilaginous, intracavitary, intracervical, intrahepatic, intramyocardial, intraosteal, intrapelvic, intrapericardial, intraperitoneal, intrapleural, intraprostatic, intrapulmonary, intrarenal, intraretinal, intraspinal, intrasynovial, intrathoracic, intrauterine, intravesical, vaginal, and rectal.

Preferably, a pharmaceutical composition according to the invention is formulated for intravenous administration to a human subject that has cancer. Intravenous administration of a pharmaceutical composition according to the invention provides an anti-PD-L1 mAb, an antigen-binding portion of an anti-PD-L1 mAb, or a TGFβ/PD-L1 bispecific binding protein throughout the circulatory system and thereby to tissues and organs reached by the circulating blood. Typically, compositions for intravenous administration are solutions in sterile isotonic aqueous buffer. Where necessary, the composition may also include a solubilizing agent and a local anesthetic, such as lidocaine, to ease pain at the site of the injection.

Subcutaneous administration of a pharmaceutical composition of the invention is a route by which an anti-PD-L1 mAb, an antigen-binding portion of an anti-PD-L1 mAb, or TGFβ/PD-L1 bispecific binding protein described herein may be provided to the lymph system. Accordingly, a pharmaceutical composition comprising an anti-PD-L1 mAb, an antigen-binding portion of an anti-PD-L1 mAb, or a TGFβ/PD-L1 bispecific binding protein described herein may be formulated for subcutaneous administration.

A pharmaceutical composition of the invention may be formulated for parenteral administration by injection (e.g., by bolus injection or continuous infusion). Formulations for injection may be presented in unit dosage form (e.g., in ampoules or in multi-dose containers) with an added preservative. The compositions may take such forms as suspensions or solutions or emulsions in oily or aqueous vehicles, and may contain formulary agents such as suspending, stabilizing, and/or dispersing agents. Alternatively, the active ingredient (i.e., an anti-PD-L1 mAb, an antigen-binding portion of an anti-PD-L1 mAb, or a TGFβ/PD-L1 bispecific binding protein of the invention) may be in powder form (e.g., lyophilized form) for reconstitution with a suitable vehicle (e.g., sterile pyrogen-free water) before use.

A pharmaceutical composition of the invention may be formulated for delivery as a depot preparation as a type of long acting formulation. Such long acting formulations may be administered by implantation (e.g., subcutaneously or intramuscularly) or by intramuscular injection. Thus, for example, a pharmaceutical composition may be formulated with suitable polymeric or hydrophobic materials (e.g., as an emulsion in an acceptable oil) or ion exchange resins, or as sparingly soluble derivatives (e.g., as a sparingly soluble salt).

Methods and Uses of a TGFβ/PD-L1 Bispecific Binding Protein of the Invention

The ability of the TGFβ/PD-L1 bispecific binding protein to bind both human TGFβ and human PD-L1 is primarily of interest in providing an anti-cancer therapy. The binding of TGFβ and PD-L1 to their respective receptors signals separate pathways that lead to suppression of T cell activation required for a robust T cell immune response to cancer cells in a patient. Such suppression of T cell activation by these two signaling pathways provides a means of resistance or immunity from a patient's immune response and therefore can promote carcinogenesis, cancer cell growth, and/or the spread of cancer cells (metastasis). The binding of a TGFβ/PD-L1 bispecific binding protein to TGFβ and PD-L1 inhibits or blocks TGFβ and PD-L1 from binding to their respective receptors and thereby release T cell activation from suppression by both pathways. Accordingly, a TGFβ/PD-L1 bispecific binding protein described herein can be used to treat cancer or any other disease associated with TGFβ-mediated or PD-L1-mediated suppression of T cell activation.

According to the invention, a method of treating cancer in a patient (human subject) comprises administering to the patient a TGFβ/PD-L1 bispecific binding protein described herein.

In a method of treating cancer in a patient according to the invention, the cancer may be an epithelial cancer.

In another embodiment, a method of the invention is used to treat a cancer, including, but is not limited to a cancer selected from the group consisting of: a melanoma (e.g., metastatic malignant melanoma), a renal cancer (e.g., clear cell carcinoma), a pancreatic cancer (e.g., pancreatic adenocarcinoma), a gastric cancer, a colon cancer, a lung cancer (e.g., non-small cell lung cancer), an esophageal cancer, a head cancer (e.g., squamous cell carcinoma of the head), a neck cancer (e.g., squamous cell carcinoma of the neck), a liver cancer, a thyroid cancer, a prostate cancer (e.g., hormone refractory prostate adenocarcinoma), a testicular cancer, a breast cancer, an ovarian cancer, a cervical cancer, a glioblastoma, a glioma, a leukemia, and a lymphoma.

In an embodiment, the invention also provides a method for restoring the activation of T cells (reversing suppression) comprising contacting human PD-L1 and human TGFβ with an TGFβ/PD-L1 bispecific binding protein of the invention in an amount effective to inhibit or block suppression of T cell activation in vitro or in vivo.

In an embodiment, the invention also provides a method for restoring the activation of T cells (reversing suppression) comprising contacting human PD-L1 with an TGFβ/PD-L1 bispecific binding protein of the invention in an amount effective to inhibit or block suppression of T cell activation in vitro or in vivo.

In an embodiment, the invention also provides a method for restoring the activation of T cells (reversing suppression) comprising contacting human TGFβ with an TGFβ/PD-L1 bispecific binding protein of the invention in an amount effective to inhibit or block suppression of T cell activation in vitro or in vivo.

In another embodiment, the invention provides a method for treating a patient (human subject) suffering from a disease in which TGFβ activity and PD-L1 activity is detrimental, such method comprising administering to the patient a TGFβ/PD-L1 bispecific binding protein of the invention in an amount effective to inhibit or block TGFβ binding to a TGFβ receptor and/or to inhibit or block PD-L1 binding to PD-1.

As used herein, the term "a disease in which TGFβ activity and/or PD-L1 activity is detrimental" is intended to include diseases in which the interaction of TGFβ with a TGFβ receptor and/or the interaction of PD-L1 with its receptor (PD-1) in a patient subject suffering from the disease is either responsible for the pathophysiology of the disease or is a factor that contributes to a worsening of the disease. Accordingly, a disease in which TGFβ and/or PD-L1 activity is detrimental is a disease in which inhibition of TGFβ and/or PD-L1 activity is expected to alleviate the symptoms and/or progression of the disease.

A TGFβ/PD-L1 bispecific binding protein of the invention that may be used in one or more of the methods of treatment described herein includes, but is not limited to, a TGFβ/PD-L1 bispecific binding protein selected from the group consisting of:

a TGFβ/PD-L1 bispecific binding protein comprising a first polypeptide chain that comprises an amino acid sequence according SEQ ID NO:26, a second polypeptide chain that comprises an amino acid sequence according to SEQ ID NO:27, and a third polypeptide chain comprises an amino acid sequence according to SEQ ID NO:28;

a TGFβ/PD-L1 bispecific binding protein comprising a first polypeptide chain comprising an amino acid sequence according to SEQ ID NO:29, a second polypeptide chain comprising an amino acid sequence according to SEQ ID NO:27, and a third polypeptide chain comprising an amino acid sequence according to SEQ ID NO:30; and a TGFβ/PD-L1 bispecific binding protein comprising a first polypeptide chain comprising an amino acid sequence according to SEQ ID NO:31, a second polypeptide chain comprising an amino acid sequence according to SEQ ID NO:27, and a third polypeptide chain comprising an amino acid sequence according to SEQ ID NO:32.

Given that a TGFβ/PD-L1 bispecific binding protein of the invention binds to human TGFβ and human PD-L1, a TGFβ/PD-L1 bispecific binding protein may also be used to detect TGFβ or PD-L1, or both, e.g., in a biological sample containing cells that express one or both of those target proteins. For example, a TGFβ/PD-L1 bispecific binding protein of the invention can be used in a conventional immunoassay, such as an enzyme linked immunosorbent assays (ELISA), a radioimmunoassay (RIA), or tissue immunohistochemistry. The invention also provides a method for detecting TGFβ or PD-L1 in a biological sample comprising contacting a biological sample with a TGFβ/PD-L1 bispecific binding protein described herein and detecting whether the TGFβ/PD-L1 binding protein has bound a target protein (TGFβ or PD-L1) in the biological sample. The TGFβ/PD-L1 binding protein may be directly or indirectly labeled with a detectable substance to facilitate detection of the bound or unbound binding protein. Suitable detectable substances include various enzymes, prosthetic groups, fluorescent materials, luminescent materials, and radioactive materials. Examples of suitable enzymes for detection of bound or unbound binding protein include, but are not limited to, horseradish peroxidase, alkaline phosphatase, β-galactosidase, and acetylcholinesterase. Examples of suitable prosthetic groups for detection of bound or unbound binding protein include, but are not limited to, streptavidin/biotin and avidin/biotin. Examples of suitable fluorescent materials for detecting bound or unbound binding protein include, but are not limited, umbelliferone, fluorescein, fluorescein isothiocyanate, rhodamine, dichlorotriazinylamine fluorescein, dansyl chloride and phycoerythrin. A non-limiting example of a suitable luminescent material for detecting bound or unbound binding protein is luminol. An example of a suitable radioactive material for detecting bound or unbound binding protein includes, but is not limited to, $^{3}$H, $^{14}$C, $^{35}$S, $^{90}$Y, $^{99}$Tc, $^{111}$In, $^{125}$I, $^{131}$I, $^{177}$Ln, $^{166}$Ho, and $^{153}$Sm.

Having now described the present invention in detail, the same will be more clearly understood by reference to the following examples, which are included for purposes of illustration only and are not intended to be limiting of the invention.

EXAMPLES

Example 1. Generation of Anti-PD-L1 Monoclonal Antibodies

Anti-PD-L1 mAbs having a $K_D$ of less than 1 nM (sub-nanomolar affinity) for the PD-L1 target antigen are preferred for producing TGFβ/PD-L1 bispecific binding proteins according to the invention for development and use in treating diseases in human patients. However, most anti-PD-L1 monoclonal antibodies (mAbs) that were previously obtained using standard hybridoma screening protocols were found to have a relatively low affinity for the PD-L1 target antigen with $K_D$ values greater than 1 nM. Moreover, in one anti-PD-L1 mAb obtained from a hybridoma screen that exhibited a sub-nanomolar affinity, the mAb also possessed unusual variable region sequences that resulted in low levels of expression (low yields) and therefore could not support production of TGFβ/PD-L1 bispecific binding proteins in quantities sufficient for sub-clinical and clinical testing.

In general, immune libraries produce more sequence diversity than hybridoma procedures, because some clones tend to be lost during hybridoma fusion and cell culture. Accordingly, the strategy adopted and carried out as described below was to employ immune libraries with the goal of isolating a panel of anti-PD-L1 antibodies with diversified sequences, that exhibited sub-nanomolar affinity for PD-L1, and that could be produced in sufficiently high yields to support production of multiple examples of TGFβ/PD-L1 bispecific binding proteins, which in turn could be produced in sufficient quantities required for pre-clinical and clinical testing. Of particular interest, were anti-PD-L1 mAbs with sub-nanomolar affinities, for example, $K_D$ values less than 1 nm, and especially $K_D$ values of about 0.5 nM for the PD-L1 target antigen, for example, as found in the anti-PD-L1 antibody atezolizumab.

In the procedure described below, anti-PD-L1 monoclonal antibodies (mAbs) were generated based on immunization and immune phage library technology. Accordingly, the initial anti-PD-L1 mAbs were single chain Fv antibodies expressed in and selected from a phage library. Anti-PD-L1 mAbs with high binding activities (sub-nanomolar KD values) for PD-L1 as demonstrated in enzyme-linked immunosorbent assay (ELISA) and fluorescence-activated cell sorting (FACS) assay were selected for further characterization.

Example 1.1. Recombinant Proteins for Use in Immunizations and Binding Assays

A structural gene encoding the extracellular domain (ECD) of human PD-L1 consisting of amino acids 1-220 (Phe1-Arg220) of SEQ ID NO:33 (same as Phe19-Arg238 of NCBI accession number, Q9NZQ7) was synthesized by Synbio Technologies (Suzhou, China). The structural gene was then subcloned into a pCP expression vector (Chempartner, Shanghai, China) so that the PD-L1 ECD was fused at its C-terminus to the Fc domain of human IgG1 to form the recombinant fusion protein designated "human PD-L1/Fc Fusion Protein" and having an amino acid sequence (SEQ ID NO:33) shown in Table 5 below. In a similar manner, a structural gene encoding the ECD of human PD-1 consisting of amino acids 1-143 of SEQ ID NO:34 (same as Leu25-Gln167 of NCBI accession number, Q8IX89) was synthesized (Synbio Technologies, Suzhou, China) and subcloned into a pCP expression vector (Chempartner, Shanghai, China) so that the PD-1 ECD was fused at its C-terminus to the Fc domain of human IgG1 to form the recombinant fusion protein designated "human PD-1/Fc Fusion Protein" and having an amino acid sequence (SEQ ID NO:34) shown in Table 5, below.

The recombinant human PD-L1/Fc and human PD-1/Fc fusion proteins were individually produced by transient expression in HEK 293 cells that were transfected with the expression plasmid encoding either the human PD-L1/Fc fusion protein or the human PD-1/Fc fusion protein. The transfected HEK 293E cells were grown in 1 to 3 liters of medium (FreeStyle™ 293 Expression Medium (ThermoFisher, Catalog No. 12338) for 7 days in a $CO_2$ shaker. The supernatant of each culture containing the recombinant fusion protein was harvested by centrifugation at 4000×g for 30 minutes. Each of the fusion proteins was purified from the culture supernatant by Protein A affinity chromatography using a MabSelect SuRe™ affinity resin (GE Healthcare), followed by dialysis against phosphate buffered saline (PBS), pH 7.4. The purified fusion proteins were stored in small aliquots at −80° C.

A human PD-L1/His fusion protein having an amino acid sequence (SEQ ID NO:35) shown in Table 5 comprising amino acids Phe19-Thr239 of human PD-L1 (NCBI accession number Q9NZQ7) fused to a C-terminal hexa-histidine peptide (HHHHHH, amino acids 222-237 of SEQ ID NO:35) was commercially procured (Catalog No. C315, Novoprotein). A human PD-L1/GST fusion protein (SEQ ID NO:36) comprising an N-terminal GST tag fused to amino acid residues 141-240 of human PD-L1 (NCBI accession number Q9NZQ7) for use in panning and screening procedures was commercially procured (Catalog No. ab112410, Abcam). A cynomolgus (cyno) PD-L1/His fusion protein was commercially procured (Cat. No. 90251-C08H, Sino biological).

The amino acid sequences of fusion proteins used in immunization and binding studies are shown in Table 5, below.

TABLE 5

Amino Acid Sequences of Fusion Proteins

| Fusion Protein | Amino Acid Sequence |
|---|---|
| PD-L1/Fc Fusion Protein | FTVTVPKDLYVVEYGSNMTIECKFPVEKQLDLAALIVYWE MEDKNIIQFVHGEEDLKVQHSSYRQRARLLKDQLSLGNAA LQITDVKLQDAGVYRCMISYGGADYKRITVKVNAPYNKIN QRILVVDPVTSEHELTCQAEGYPKAEVIWTSSDHQVLSGK TTTTNSKREEKLFNVTSTLRINTTTNEIFYCTFRRLDPEE NHTAELVIPELPLAHPPNERTDIEGRMDPKSSDKTHTCPP CPAPELLGGPSVFLFPPKPKDTLMISRTPEVTCVVVDVSH EDPEVKFNWYVDGVEVHNAKTKPREEQYNSTYRVVSVLTV LHQDWLNGKEYKCKVSNKALPAPIEKTISKAKGQPREPQV YTLPPSREEMTKNQVSLTCLVKGFYPSDIAVEWESNGQPE NNYKTTPPVLDSDGSFFLYSKLTVDKSRWQQGNVFSCSVM HEALHNHYTQKSLSLSPGK (SEQ ID NO: 33) |
| PD-1/Fc Fusion Protein | LDSPDRPWNPPTFSPALLVVTEGDNATFTCSFSNTSESFV LNWYRMSPSNQTDKLAAFPEDRSQPGQDCRFRVTQLPNGR DFHMSVVRARRNDSGTYLCGAISLAPKAQIKESLRAELRV TERRAEVPTAHPSPSPRPAGQFQIEGRMDPKSSDKTHTCP PCPAPELLGGPSVFLFPPKPKDTLMISRTPEVTCVVVDVS HEDPEVKFNWYVDGVEVHNAKTKPREEQYNSTYRVVSVLT VLHQDWLNGKEYKCKVSNKALPAPIEKTISKAKGQPREPQ VYTLPPSREEMTKNQVSLTCLVKGFYPSDIAVEWESNGQP ENNYKTTPPVLDSDGSFFLYSKLTVDKSRWQQGNVFSCSV MHEALHNHYTQKSLSLSPGK (SEQ ID NO: 34) |
| PD-L1/His Fusion Protein | FTVTVPKDLYVVEYGSNMTIECKFPVEKQLDLAALIVYWE MEDKNIIQFVHGEEDLKVQHSSYRQRARLLKDQLSLGNAA LQITDVKLQDAGVYRCMISYGGADYKRITVKVNAPYNKIN QRILVVDPVTSEHELTCQAEGYPKAEVIWTSSDHQVLSGK TTTTNSKREEKLFNVTSTLRINTTTNEIFYCTFRRLDPEE NHTAELVIPELPLAHPPNERTHHHHHH (SEQ ID NO: 35) |

TABLE 5-continued

Amino Acid Sequences of Fusion Proteins

| Fusion Protein | Amino Acid Sequence<br>12345678901234567890123456789012345678 90 |
|---|---|
| PD-L1/GST Fusion Protein | MSPILGYWKIKGLVQPTRLLLEYLEEKYEEHLYERDEGDK<br>WRNKKFELGLEFPNLPYYIDGDVKLTQSMAIIRYIADKHN<br>MLGGCPKERAEISMLEGAVLDIRYGVSRIAYSKDFETLKV<br>DFLSKLPEMLKMFEDRLCHKTYLNGDHVTHPDFMLYDALD<br>VVLYMDPMCLDAFPKLVCFKKRIEAIPQIDKYLKSSKYIA<br>WPLQGWQATFGGGDHPPKSDILVVDPVTSEHELTCQAEGY<br>PKAEVIWTSSDHQVLSGKTTTTNSKREEKLFNVTSTLRIN<br>TTTNEIFYCTFRRLDPEENHTAELVIPELPLAHPPNERTH<br>(SEQ ID NO: 36) |

Example 1.2. Stable Cell Line Expressing PD-L1 Protein

A stable cell line overexpressing human PD-L1 (NCBI accession number Q9NZQ7) was established by transfecting CHO-K1 cells (ATCC CCL-1) with pIRES-puro plasmids encoding human PD-L1. Single clones were isolated by limited dilution. All clones were screened by FACS analysis using anti-PD-L1 antibodies, and the clones with highest levels of expression of PD-L1 were selected for use in FACS binding assays to screen clones or purified monoclonal antibodies, or for use in functional assays. A stable CHO cell line overexpressing cynomolgus PD-L1 (NCBI accession number XP 015292694), was similarly established.

Example 1.3. Generation of a Reference Anti-PD-L1 scFv Monoclonal Antibody

A gene encoding the variable regions of the anti-PD-L1 monoclonal antibody (mAb) atezolizumab in a single chain antibody (scFv) format, wherein the VH and VL domains of atezolizumab were linked to one another by a glycine-serine peptide linker, and having an amino acid sequence (SEQ ID NO:37) as shown in Table 6, below, was synthesized (Genewiz, Suzhou, China). The gene was subcloned into a pCAN phagemid vector (Chempartner, Shanghai, China) so that the encoded scFv was further fused with a c-myc tag (EQKLISEEDL, SEQ ID NO:38) followed by a 6His tag (HHHHHH, SEQ ID NO:39) at the C-terminus.

TABLE 6

Amino Acid Sequence of a Reference Anti-PD-L1 scFv

| Reference<br>Antibody | Amino Acid Sequence<br>12345678901234567890123456789012345678 90 |
|---|---|
| anti-PD-L1 scFv<br>(atezolizumab scFv) | EVQLVESGGGLVQPGGSLRLSCAASGFTFSDSWIHWVRQA<br>PGKGLEWVAWISPYGGSTYYADSVKGRFTISADTSKNTAY<br>LQMNSLRAEDTAVYYCARRHWPGGFDYWGQGTLVTVSSGG<br>GGSGGGGSGGGGSDIQMTQSPSSLSASVGDRVTITCRASQ<br>DVSTAVAWYQQKPGKAPKLLIYSASFLYSGVPSRFSGSGS<br>GTDFTLTISSLQPEDFATYYCQQYLYHPATFGQGTKVEIK<br>RTV (SEQ ID NO: 37) |

Example 1.4. Immunization and a Phage Display Immune Library Construction

Immunization to raise antibody to PD-L1 was performed using high and low dosing protocols. Briefly, female Balb/c mice were injected with PD-L1/Fc Fusion Protein (SEQ ID NO:33, Table 5) at a dose of 50 µg/animal (n=5, high dose Group 1) or at a dose of 10 µg/animal (n=5, low dose Group 2), with a maximum volume of 0.2 ml/animal, by intraperitoneal (ip) injection. Animals received booster injections three times at approximately two- to three-week intervals with PD-L1/Fc Fusion Protein at a dose of 25 µg/animal in Group 1 and 5 µg/animal in Group 2. The complete Freund's adjuvant (CFA) was included in immunogen solution of the first injection, and Incomplete Freund's Adjuvant (IFA) was included in immunogen solution of three booster injections. Blood samples were taken from each animal after each boost immunization, except the final boost immunization, for analysis by ELISA, FACS, and receptor blocking assay (only after the second booster) to assess the immune response to the target antigen. Three days after the final boosting, the splenocytes were isolated from mice of both Groups 1 and 2 for library construction.

An M13 phage library was constructed according to the method of Krebber et al., *J. Immunol. Methods,* 201(1): 35-55 (1997). Briefly, RNA was isolated from splenocytes of immunized animals, and cDNA was synthesized by reverse transcriptase-polymerase chain reaction (RT-PCR) using PrimeScript™RT Master Mix (Cat. No. RR036A, Takara). DNA molecules encoding variable regions of anti-PD-L1 antibody heavy chains and light chains were amplified and assembled to scFv constructs in the orientation VH-Linker-VL by overlapping PCR, wherein "Linker" is a 15-amino acid $(G_4S)_3$ peptide linker, i.e., $(Gly_4Ser)_3$ (SEQ ID NO:40). The DNA molecules encoding the scFv fragments were cloned into phagemid vector pCAN (Chempartner, Shanghai, China) and then electro-transformed into *Escherichia. coli* TG1 cells (Cat. No. 60502-1, Lucigen), resulting in a library of approximately $1.2 \times 10^8$ clones with high sequence diversity. The library was rescued with M13K07 helper phage (Cat. No. N0315S, New England Biolabs) at approximately a 1:20 ratio (host cell versus phage).

Rounds of panning the phage display library were carried out with progressively lower concentrations of biotinylated PD-L1/His Fusion Protein followed by washing steps. Briefly, 5 nM biotinylated PD-L1/His Fusion Protein was used in the first round to recycle binders. In the second round, 0.5 nM biotinylated PD-L1/His Fusion Protein was used for high affinity binder rescue and 50 nM human PD-L1/GST protein (Cat. No. ab112410, Abcam) was used for extended washing to reduce scFv phages binding to undesired epitope. In the third round, 0.1 nM biotinylated PD-L1/His Fusion Protein was used for high affinity binders rescue. Three groups of additional washing conditions were applied separately: washing buffer containing phage displaying reference anti-PD-L1 scFv at titers of $10^7$ for group 1 or $10^9$ for group 2, or washing buffer containing 10 nM PD-L1/His Fusion Protein for group 3, all of which help select to high affinity scFv phage.

Example 1.5. Assessing PD-L1 Binding Activity of scFv Monoclonal Antibodies

Binding Activity by Enzyme-Linked Immunosorbent Assay (ELISA)

Two hundred (200) single bacterial clones from each group of the third panning round were isolated and grown in culture to express a single scFv monoclonal antibodies (mAbs). The scFv mAbs were expressed in the bacterial culture supernatants, which were primarily screened by ELISA. Briefly, the scFv supernatants of single clones, supernatant for a culture of "blank" TG1 E. coli cells (i.e., cells transformed with empty phagemid) as negative control, and reference anti-PD-L1 scFv as positive control, were prepared by overnight culturing at 30° C. with 1 mM IPTG. 20 ng of human PD-L1/Fc protein in 100 μL PBS, pH 7.4, were directly coated in each well of a 96-well plate. An HRP-linked anti-c-myc antibody (Cat. No. Ab1261, Abcam) and TMB reagent were used to detect and develop the ELISA signal, which was read using a plate reader (SpectraMax® Plus 384; Molecular Devices) at a wavelength of 450 nm. The ELISA-positive clones were further characterized by ELISA for ability to bind cynomolgus ("cyno") PD-L1, by a receptor blocking assay (RBA) using scFv supernatants, and by FACS using scFv-displayed phage.

Receptor Blocking Assay (RBA)

Anti-PD-L1 scFv supernatants were tested for ability to block PD-L1/PD-1 interaction. Briefly, 100 ng of human PD-L1/His protein in 100 μL of phosphate buffered saline (PBS) were directly coated in each well of a 96-well plate, after which 50 μL/well of biotinylated human PD-1/Fc fusion protein (1 μg/mL, final concentration) in blocking buffer were mixed with anti-PD-L1 scFv supernatant, blank TG1 supernatant as negative control, or tool antibody (atezolizumab scFv) as positive control. The mixtures were added to individual wells and incubated at room temperature for 30 minutes. Plates were washed twice with PBS to remove non-binding biotinylated human PD-1/Fc fusion protein. Bound signal was developed by Streptavidin-HRP (Cat. No. S2468, Sigma) and read by a plate reader at a wavelength of 450 nm. A low signal, as with the positive control, indicated blocking activity.

After characterization of ability to bind PD-L1 in ELISA and RBA ELISA, the PD-L1-binding positive scFv clones were sequenced. Based on sequence homology analysis, 62 clones with unique CDR-H3 sequences were further analyzed for cell surface binding by FACS. Briefly, $2\times10^5$ cells of the CHO-K1/PD-L1 cell line stably expressing huPD-L1 described above were added to round-bottom wells of a 96-well plate (Cat. No. 3799, Corning). A phage supernatant from an overnight culture that had been rescued by hyper phage was added. The mixture of CHO-K1/PD-L1 cells and phage supernatant in each well was diluted with 50 μl of FACS buffer (PBS with 2% FBS). The anti-PD-L1 scFv-phages were detected with murine anti-M13 phage antibody (Cat. No. 11973-MM05, Sino biological) and then with Donkey anti-Mouse IgG (H+L) Highly Cross-Adsorbed, Alexa Fluor® 488 conjugate, secondary antibody (Cat. No. A21202, Invitrogen). Cell fluorescence was monitored using a flow cytometer.

The 62 scFv mAbs that showed positive signals in ELISA, FACS, and RBA were analyzed for off-rate ranking. Briefly, antibodies were characterized for affinities and binding kinetics by biolayer interferometry (BLI) using an Octet® RED96 sensor device (Pall ForteBio LLC). Antibodies were captured by anti-hIgG Fc Capture (AHC) Biosensors (Pall) at a concentration of 100 nM for 30 seconds. Sensors were then dipped into running buffer (1×, pH7.2, PBS, 0.05% Tween 20, 0.1% BSA) for 60 seconds to check baseline. Binding was measured by dipping sensors into a single concentration of recombinant human PD-L1-his protein. Dissociation was followed by dipping sensors into running buffer for 1200 seconds. The association and dissociation curves were fitted to a 1:1 Langmuir binding model using the manufacturer's data analysis software (ForteBio Data Analysis software, Pall ForteBio LLC).

The results of the above binding assays for three of the 62 scFv mAbs along with positive and negative controls are summarized in Table 7, below. Note that the abbreviation "NA" in the "$k_{off}$" column of the BLI data indicates a very low binding response and thus, as expected, the negative control had very low affinity for PD-L1 according to the BLI assay.

TABLE 7

Results of Binding Assays for scFv mAbs

| scFv mAb | Binding to human PD-L1 (EC50, nM) | Binding to cynomolgus PD-L1 (EC50, nM) | RBA (% inhibition) | Binding to CHOK1-PD-L1 (X Geo Mean) | $k_{off}$ (1/sec) |
|---|---|---|---|---|---|
| 6C11 | 3.34 | 4.00 | 100.0% | 36.6 | $2.32 \times 10^{-4}$ |
| 3A3 | 1.19 | 4.00 | 100.0% | 27.6 | $1.97 \times 10^{-4}$ |
| 4E8 | 3.02 | 4.00 | 99.8% | 49.7 | $2.06 \times 10^{-4}$ |
| Negative control | 0.07 | 0.07 | 19.1% | 2.3 | NA |
| Positive control | 4.00 | 4.00 | 99.0% | 90.5 | $1.53 \times 10^{-4}$ |

Example 1.6. Sequence Analysis of Anti-PD-L1 scFv mAbs

The anti-PD-L1 scFv mAbs (clones) from Table 7, above, were sequenced in their entireties. These clones have positive ELISA and FACS binding activity, cynomolgus PD-L1 cross-reactivity, complete PD-1/PD-L1 blocking activity, and better or similar off-rates compared to reference scFv (atezolizumab scFv). The amino acid sequences of the VH and VL domains of the three clones are shown in Table 8 below, along with scFv mAb and corresponding clonal designations. The VL domains of the clones are kappa light chain variable domains, and therefore are referred to as "VL kappa," or simply, "VK" domains. The underlined portions of the amino acid sequences of the VH and VK domains in Table 8 are the individual CDR regions based on the Kabat numbering system.

TABLE 8

Amino Acid Sequences of VH and VK Domains of Selected scFv mAbs

| scFv mAb Designation | Clone | Variable Domain | Amino Acid Sequence<br>12345678901234567890123456789012345678 90 |
|---|---|---|---|
| EM0005-mAb86 | 3A3 | VH | QVQLQQSGAELVRPGSSVKMSCKTSGYTFTTYGINWVKQR PGQGLEWIGYIYIGNGYTEYNEKFKGKATLTSDPSSRTAY MQLSSLTSEDSAIYFCARDLMVIAPKTMDYWGQGTSVTVS S (SEQ ID NO: 41) |
| | | VK | DIQMNQSHKFMSTSVGDRVSITCKASQDVGTAVAWYQQKP GQSPKLLIYWASTRHTGVPDRFTGGGSGTDFTLTISNVQS EDLADYFCQQYSSYPYTFGGGTKLEMK (SEQ ID NO: 42) |
| EM0005-mAb87 | 4E8 | VH | EVQLQQSGPELVKPGASVKISCKASGYSFTDYYINWVKQS PEKSLEWIGETIPNTGGTTYNQKFKAKATLTVDKSSSTAY MQLKSLTSEDSAVYYCARYQSGSPFAYWGQGTPVTVSS (SEQ ID NO: 43) |
| | | VK | DIVMTQSQKFMSTTVGDRVSITCKASQNVGTAVAWYQQKP GQSPKLLIYSASNRYTGVPDRFTGSGSGTDFTLTISNMQS EDLADYFCQQHYSTPYTFGGGTKLEIK (SEQ ID NO: 44) |
| EM0005-mAb90 | 6C11 | VH | QVQLKQSGAELVRPGSSVKMSCKTSGYTFTSHSINWVKQR PGQGLEWIGYMYIGNGYTEYNEKFKGKATLTSDTSSTTAY MQLSSLTSEDSAIYFCAKITPVVAPYVMDYWGQGTSVTVS S (SEQ ID NO: 45) |
| | | VK | DIVMTQTHKFMSTSVGDRVSITCKASQDVGTAVAWYQQKP GQSPKLLIYWASTRHTGVPDRFTGSGSGTDFTLTISNVQS EDLADYFCQQYSSYPYTFGGGTKLELK (SEQ ID NO: 46) |

Example 1.7. Generation and Characterization of Chimeric Antibodies

The scFv mAb clones described above and in Table 8 were converted to full-length IgG proteins with human constant sequences (i.e., chimeric antibodies). The VH and VL domains used in Example 1.3 for atezolizumab scFv (SEQ ID NO:37) was also used to generate a full-length chimeric IgG (Atezolizumab analogue) for use as a control. Briefly, genes encoding the VH and VL (i.e., VK) domains of each of the scFv mAbs in Table 8 were produced synthetically and then cloned into plasmid vectors containing coding sequences for the human IgG1 heavy chain constant region (CH1-hinge-CH2-CH3) and human kappa light chain constant domain (CL), respectively. The amino acid sequences of the human IgG1 heavy and light chain constant regions used to generate the full-length chimeric antibodies are shown in Table 9 below.

The heavy chain and cognate light chain plasmids for each chimeric antibody were co-transfected into HEK 293E cells. After approximately six days of post-transfection cell culture, the supernatants were harvested and subjected to Protein A affinity chromatography. The composition and purity of the purified antibodies were analyzed by size exclusion chromatography (SEC). Purified antibody, in PBS, was applied to a TSKgel G3000SWXL, 7.8×300 mm, 5 μm Steel, SEC column (TOSOH). A DIONEX™ UltiMate 3000 HPLC instrument (Thermo Scientific) was used for SEC with UV detection at 280 nm and 214 nm. The results of SEC for each chimeric IgG antibody were also expressed as the percent monomeric IgG antibody (intact, 4-chain, IgG antibody) present in a peak SEC fraction, which provides an indication of the stability of the purified chimeric antibody and whether or not aggregates or fragments constitute a significant proportion of the antibody produced in transfected HEK 293E cells. In general, a peak SEC fraction

TABLE 9

Amino Acid Sequences of Human IgG1 Constant Regions

| Constant Regions | Amino Acid Sequences<br>12345678901234567890123456789012345678 90 |
|---|---|
| human IgG1 heavy chain constant region (CH1-hinge-CH2-CH3) | ASTKGPSVFPLAPSSKSTSGGTAALGCLVKDYFPEPVTVS WNSGALTSGVHTFPAVLQSSGLYSLSSVVTVPSSSLGTQT YICNVNHKPSNTKVDKKVEPKSCDKTHTCPPCPAPELLGG PSVFLFPPKPKDTLMISRTPEVTCVVVDVSHEDPEVKFNW YVDGVEVHNAKTKPREEQYNSTYRVVSVLTVLHQDWLNGK EYKCKVSNKALPAPIEKTISKAKGQPREPQVYTLPPSREE MTKNQVSLTCLVKGFYPSDIAVEWESNGQPENNYKTTPPV LDSDGSFFLYSKLTVDKSRWQQGNVFSCSVMHEALHNHYT QKSLSLSPGK (SEQ ID NO: 47) |
| human IgG1 kappa light chain region (CL) | RTVAAPSVFIFPPSDEQLKSGTASVVCLLNNFYPREAKVQ WKVDNALQSGNSQESVTEQDSKDSTYSLSSTLTLSKADYE KHKVYACEVTHQGLSSPVTKSFNRGEC (SEQ ID NO: 48) | containing 90 percent or more monomeric antibody is preferred for a particular antibody to be further analyzed as described herein and used in preparing a tetravalent, bispecific, PD-L1/TGFB2 binding protein according to the invention as described in Example 3, below.

The purified chimeric antibodies were characterized in terms of binding activity by ELISA, FACS, receptor blocking activity (RBA) using ELISA, and binding affinity to human and cynomolgus PD-L1 by biolayer interferometry (BLI) using an Octet®Red senor device (Pall ForteBio LLC).

Binding Activity by ELISA

The ability of an antibody to bind human or cynomolgus (cyno) PD-L1 (binding activity) was determined by ELISA. ELISA plates were incubated overnight at 4° C. with 50 µl of the human or cyno PD-L1 protein described above diluted in PBS buffer, pH 7.4, at 1 µg/ml. Plates were washed four times in washing buffer (PBS containing 0.05% Tween 20) and blocked for 1 hour at 37° C. with 200 µl per well of blocking buffer (1% BSA in PBS containing 0.05% Tween 20). After blocking buffer was removed, diluted purified antibodies (200 nM and 1:5 serial dilutions to provide 7 concentrations of each antibody) were added to the wells at 100 µl per well and incubated at 37° C. for 1 hour. The wells were washed four times with washing buffer, and anti-human IgG (Fc-specific) HRP-conjugated antibody (Sigma), diluted 1:10,000, was added to the wells at 100 µl per well. The plates were incubated for 1 hour at 37° C. and washed four times in washing buffer. 100 µl of tetramethylbenzidine (TMB) chromogenic solution were added per well. Following color development, the reaction was stopped with 1 N HCl, and absorbance at 450 nm was measured on a VARIOSKAN™ LUX multimode microplate reader (ThermoFisher Scientific, Vataa, Finland). The data were processed by GraphPad software, and EC50 values were calculated. The EC50 for binding activity according to this ELSA is the concentration at which an antibody induces a response halfway between the baseline and maximum and indicates the binding ability of the antibody.

Binding Activity by Fluorescence-Activated Cell Sorting (FACS)

The ability of the purified antibodies to bind to cell membrane human PD-L1 was determined by FACS analysis. CHO-K1 cells stably expressing human PD-L1 (CHO-K1/hPD-L1 cells) were resuspended in PBS containing 2% FBS (FACS buffer) and seeded at 1×10$^5$ cells/well into 96-well round-bottomed plates (Corning; Cat. No. 3799). Purified antibodies were added to the wells and detected with Fc-specific secondary antibody (Alexa Fluor® 647 AffiniPure F(ab')$_2$ Fragment Goat Anti-Human IgG, Fcγ Fragment Specific, Catalogue No. 109-606-098, Jackson ImmunoResearch Laboratories, Inc., West Grove, PA, USA). The assay plate was then read on a flow cytometer. The data were processed by GraphPad software, and EC50 values were calculated. The EC50 for binding activity according to this FACS analysis is the concentration at which of an antibody induces a response halfway between the baseline and maximum and reflects the binding ability of the antibody.

Receptor Blocking Assay (RBA) by ELISA

ELISA plates were coated with 100 µl of 1 µg/ml of human PD-L1/Fc in PBS and incubated overnight at 4° C. Plates were washed four times in washing buffer (PBS containing 0.05% Tween 20) and blocked for 1 hour at 37° C. with 200 µl per well of blocking buffer (1% BSA in PBS containing 0.05% Tween 20). After blocking buffer was removed, 50 µl diluted antibody (1:5 serial dilutions from 200 nM) were added to the wells, mixed with 50 µl biotinylated human PD-1 protein (2 µg/ml final concentration) in blocking buffer, and then incubated at 37° C. for 1 hour. A human IgG was included as negative control. The signal was developed by adding streptavidin-HRP (Cat. No. S2468, Sigma) (100 µl/well at 1:5000 dilution) and incubating for 40 minutes at 37° C., followed by washing four times in washing buffer. Then, 100 µl of TMB solution were added per well. Following color development, the reaction was stopped with 1 N HCl, and absorbance at 450 nm was measured. The data were processed by GraphPad software, and IC50 values were calculated. IC50 is a quantitative measure that indicates how much of an anti-PD-L1 antibody is needed to inhibit the in vitro PD-1/PD-L1 interaction by 50% and reflects the blocking activity of the anti-PD-L1 antibody. The signal reduction induced by antibody samples was normalized to inhibition percentage, where the negative control was 0% inhibition, and the absolute value of signal reduction of each antibody divided by the signal of the negative control equals the percent inhibition by the antibody.

Binding Affinity by Biolayer Interferometry

Binding of antibodies to PD-L1 was also assessed using biolayer interferometry (BLI) using an Octet® RED96 sensor device (Pall ForteBio LLC). Antibodies were captured by anti-hIgG Fc capture (AHC) Biosensors (Pall) at a concentration of 100 nM for 30 seconds. Sensors were then dipped into running buffer (1×pH7.2 PBS, 0.05% Tween 20, 0.1% BSA) for 60 seconds to check the baseline. Binding was measured by dipping sensors into a series of diluted concentrations of recombinant human PD-L1/His fusion protein. Dissociation was followed by dipping sensors into running buffer for 1200 seconds. The association and dissociation curves were fitted to a 1:1 Langmuir binding model using ForteBio Data Analysis software (Pall). The equilibrium dissociation constant $K_D$ (molarity) of the reaction between antibodies and related target proteins was then calculated from the kinetic rate constants using the formula $K_D$=koff/kon.

The data from the above-described assays for each of the full-length chimeric IgG1 antibodies are summarized in the Tables 10 and 11 below. Each of the chimeric antibodies are designated with the designation of parental scFv mAb (Table 8) followed by the letter "c" for "chimeric." Table 10 provides the results of the SEC analysis, binding activity by ELISA, and Receptor Binding Activity by ELISA. Table 11 provides binding affinity data ($K_D$) for each chimeric antibody as determined using biolayer interferometry and additional binding activity (EC50) as determined using FACS.

TABLE 10

Purity and Binding Activity of Chimeric Antibodies

| Antibody Designation | Purity in SEC-HPLC (% monomer) | Binding Activity by ELISA | | Receptor Blocking Activity by ELISA | |
|---|---|---|---|---|---|
| | | Human PD-L1 EC50 (nM) | Cyno PD-L1 EC50 (nM) | human PD-L1 IC50 (nM) | Inhibition (percent) |
| EM0005-mAb86c | 93.4% | 0.14 | 0.10 | 1.09 | 97.4% |
| EM0005-mAb87c | 99.6% | 0.08 | 0.06 | 0.94 | 93.9% |
| EM0005-mAb90c | 94.8% | 0.15 | 0.12 | 1.05 | 94.4% |
| atezolizumab | | 0.07 | 0.09 | 0.6878 | 96.0% |

TABLE 11

Affinity and Binding Activity of Chimeric Antibodies

| Antibody Designation | Affinity for human PD-L1 by OctetRed KD (M) | Affinity for Cyno PD-L1 by OctetRed KD (M) | Binding Activity to Human PD-L1 by FACs EC50 (nM) |
|---|---|---|---|
| EM0005-mAb86c | $2.61 \times 10^{-10}$ | $3.73 \times 10^{-10}$ | 0.22 |
| EM0005-mAb87c | $9.81 \times 10^{-10}$ | $4.93 \times 10^{-10}$ | 0.42 |
| EM0005-mAb90c | $6.81 \times 10^{-10}$ | $8.37 \times 10^{-10}$ | 0.21 |
| atezolizumab | $9.56 \times 10^{-10}$ | $4.15 \times 10^{-9}$ | 0.17 |

Criteria for Selecting Preferred Anti-PD-L1 Antibodies

Useful criteria that should be considered in selecting an antibody for further development as a therapeutic antibody and/or use as a parental antibody for making a TGFβ/PD-L1 bispecific binding protein according to the invention include: (1) sub-nanomolar affinity for human PD-L1, (2) CDR amino acid sequences that are considered to be significantly or distinctly different from those of other anti-PD-L1 antibodies, (3) similar binding activity for human and cynomolgus PD-L1, (4) greater than 90% inhibition of PD-1/PD-L1 binding in a receptor blocking assay (RBA), (5) an acceptable purity of greater than 90% monomeric species (fully assembled antibody) after one-step affinity purification (e.g., one-step Protein A affinity chromatograph) as determined, for example, using size exclusion chromatography (SEC), (6) a low propensity to form aggregates, preferably less than 10% aggregates, for example, as detected using SEC after a one-step affinity purification, and (7) with respect to selecting between two humanized antibodies with similar properties, a lower number of back-mutations.

Criteria (1), (3), (4), (5), and (6) are readily determined by methods and assays such as those described herein. Regarding criterion (3), the ability to run assays with cynomolgus PD-L1 protein is important in the routine pre-clinical analysis and development of a candidate as a therapeutic anti-PD-L1 antibody or for use in making a therapeutic TGFB/PD-L1 bispecific binding protein according to the invention. With respect to criterion (6), an antibody with a propensity to form aggregates (especially greater than 10%, for example, as determined using size exclusion chromatography) is not preferred either for development as a therapeutic antibody or for use in preparing TGFβ/PD-L1 bispecific binding protein according to the invention. An antibody with a propensity to form aggregates will typically lead to undesired aggregate formation in a TGFβ/PD-L1 bispecific binding protein produced using the antibody. With respect to criterion (2) regarding CDR sequence diversity, the point is not only to avoid characterizing previously isolated or highly similar anti-PD-L1 antibodies, but also to carry forward structurally distinct antibodies that typically will be further modified and improved (for example, during humanization and/or affinity maturation) prior to use as a therapeutic antibody or as a parental antibody to make a TGFB/PD-L1 bispecific binding protein according to the invention.

Regarding criterion (7), a lower number of back-mutations means that a humanized antibody retains more human residues and is less likely to be recognized as a foreign protein in a human. As between two humanized antibodies that are similar with respect to the other criteria, the antibody with fewer back mutations is usually preferred, assuming the other criteria are approximately the same. Of particular importance is the propensity of a humanized antibody to form aggregates. As explained above, an antibody with a propensity to form aggregates is likely to cause aggregates in a TGFβ/PD-L1 bispecific binding protein that is made using the antibody. Since back-mutations are not typically the source of aggregate formation, a humanized antibody with a relatively low aggregate formation (especially less than 10%) would be preferred over a humanized antibody with a relatively higher aggregate formation and lower number of back mutations. Accordingly, a humanized antibody with a lower number of back mutations is usually preferred when a selection is being made between two humanized antibodies that have similar properties for criteria (1)-(6).

Applying the above criteria to the purity and binding data obtained for the chimeric antibodies in Tables 10 and 11, pairs of VH and VK (VLkappa) domains as derived from the original scFv mAb clones were selected for further humanization. Accordingly, the VH and VL domains from EM0005-mAb86, EM0005-mAb87, and EM0005-mAb90 were selected for humanization because the data in Tables 10 and 11 indicated that the corresponding full-length IgG1 chimeric antibodies exhibited greater than 90% purity after one-step purification; a relatively high binding activity and high cross reactivity to cyno PD-L1, as compared to the reference antibody (atezolizumab); relatively high receptor blocking activity; and higher PD-L1 binding affinity as determined by biolayer interferometry than the reference antibody (atezolizumab).

It is noted that compared to the other antibodies, the EM0005-mAb83c antibody exhibited an exceptionally low EC50 of approximately 0.0023 nM (2.3 picomolar) for binding to human PD-L1 and an exceptionally high EC50 (approximately 39.21 nM) for binding to cynomolgus in the ELISA binding activity assay (see, Table 10). The other PD-L1 binding data for EM0005-mAb83c in Tables 10 and 11 were more in line with those of the other antibodies. The basis for the exceptional ELISA binding activity of EM0005-mAb83c was not determined. As explained above, the ability to run assays with both human and cynomolgus PD-L1 proteins is important in the pre-clinical study and assessment of a candidate therapeutic anti-CD39 antibody or TGFβ/PD-L1 bispecific binding protein according to the invention. Accordingly, despite an exceptionally high binding activity for human PD-L1, the EM0005-mAb83c was not selected for further assessment in the studies below for development as a therapeutic humanized antibody or as a parental antibody used to generate a TGFβ/PD-L1 bispecific binding protein according to the invention.

Example 2. Humanization and Characterization of Anti-PD-L1 Monoclonal Antibodies Based on the results of the assays of the IgG1 chimeric antibodies shown in Tables 10 and 11 above, monoclonal antibodies EM0005-mAb86, EM0005-mAb87, and EM0005-mAb90 were selected for humanization.

Example 2.1. Humanization of EM0005-mAb86

The EM0005-mAb86 variable region genes were employed to create a humanized antibody. In the first step of this process, the amino acid sequences of the VH domain and of the VK (VL kappa) domain of EM0005-mAb86 were compared against the available database of human Ig V-gene sequences in order to find the overall best-matching human germline Ig V-gene sequences. Additionally, the framework 4 segment of VH or VK domains was compared against the J-region database to find the human framework having the highest homology to the murine VH and VK regions, respectively. For the light chain, the closest human V-gene match was the L5 gene; and for the heavy chain, the closest human match was the VH1-18 gene. Humanized variable domain sequences were then designed where the CDR-L1, CDR-L2, and CDR-L3 of the EM0005-mAb86 light chain were grafted onto framework sequences of the L5 gene with JK4 framework 4 sequence after CDR-L3; and the CDR-H1, CDR-H2, and CDR-H3 of the EM0005-mAb86 heavy chain were grafted onto framework sequences of the VH1-18 with JH6 framework 4 sequence after CDR-H3. A three-dimensional Fv model of EM0005-mAb86 was then generated to determine if there were any framework positions where mouse amino acids were critical to support loop structures or the VH/VK interface. These residues within the human framework sequences should be back-mutated to the corresponding mouse residues at the same position to retain affinity/activity. Several desirable back-mutations were indicated for EM0005-mAb86 VH and VK, and alternative VH and VK designs were constructed, as shown in Table 12, below. In Table 12, amino acid sequences for CDRs according to the Kabat numbering system are underlined, and murine back-mutated framework amino acid residues are indicated by double underlining. In addition, there is a "NG" (Asn-Gly) pattern in the CDR-H2 of EM0005-mAb86, which may result in heterogeneity during manufacturing because of deamination reactions. Therefore, a VH domain designated "EM0005-86VH-G55A", which contains an NG (Asn-Gly) to NA (Asn-Ala) mutation, was also designed and evaluated.

TABLE 12

Humanized VH/VK Designs for EM0005-mAb86 with Back Mutations*

| Humanized EM0005-mAb86 with VH or VK Identifier | Amino Acid Sequence<br>12345678901234567890123456789012345678901234567890 |
|---|---|
| EM0005-86VH.1a | EVQLVQSGAEVKKPGASVKVSCKASGYTFTTYGINWVRQA<br>PGQGLEWMGYIYIGNGYTEYNEKFKGRVTMTTDTSTSTAY<br>MELSSLRSDDTAVYYCARDLMVIAPKTMDYWGQGTTVTVS<br>S (SEQ ID NO: 49) |
| EM0005-86VH.1b | EVQLVQSGAEVKKPGASVKVSCKASGYTFTTYGINWVRQA<br>PGQGLEWMGYIYIGNGYTEYNEKFKGRVTMTSDTSTSTAY<br>MELSSLRSDDTAVYYCARDLMVIAPKTMDYWGQGTTVTVS<br>S (SEQ ID NO: 50) |
| EM0005-86VH.1c | EVQLVQSGAEVKKPGASVKVSCKASGYTFTTYGINWVRQA<br>PGQGLEWMGYIYIGNGYTEYNEKFKGRVTLTSDTSTSTAY<br>MELSSLRSDDTAVYYCARDLMVIAPKTMDYWGQGTTVTVS<br>S (SEQ ID NO: 51) |
| EM0005-86VH.1d | EVQLVQSGAEVKKPGASVKVSCKASGYTFTTYGINWVRQA<br>PGQGLEWIGYIYIGNGYTEYNEKFKGRVTLTSDTSTSTAY<br>MELSSLRSDDTAVYYCARDLMVIAPKTMDYWGQGTTVTVS<br>S (SEQ ID NO: 52) |
| EM0005-86VH.1e | EVQLVQSGAEVKKPGASVKVSCKASGYTFTTYGINWVRQA<br>PGQGLEWIGYIYIGNGYTEYNEKFKGKATLTSDTSTSTAY<br>MELSSLRSDDTAVYYCARDLMVIAPKTMDYWGQGTTVTVS<br>S (SEQ ID NO: 53) |
| EM0005-86VH.1f | EVQLVQSGAEVKKPGASVKVSCKTSGYTFTTYGINWVRQA<br>PGQGLEWIGYIYIGNGYTEYNEKFKGKATLTSDPSTRTAY<br>MELSSLRSDDTAVYYCARDLMVIAPKTMDYWGQGTTVTVS<br>S (SEQ ID NO: 54) |
| EM0005-86VH.1g | EVQLVQSGAEVKKPGASVKVSCKASGYTFTTYGINWVRQA<br>PGQGLEWIGYIYIGNGYTEYNEKFKGRVTLTSDPSTRTAY<br>MELSSLRSDDTAVYYCARDLMVIAPKTMDYWGQGTTVTVS<br>S (SEQ ID NO: 55) |

TABLE 12-continued

Humanized VH/VK Designs for EM0005-mAb86 with Back Mutations*

```
Humanized EM0005-mAb86    Amino Acid Sequence
with VH or VK Identifier  123456789012345678901234567890

EM0005-86VH-G55A          QVQLQQSGAELVRPGSSVKMSCKTSGYTFTTYGINWVKQR
                          PGQGLEWIGYIYIGNAYTEYNEKFKGKATLTSDPSSRTAY
                          MQLSSLTSEDSAIYFCARDLMVIAPKTMDYWGQGTSVTVS
                          S (SEQ ID NO: 56)

EM0005-86VK.1a            DIQMTQSPSSVSASVGDRVTITCKASQDVGTAVAWYQQKP
                          GKAPKLLIYWASTRHTGVPDRFTGSGSGTDFTLTISSLQP
                          EDFATYYCQQYSSYPYTFGGGTKVEIK (SEQ ID
                          NO: 57)

EM0005-86VK.1b            DIQMTQSPSSVSASVGDRVTITCKASQDVGTAVAWYQQKP
                          GKSPKLLIYWASTRHTGVPDRFTGSGSGTDFTLTISSLQP
                          EDFATYFCQQYSSYPYTFGGGTKVEIK
                          (SEQ ID NO: 58)
```

*CDR sequences indicated by underlining; framework back-mutations indicated by double underlining.

The humanized VH and VK (VL kappa) genes were produced synthetically and then respectively cloned into vectors containing the human IgG1 heavy chain constant domains and the human kappa light chain constant domain. The pairing of the humanized VH and the humanized VK chains created 14 humanized antibodies, designated "HuEM0005-86-1" to "HuEM0005-86-14," as shown in Table 13, below. Also listed in Table 13 is the EM0005-86c chimeric antibody with a G55A mutation in CDR-H2 designated "EM0005-86c-G55A." All antibodies were expressed and purified.

TABLE 13

Production List of Anti-PD-L1 Humanized EM0005-86 Antibodies

| Antibody Identifier | VH Region in Heavy Chain | VK Region in Light Chain |
|---|---|---|
| EM0005-86c-G55A | EM0005-86VH-G55A | EM0005-86 VK |
| HuEM0005-86-1 | EM0005-86VH.1a | EM0005-86 VK.1a |
| HuEM0005-86-2 | EM0005-86VH.1b | EM0005-86 VK.1a |
| HuEM0005-86-3 | EM0005-86VH.1c | EM0005-86 VK.1a |
| HuEM0005-86-4 | EM0005-86VH.1d | EM0005-86 VK.1a |
| HuEM0005-86-5 | EM0005-86VH.1e | EM0005-86 VK.1a |
| HuEM0005-86-6 | EM0005-86VH.1f | EM0005-86 VK.1a |
| HuEM0005-86-7 | EM0005-86VH.1g | EM0005-86 VK.1a |
| HuEM0005-86-8 | EM0005-86VH.1a | EM0005-86 VK.1b |
| HuEM0005-86-9 | EM0005-86VH.1b | EM0005-86 VK.1b |
| HuEM0005-86-10 | EM0005-86VH.1c | EM0005-86 VK.1b |
| HuEM0005-86-11 | EM0005-86VH.1d | EM0005-86 VK.1b |
| HuEM0005-86-12 | EM0005-86VH.1e | EM0005-86 VK.1b |
| HuEM0005-86-13 | EM0005-86VH.1f | EM0005-86 VK.1b |
| HuEM0005-86-14 | EM0005-86VH.1g | EM0005-86 VK.1b |

All 15 antibodies in Table 13 were assayed for and ranked by dissociation rate constant ($k_{off}$). The chimeric antibody EM0005-86c (without the G55A mutation) was a positive control for comparison with each of the 15 antibodies in Table 13. Briefly, antibodies were characterized for affinities and binding kinetics by Octet®RED96 biolayer interferometry (Pall ForteBio LLC). Antibodies were captured by Anti-hIgG Fc Capture (AHC) Biosensors (Pall) at a concentration of 100 nM for 30 seconds. Sensors were then dipped into running buffer (1×pH 7.2 PBS, 0.05% Tween 20, 0.1% BSA) for 60 seconds to check the baseline. Binding was measured by dipping sensors into a single concentration of recombinant human PD-L1/His fusion protein (Novoprotein). Dissociation was followed by dipping sensors into running buffer for 1200 seconds. The association and dissociation curves were fitted to a 1:1 Langmuir binding model using ForteBio Data Analysis software (Pall). Results are shown in Table 14, below. In each test group, the off-rates of antibodies were compared with that of the EM0005-86c chimeric antibody. The off-rate ratios were calculated by the off-rate of a humanized antibody to that of EM0005-86c of its test group. The off-rate ratio serves as a data normalization. Accordingly, in each test group, the off-rate ratios of the humanized antibodies can be compared with that of the chimeric antibody, and the off-rate ratios of each of the humanized antibodies can be compared to one another within all test groups. The lower the off-rate ratio was, the higher was the affinity of an antibody for human PD-L1.

TABLE 14

Off-Rates ($k_{off}$) of Humanized and Chimeric EM0005-mAb86 Antibodies

| Test Group | Antibody | Off-Rate ($k_{off}$) (1/sec) | Off-Rate Ratio to that of EM0005-86c |
|---|---|---|---|
| 1 | HuEM0005-86-1 | $1.47 \times 10^{-3}$ | 120% |
|   | HuEM0005-86-2 | $8.87 \times 10^{-4}$ | 72% |
|   | HuEM0005-86-3 | $1.42 \times 10^{-3}$ | 115% |
|   | HuEM0005-86-4 | $9.57 \times 10^{-4}$ | 78% |
|   | HuEM0005-86-6 | $1.22 \times 10^{-3}$ | 99% |
|   | EM0005-86c | $1.23 \times 10^{-3}$ | 100% |
| 2 | HuEM0005-86-7 | $1.31 \times 10^{-3}$ | 73% |
|   | HuEM0005-86-8 | $1.55 \times 10^{-3}$ | 87% |
|   | HuEM0005-86-9 | $1.60 \times 10^{-3}$ | 89% |
|   | HuEM0005-86-10 | $1.57 \times 10^{-3}$ | 88% |
|   | HuEM0005-86-11 | $1.31 \times 10^{-3}$ | 73% |
|   | HuEM0005-86-12 | $1.50 \times 10^{-3}$ | 84% |
|   | EM0005-86c | $1.79 \times 10^{-3}$ | 100% |
| 3 | HuEM0005-86-5 | $1.24 \times 10^{-3}$ | 120% |
|   | HuEM0005-86-13 | $1.19 \times 10^{-3}$ | 116% |
|   | HuEM0005-86-14 | $8.38 \times 10^{-4}$ | 81% |
|   | HuEM0005-86-G55A | $1.11 \times 10^{-3}$ | 108% |
|   | EM0005-86c | $1.03 \times 10^{-3}$ | 100% |

A preferred humanized anti-human PD-L1 antibody of the invention for use in making a TGFβ/PD-L1 bispecific binding protein according to the invention has an affinity for human PD-L1 of approximately that of the chimeric "parent" EM0005-86C chimeric (control) antibody, which had an off-rate ranging from $1.03 \times 10^{-3}$ s$^{-1}$ to $1.79 \times 10^{-3}$ s-1 (Table 14). Preferably, a humanized antibody used in making a TGFβ/PD-L1 bispecific binding protein according to the invention should also have a minimal number of murine back mutations in the VH and VL domains. As shown in Table 14 above, humanized antibodies HuEM0005-86-2, HuEM0005-86-4, and HuEM0005-86-6 had off-rate constants similar to or lower than that of the EM0005-86C chimeric control antibody in Test Group 1. HuEM0005-86-2 had a relatively low number of back mutations, i.e., two back mutations in the antibody's VH (EM0005-86VH.1b) domains and two back mutations in the antibody's VK (EM0005-86 VK.1a) domains. A lower number of back mutations means that a humanized antibody retains more human residues and is less likely to be recognized as a foreign protein in a human. As between two humanized antibodies that are highly similar in other properties, the antibody with fewer back mutations is preferred; however, the amount of aggregate formation by an antibody is more important. An antibody with a propensity to form aggregates, for example, as detected using size exclusion chromatography after a one-step purification by affinity chromatography, is also likely to cause aggregates in a TGFβ/PD-L1 bispecific binding protein that is made using the antibody. HuEM0005-86-6 had less aggregates than either HuEM0005-86-2 and HuEM0005-86-4 (data not shown). Comparing the various properties of the three antibodies, HuEM0005-86-2 and HuEM0005-86-6 were selected as candidates for use in preparing a PD-L1/TGFβ bispecific binding protein according to the invention with HuEMM0005-86-6 being most preferred.

The data in Table 14 above also indicates that the introduction of the G55A mutation into the CDR-H2 of the VH domain of the parental EM0005-86C chimeric antibody did not significantly alter the off-rate (affinity) of the antibody for PD-L1. Compare, for example, the off-rates of HuEM0005-86-G55A with that of the parental EM0005-86C chimeric antibody in Test Group 3 of Table 14 above. Accordingly, the G55A mutation was introduced into the CDR-H2 of the humanized antibody HuEM0005-86-6 selected for use in preparing a TGFβ/PD-L1 bispecific binding protein.

Example 2.2. Humanization of EM0005-mAb87

The EM0005-mAb87 variable region genes were employed to create a humanized antibody. In the first step of this process, the amino acid sequences of the VH and VK (VL kappa) domains of EM0005-mAb87 were compared against the available database of human Ig V-gene sequences in order to find the overall best-matching human germline Ig V-gene sequences. Additionally, the framework 4 segment of the VH or VK domains was compared against the J-region database to find the human framework having the highest homology to the murine VH and VK regions, respectively. For the light chain, the closest human V-gene match was the L2 and B3 gene; and for the heavy chain, the closest human match was the VH1-46 gene. Humanized variable domain sequences were then designed where the CDR-L1, CDR-L2, and CDR-L3 of the VK domain of the EM0005-mAb87 light chain were grafted onto framework sequences of the L2 and B3 gene with JK2 framework 4 sequence after CDR-L3, respectively; and the CDR-H1, CDR-H2, and CDR-H3 of the VH domain of the EM0005-mAb87 heavy chain were grafted onto framework sequences of the VH1-18 with JH6 framework 4 sequence after CDR-H3. A three-dimensional Fv model of EM0005-mAb87 was then generated to determine if there were any framework positions where mouse amino acids were critical to support loop structures or the VH/VL interface. These residues within the human framework sequences should be back-mutated to mouse residues at the same position to retain affinity/activity. Several desirable murine back-mutations were indicated for EM0005-mAb87 VH and VK, and alternative VH and VK designs were constructed, as shown in Table 15, below. In Table 15, below, CDR sequences according to Kabat numbering system are indicated by underlining, and murine back-mutated framework amino acid residues are indicated by double underlining

TABLE 15

| Humanization VH/VK Design for EM0005-mAb87 with Back Mutations* | |
|---|---|
| Humanized EM0005-mAb87 with VH or VK Identifier | Amino Acid Sequence 12345678901234567890123456789012345678 90 |
| EM0005-mAb87VH.1a | EVQLVQSGAEVKKPGASVKVSCKASGYTFTDYYINWVRQA PGQGLEWMGETIPNTGGTTYNQKFKARVTMTVDTSTSTVY MELSSLRSEDTAVYYCARYQSGSPFAYWGQGTTVTVSS (SEQ ID NO: 59) |
| EM0005-mAb87VH.1b | EVQLVQSGAEVKKPGASVKVSCKASGYTFTDYYINWVRQA PGQGLEWMGETIPNTGGTTYNQKFKARVTLTVDTSTSTVY MELSSLRSEDTAVYYCARYQSGSPFAYWGQGTTVTVSS (SEQ ID NO: 60) |
| EM0005-mAb87VH.1c | EVQLVQSGAEVKKPGASVKVSCKASGYTFTDYYINWVRQA PGQGLEWIGETIPNTGGTTYNQKFKARVTLTVDKSTSTVY MELSSLRSEDTAVYYCARYQSGSPFAYWGQGTTVTVSS (SEQ ID NO: 61) |
| EM0005-mAb87VH.1d | EVQLVQSGAEVKKPGASVKVSCKASGYSFTDYYINWVRQA PGQGLEWIGETIPNTGGTTYNQKFKAKATLTVDKSTSTAY MELSSLRSEDTAVYYCARYQSGSPFAYWGQGTTVTVSS (SEQ ID NO: 62) |
| EM0005-mAb87VH.1e | EVQLVQSGAEVKKPGASVKVSCKASGYSFTDYYINWVKQA PGQGLEWIGETIPNTGGTTYNQKFKAKATLTRDKSTSTAY MELKSLRSEDTAVYYCARYQSGSPFAYWGQGTTVTVSS (SEQ ID NO: 63) |

TABLE 15-continued

Humanization VH/VK Design for EM0005-mAb87 with Back Mutations*

| Humanized EM0005-mAb87 with VH or VK Identifier | Amino Acid Sequence<br>12345678901234567890123456789012345678 90 |
|---|---|
| EM0005-mAb87VK.1a | DIVMTQSPDSLAVSLGERATINCKASQNVGTAVAWYQQKP<br>GQPPKLLIYSASNRYTGVPDRFTGSGSGTDFTLTISSLQA<br>EDVAVYYCQQHYSTPYTFGGGTKLEIK (SEQ ID NO: 64) |
| EM0005-mAb87VK.2 | EIVMTQSPATLSVSPGERATLSCKASQNVGTAVAWYQQKP<br>GQAPRLLIYSASNRYTGIPARFSGSGSGTEFTLTISSLQS<br>EDFAVYYCQQHYSTPYTFGGGTKLEIK (SEQ ID NO: 65) |
| EM0005-mAb87VK.2a | EIVMTQSPATLSVSPGERATLSCKASQNVGTAVAWYQQKP<br>GQAPRLLIYSASNRYTGVPARFSGSGSGTEFTLTISSLQS<br>EDFAVYYCQQHYSTPYTFGGGTKLEIK (SEQ ID NO: 66) |
| EM0005-mAb87VK.2b | EIVMTQSPATLSVSPGERATLSCKASQNVGTAVAWYQQKP<br>GQAPRLLIYSASNRYTGVPDRFTGSGSGTEFTLTISSLQS<br>EDFAVYYCQQHYSTPYTFGGGTKLEIK (SEQ ID NO: 67) |
| EM0005-mAb87VK.2c | DIVMTQSPATLSVSPGERATLSCKASQNVGTAVAWYQQKP<br>GQAPRLLIYSASNRYTGVPDRFTGSGSGTDFTLTISSLQS<br>EDFAVYYCQQHYSTPYTFGGGTKLEIK (SEQ ID NO: 68) |

*CDR sequences indicated by underlining; framework back-mutations indicated by double underlining.

The humanized VH and VK (i.e., VL kappa) genes were produced synthetically and then respectively cloned into vectors containing the human IgG1 heavy chain constant domains and the human kappa light chain constant domain. The pairing of the humanized VH and the humanized VK chains created 24 humanized antibodies, designated "HuEM0005-87-1" to "HuEM0005-87-24," as shown in Table 16, below. Chimeric antibody EM0005-87c was a positive control for affinity comparisons. All antibodies were expressed and purified.

TABLE 16

Production List of Anti-PD-L1 Humanized EM0005-87 Antibodies

| Antibody Identifier | VH Region in Heavy Chain | VK Region in Light Chain |
|---|---|---|
| HuEM0005-87-1 | EM0005-87VH.1a | EM0005-87 VK.1a |
| HuEM0005-87-2 | EM0005-87VH.1b | EM0005-87 VK.1a |
| HuEM0005-87-3 | EM0005-87VH.1c | EM0005-87 VK.1a |
| HuEM0005-87-4 | EM0005-87VH.1d | EM0005-87 VK.1a |
| HuEM0005-87-5 | EM0005-87VH.1e | EM0005-87 VK.1a |
| HuEM0005-87-6 | EM0005-87VH.1a | EM0005-87 VK.2 |
| HuEM0005-87-7 | EM0005-87VH.1b | EM0005-87 VK.2 |
| HuEM0005-87-8 | EM0005-87VH.1c | EM0005-87 VK.2 |
| HuEM0005-87-9 | EM0005-87VH.1d | EM0005-87 VK.2 |
| HuEM0005-87-10 | EM0005-87VH.1e | EM0005-87 VK.2 |
| HuEM0005-87-11 | EM0005-87VH.1a | EM0005-87 VK.2a |
| HuEM0005-87-12 | EM0005-87VH.1b | EM0005-87 VK.2a |
| HuEM0005-87-13 | EM0005-87VH.1c | EM0005-87 VK.2a |
| HuEM0005-87-14 | EM0005-87VH.1d | EM0005-87 VK.2a |
| HuEM0005-87-15 | EM0005-87VH.1e | EM0005-87 VK.2a |
| HuEM0005-87-16 | EM0005-87VH.1a | EM0005-87 VK.2b |
| HuEM0005-87-17 | EM0005-87VH.1b | EM0005-87 VK.2b |
| HuEM0005-87-18 | EM0005-87VH.1c | EM0005-87 VK.2b |
| HuEM0005-87-19 | EM0005-87VH.1d | EM0005-87 VK.2b |
| HuEM0005-87-20 | EM0005-87VH.1e | EM0005-87 VK.2b |
| HuEM0005-87-21 | EM0005-87VH.1a | EM0005-87 VK.2c |
| HuEM0005-87-22 | EM0005-87VH.1b | EM0005-87 VK.2c |
| HuEM0005-87-23 | EM0005-87VH.1c | EM0005-87 VK.2c |
| HuEM0005-87-24 | EM0005-87VH.1d | EM0005-87 VK.2c |

All 24 designed antibodies (Table 16) and the EM0005-87c chimeric antibody were assayed for and ranked by dissociation rate constant ($k_{off}$, "off-rate"). Briefly, antibodies were characterized for affinities and binding kinetics by Octet®RED96 biolayer interferometry (Pall ForteBio LLC). Antibodies were captured by Anti-hIgG Fc Capture (AHC) Biosensors (Pall) at a concentration of 100 nM for 30 seconds. Sensors were then dipped into running buffer (1×pH 7.2 PBS, 0.05% Tween 20, 0.1% BSA) for 60 seconds to check baseline. Binding was measured by dipping sensors into a single concentration of recombinant human PD-L1/His fusion protein (Novoprotein). Dissociation was followed by dipping sensors into running buffer for 1200 seconds. The association and dissociation curves were fitted to a 1:1 Langmuir binding model using ForteBio Data Analysis software (Pall). Results are shown in Table 17, below. In each test group, the off-rates of antibodies were compared with that of the EM0005-87c chimeric antibody. The off-rate ratios were calculated by the off-rate of a humanized antibody to that of EM0005-87c of its test group. The off-rate ratio serves as a data normalization. Accordingly, in each test group, the off-rate ratios of the humanized antibodies can be compared with that of the chimeric antibody, and the off-rate ratios of each of the humanized antibodies can be compared to one another within all test groups. The lower the off-rate ratio was, the higher was the affinity of an antibody for human PD-L1.

TABLE 17

Off-Rates ($k_{off}$) of Humanized and Chimeric EM0005-mAb87 Antibodies

| Test Group | Antibody | Off-Rate ($k_{off}$) (1/s) | Off-Rate Ratio to that of EM0005-87c |
|---|---|---|---|
| 1 | HuEM0005-87-1 | $9.37 \times 10^{-4}$ | 64% |
|   | HuEM0005-87-2 | $7.97 \times 10^{-4}$ | 54% |
|   | HuEM0005-87-3 | $9.26 \times 10^{-4}$ | 63% |

TABLE 17-continued

Off-Rates ($k_{off}$) of Humanized and Chimeric EM0005-mAb87 Antibodies

| Test Group | Antibody | Off-Rate ($k_{off}$) (1/s) | Off-Rate Ratio to that of EM0005-87c |
|---|---|---|---|
|  | HuEM0005-87-4 | $7.68 \times 10^{-4}$ | 52% |
|  | HuEM0005-87-5 | $9.47 \times 10^{-4}$ | 64% |
|  | HuEM0005-87-6 | $9.98 \times 10^{-4}$ | 68% |
|  | EM0005-87c | $1.47 \times 10^{-3}$ | 100% |
| 2 | HuEM0005-87-7 | $7.09 \times 10^{-4}$ | 68% |
|  | HuEM0005-87-8 | $8.44 \times 10^{-4}$ | 81% |
|  | HuEM0005-87-9 | $8.78 \times 10^{-4}$ | 84% |
|  | HuEM0005-87-10 | $9.94 \times 10^{-4}$ | 96% |
|  | HuEM0005-87-11 | $7.69 \times 10^{-4}$ | 74% |
|  | HuEM0005-87-12 | $7.98 \times 10^{-4}$ | 77% |
|  | EM0005-87c | $1.04 \times 10^{-3}$ | 100% |
| 3 | HuEM0005-87-13 | $1.00 \times 10^{-3}$ | 74% |
|  | HuEM0005-87-14 | $1.08 \times 10^{-3}$ | 80% |
|  | HuEM0005-87-15 | $1.29 \times 10^{-3}$ | 96% |
|  | HuEM0005-87-16 | $9.32 \times 10^{-4}$ | 69% |
|  | HuEM0005-87-17 | $8.88 \times 10^{-4}$ | 66% |
|  | HuEM0005-87-18 | $1.01 \times 10^{-3}$ | 75% |
|  | EM0005-87c | $1.35 \times 10^{-3}$ | 100% |
| 4 | HuEM0005-87-19 | $7.82 \times 10^{-4}$ | 87% |
|  | HuEM0005-87-20 | $8.01 \times 10^{-4}$ | 89% |
|  | HuEM0005-87-21 | $5.22 \times 10^{-4}$ | 58% |
|  | HuEM0005-87-22 | $7.38 \times 10^{-4}$ | 82% |
|  | HuEM0005-87-23 | $9.05 \times 10^{-4}$ | 101% |
|  | HuEM0005-87-24 | $1.01 \times 10^{-3}$ | 113% |
|  | EM0005-87c | $8.97 \times 10^{-4}$ | 100% |

The HuEM0005-87-1 humanized antibody had an off-rate constant lower than that of the EM0005-87c chimeric control antibody in Test Group 1 of Table 17 above. HuEM0005-87-1 also had a low number of back mutations, i.e., only one back mutation in the VH (EM0005-87VH.1a) domains and only one back mutation in the VK (EM0005-87VK.1a) domains. Based on these criteria, the HuEM0005-87-1 humanized antibody was selected for use in preparing a PD-L1/TGFβ bispecific binding protein according to the invention.

Example 2.3. Humanization of EM0005-mAb90

The EM0005-mAb90 variable region genes were employed to create a humanized antibody. In the first step of this process, the amino acid sequences of the VH and VK (VL kappa) of EM0005-mAb90 were compared against the available database of human Ig V-gene sequences in order to find the overall best matching human germline Ig V-gene sequences. Additionally, the framework 4 segment of VH or VK was compared against the J-region database to find the human framework having the highest homology to the murine VH and VK regions, respectively. For the light chain, the closest human V-gene match was the L8 gene; and for the heavy chain, the closest human match was the VH1-8 gene. Humanized variable domain sequences were then designed where the CDR-L1, CDR-L2, and CDR-L3 of the EM0005-mAb90 light chain were grafted onto framework sequences of the L8 gene with JK2 framework 4 sequence after CDR-L3; and the CDR-H1, CDR-H2, and CDR-H3 of the EM0005-mAb90 heavy chain were grafted onto framework sequences of the VH1-8 with JH6 framework 4 sequence after CDR-H3. A three-dimensional Fv model of EM0005-mAb90 was then generated to determine if there were any framework positions where mouse amino acids were critical to support loop structures or the VH/VK interface. These residues in the human framework sequences should be back-mutated to mouse residues at the same position to retain affinity/activity. Several desirable murine back-mutations were indicated for EM0005-mAb90 VH and VK, and alternative VH and VK designs were constructed, as shown in Table 18, below. In Table 18, CDR sequences according to the Kabat numbering system are indicated by (single) underlining, and murine back-mutated framework amino acid residues are indicated with double underlining. In addition, there was a NG (Asn-Gly) pattern in CDR-H2 of the VH domains of EM0005-mAb90 that may result in heterogeneity during manufacturing because of deamination reactions. Therefore, EM0005-90VH-G55A with an NG (Asn-Gly) to NA (Asn-Ala) mutation was also designed and evaluated. The sequence of the EM0005-mAb90VH(G55A) domain is the first sequence in Table 18 and the mutated residue "A" within CDR-H2 is indicated by double underlining

TABLE 18

Humanization VH/VL Design for EM0005-mAb90 with Back Mutations

| Humanized EM0005-mAb90 with VH or VK Identifier | Amino acid sequences 12345678901234567890123456789012345678 90 |
|---|---|
| EM0005-mAb90VH(G55A) | QVQLKQSGAELVRPGSSVKMSCKTSGYTFTSHSINWVKQR PGQGLEWIGYMYIGNAYTEYNEKFKGKATLTSDTSSTTAY MQLSSLTSEDSAIYFCAKITPVVAPYVMDYWGQGTSVTVS S (SEQ ID NO: 69) |
| EM0005-mAb90VH.1a | EVQLVQSGAEVKKPGASVKVSCKASGYTFTSHSINWVRQA TGQGLEWMGYMYIGNGYTEYNEKFKGRVTLTSNTSISTAY MELSSLRSEDTAVYYCAKITPVVAPYVMDYWGQGTSVTVS S (SEQ ID NO: 70) |
| EM0005-mAb90VH.1b | EVQLVQSGAEVKKPGASVKVSCKASGYTFTSHSINWVRQA TGQGLEWIGYMYIGNGYTEYNEKFKGRATLTSNTSISTAY MELSSLRSEDTAVYYCAKITPVVAPYVMDYWGQGTSVTVS S (SEQ ID NO: 71) |
| EM0005-mAb90VH.1c | EVQLVQSGAEVKKPGASVKVSCKTSGYTFTSHSINWVRQA TGQGLEWMGYMYIGNGYTEYNEKFKGRVTMTSNTSISTAY MELSSLRSEDTAVYYCAKITPVVAPYVMDYWGQGTSVTVS S (SEQ ID NO: 72) |

TABLE 18-continued

Humanization VH/VL Design for EM0005-mAb90 with Back Mutations

| Humanized EM0005-mAb90 with VH or VK Identifier | Amino acid sequences<br>123456789012345678901234567890123456789 |
|---|---|
| EM0005-mAb90VH.1d | EVQLVQSGAEVKKPGASVKVSCK<u>T</u>SGYTFT<u>SHS</u>INWVRQA<br>TGQGLEW<u>I</u>GYMYIGNGYTEYNEKFKGR<u>AT</u>L<u>TS</u>NTSISTAY<br>MELSSLRSEDTAVYYCA<u>KIT</u>PVVAPYVMDYWGQGTSVTVS<br>S (SEQ ID NO: 73) |
| EM0005-mAb90VK.1 | DIQLTQSPSFLSASVGDRVTITC<u>KASQDVGTAVAW</u>YQQKP<br>GKAPKLLIY<u>WASTRHT</u>GVPSRFSGSGSGTEFTLTISSLQP<br>EDFATYYC<u>QQYSSYPYT</u>FGQGTKLEIK (SEQ ID NO: 74) |
| EM0005-mAb90VK.1a | DI<u>QM</u>TQSPSFLSASVGDRVTITC<u>KASQDVGTAVAW</u>YQQKP<br>GKAPKLLIY<u>WASTRHT</u>GVPSRFSGSGSGTEFTLTISSLQP<br>EDFATYYC<u>QQYSSYPYT</u>FGQGTKLEIK (SEQ ID NO: 75) |
| EM0005-mAb90VK.1b | DI<u>VM</u>TQSPSFLSASVGDRVTITC<u>KASQDVGTAVAW</u>YQQKP<br>GK<u>A</u>PKLLIY<u>WASTRHT</u>GVPSRFSGSGSGT<u>DF</u>TLTISSLQP<br>EDFATYYC<u>QQYSSYPYT</u>FGQGTKLEIK (SEQ ID NO: 76) |
| EM0005-mAb90VK.1c | DI<u>QM</u>TQSPSFLSASVGDRVTITC<u>KASQDVGTAVAW</u>YQQKP<br>GK<u>A</u>PKLLIY<u>WASTRHT</u>GVP<u>DRFT</u>GSGSGTEFTLTISSLQP<br>EDFATYYC<u>QQYSSYPYT</u>FGQGT<u>K</u>LEIK (SEQ ID NO: 77) |
| EM0005-mAb90VK.1d | DI<u>VM</u>TQSPSFLSASVGDRVTITC<u>KASQDVGTAVAW</u>YQQKP<br>GK<u>A</u>PKLLIY<u>WASTRHT</u>GVP<u>DRFT</u>GSGSGT<u>DF</u>TLTISSLQP<br>EDFATYYC<u>QQYSSYPYT</u>FGQGTKLEIK (SEQ ID NO: 78) |

*CDR sequences indicated by underlining; framework back-mutations indicated by double underlining; G55A mutation within a CDR-H2 sequence indicated by double underlining.

The humanized VH and VK (i.e., VL kappa) genes were produced synthetically and then respectively cloned into vectors containing the human IgG1 heavy chain constant domains and the human kappa light chain constant domain. The pairing of the humanized VH and the humanized VK chains created 20 humanized antibodies, designated "HuEM0005-90-1" to "HuEM0005-90-20" shown in Table 19 below. In addition, "EM0005-90c (G55A)," which contains the original VK of the mouse EM0005-mAb90 and a VH domain that contains a G55A mutation in the sequence of CDR-H2, was also generated and is listed at the bottom of Table 19. All antibodies were expressed and purified.

TABLE 19

Production List of Anti-PD-L1 Humanized EM0005-90 Antibodies

| Antibody Identifier | VH Region in Heavy Chain | VK Region in Light k Chain |
|---|---|---|
| HuEM0005-90-1 | EM0005-90VH.1a | EM0005-90 VK.1 |
| HuEM0005-90-2 | EM0005-90VH.1b | EM0005-90 VK.1 |
| HuEM0005-90-3 | EM0005-90VH.1c | EM0005-90 VK.1 |
| HuEM0005-90-4 | EM0005-90VH.1d | EM0005-90 VK.1 |
| HuEM0005-90-5 | EM0005-90VH.1a | EM0005-90 VK.1a |
| HuEM0005-90-6 | EM0005-90VH.1b | EM0005-90 VK.1a |
| HuEM0005-90-7 | EM0005-90VH.1c | EM0005-90 VK.1a |
| HuEM0005-90-8 | EM0005-90VH.1d | EM0005-90 VK.1a |
| HuEM0005-90-9 | EM0005-90VH.1a | EM0005-90 VK.1b |
| HuEM0005-90-10 | EM0005-90VH.1b | EM0005-90 VK.1b |
| HuEM0005-90-11 | EM0005-90VH.1c | EM0005-90 VK.1b |
| HuEM0005-90-12 | EM0005-90VH.1d | EM0005-90 VK.1b |
| HuEM0005-90-13 | EM0005-90VH.1a | EM0005-90 VK.1c |
| HuEM0005-90-14 | EM0005-90VH.1b | EM0005-90 VK.1c |
| HuEM0005-90-15 | EM0005-90VH.1c | EM0005-90 VK.1c |
| HuEM0005-90-16 | EM0005-90VH.1d | EM0005-90 VK.1c |
| HuEM0005-90-17 | EM0005-90VH.1a | EM0005-90 VK.1d |
| HuEM0005-90-18 | EM0005-90VH.1b | EM0005-90 VK.1d |
| HuEM0005-90-19 | EM0005-90VH.1c | EM0005-90 VK.1d |
| HuEM0005-90-20 | EM0005-90VH.1d | EM0005-90 VK.1d |
| EM0005-90c(G55A) | EM0005-mAb90VH(G55A) | EM0005-mAb90 VK |

All 21 designed antibodies in Table 19 above and the EM0005-90c chimeric antibody were ranked by dissociation rate constant ($k_{off}$). The chimeric antibody EM0005-90c was a positive control for affinity comparisons. Briefly, antibodies were characterized for affinities and binding kinetics by Octet®RED96 biolayer interferometry (Pall ForteBio LLC). Antibodies were captured by Anti-hIgG Fc Capture (AHC) Biosensors (Pall) at a concentration of 100 nM for 30 seconds. Sensors were then dipped into running buffer (1×pH 7.2 PBS, 0.05% Tween 20, 0.1% BSA) for 60 seconds to check baseline. Binding was measured by dipping sensors into a single concentration of recombinant human PD-L1/His fusion protein (Novoprotein). Dissociation was followed by dipping sensors into running buffer for 1200 seconds. The association and dissociation curves were fitted to a 1:1 Langmuir binding model using ForteBio Data Analysis software (Pall). Results are shown in Table 20-1 below. In each test group, the off-rates of antibodies were compared with that of the EM0005-90c chimeric antibody. The off-rate ratios were calculated by the off-rate of a humanized antibody to that of EM0005-90c of its test group. The off-rate ratio serves as a data normalization. Accordingly, in each test group, the off-rate ratios of the humanized antibodies can be compared with that of the chimeric antibody, and the off-rate ratios of each of the humanized antibodies can be compared to one another within all test groups. The lower the off-rate ratio was, the higher was the affinity of an antibody for human PD-L1.

TABLE 20-1

Off-Rates ($k_{off}$) of Humanized and Chimeric EM0005-mAb90 Antibodies

| Test group | Antibody | Off-Rate ($k_{off}$) (1/s) | Off-Rate Ratio to that of EM0005-90c |
|---|---|---|---|
| 1 | HuEM0005-90-1 | $2.59 \times 10^{-4}$ | 102% |
|  | HuEM0005-90-2 | $2.27 \times 10^{-4}$ | 90% |
|  | HuEM0005-90-3 | $3.04 \times 10^{-4}$ | 120% |
|  | HuEM0005-90-4 | $2.46 \times 10^{-4}$ | 97% |
|  | HuEM0005-90-5 | $2.70 \times 10^{-4}$ | 107% |
|  | HuEM0005-90-6 | $2.54 \times 10^{-4}$ | 100% |
|  | EM0005-90c | $2.53 \times 10^{-4}$ | 100% |
| 2 | HuEM0005-90-7 | $4.60 \times 10^{-4}$ | 135% |
|  | HuEM0005-90-8 | $3.49 \times 10^{-4}$ | 102% |
|  | HuEM0005-90-9 | $3.73 \times 10^{-4}$ | 109% |
|  | HuEM0005-90-10 | $3.10 \times 10^{-4}$ | 91% |
|  | HuEM0005-90-11 | $4.14 \times 10^{-4}$ | 121% |
|  | HuEM0005-90-12 | $3.42 \times 10^{-4}$ | 100% |
|  | EM0005-90c | $3.42 \times 10^{-4}$ | 100% |
| 3 | HuEM0005-90-13 | $4.39 \times 10^{-4}$ | 115% |
|  | HuEM0005-90-14 | $3.76 \times 10^{-4}$ | 98% |
|  | HuEM0005-90-15 | $4.99 \times 10^{-4}$ | 131% |
|  | HuEM0005-90-16 | $3.87 \times 10^{-4}$ | 101% |
|  | HuEM0005-90-17 | $4.05 \times 10^{-4}$ | 106% |
|  | HuEM0005-90-18 | $3.34 \times 10^{-4}$ | 87% |
|  | EM0005-90c | $3.82 \times 10^{-4}$ | 100% |
| 4 | HuEM0005-90-19 | $3.28 \times 10^{-3}$ | 146% |
|  | HuEM0005-90-20 | $2.49 \times 10^{-3}$ | 111% |
|  | HuEM0005-90C-G55A | $2.55 \times 10^{-3}$ | 113% |
|  | EM0005-90c | $2.25 \times 10^{-3}$ | 100% |

As shown in Table 20-1 above, the HuEM0005-90-1 humanized antibody in Test Group 1 had an off-rate constant similar to that of the chimeric EM0005-90c control antibody. In addition, HuEM0005-90-1 also had a low number of back mutations, i.e., three back mutations in the VH (EM0005-90VH.1a) domains and no back-mutation in the VK (EM0005-90VK.1) domains. Based on these criteria, the HuEM0005-90-1 humanized antibody was selected for use in producing a TGFβ/PD-L1 bispecific binding protein according to the invention.

Example 2.4. In Vivo Anti-Tumor Efficacy of Anti-PD-L1 Antibodies in MC38-hPDL1 Syngeneic Model in huPD-L1 KI Mice Ability of anti-PD-L1 antibodies to inhibit tumor growth was evaluated in a MC38-hPDL1 syngeneic model in huPD-L1 KI mice. Female huPD-L1 KI mice aged 8-9 weeks (Shanghai Model Organisms Center, Inc.) were subcutaneously implanted with 500,000 MC38-hPDL1 cells suspended in 0.1 mL DPBS per animal in the right flank. A week later (Day 0), tumor bearing mice with tumor size in the range of 40-100 mm³ were selected and randomized into groups of 7-8 mice each and intraperitoneally administered with vehicle, 10 mg/kg of Atezolizumab analogue, 10 mg/kg of HuEM0005-86-41, 10 mg/kg of HuEM0005-87-1, and 10 mg/kg of HuEM0005-90-1, respectively, once every three days for 6 consecutive times. Animals were sacrificed 7 days after the last dose (Day 22). Body weights and tumor volumes were measured 2-3 times per week, and tumor volumes were determined at different time points using the formula: tumor volume (mm³)=length×width×0.5. For all test groups, Percent Tumor Growth Inhibition (TGI) compared to Vehicle control is defined as (1−(mean net increased volume of treated tumors)/(mean net increased volume of control tumors))×100% on Day 22.

All the treatments were well tolerated (data not shown). The inhibition of tumor growth by the various treatments is shown below in Table 20-2. HuEM0005-86-41, HuEM0005-87-1, and HuEM0005-90-1 treatment demonstrated potent anti-tumor efficacy, achieving a TGI ratio of 78.86%, 80.66%, and 92.17% respectively. Compared with Vehicle control, all treatment groups showed significant differences inhibition of tumor growth, HuEM0005-90-1 (P<0.0005), HuEM0005-86-41 (P<0.005), HuEM0005-87-1 (P<0.005), and Atezolizumab analogue (P<0.005) on Day 22. Moreover, HuEM0005-90-1 treatment resulted in 3 out of 8 (37.5%) tumor-free mice by Day 22, an outcome slightly better than that of the Atezolizumab analogue treatment which achieved a TGI ratio of 84.60% and 1 out of 8 (12.5%) tumor-free mice by Day 22.

TABLE 20-2

Inhibition of tumor growth in MC38-hPDL1 syngeneic model in huPD-L1 KI mice by anti-PD-L1 antibodies

| Treatment Group | N | Tumor volume(mm³)[a] Day 0 | Tumor volume(mm³)[a] Day 22 | % TGI on Day 22 | P value [b] |
|---|---|---|---|---|---|
| Vehicle control, IP, Q3D × 6 | 8 | 66.71 ± 7.83 | 1574.57 ± 404.44 |  |  |
| Atezolizumab, 10 mg/kg, IP, Q3D × 6 | 8 | 69.68 ± 7.27 | 301.86 ± 84.48 | 84.60 | 0.0014 |
| HuEM0005-86-41, 10 mg/kg, IP, Q3D × 6 | 8 | 66.71 ± 7.83 | 385.44 ± 96.92 | 78.86 | 0.0030 |
| HuEM0005-87-1, 10 mg/kg, IP, Q3D × 6 | 7 | 67.45 ± 8.74 | 359.09 ± 179.58 | 80.66 | 0.0034 |
| HuEM0005-90-1, 10 mg/kg, IP, Q3D × 6 | 8 | 67.67 ± 7.81 | 185.76 ± 112.95 | 92.17 | 0.0004 |

[a] Data are expressed as "Mean ± SEM";
[b] One-way ANOVA followed by Tukey's multiple comparison post-test VS Vehicle control group on tumor volume measured Day 22.

Example 3. Structural Features and Expression of TGFβ/PD-L1 Bispecific Binding Proteins Example 3.1. Sequence and Structural Features of Component Polypeptide Chains The CDR-H2 sequences of the HuEM0005-86-2, HuEM0005-86-6, and HuEM0005-90-1 humanized antibodies comprise an "NG" sequence, which is a deamination site that can result in heterogeneity during production of an antibody or protein comprising the CDR-H2 sequences. Accordingly, when these antibodies were used to produce TGFβ/PD-L1 bispecific binding proteins, a G55A mutation was made in the CDR-H2 sequences of the VH domains of the respective TGFβ/PD-L1 bispecific binding proteins to eliminate the NG deamination sites. The CDR-H2 sequences of the VH domains of HuEM0005-87-1 did not contain an "NG" (Asn-Gly) sequence, and therefore the original CDR-H2 sequences of the HuEM0005-87-1 were used to make a TGFβ/PD-L1 bispecific binding protein.

A schematic diagram of a TGFβ/PD-L1 bispecific binding protein according to the invention is shown in FIG. 1. A TGFβ/PD-L1 bispecific binding protein according to the invention is a fusion protein comprising a first polypeptide chain, a second polypeptide chain, and a third polypeptide, wherein two of the first polypeptide chain, two of the second polypeptide chain, and two of the third polypeptide chain associate to form the TGFβ/PD-L1 bispecific binding protein comprising two antibody binding domains for PD-L1 and two TGFβ ligand-binding domains of a human TGFβ receptor 2 protein.

The first polypeptide chain of a TGFβ/PD-L1 bispecific binding protein comprises, from amino terminus to carboxy terminus, the structural formula: TGFβR2(ECD)-CL-VH$_{PD-L1}$-CH1-Fc, wherein "TGFBR2(ECD)" is an extracellular domain of a human TGFβ receptor 2 protein that comprises a TGFβ-binding domain of the receptor, CL is an antibody light chain constant domain, VH$_{PD-L1}$ is a VH domain of an anti-PD-L1 monoclonal antibody, CH1 is a first constant domain of an antibody heavy chain, and Fc is a heavy chain constant region of a human IgG antibody consisting of hinge-CH2-CH3 domains. All of the domains are fused directly to one another in the order of the structural formula for the first polypeptide chain without the insertion of any artificial linker.

The second polypeptide chain (first light chain) of a TGFβ/PD-L1 bispecific binding protein comprises, from amino terminus to carboxy terminus, the structural formula: TGFβR2(ECD)-CH1, wherein "TGFβR2(ECD)" is an extracellular domain of a human TGFβ Receptor 2 protein that comprises a TGFβ-binding domain and CH1 is first constant domain of an antibody heavy chain. The amino terminal TGFβR2(ECD) domain and the carboxy terminal CH1 domain are fused directly to one another without the insertion of any artificial linker. Note further that, by design, the structural formula TGFβR2(ECD)-CH1 of this second polypeptide chain directs the polypeptide chain to preferentially pair with the N-terminal "TGFβR2(ECD)-CL" portion of the TGFβR2(ECD)-CL-VHp0-L1-CH1-Fc structure of the first polypeptide chain to provide two N-terminal TGFβR2(ECD) domains providing two, functional, N-terminal, TGFβ-binding domains held in proximity to one another by the pairing of the CH1 domain of the second polypeptide with the CL domain of the first polypeptide chain. Each of the N-terminal, TGFβ-binding domains of TGFβR2 receptor proteins is also referred to as a "trap" to distinguish the TGFβ binding domain as a ligand binding domain derived from a receptor protein in contrast to an antigen-binding domain derived from an antibody.

The third polypeptide chain (second light chain) of a TGFβ/PD-L1 bispecific binding protein comprises, from amino terminus to carboxy terminus, the structural formula: VL$_{PD-L1}$-CL, wherein VL$_{PD-L1}$ is a VL domain of the anti-PD-L1 monoclonal antibody and CL is an antibody light chain constant domain. As in a light chain of a naturally occurring IgG antibody, the VL$_{PD-L1}$ and CL domains are fused directly to one another without the insertion of any artificial linker. By design, the structural formula VL$_{PD-L1}$-CL of this third polypeptide chain should direct the polypeptide chain to preferentially pair with the C-terminal "VH$_{PD-L1}$-CH1-Fc" portion of the TGFβR2(ECD)-CL-VH$_{PD-L1}$-CH1-Fc structure of the first polypeptide chain so that VL$_{PD-L1}$ domain of the third polypeptide chain and VH$_{PD-L1}$ domain of the first polypeptide chain form a functional, PD-L1 binding domain (PD-L1 binding site) that is stabilized by the pairing of the CL domain of the third polypeptide chain with the CH1 domain of the first polypeptide chain. The structure of the resulting PD-L1 binding domain (VH::VL) and the stabilization by CH1::CL pairing are the same as found in a naturally occurring IgG antibody Fab domain (VH-CH1::VL-CL). Accordingly, the resulting functional PD-L1 binding domain that is formed by pairing of a first polypeptide chain with a third polypeptide chain is referred to as a Fab domain of the TGFβ/PD-L1 bispecific binding protein.

As described below, the PD-L1 binding domains derived from anti-PD-L1 humanized antibodies HuEM0005-86-6 (Example 2.1), HuEM0005-87-1 (Example 2.2) and HuEM0005-90-1 (Example 2.3) were used to generate three TGFβ/PD-L1 bispecific binding proteins designated, respectively, FIT1012-3a, FIT1012-4a and FIT1012-7a. To ensure that the three TGFβ/PD-L1 binding proteins differed only in PD-L1 binding domains derived from each antibody, the TGFβR2(ECD) domain, which is present at the N-termini of the first and second component polypeptide chains, had the following same amino acid sequence:

```
                                          (SEQ ID NO: 1)
TIPPHVQKSVNNDMIVTDNNGAVKEPQLCKFCDVRFSTCDNQK

SCMSNCSITSICEKPQEVCVAVWRKNDENITLETVCHDPKLPY

HDFILEDAASPKCIMKEKKKPGETFFMCSCSSDECNDNIIFSE

EYNTSNPD.
```

Example 3.2. Expression of TGFβ/PD-L1 Binding Proteins

DNA molecules encoding amino acid sequences for each of the three component polypeptide chains for each of the three TGFβ/PD-L1 binding proteins were synthesized and cloned into pcDNA3.1 mammalian expression vectors. The nucleotide coding sequence for each polypeptide chain was also augmented at the 5' terminus with a sequence encoding a signal peptide sequence as required for expression in mammalian host cells. The signal peptides are efficiently removed (processed) from each of the nascent polypeptide chains by the mammalian host cells shortly after expression.

For the expression of a first polypeptide chain (heavy chain) for each of the TGFβ/PD-L1 binding proteins, a DNA molecule was synthesized comprising a nucleotide sequence encoding an N-terminal signal peptide sequence consisting of amino acids MDMRVPAQLLGLLLLWFPGSRC (SEQ ID NO:79), which was fused directly to a sequence encoding a TGFβR2(ECD) domain followed by the rest of the first polypeptide chain. For the expression of a second polypeptide chain (first light chain) of each of the TGFβ/PD-L1 binding proteins, a DNA molecule was synthesized comprising a nucleotide sequence encoding an N-terminal signal peptide sequence consisting of amino acids MEFGLSWLFLVAILKGVQC (SEQ ID NO:80), which was fused directly to a sequence encoding a TGFβR2(ECD) domain followed by the rest of the second polypeptide chain. For the expression of a third polypeptide chain (second light chain) of each of the TGFβ/PD-L1 binding proteins, a DNA molecule was synthesized comprising a nucleotide sequence encoding the same N-terminal signal peptide sequence used for expressing the first polypeptide chain and consisting of amino acids MDMRVPAQLLGLLLLWFPGSRC (SEQ ID NO:79), which was fused directly to a sequence encoding the amino acid sequence for a $VL_{PD-L1}$ domain followed by the rest of the third polypeptide chain. After sequencing validation, a set of three recombinant pcDNA3.1 expression plasmid vectors, wherein each vector encoded the first, second, or third component polypeptide chains of a TGFβ/PD-L1 binding protein, were prepared for transfection into HEK 293E cells.

As noted above, the N-terminal signal peptides are efficiently removed (processed) from the nascent first, second, and third polypeptide chains by a transfected mammalian host cell shortly after expression to release the mature polypeptide chains. As shown below, the expressed and mature polypeptide chains assemble to form a TGFβ/PD-L1 bispecific binding protein that is capable of binding TGFβ and human PD-L1 and comprising two first polypeptide chains, two second polypeptide chains, and two third polypeptide chains, and wherein the TGFβ/PD-L1 bispecific binding protein comprises four, N-terminal, functional TGFβ-binding domains, each derived from a TGFβ Receptor 2 protein and two PD-L1 binding domains of the particular humanized anti-PD-L1 monoclonal antibody used to make the TGFβ/PD-L1 bispecific binding protein.

Table 21, below, shows the amino acid sequences for each of the three component polypeptide chains for the TGFβ/PD-L1 bispecific binding proteins designated "FIT1012-3a." Table 22, below, shows the amino acid sequences for each of the three component polypeptide chains for the TGFβ/PD-L1 bispecific binding proteins designated "FIT1012-4a." Table 23, shows the amino acid sequences for each of the three component polypeptide chains for the TGFβ/PD-L1 bispecific binding proteins designated "FIT1012-7a." In Tables 21, 22, and 23, below, the sequences of the TGFβR2(ECD) domains and of the VH and VL domains from each of the anti-PD-L1 humanized antibodies are underlined. The same polypeptide sequence for the TGFβR2(ECD) domain was used in the first and second polypeptide chains in each of the three TGFβ/PD-L1 bispecific binding proteins.

TABLE 21

Amino Acid Sequences for FIT1012-3a Component Polypeptide Chains

| FIT1012-3a TGFβ/PD-L1 bispecific binding protein | Amino Acid Sequence for Polypeptide Chain 12345678901234567890123456789012345678890 |
|---|---|
| Polypeptide Chain 1 TGFβR2(ECD)-CL-$VH_{PD-1}$- CH1-Fc | TIPPHVQKSVNNDMIVTDNNGAVKFPQLCKFCDVRFSTCD NQKSCMSNCSITSICEKPQEVCVAVWRKNDENITLETVCH DPKLPYHDFILEDAASPKCIMKEKKKPGETFFMCSCSSDE CNDNIIFSEEYNTSNPDRTVAAPSVFIFPPSDEQLKSGTA SVVCLLNNFYPREAKVQWKVDNALQSGNSQESVTEQDSKD STYSLSSTLTLSKADYEKHKVYACEVTHQGLSSPVTKSFN RGECEVQLVQSGAEVKKPGASVKVSCKTSGYTFTTYGINW VRQAPGQGLEWIGYIYIGNAYTEYNEKFKGKATLTSDPST RTAYMELSSLRSDDTAVYYCARDLMVIAPKTMDYWGQGTT VTVSSASTKGPSVFPLAPSSKSTSGGTAALGCLVKDYFPE PVTVSWNSGALTSGVHTFPAVLQSSGLYSLSSVVTVPSSS LGTQTYICNVNHKPSNTKVDKKVEPKSCDKTHTCPPCPAP ELLGGPSVFLFPPKPKDTLMISRTPEVTCVVVDVSHEDPE VKFNWYVDGVEVHNAKTKPREEQYNSTYRVVSVLTVLHQD WLNGKEYKCKVSNKALPAPIEKTISKAKGQPREPQVYTLP PSREEMTKNQVSLTCLVKGFYPSDIAVEWESNGQPENNYK TTPPVLDSDGSFFLYSKLTVDKSRWQQGNVFSCSVMHEAL HNHYTQKSLSLSPGK (SEQ ID NO: 26) |
| Polypeptide Chain 2 TGFβR2(ECD)-CH1 | TIPPHVQKSVNNDMIVTDNNGAVKFPQLCKFCDVRFSTCD NQKSCMSNCSITSICEKPQEVCVAVWRKNDENITLETVCH DPKLPYHDFILEDAASPKCIMKEKKKPGETFFMCSCSSDE CNDNIIFSEEYNTSNPDASTKGPSVFPLAPSSKSTSGGTA ALGCLVKDYFPEPVTVSWNSGALTSGVHTFPAVLQSSGLY SLSSVVTVPSSSLGTQTYICNVNHKPSNTKVDKKVEPKSC (SEQ ID NO: 27) |
| Polypeptide Chain 3 $VL_{PD-L1}$-CL | DIQMTQSPSSVSASVGDRVTITCKASQDVGTAVAWYQQKP GKAPKLLIYWASTRHTGVPDRFTGSGSGTDFTLTISSLQP EDFATYYCQQYSSYPYTFGGGTKVEIKRTVAAPSVFIFPP SDEQLKSGTASVVCLLNNFYPREAKVQWKVDNALQSGNSQ ESVTEQDSKDSTYSLSSTLTLSKADYEKHKVYACEVTHQG LSSPVTKSFNRGEC (SEQ ID NO: 28) |

TABLE 22

Amino Acid Sequences of FIT1012-4a Component Polypeptide Chains

| FIT1012-4a TGFβ/PD-L1 bispecific binding protein | Amino Acid Sequence for Polypeptide Chain 12345678901234567890123456789012345678990 |
|---|---|
| Polypeptide Chain 1 TGFβR2(ECD)-CL-VH$_{PD-1}$-CH1-Fc | TIPPHVQKSVNNDMIVTDNNGAVKFPQLCKFCDVRFSTCD<br>NQKSCMSNCSITSICEKPQEVCVAVWRKNDENITLETVCH<br>DPKLPYHDFILEDAASPKCIMKEKKKPGETFFMCSCSSDE<br>CNDNIIFSEEYNTSNPDRTVAAPSVFIFPPSDEQLKSGTA<br>SVVCLLNNFYPREAKVQWKVDNALQSGNSQESVTEQDSKD<br>STYSLSSTLTLSKADYEKHKVYACEVTHQGLSSPVTKSFN<br>RGECEVQLVQSGAEVKKPGASVKVSCKASGYTFTDYYINW<br>VRQAPGQGLEWMGETIPNTGGTTYNQKFKARVTMTVDTST<br>STVYMELSSLRSEDTAVYYCARYQSGSPFAYWGQGTTVTV<br>SSASTKGPSVFPLAPSSKSTSGGTAALGCLVKDYFPEPVT<br>VSWNSGALTSGVHTFPAVLQSSGLYSLSSVVTVPSSSLGT<br>QTYICNVNHKPSNTKVDKKVEPKSCDKTHTCPPCPAPELL<br>GGPSVFLFPPKPKDTLMISRTPEVTCVVVDVSHEDPEVKF<br>NWYVDGVEVHNAKTKPREEQYNSTYRVVSVLTVLHQDWLN<br>GKEYKCKVSNKALPAPIEKTISKAKGQPREPQVYTLPPSR<br>EEMTKNQVSLTCLVKGFYPSDIAVEWESNGQPENNYKTTP<br>PVLDSDGSFFLYSKLTVDKSRWQQGNVFSCSVMHEALHNH<br>YTQKSLSLSPGK (SEQ ID NO: 29) |
| Polypeptide Chain 2 TGFβR2(ECD)-CH1 | TIPPHVQKSVNNDMIVTDNNGAVKFPQLCKFCDVRFSTCD<br>NQKSCMSNCSITSICEKPQEVCVAVWRKNDENITLETVCH<br>DPKLPYHDFILEDAASPKCIMKEKKKPGETFFMCSCSSDE<br>CNDNIIFSEEYNTSNPDASTKGPSVFPLAPSSKSTSGGTA<br>ALGCLVKDYFPEPVTVSWNSGALTSGVHTFPAVLQSSGLY<br>SLSSVVTVPSSSLGTQTYICNVNHKPSNTKVDKKVEPKSC<br>(SEQ ID NO: 27) |
| Polypeptide Chain 3 VL$_{PD-L1}$-CL | DIVMTQSPDSLAVSLGERATINCKASQNVGTAVAWYQQKP<br>GQPPKLLIYSASNRYTGVPDRFTGSGSGTDFTLTISSLQA<br>EDVAVYYCQQHYSTPYTFGGGTKLEIKRTVAAPSVFIFPP<br>SDEQLKSGTASVVCLLNNFYPREAKVQWKVDNALQSGNSQ<br>ESVTEQDSKDSTYSLSSTLTLSKADYEKHKVYACEVTHQG<br>LSSPVTKSFNRGEC (SEQ ID NO: 30) |

TABLE 23

Amino Acid Sequences of FIT1012-7a Component Polypeptide Chains

| FIT1012-7a TGFβ/PD-L1 bispecific binding protein | Amino Acid Sequence for Polypeptide Chain 12345678901234567890123456789012345678990 |
|---|---|
| Polypeptide Chain 1 TGFβR2(ECD)-CL-VH$_{PD-1}$-CH1-Fc | TIPPHVQKSVNNDMIVTDNNGAVKFPQLCKFCDVRFSTCD<br>NQKSCMSNCSITSICEKPQEVCVAVWRKNDENITLETVCH<br>DPKLPYHDFILEDAASPKCIMKEKKKPGETFFMCSCSSDE<br>CNDNIIFSEEYNTSNPDRTVAAPSVFIFPPSDEQLKSGTA<br>SVVCLLNNFYPREAKVQWKVDNALQSGNSQESVTEQDSKD<br>STYSLSSTLTLSKADYEKHKVYACEVTHQGLSSPVTKSFN<br>RGECEVQLVQSGAEVKKPGASVKVSCKASGYTFTSHSINW<br>VRQATGQGLEWMGYMYIGNAYTEYNEKFKGRVTLTSNTSI<br>STAYMELSSLRSEDTAVYYCAKITPVVAPYVMDYWGQGTS<br>VTVSSASTKGPSVFPLAPSSKSTSGGTAALGCLVKDYFPE<br>PVTVSWNSGALTSGVHTFPAVLQSSGLYSLSSVVTVPSSS<br>LGTQTYICNVNHKPSNTKVDKKVEPKSCDKTHTCPPCPAP<br>ELLGGPSVFLFPPKPKDTLMISRTPEVTCVVVDVSHEDPE<br>VKFNWYVDGVEVHNAKTKPREEQYNSTYRVVSVLTVLHQD<br>WLNGKEYKCKVSNKALPAPIEKTISKAKGQPREPQVYTLP<br>PSREEMTKNQVSLTCLVKGFYPSDIAVEWESNGQPENNYK<br>TTPPVLDSDGSFFLYSKLTVDKSRWQQGNVFSCSVMHEAL<br>HNHYTQKSLSLSPGK (SEQ ID NO: 31) |
| Polypeptide Chain 2 TGFβR2(ECD)-CH1 | TIPPHVQKSVNNDMIVTDNNGAVKFPQLCKFCDVRFSTCD<br>NQKSCMSNCSITSICEKPQEVCVAVWRKNDENITLETVCH<br>DPKLPYHDFILEDAASPKCIMKEKKKPGETFFMCSCSSDE<br>CNDNIIFSEEYNTSNPDASTKGPSVFPLAPSSKSTSGGTA<br>ALGCLVKDYFPEPVTVSWNSGALTSGVHTFPAVLQSSGLY<br>SLSSVVTVPSSSLGTQTYICNVNHKPSNTKVDKKVEPKSC<br>(SEQ ID NO: 27) |

TABLE 23-continued

Amino Acid Sequences of FIT1012-7a Component Polypeptide Chains

```
FIT1012-7a
TGFβ/PD-L1 bispecific   Amino Acid Sequence for Polypeptide Chain
binding protein         12345678901234567890123456789012345 67890

Polypeptide Chain 3     DIQLTQSPSFLSASVGDRVTITCKASQDVGTAVAWYQQKP
VL$_{PD-L1}$-CL         GKAPKLLIYWASTRHTGVPSRFSGSGSGTEFTLTISSLQP
                        EDFATYYCQQYSSYPYTFGQGTKLEIKRTVAAPSVFIFPP
                        SDEQLKSGTASVVCLLNNFYPREAKVQWKVDNALQSGNSQ
                        ESVTEQDSKDSTYSLSSTLTLSKADYEKHKVYACEVTHQG
                        LSSPVTKSFNRGEC (SEQ ID NO: 32)
```

The three recombinant pcDNA3.1 expression vectors for expressing each of the three component polypeptide chains for each TGFβ/PD-L1 bispecific binding protein (i.e., FIT1012-3a, FIT1012-4a, FIT1012-7a) were co-transfected into HEK 293E cells at a ratio of 1:3:3 (i.e., 1 vector for expressing the first polypeptide chain: 3 vectors for expressing the second polypeptide chain: 3 vectors for expressing the third polypeptide chain). After approximately six days of post-transfection cell culture, the supernatants were harvested and subjected to Protein A affinity chromatography to obtain purified TGFβ/PD-L1 bispecific binding protein. The yield was calculated based on the amount of purified protein and the transfected cell volume. The composition and purity of the purified bispecific binding proteins were analyzed by size exclusion chromatography (SEC). Purified binding protein in PBS was applied on a TSKgel G3000SWXL, 7.8×300 mm, 5 μm particle size, stainless steel column (Tosoh Bioscience Shanghai, China). A DIONEX™ UltiMate 3000 HPLC instrument (Thermo Scientific) was used for SEC using UV detection at 280 nm and 214 nm. The expression results are shown in Table 24, below, and the SEC-HPLC profile are shown in FIG. 2A (FIT1012-3a), FIG. 2B (FIT1012-4a), and FIG. 2C (FIT1012-7a).

TABLE 24

Expression Results for TGFβ/PD-L1 Binding Proteins

| TGFβ/PD-L1 Bispecific Binding Protein | Anti-PD-L1 Moiety | Yield (mg/L) | Aggregates (percent) | Monomer (percent) |
|---|---|---|---|---|
| FIT1012-3a | HuEM0005-86-6 | 49.0 | 0.97% | 99.03% |
| FIT1012-4a | HuEM0005-87-1 | 62.3 | 1.33% | 98.67% |
| FIT1012-7a | HuEM0005-90-1 | 42.3 | 1.07% | 98.93% |

All three TGFβ/PD-L1 bispecific binding proteins exhibited acceptable yield ability in the transient expression system using HEK 293E cells and high purity after one-step purification as indicated by low percentage of aggregates and high percentage of monomer, reflecting favorable developability properties for further process development.

Example 4. Generation of Bintrafusp Alfa for Comparative Studies

Bintrafusp alfa (also known as M7824) is a bifunctional fusion protein that binds human PD-L1 and human TGFβ. See, for example, U.S. Pat. No. 9,676,863 B2. The two light chains of bintrafusp alfa are identical to the light chains of the anti-PD-L1 monoclonal antibody avelumab, which is a fully human monoclonal antibody that has been approved for the treatment of certain cancers in the United States and Europe. Each heavy chain of bintrafusp alfa is a fusion protein comprising the heavy chain of avelumab fused at its C-terminus via a peptide linker having the amino acid sequence (Gly$_4$Ser)$_4$Gly (SEQ ID NO:81) to the N-terminus of an extracellular domain of transforming growth factor beta Receptor 2 (TGFβR2). Dimerization of the heavy chains provides the bintrafusp alfa molecule with two, C-terminal, TGFβ ligand-binding domains. Accordingly, bintrafusp alfa comprises two PD-L1 antigen-binding domains of avelumab and two TGFβ binding domains.

For expression of the bintrafusp alfa light chain, a DNA molecule was synthesized comprising a nucleotide sequence encoding an N-terminal signal peptide sequence consisting of amino acids MTWTPLLFLTLLLHCTGSLS (SEQ ID NO:82), which was fused directly to a sequence encoding the light chain of avelumab. For expression of the bintrafusp alfa heavy chain, a DNA molecule was synthesized comprising a nucleotide sequence encoding an N-terminal signal peptide sequence consisting of amino acids MEFGLSWLFLVAILKGVQC (SEQ ID NO:83), which was fused directly a sequence encoding the heavy chain of avelumab. The DNA molecules encoding the light and heavy chains of bintrafusp alfa were each cloned into separate pcDNA3.1 mammalian expression plasmid vectors for transfection into HEK 293 cells and production of the bintrafusp alfa protein.

The N-terminal signal peptides are efficiently removed (processed) from the nascent light and heavy chains by the transfected mammalian host cell shortly after expression to release the mature polypeptide chains, which assemble to form the bintrafusp alfa protein comprising four polypeptide chains that form two functional PD-L1 binding domains of avelumab and two TGFβ-binding domains derived from TGFβR2. Table 25, below, shows the amino acid sequences for the light and heavy chains of bintrafusp alfa, omitting N-terminal signal peptide sequences. Polypeptide sequences of the antibody N-terminal light and heavy chain variable domains and of the C-terminal TGFβ binding domain of the heavy chain are underlined.

TABLE 25

Amino Acid Sequences of Bintrafusp Alfa Component Polypeptide Chains

```
bintrafusp
alfa
polypeptide  Amino Acid Sequence
chains       12345678901234567890123456789012345 67890 light chain  QSALTQPASVSGSPGQSITISCTGTSSDVGGYNYVSWYQQ
             HPGKAPKLMIYDVSNRPSGVSNRFSGSKSGNTASLTISGL
             QAEDEADYYCSSYTSSSTRVFGTGTKVTVLGQPKANPTVT
             LFPPSSEELQANKATLVCLISDFYPGAVTVAWKADGSPVK
             AGVETTKPSKQSNNKYAASSYLSLTPEQWKSHRSYSCQVT
             HEGSTVEKTVAPTECS (SEQ ID NO: 84)
```

TABLE 25-continued

Amino Acid Sequences of Bintrafusp Alfa Component Polypeptide Chains

| bintrafusp alfa polypeptide chains | Amino Acid Sequence<br>1234567890123456789012345678901234567890 |
|---|---|
| heavy chain | EVQLLESGGGLVQPGGSLRLSCAASGFTFSSYIMMWVRQA<br>PGKGLEWVSSIYPSGGITFYADTVKGRFTISRDNSKNTLY<br>LQMNSLRAEDTAVYYCARIKLGTVTTVDYWGQGTLVTVSS<br>ASTKGPSVFPLAPSSKSTSGGTAALGCLVKDYFPEPVTVS<br>WNSGALTSGVHTFPAVLQSSGLYSLSSVVTVPSSSLGTQT<br>YICNVNHKPSNTKVDKRVEPKSCDKTHTCPPCPAPELLGG<br>PSVFLFPPKPKDTLMISRTPEVTCVVVDVSHEDPEVKFNW<br>YVDGVEVHNAKTKPREEQYNSTYRVVSVLTVLHQDWLNGK<br>EYKCKVSNKALPAPIEKTISKAKGQPREPQVYTLPPSREE<br>MTKNQVSLTCLVKGFYPSDIAVEWESNGQPENNYKTTPPV<br>LDSDGSFFLYSKLTVDKSRWQQGNVFSCSVMHEALHNHYT<br>QKSLSLSPGAGGGGSGGGGSGGGGSGGGGSGIPPHVQKSV<br>NNDMIVTDNNGAVKFPQLCKFCDVRFSTCDNQKSCMSNCS<br>ITSICEKPQEVCVAVWRKNDENITLETVCHDPKLPYHDFI<br>LEDAASPKCIMKEKKKPGETFFMCSCSSDECNDNIIFSEE<br>YNTSNPD (SEQ ID NO: 85) |

The two recombinant pcDNA3.1 mammalian expression vectors encoding the component heavy chain and light chain of bintrafusp alfa were co-transfected into HEK 293E cells at a mole ratio of 2:3 (i.e., 2 vectors for the heavy chain: 3 vectors for the light chain) for production of bintrafusp alfa protein. After approximately six days of post-transfection cell culture, the supernatants were harvested and subjected to Protein A affinity chromatography to obtain purified bintrafusp alfa protein. The yield was calculated based on the amount of purified protein and the transfected cell volume. The composition and purity of the purified bispecific binding proteins were analyzed by size exclusion chromatography (SEC). Purified binding protein in PBS was applied on a TSKgel G3000SWXL, 7.8×300 mm, 5 μm particle size, stainless steel column (Tosoh Bioscience Shanghai, China). A DIONEX™ UltiMate 3000 HPLC instrument (Thermo Scientific) was used for SEC using UV detection at 280 nm and 214 nm.

Example 5. Binding Activities of TGFβ/PD-L1 Bispecific Binding Proteins

The PD-L1 binding activities of TGFβ/PD-L1 bispecific binding proteins FIT1012-3a, FIT1012-4a, and FIT1012-7a, and of the corresponding parental anti-PD-L1 mAbs were detected by biolayer interferometry using an Octet®Red sensing device. A TGFβ/PD-L1 bispecific binding protein (FIT1012-3a, FIT1012-4a, or FIT1012-7a) was captured by Anti-hIgG Fc Capture (AHC) Biosensors (Pall) at a concentration of 100 nM for 30 seconds. Sensors were then dipped into running buffer (1×pH 7.2 PBS, 0.05% Tween 20, 0.1% BSA) for 60 seconds to check baseline. Binding was measured by dipping sensors into a series diluted concentration of recombinant human PD-L1-his protein. Dissociation was followed by dipping sensors into running buffer for 1200 seconds. The association and dissociation curves were fitted to a 1:1 Langmuir binding model using ForteBio Data Analysis software (Pall). The equilibrium dissociation constant $K_D$ (M) of the reaction between antibodies and related target proteins was then calculated from the kinetic rate constants using the formula $K_D = k_{off}/k_{on}$. The results are shown in Table 26, below.

TABLE 26

PD-L1 Binding Affinities for TGFβ/PD-L1 Bispecific Binding Proteins

| TGFβ/PD-L1 Bispecific Binding Protein Captured on Sensor Chip | Analyte Target | $k_{on}$ (M$^{-1}$ sec$^{-1}$) | $k_{off}$(sec$^{-1}$) | $K_D$ (M) |
|---|---|---|---|---|
| FIT1012-3a | Human PD-L1-His | 5.64 × 10$^5$ | 3.44 × 10$^{-4}$ | 6.09 × 10$^{-10}$ |
| FIT1012-4a | Human PD-L1-His | 1.85 × 10$^5$ | 2.40 × 10$^{-4}$ | 1.30 × 10$^{-9}$ |
| FIT1012-7a | Human PD-L1-His | 4.05 × 10$^5$ | <1.0 × 10$^{-6}$ | <1.0 × 10$^{-11}$ |

Example 5.1. Binding Activity of TGFβ/PD-L1 Binding Proteins to TGFβ Isoforms The binding activities of the three TGFβ/PD-L1 bispecific binding proteins (FIT1012-3a, FIT1012-4a, and FIT1012-7a) for each of the three isoforms of TGFβ were detected by ELISA. In addition, two other binding proteins, i.e., the bintrafusp alfa PD-L1/TGFβ binding protein and a recombinant human TGFβRII-Fc fusion protein (Cat. No. CC10, Novoprotein), designated "TGFbRII-ECD-Fc", were also assayed for comparison with the three FIT1012 TGFβ/PD-L1 bispecific binding proteins. The TGFbRII-ECD-Fc protein was known to bind each of the three TGFβ isoforms and therefore also served as a positive control. Accordingly, each of the wells of the ELISA microplates provided a reaction mixture to test the ability of a particular binding protein at a particular concentration to bind to a particular TGFβ isoform. Briefly, ELISA plates were incubated overnight at 4° C. with 100 μl of the human TGFβ1 (Cat. No. CA59, Novoprotein), TGFβ2 (Cat. No. CJ79, Novoprotein), or TGFβ3 (Cat. No. CJ44, Novoprotein) that had been diluted in PBS buffer, pH 7.4, at 1 μg/ml, respectively, to coat (adsorb to) the surface of wells of ELISA plates. Plates were washed three times in washing buffer (PBS containing 0.05% Tween 20) and blocked for 1 hour at 37° C. with 200 μl per well of blocking buffer (1% BSA in PBS containing 0.05% Tween 20). After blocking buffer was removed, a binding protein (i.e., FIT1012-3a, FIT1012-4a, FIT1012-7a, bintrafusp alfa, or TGFbRII-ECD-Fc) was diluted serially 1:4 from 10 nM to 0.0006 nM, and 100 μl of each concentration of the binding protein were then added to each well. The wells containing the various binding mixtures were incubated at 37° C. for 1 hour to permit binding to TGFβ protein on the surface of the wells. Thereafter, the wells were washed four times with washing buffer, and anti-human IgG Fc HRP (Sigma, Catalog No. A0170) was diluted 1:10000 and added to the wells at 100 μl per well to detect binding protein that was bound to TGFβ protein present on the surface of a well. The plates were incubated for 1 hour at 37° C. and washed four times with washing buffer. 100 μl of tetramethylbenzidine (TMB) chromogenic solution were added per well. Following color development, the reaction was stopped with 1 N HCl, and absorbance at 450 nm (OD450) was measured on a VARIOSKAN™ LUX microplate reader (Thermo Scientific™). The data were processed by GraphPad software, and EC50 values were calculated.

Figure 3A:
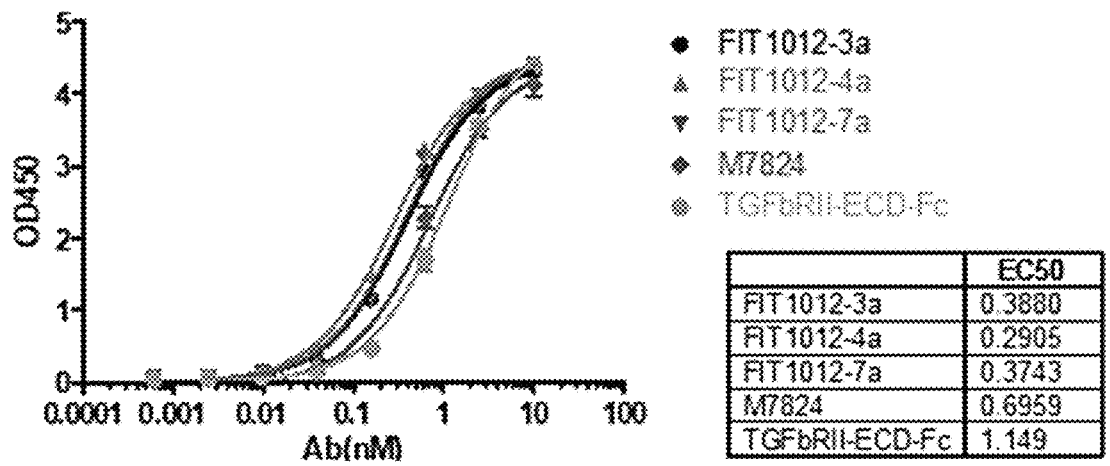
FIGS. 3A, 3B, and 3C show results of experiments to determine the ability of TGFβ/PD-L1 bispecific binding proteins designated FIT1012-3a, FIT1012-4a, and FIT1012-7a to bind TGFβ isoform 1 (FIG. 3A), TGFβ isoform 2 (FIG. 3B), and TGFβ isoform 3 (FIG. 3C) as determined by an ELISA format. For comparison, each assay also determined the TGFβ isoform binding activity of the bintrafusp alfa PD-L1/TGFβ bispecific binding protein and "TGFbRII-ECD-Fc," which is a recombinant TGFβRII-Fc fusion protein (Cat. No. CC10, Novoprotein). See, Example 5.1 for additional details.
Figure 3B:
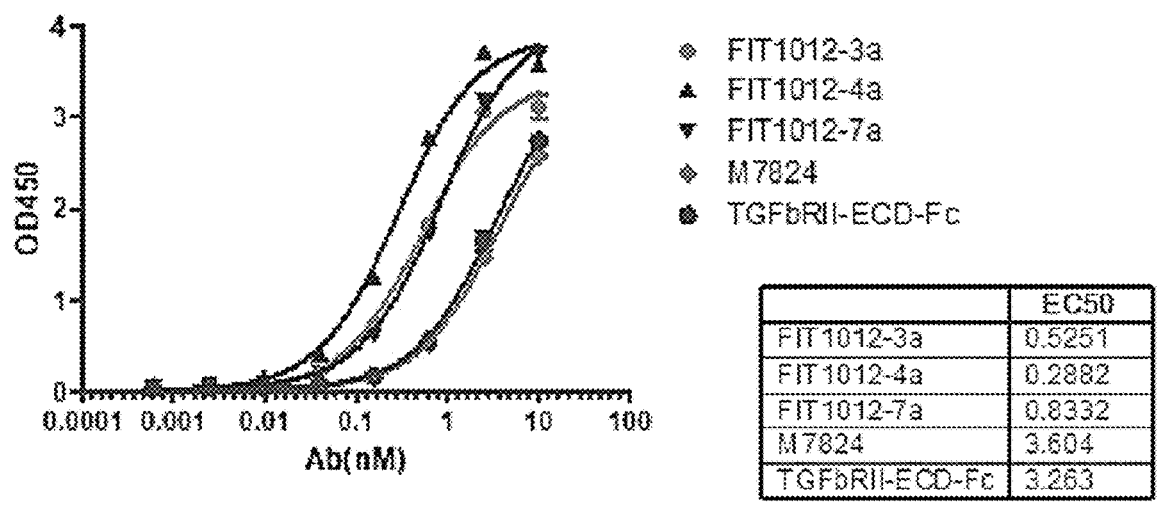
Figure 3C:
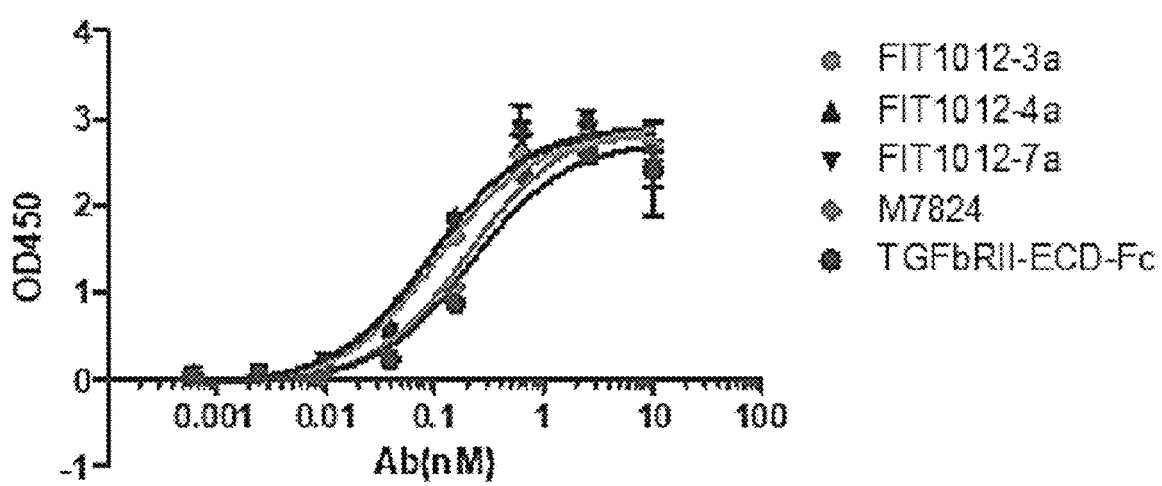

The results of the ELISA are shown in FIG. 3A (binding to TGFβ1), FIG. 3B (binding to TGFβ2), and FIG. 3C (binding to TG933). The data indicate that each of the binding proteins can bind all three TGFβ isoforms. Further, based on the EC50 comparison, these data show that the three FIT1012 species have a 1.8-2.4 times higher binding activity for TGFβ1 than bintrafusp alfa, and bind TGFβ2 with an binding activity that is 4.3-12.5 times greater than that of bintrafusp alfa for TGFβ2, and bind TGFβ3 with an binding activity that is 1.9-2.2 times that of bintrafusp alfa for TGFβ3. The approximately 2-fold higher affinity of the FIT1012 species for TGFβ1 and TGFβ3 as compared to the affinity of bintrafusp alfa can be seen as a reflection of the fact that there are twice the number of TGFβRII binding sites on the FIT1012 species as compared to bintrafusp alfa. However, the approximately 4- to 12-times higher binding affinity of the FIT1012 species for TGFβ2 as compared to the binding affinity of bintrafusp alfa is unexpectedly higher than that of bintrafusp alfa. The result is well above a simple additive result.

Example 5.2. Simultaneous Binding Activity of TGFβ/PD-L1 Binding Proteins

Figure 4:
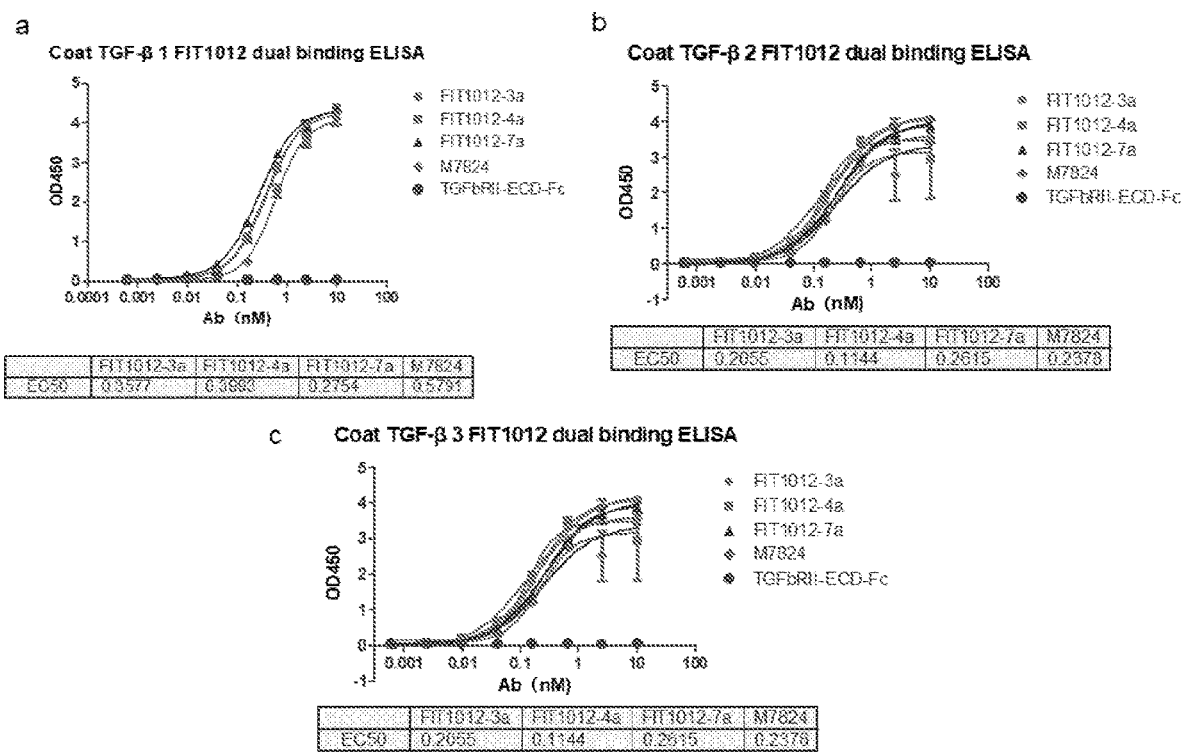
FIGS. 4A, 4B, and 4C show results of experiments to determine the ability of the TGFβ/PD-L1 bispecific binding proteins FIT1012-3a, FIT1012-4a, and FIT1012-7a to simultaneously bind a TGFβ isoform and PD-L1 (dual binding activity) evaluated by ELISA. In addition to testing the three TGFβ/PD-L1 bispecific binding proteins, the bintrafusp alfa PD-L1/TGFβ binding protein and the TGFbRII-ECD-Fc fusion protein (Catalog No. CC10, Novoprotein) were also included for comparison. In this dual binding assay, the recombinant TGFbRII ECD-Fc fusion protein served as a negative control because this protein binds TGFβ and does not bind PD-L1.

The ability of the TGFβ/PD-L1 bispecific binding proteins (FIT1012-3a, FIT1012-4a, and FIT1012-7a) to simultaneously bind a TGFβ isoform and PD-L1 (dual binding activity) was evaluated by ELISA. In addition to testing the three TGFβ/PD-L1 bispecific binding proteins, the bintrafusp alfa PD-L1/TGFβ binding protein was included as positive control, and a recombinant TGFβRII-Fc fusion protein (Cat. No. CC10, Novoprotein, CC10), designated "TGFβRII-ECD-Fc" was included as a negative control. In this dual binding assay, the recombinant TGFβRII(ECD)-Fc fusion protein served as a negative control because this protein does not bind PD-L1. Accordingly, each of the wells of the ELISA microplates provided a reaction mixture to test the ability of a particular binding protein at a particular concentration to bind to TGFβ isoform 1, 2, or 3 coated on (adsorbed to) the surface of a well, and thereafter to test the ability of the protein that was bound to a TGFβ isoform (on the surface of the well) to also bind PD-L1 that was subsequently added to the well. Briefly, ELISA plates were incubated overnight at 4° C. with 100 µl of a human TGFβ isoform diluted in PBS buffer, pH 7.4, at 1 µg/ml, to allow the human TGFβ isoform to coat (adsorb to) the surface of the wells. Plates were washed three times in washing buffer (PBS containing 0.05% Tween 20) and blocked for 1 hour at 37° C. with 200 µl per well blocking buffer (1% BSA in PBS containing 0.05% Tween 20). After blocking buffer was removed, 5 nM of binding protein (i.e., FIT1012-3a, FIT1012-4a, FIT1012-7a, bintrafusp alfa, or TGFβRII-ECD-Fc fusion protein) was added to the wells at 100 µl per well and incubated at 37° C. for 1 hour. After washing, biotinylated human PD-L1 protein (ACROBiosystems, H82E5) was serially diluted 4-fold from 10 nM to 0.0006 nM, and then 100 µl of each concentration of biotinylated PD-L1 were added to each well. The mixtures were then incubated at 37° C. for 1 hour to permit binding to biotinylated PD-L1. The wells were washed four times with washing buffer, and Streptavidin-HRP (Merck, RABHRP3) was diluted 1:10000 and added to the wells at 100 µl per well. The plates were incubated for 1 hour at 37° C. and washed four times in washing buffer. 100 µl of tetramethylbenzidine (TMB) chromogenic solution were added per well. Following color development, the reaction was stopped with 1 N HCl, and absorbance at 450 nm was measured on a Varioskan™ LUX multimode multiplate reader (Thermo Scientific). The data were processed by GraphPad software, and EC50 values were calculated. The results are shown in FIGS. 4A, 4B, and 4C. The results indicate that the three TGFβ/PD-L1 bispecific binding proteins can bind to TGFβ and PD-L1 protein simultaneously.

As expected, no signal was generated in the assays using the negative control TGFβRII-ECD-Fc protein, which only binds TGFβ.

Example 6. Biological Activities of TGFβ/PD-L1 Bispecific Binding Proteins

Since the PD-L1 (PD-L1/PD-1) and TGFβ signaling pathways are involved in immune suppression within tumor microenvironment and tumor metastasis, whether the three FIT1012 TGFβ/PD-L1 bispecific binding proteins can stimulate an immune response that might otherwise be suppressed was investigated was initially investigated using a mixed lymphocyte reaction and an assay for Smad signaling.

Example 6.1. Mixed Lymphocyte Reaction for T Cell Stimulation and Proliferation

The binding of the PD-1 surface protein on T cells to PD-L1 expressed on the surface of cancer cells or other antigen-presenting cells is a known immune checkpoint that can significantly suppress T cell activation and expansion, thereby blocking an effective T cell response by the immune system to cancer or other diseases in an individual. This experiment used a standard mixed lymphocyte reaction (MLR) assay to assess whether the FIT1012-3a, FIT1012-4a, and FIT1012-7a TGFβ/PD-L1 bispecific binding proteins, which as shown above can bind PD-L1, can also effectively block PD-1 on T cells from binding to PD-L1 on antigen-presenting cells and thereby overcome PD-1/PD-L1 immune checkpoint suppression of T cell activation and proliferation. In the MLR assay used in this study, monocyte-derived dendritic cells from one donor individual are mixed with CD4+ T cells from another donor individual. In the absence of inhibition by an immune checkpoint, such as PD-1/PD-L1 binding between the two cell populations, the dendritic cells (from one donor) further stimulate the allogeneic CD4+ T cells (from the other donor) to proliferate and release cytokines, such as IL-2 and gamma interferon (IFN-gamma, IFN-γ), which can be detected and measured. Accordingly, this MLR assay was used to determine the extent to which the FIT1012 binding proteins, which bind PD-L1, could overcome PD-1/PD-L1 immune checkpoint suppression and promote T cell activation and proliferation as required for a robust T cell immune response.

For generation of monocyte-derived dendritic cells, CD14+ monocytes were immunomagnetically purified with CD14 mAb-conjugated microbeads (Miltenyi Biotec) from peripheral blood mononuclear cells (PBMC) from a healthy donor individual, and then cultured in 6-well plates (Corning) for 6 days at $1\times10^6$ cells/ml in RPMI1640 media containing 10% fetal bovine serum supplemented with 50 ng/mL GM-CSF (R&D, 215-GM-050/CF) and 35 ng/mL IL4 (R&D, 204-IL-050/CF). Fresh media with 50 ng/mL GM-CSF and 35 ng/mL IL4 was replenished on day 4. Immature dendritic cells were harvested on day 6, and their maturation was accomplished by culturing them for 2 days in RPMI1640 media containing 10% fetal bovine serum and supplemented with 50 ng/mL GM-CSF, 35 ng/mL IL4, 20 ng/ml TNFα (R&D, 210-TA-020/CF), and 50 µg/ml poly I:C (Sigma, 13036). CD4+ T cells from another healthy donor individual were purified from PBMC with immunomagnetic negative selection kit (Stem cell) according to the manufacturer's protocol, and then $1\times10^5$ CD4+ T cells/well in 96-well plate (Corning) were stimulated by the mature dendritic cells ($1\times10^4$ cells/well) for 4 days in X-VIVO-15 media (LONZA) in the presence of FIT1012-3a, FIT1012-4a, FIT1012-7a, bintrafusp alfa as a positive control, or a human IgG1 that does not bind PD-L1 as a negative control. Cytokine release into the media from CD4+ T cells was assayed on day 3 by Lance Ultra IL2 (human) detection kit (Perkin Elmer) and on day 4 by IFN-γ (human) LANCE Ultra TR-FRET Detection Kit according to the manufacturer's manual.

Figure 5A:
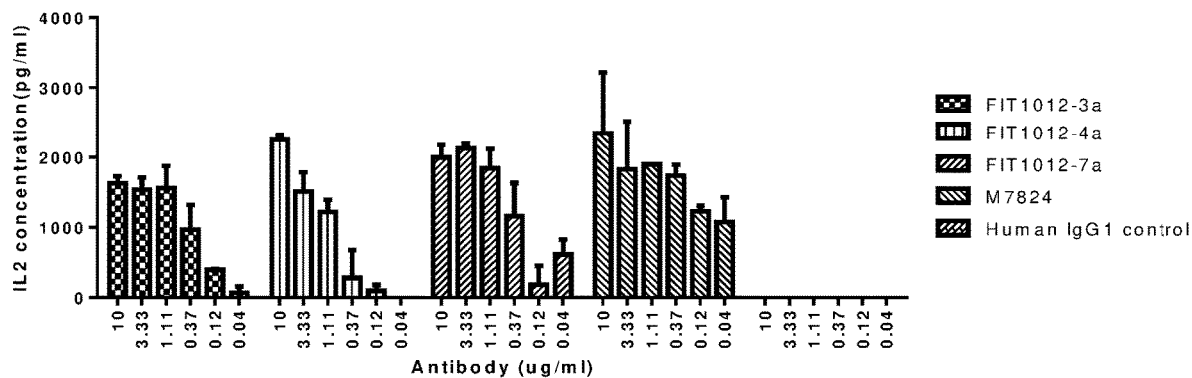
FIGS. 5A and 5B show results of a mixed lymphocyte reaction (MLR) assay for secretion of cytokines IL-2 and IFN-γ as indicators of T cell priming and expansion (i.e., activation) in response to allogeneic cells in the presence of varying concentrations of TGFβ/PD-L1 bispecific binding proteins FIT1012-3a, FIT1012-4a, FIT1012-7a, and bintrafusp alfa, and also a human IgG1 antibody, which is a negative control for the assay. The secretion of IL-2 and IFN-γ in this MLR assay is predominantly an indication of T cell activation, and the concentrations of IL2 and IFN-γ secreted into the medium are positively correlated with the strength of T cell activation. Inhibition of PD-L1 mediated suppression of T cell activation will enhance IL2 and IFN-γ secretion.
Figure 5B:
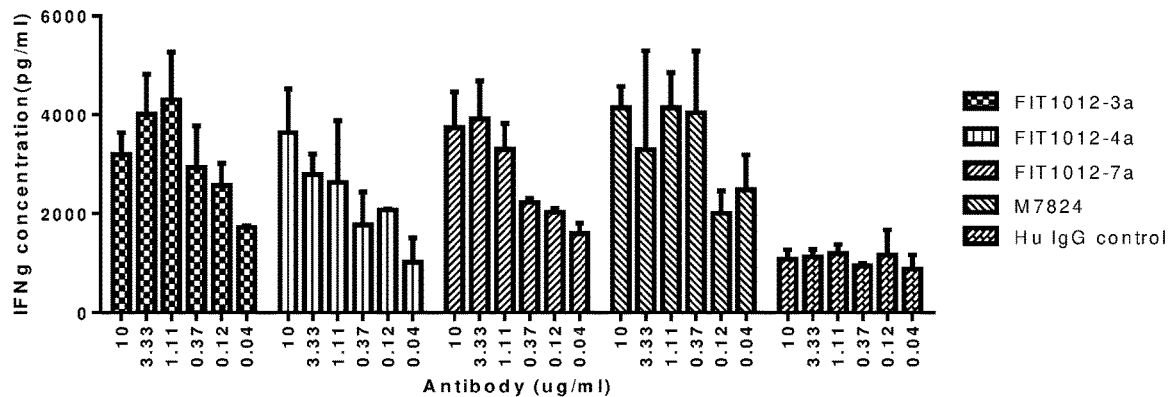

The results in FIGS. 5A and 5B show that the FIT1012 proteins promoted IL-2 and IFN-γ release in the MLR assay, indicating that the FIT1012 binding proteins blocked PD-1/PD-L1 binding and promoted T cell priming and expansion, i.e., stimulated T cell activation. Accordingly, the results indicate that the FIT1012 proteins overcame PD-L1-mediated immune checkpoint suppression of T cell activation as required to treat cancer.

Example 6.2. Inhibition of Smad Phosphorylation

TGFβ has an ongoing critical role of inhibiting activation of T cells to maintain immune quiescence and self-tolerance by remaining bound to TGFβ receptors expressed on the surface of T cells. However, the same TGFβ-dependent process to maintain T cell quiescence and avoid autoimmunity may also suppress T cell activation in response to cancer and other foreign cells, thereby providing another block to a robust response by T cells to cancer cells in an individual. See, for example, the review by Oh et al., *J. Immunol.*, 191(8): 3973-3979 (2013). The binding of TGFβ to TGFβ receptors expressed on the surface of cells signals phosphorylation of transcription factors Smad2 and Smad3, which form complexes with Smad4. The complexes are in turn transported into the cell nucleus and associate with DNA-binding cofactors to inhibit the transcription of various genes, including those that are relevant to activation in the case of T cells.

As explained above, in addition to the presence of two functional PD-L1 antigen binding sites derived from anti-PD-L1 parental monoclonal antibodies, the structures of the FIT1012-3a, FIT1012-4a, and FIT1012-7a bispecific binding proteins comprise four functional human TGFβ ligand-binding domains in extracellular domains derived from human TGFβ Receptor 2 proteins (TGFβR2(ECD)).

To verify that each of the FIT1012-3a, FIT1012-4a, and FIT1012-7a TGFβ/PD-L1 bispecific binding proteins has the ability to bind to TGFβ and inhibit the TGFβ-dependent signaling pathway, the proteins were tested for the ability to inhibit TGFβ-dependent phosphorylation of Smad2 at amino acid residues S465/S467 in lysates of cells using a Phospho-SMAD2 (Ser465/467) LANCE Ultra TR-FRET detection assay kit (Perkin-Elmer, TRF4012C). The bintrafusp alfa protein, which has two TGFβ ligand-binding domains, was also assayed in this study as a positive control for comparison with the FIT1012 binding proteins. A human IgG antibody, which does not bind TGFβ, served as a negative control. The level of Smad2 phosphorylation at S465/S467 is positively correlated with TGFβ signaling. Briefly, MDA-MB-231 cancer cells (ATCC), which express TGFβ receptors, were plated in 96-well plate at $1\times10^5$ cells/well in Leibovitz's L-15 Media containing 10% fetal bovine serum. The cells were allowed to attach to the surface of the wells by overnight culture in a $CO_2$ tissue culture incubator. The next day, the cells were pre-treated with serial concentrations of binding protein for 30 minutes and then 0.2 nM TGFβ1 was added to stimulate TGFβ signaling for 1 hour. Supernatant liquid was removed, and the cells were lysed with 50 μL of 1× lysis buffer (supplied by the manufacturer). Phosphorylated Smad2 protein was measured according to the manufacturer's manual.

Figure 6:
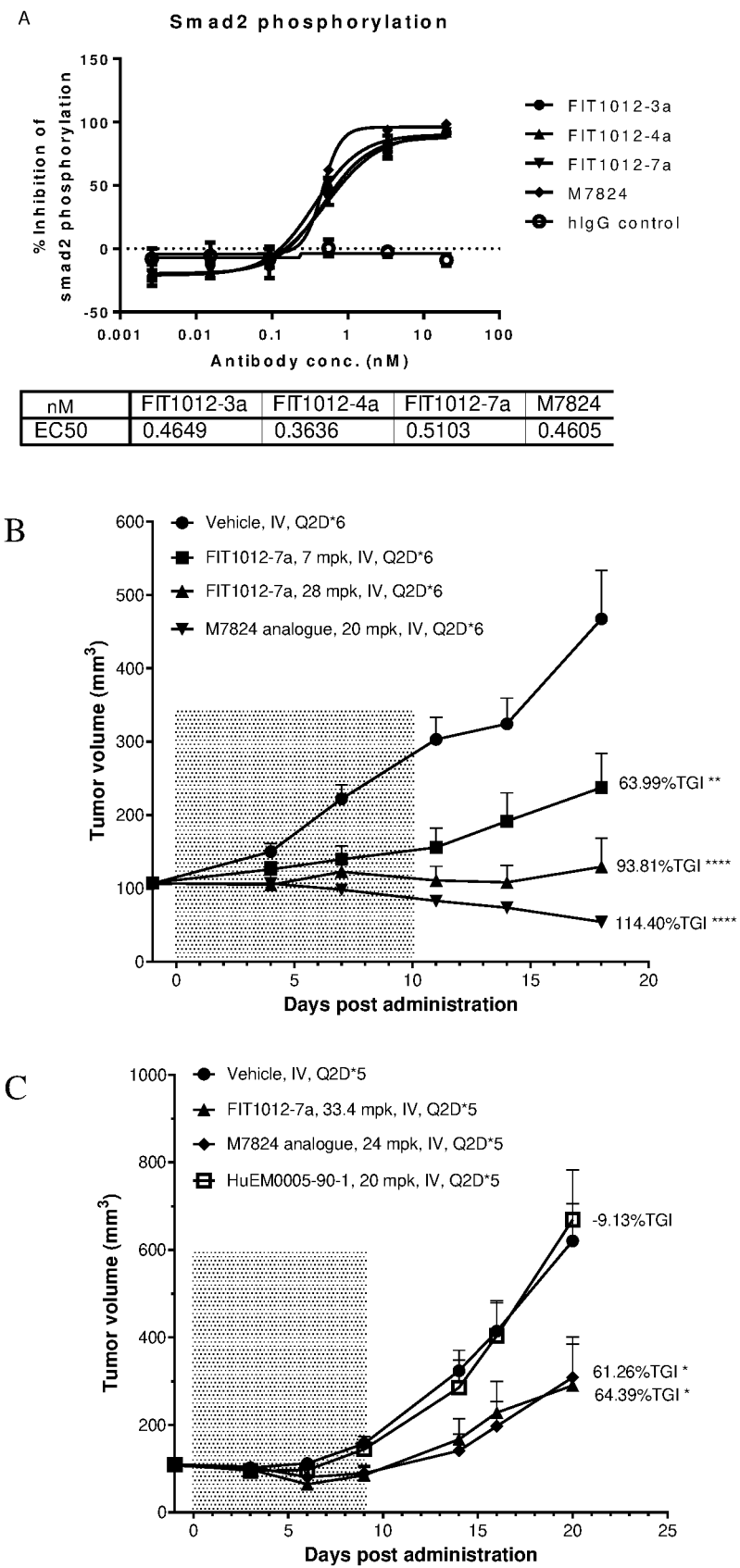
FIGS. 6A-C show biological activities of TGFβ/PD-L1 bispecific binding proteins.

As shown in FIG. 6, each of the FIT1012 TGFβ/PD-L1 bispecific binding proteins potently inhibited Smad2 phosphorylation, indicating that each of the FIT1012 TGFβ/PD-L1 bispecific binding proteins can inhibit TGFβ receptor signaling by binding (trapping) and preventing TGFβ from binding to TGFβ receptors expressed on the surfaces of cells.

Example 6.3. Anti-Tumor Efficacy of FIT1012-7a in Detroit 562 Human Pharyngeal Carcinoma Xenograft Model in Nude Mice Detroit 562 human carcinoma xenograft model in nude mice was employed to evaluate the anti-tumor efficacy of FIT1012-7a. Female BALB/c nude mice of 7-8 weeks (Gempharmatech Co., Ltd.) were subcutaneously implanted with $5\times10^6$ viable Detroit 562 cells in 0.1 mL DPBS containing 50% BD Matrigel per animal in the right flank. A week later, tumor bearing mice with tumor size ranged 80-130 mm³ were selected and randomized into groups of eight mice each and treatment was initiated in the next day (Day 0). Mice were administered i.v. with vehicle, 7 mg/kg of FIT1012-7a, 28 mg/kg of FIT1012-7a, or 20 mg/kg of Bintrafusp alfa respectively once every other day for 6 consecutive times, and this study was concluded 8 days after the last dose (Day 18). Body weights and tumor volumes were measured 2-3 times per week, and tumor volumes were determined at different time points using the formula: tumor volume (mm³)=length×width²×0.5. For all test groups, Percent Tumor Growth Inhibition (TGI) compared to Vehicle control is defined as (1−(mean net increased volume of treated tumors)/(mean net increased volume of control tumors))×100% on Day 18.

All treatments were well tolerated (data not shown). FIG. 6B shows the average tumor volumes of the mice on different time points, indicating inhibition of tumor growth by the various treatments. In Detroit 562 human carcinoma xenograft in nude mice, FIT1012-7a showed a dose dependent anti-tumor effect with a TGI ratio of 63.99% for 7 mg/kg treatment group and 93.81% for 28 mg/kg treatment group. Treatments with 20 mg/kg Bintrafusp alfa analogue also showed potent anti-tumor efficacy, achieving a TGI ratio of 114.40%. Significant differences from Vehicle control in tumor volumes were revealed by one-way ANOVA with Tukey's multiple comparison post-test for treatment groups 7 mg/kg FIT1012-7a t (P<0.005), 28 mg/kg FIT1012-7a (P<0.0001), and 20 mg/kg Bintrafusp alfa (P<0.0001) on Day 18.

Example 6.4. Antitumor Efficacy of FIT1012-7a and Anti-PD-L1 Antibody in A375 Human Melanoma Xenograft Model in PBMC Engrafted M-NSG Mice Anti-tumor efficacy was also evaluated in A375 human melanoma xenograft model in PBMC engrafted M-NSG mice, which is an immunodeficient strain lacking T cells, B cells and natural killer cells. Female M-NSG mice aged 8-10 weeks (Shanghai Model Organisms Center, Inc.) were used for human PBMC reconstitution and A375 tumor model establishment. Briefly, $5\times10^6$ A375 cells suspended in 0.1 mL DPBS containing 50% BD Matrigel per animal were subcutaneously injected into the right flank of female M-NSG mice. On the same day, the mice received a single intraperitoneal injection of 5×10⁶ human PBMC. On 11 days post tumor cell inoculation, huCD45 cells in mouse peripheral blood were detected using FACS, and tumor bearing mice with tumor size of 70-130 mm³ were selected. Based on the tumor size and huCD45 counts, the selected mice were randomized (blocked randomization) divided into 4 groups of 9 mice each, and treatment was initiated in the next day (Day 0). Mice were administered i.v. with vehicle, 20 mg/kg of the parental anti-PD-L1 antibody HuEM0005-90-1, 33.4 mg/kg of FIT1012-7a, or 24 mg/kg of Bintrafusp alfa respectively once every other day for 5 consecutive times, and this study was concluded on Day 20. Body weights and tumor volumes were measured 2-3 times per week, and tumor volumes were determined at different time points using the formula: tumor volume (mm³)=length×width×0.5. For all test groups, Percent Tumor Growth Inhibition (TGI) compared to Vehicle control is defined as (1−(mean net increased volume of treated tumors)/(mean net increased volume of control tumors))×100% on Day 20.

All the treatments were well tolerated (data not shown). FIG. 6C shows the average tumor volumes of the mice on different time points, indicating the inhibition of tumor growth by various treatments. Administered at equimolar doses in A375 human melanoma xenograft model in PBMC engrafted M-NSG mice, FIT1012-7a showed a better anti-tumor efficacy than the parental anti-PD-L1 antibody HuEM0005-90-1, with a TGI ratio of 64.39% for FIT1012-7a treatment group versus −9.13% for HuEM0005-90-1 treatment group. Bintrafusp alfa treatment at the same molar strength produced an anti-tumor efficacy similar to FIT1012-7a treatment, achieving a TGI ratio of 61.26%. Significant differences from Vehicle control in tumor volumes were revealed by unpaired t-tests for treatment groups 33.4 mg/kg FIT1012-7a ($P<0.05$), and 24 mg/kg Bintrafusp alfa ($P<0.05$) on Day 20.

Example 7. Stability Study of PD-L1/TGF-β/PD-L1 Bispecific Binding Proteins

To further evaluate whether the FIT1012-3a, FIT1012-4a, and FIT1012-7a TGFβ/PD-L1 bispecific binding proteins were suitable for development as therapeutic binding proteins, the proteins were assessed for in vitro temperature stability in two different protocols. In one protocol, the FIT1012 binding proteins were freeze-thawed once, twice, or three times. Briefly, for one freeze-thaw cycle, FIT1012 binding proteins stored at −80° C. were taken out and incubated at room temperature (— 25° C.) for 30 minutes, and then were put back to −80° C. freezer for more than 1 hour. In the other protocol, each of the purified FIT1012 TGFβ/PD-L1 bispecific binding proteins was dissolved in 20 mM histidine buffer (pH 6.0), and incubated at constant 4° C., 25° C., and 40° C. for 1 day, 3 days, and 7 days.

The fractions of intact, monomeric protein and aggregates of each of the samples from the two protocols were detected by SEC-HPLC. Briefly, 10 μg of each protein sample was applied on a TSKgel G3000SWXL, 7.8×300 mm, 5 μm particle size, stainless steel column (Tosoh Bioscience Shanghai, China). A DIONEX™ UltiMate 3000 HPLC instrument (Thermo Scientific) was used for SEC using UV detection at 280 nm and 214 nm. Data were recorded and analyzed using Chromeleon™ software supplied by the manufacturer.

The results of the temperature stability assays for FIT1012-3a, FIT1012-4a, and FIT1012-7a are shown respectively in Tables 27, 28, and 29, below.

TABLE 27

Thermostability Analysis of FIT1012-3a TGFβ/PD-L1 Bispecific Binding Protein

| Temperature Condition | Aggregation (%) | Monomer (%) |
| --- | --- | --- |
| No treatment | 0.71 | 99.29 |
| freeze/thaw × 1 | 0.75 | 99.25 |
| freeze/thaw × 2 | 1.05 | 98.95 |
| freeze/thaw × 3 | 1.24 | 98.76 |
| 4° C., 1 day | 0.84 | 99.16 |
| 25° C., 1 day | 0.84 | 99.16 |
| 40° C., 1 day | 0.85 | 99.15 |
| 4° C., 3 days | 0.63 | 99.37 |
| 25° C., 3 days | 0.91 | 99.09 |
| 40° C., 3 days | 1.09 | 98.91 |
| 4° C., 7 days | 0.76 | 99.24 |
| 25° C., 7 days | 0.99 | 99.01 |
| 40° C., 7 days | 1.27 | 98.73 |

TABLE 28

Thermostability Analysis of FIT1012-4a TGFβ/PD-L1 Bispecific Binding Protein

| Temperature Condition | Aggregation (%) | Monomer (%) |
| --- | --- | --- |
| No treatment | 0.97 | 99.03 |
| freeze/thaw × 1 | 0.95 | 99.05 |
| freeze/thaw × 2 | 1.20 | 98.80 |
| freeze/thaw × 3 | 1.19 | 98.81 |
| 4° C., 1 day | 1.01 | 98.99 |
| 25° C., 1 day | 1.31 | 98.69 |
| 40° C., 1 day | 1.18 | 98.82 |
| 4° C., 3 days | 1.01 | 98.99 |
| 25° C., 3 days | 0.87 | 99.13 |
| 40° C., 3 days | 1.10 | 98.90 |
| 4° C., 7 days | 0.95 | 99.05 |
| 25° C., 7 days | 1.10 | 98.90 |
| 40° C., 7 days | 1.24 | 98.76 |

TABLE 29

Thermostability Analysis of FIT1012-7a TGFβ/PD-L1 Bispecific Binding Protein

| Temperature Condition | Aggregation (%) | Monomer (%) |
| --- | --- | --- |
| No treatment | 0.95 | 99.05 |
| freeze/thaw × 1 | 0.91 | 99.09 |
| freeze/thaw × 2 | 1.24 | 98.76 |
| freeze/thaw × 3 | 1.17 | 98.83 |
| 4° C., 1 day | 0.84 | 99.16 |
| 25° C., 1 day | 0.77 | 99.23 |
| 40° C., 1 day | 0.96 | 99.04 |
| 4° C., 3 days | 0.88 | 99.12 |
| 25° C., 3 days | 0.82 | 99.18 |
| 40° C., 3 days | 0.84 | 99.16 |
| 4° C., 7 days | 1.08 | 98.92 |
| 25° C., 7 days | 0.84 | 99.16 |
| 40° C., 7 days | 0.91 | 99.09 |

The results in Tables 27-29, above, indicate that FIT1012-3a, FIT1012-4a. and FIT1012-7a remained as essentially fully intact (greater than 98%) monomeric proteins without significant aggregate formation (less than 1.5%) under the temperature conditions of both protocols. Even in a regular buffer system without any preservatives, no significant amount of aggregation or degradation was observed by SEC-HPLC for any of the FIT1012 proteins after incubation for up to one week at various temperatures ranging from 4° C. to 40° C. or after three freeze/thaw cycles. The results indicate that each of the FIT1012 TGFβ/PD-L1 bispecific binding proteins had favorable storage stability as required for manufacturing, feasibility of liquid formulation, and long shelf time.

Example 8. Pharmacokinetic Study of TGFβ/PD-L1 Bispecific Binding Proteins

The rat pharmacokinetic system is commonly used in the pharmaceutical industry for preclinical evaluation of therapeutic monoclonal antibodies and binding proteins and provides a reliable prediction of the pharmacokinetic profile of therapeutic antibodies and binding proteins in humans.

Pharmacokinetic properties of the FIT1012-3a, FIT1012-4a, and FIT-1012-7a TGFβ/PD-L1 bispecific binding proteins were assessed in male Sprague-Dawley (SD) rats. FIT1012 proteins were administered to male SD rats in a single intravenous dose of 5 mg/kg via a jugular cannula or subcutaneously under the dorsal skin. Serum samples were collected from the tail vein of the rats at different time points after administration of FIT1012 bispecific binding protein over a period of 28 days with sampling at: 0 minutes, 5 minutes, 15 minutes, 30 minutes, 1 hour, 2 hours, 4 hours, 8 hours, 24 hours, 2 days, 4 days, 7 days, 10 days, 14 days, 21 days, and 28 days.

Serum samples were analyzed by ELISA for the presence of generic human IgG and for the presence of TGFβ1-binding protein (TGFβ1-specific binding protein) species having an Fc domain. For generic human IgG detection, briefly, ELISA plates were coated with 125 ng/well of goat anti-human IgG Fc antibody (Rockland, Catalog No. 609-101-017) at 4° C. overnight, followed by blocking with 1×PBS/1% BSA/0.05% Tween-20/0.05% ProClin™ 300. All serum samples were diluted 20-fold in blocking buffer first. Additional dilution was made in 5% pooled rat serum and incubated on the plate for 60 minutes at 37° C. Detection was carried out with Anti-human IgG (Fab fragment) peroxidase conjugated (Sigma; Cat. No. A0293) and concentrations were determined with the help of standard curves using the four-parameter logistic fit.

The antigen-specific ELISA was carried out using a similar protocol as that described above, except that wells were coated with human TGFβ1 (50 ng/well), and anti-human IgG Fc HRP (Sigma, Cat. #A0170) was used as a secondary detection antibody. Values for the pharmacokinetic parameters were determined by non-compartmental model using WinNonlin software (Pharsight Corporation, Mountain View, Calif.). The pharmacokinetic parameters determined using the two ELISA protocols are shown in Table 30, below.

TABLE 30

Pharmacokinetic Properties of TGFβ/PD-L1 Bispecific Binding Proteins

| Binding Protein | Species Detected in Serum | CL (mL/day/kg) | Vss (mL/kg) | Beta $t_{1/2}$ (day) | AUC (day * μg/mL) | MRT (day) |
|---|---|---|---|---|---|---|
| FIT1012-3a | generic human IgG | 71.2 | 627.7 | 8.2 | 61.8 | 5.8 |
|  | TGFβ1-specific binding protein | 243 | 688 | 2.58 | 20.8 | 2.64 |
| FIT1012-4a | generic human IgG | 54.0 | 335.0 | 5.9 | 91.1 | 5.1 |
|  | TGFβ1-specific binding protein | 177.2 | 533.7 | 2.6 | 29.2 | 3.1 |
| FIT1012-7a | generic human IgG | 50.0 | 431.9 | 7.6 | 88.3 | 5.6 |
|  | TGFβ1-specific binding protein | 152.3 | 467.9 | 3.0 | 32.6 | 2.8 |

CL = total clearance;
Vss = volume of distribution at steady state;
AUC = area under the curve (plasma concentration versus time);
MRT = mean residence time In general, serum concentrations of generic human IgG were higher than for a TGFβ1-specific binding protein. This may have resulted from the human TGFβR2 domains of the FIT1012 binding proteins cross-reacting with (binding to) rat TGFβ. The presence of rat TGFβ occupying the ligand-binding domains of FIT1012 binding proteins could also prevent such FIT1012 proteins from binding to the human TGFβ coated on the surface of the wells of the ELISA plates, resulting in a calculated concentration that is lower than the actual concentration of FIT1012 binding protein in the serum samples. Based on the generic method, the half-life (Beta $t_{1/2}$) values for the FIT1012 proteins were comparable to PK parameters for normal human IgG in rat.

The long half-life and low clearance of FIT1012 binding proteins indicate that these TGFβ/PD-L1 bispecific binding proteins have therapeutic utility for chronic indications with less frequent dosing, similar to other therapeutic monoclonal antibodies.

Figure 7:
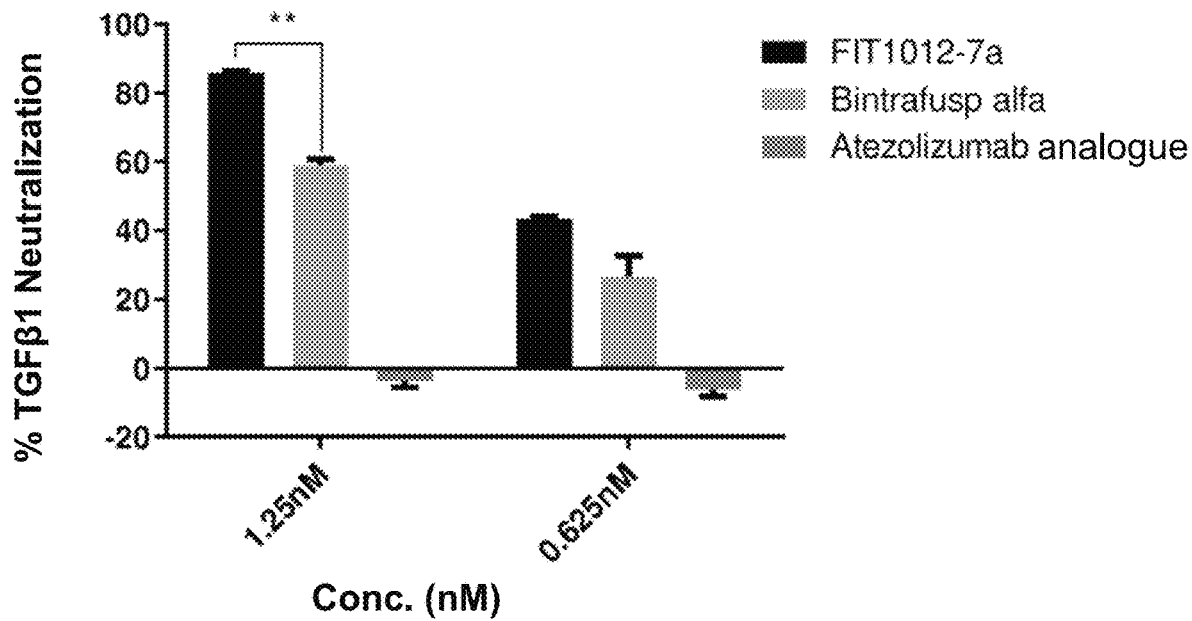
FIG. 7 shows TGFβ1 neutralization efficacy of TGFβ/PD-L1 bispecific binding protein FIT1012-7a and Bintrafusp alfa.

Example 9. TGFβ1 Neutralization Efficacy and Inhibition of TGFβ1 Down-Stream Signal: Comparison of TGFβ/PD-L1 Bispecific Binding Protein FIT1012-7a and Bintrafusp Alfa TGFβ1 neutralization efficacy was evaluated in a competitive ELISA assay. Briefly, 1 μg/ml TGFbRII-ECD-Fc (Cat. No. CC10, Novoprotein) was coated to an ELISA plate overnight at 4° C., the ELISA plate was washed 3 times with washing buffer (PBS containing 0.05% Tween 20) and then blocked for 2 hours at room temperature with 300 μl per well of blocking buffer (1% BSA in PBS). For assay sample, FIT1012-7a, Bintrafusp alfa and Atezolizumab analogue (negative control, PD-L1 blocking monoclonal antibody which does not bind to TGFβ) were each diluted to 2.5 nM and 1.25 nM in diluent (1% BSA in PBS), and then respectively mixed with an equal volume of 4 nM TGFβ1 followed by incubation at room temperature for 3 hours. For TGFβ1 standards, 2-fold serial dilutions were prepared in the diluent for concentration from 4 nM to 0.004 nM. Each well of the TGFbRII-ECD-Fc coated ELISA plate received 100 ul of assay sample or TGFβ1 standard, the ELISA plate was incubated for 1 hour at room temperature then washed for 3 times. One hundred microliter of 0.5 ug/ml biotin anti-human/mouse TGF-β1 (Biolegend, 521705) was added to each well of the ELISA plate and incubated at room temperature for 45 min, then the ELISA plate was washed 3 times with 300 uL/well washing buffer. Streptavidin-HRP and TMB substrate were used to detect and develop the ELISA signal. Results of TGFβ1 standards were fit into a standard curve (Non-linear Standard Curve: 4-Parameter Logistic), into which results of the assay mixtures were interpolated to give the concentrations of free TGFβ1 which did not bind to FIT1012-7a and Bintrafusp alfa. The percentage reduction of free TGFβ1 concentration, i.e., percentage of TGFβ1 neutralization, was calculated thereby and shown in FIG. 7. TGFβ/PD-L1 bispecific binding protein FIT1012-7a and Bintrafusp alfa protein both bind to TGFβ1 and prevent the TGFβ1 from binding to the plate-bound TGFbRII-ECD-Fc, while FIT1012-7a showed better TGFβ1 neutralization efficacy than Bintrafusp alfa protein (P<0.05 for 1.25 nM FIT1012-7a vs. 1.25 nM Bintrafusp alfa protein, unpaired t-test). As expected for negative control, no TGFβ1 neutralization was observed for Atezolizumab analogue.

The level of Smad2 phosphorylation at S465/S467 is positively correlated with TGFβ signaling, therefore Phospho-SMAD2 (Ser465/467) LANCE Ultra TR-FRET detection assay was employed to evaluate inhibition of the TGFβ-dependent signaling pathway. Cancer cell line A549, expressing TGFβ receptors and sensitive to TGFβ1 treatment (data not shown), was chosen for this assay, and Atezolizumab analogue was used as negative control. Briefly, A549 cells were plated in 96-well plate at 1×10$^5$ cells/well in 100 μl RPMI1640 media containing 10% fetal bovine serum. The cells cultured overnight in a CO2 tissue culture incubator and become adherent were treated by carefully replace the culture media with 100 μl assay sample and incubate at room temperature for 1 hour. The assay samples were freshly prepared by mixing 0.4 nM TGFβ1 with an equal volume of 0.16 nM sample protein (FIT1012-7a, Bintrafusp alfa and Atezolizumab analogue, respectively) and incubated at room temperature for 2 hours. After the 1 hour treatment, the assay samples were aspired and the cells were lysed with 50 μL of 1× lysis buffer (supplied by the manufacturer), and phosphorylated Smad2 protein was measured according to the manufacturer's manual.

Figure 8:
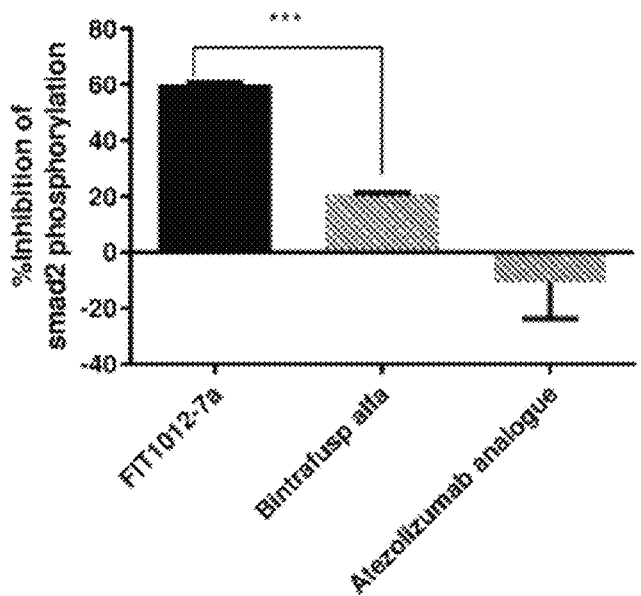
FIG. 8 shows inhibition of TGFβ1 down-stream signaling by TGFβ/PD-L1 bispecific binding protein FIT1012-7a and Bintrafusp alfa.

As shown in FIG. 8, the FIT1012-7a and Bintrafusp alfa inhibited Smad2 phosphorylation while the negative control Atezolizumab analogue did not, indicating both FIT1012-7a and Bintrafusp alfa can inhibit TGFβ receptor signaling by binding (trapping) and preventing TGFβ from binding to TGFβ receptors expressed on cell surfaces. FIT1012-7a showed stronger inhibition of TGFβ downstream signal than Bintrafusp alfa (P<0.005, un-paired T test).

The contents of all references (including literature references, patents, patent applications, and websites) that are cited throughout this application are hereby expressly incorporated by reference in their entirety. The practice of the present invention will employ, unless otherwise indicated, conventional techniques of immunology, molecular biology and cell biology, which are well known in the art.

The invention may be embodied in other specific forms without departing from the essential characteristics of the invention described above. The foregoing embodiments are therefore to be considered in all respects illustrative rather than limiting of the invention described herein. The scope of the invention is thus indicated by the appended claims rather than by the foregoing description, and all changes that come within the meaning and range of equivalency of the claims are therefore intended to be embraced herein.

The invention claimed is:

1. An anti-PD-L1 antibody, or antigen-binding portion thereof, capable of binding human PD-L1, wherein the antigen-binding portion of the antibody comprises a set of six CDRs, CDR-H1, CDR-H2, CDR-H3, CDR-L1, CDR-L2, and CDR-L3, selected from the from group of CDR sets below:

| CDR Set No. | CDR | CDR Amino Acid Sequence 12345678901234567890 | Sequence Identifier |
|---|---|---|---|
| 1 | CDR-H1 | TYGIN | SEQ ID NO: 2 |
|   | CDR-H2 | YIYIGNAYTEYNEKFKG | SEQ ID NO: 3 |
|   | CDR-H3 | DLMVIAPKTMDY | SEQ ID NO: 4 |
|   | CDR-L1 | KASQDVGTAVA | SEQ ID NO: 5 |
|   | CDR-L2 | WASTRHT | SEQ ID NO: 6 |
|   | CDR-L3 | QQYSSYPYT | SEQ ID NO: 7 |
| 2 | CDR-H1 | DYYIN | SEQ ID NO: 8 |
|   | CDR-H2 | ETIPNTGGTTYNQKFKA | SEQ ID NO: 9 |
|   | CDR-H3 | YQSGSPFAY | SEQ ID NO: 10 |
|   | CDR-L1 | KASQNVGTAVA | SEQ ID NO: 11 |
|   | CDR-L2 | SASNRYT | SEQ ID NO: 12 |
|   | CDR-L3 | QQHYSTPYT | SEQ ID NO: 13 |
| 3 | CDR-H1 | SHSIN | SEQ ID NO: 14 |
|   | CDR-H2 | YMYIGNAYTEYNEKFKG | SEQ ID NO: 15 |
|   | CDR-H3 | ITPVVAPYVMDY | SEQ ID NO: 16 |
|   | CDR-L1 | KASQDVGTAVA | SEQ ID NO: 17 |
|   | CDR-L2 | WASTRHT | SEQ ID NO: 18 |
|   | CDR-L3 | QQYSSYPYT | SEQ ID NO: 19 |

2. The antibody, or antigen-binding portion thereof, according to claim 1, wherein the antibody, or antigen-binding portion thereof, is humanized.

3. The humanized antibody, or antigen-binding portion thereof, according to claim 2, comprising a heavy chain variable (VH) domain and a light chain variable (VL) domain comprising amino acid sequences selected from the following pairs of heavy and light chain variable domain sequences:

| Pair No. | Amino Acid Sequence of Heavy Chain Variable (VH) Domain 12345678901234567890123456789 |
|---|---|
| 1 | EVQLVQSGAEVKKPGASVKVSCKTSGYTFT TYGINWVRQAPGQGLEWIGYIYIGNAYTEY NEKFKGKATLTSDPSTRTAYMELSSLRSDD TAVYYCARDLMVIAPKTMDYWGQGTTVTVS S (SEQ ID NO: 20) |
| 2 | EVQLVQSGAEVKKPGASVKVSCKASGYTFT DYYINWVRQAPGQGLEWMGETIPNTGGTTY NQKFKARVTMTVDTSTSTVYMELSSLRSED TAVYYCARYQSGSPFAYWGQGTTVTVSS (SEQ ID NO: 22) |
| 3 | EVQLVQSGAEVKKPGASVKVSCKASGYTFT SHSINWVRQATGQGLEWMGYMYIGNAYTEY NEKFKGRVTLTSNTSISTAYMELSSLRSED TAVYYCAKITPVVAPYVMDYWGQGTSVTVS S (SEQ ID NO: 24) |

| Pair No. | Amino Acid Sequence of Light Chain Variable (VL) Domain 123456789012345678901234567890 |
|---|---|
| 1 | DIQMTQSPSSVSASVGDRVTITCKASQDVG TAVAWYQQKPGKAPKLLIYWASTRHTGVPD RFTGSGSGTDFTLTISSLQPEDFATYYCQQ YSSYPYTFGGGTKVEIK (SEQ ID NO: 21) |
| 2 | DIVMTQSPDSLAVSLGERATINCKASQNVG TAVAWYQQKPGQPPKLLIYSASNRYTGVPD RFTGSGSGTDFTLTISSLQAEDVAVYYCQQ HYSTPYTFGGGTKLEIK (SEQ ID NO: 23) |
| 3 | DIQLTQSPSFLSASVGDRVTITCKASQDVG TAVAWYQQKPGKAPKLLIYWASTRHTGVPS RFSGSGSGTEFTLTISSLQPEDFATYYCQQ YSSYPYTFGQGTKLEIK (SEQ ID NO: 25). |

4. A pharmaceutical composition comprising an antibody, or antigen-binding portion thereof, according to claim 1.

5. The pharmaceutical composition according to claim 4, further comprising one or more additional therapeutic agents selected from the group consisting of: a cytotoxic metal-containing anti-cancer compound or a cytotoxic radioisotope-based anti-cancer compound, an antibiotic, an antiviral compound, a sedative, a stimulant, a local anesthetic, an anti-inflammatory steroid, an analgesic, an anti-histamine, a non-steroidal anti-inflammatory drug, and combinations thereof.

6. The pharmaceutical composition according to claim 5, wherein said anti-inflammatory steroid is a natural anti-inflammatory steroid, a synthetic anti-inflammatory steroid, or a combination thereof.

7. The pharmaceutical composition according to claim 5, wherein said analgesic is selected from the group consisting of: acetylsalicylic acid, acetaminophen, naproxen, ibuprofen, a COX-2 inhibitor, morphine, oxycodone, and combinations thereof.

8. The pharmaceutical composition according to claim 5, wherein said non-steroidal anti-inflammatory drug is selected from the group consisting of: acetylsalicylic acid, ibuprofen, naproxen, a COX-2 inhibitor, and combinations thereof.

9. A method for blocking PD-L1 signalling in a cell, comprising contacting the antibody or antigen-binding portion thereof according to claim 1 with the cell.

10. A method for treating cancer or other disease associated with PD-L1-mediated suppression of T cell activation in a human patient, comprising administering to the subject an anti-PD-L1 antibody or antigen-binding portion thereof according to claim 1.

11. The method according to claim 10, wherein said cancer is an epithelial cancer.

12. The method according to claim 10, wherein said cancer is selected from the group consisting of: a melanoma, a renal cancer, a prostate cancer, a pancreatic adenocarcinoma, a breast cancer, a colon cancer, a lung cancer, an esophageal cancer, a squamous cell carcinoma of the head, a squamous cell carcinoma of the neck, a liver cancer, an ovarian cancer, a cervical cancer, a thyroid cancer, a glioblastoma, a glioma, a leukemia, and a lymphoma.

13. The method according to claim 12, wherein said lung cancer is a non-small cell lung cancer.

\* \* \* \* \*

SEQUENCE LISTING

```
<160> NUMBER OF SEQ ID NOS: 85

<210> SEQ ID NO 1
<211> LENGTH: 137
<212> TYPE: PRT
<213> ORGANISM: Artificial Sequence
<220> FEATURE:
<223> OTHER INFORMATION: synthetic construct

<400> SEQUENCE: 1

Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
                20                  25                  30

Asp Val Arg Phe Ser Thr Cys Asp Asn Gln Lys Ser Cys Met Ser Asn
            35                  40                  45

Cys Ser Ile Thr Ser Ile Cys Glu Lys Pro Gln Glu Val Cys Val Ala
        50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Pro Gly Glu Thr Phe Phe
            100                 105                 110
```

```
Met Cys Ser Cys Ser Ser Asp Glu Cys Asn Asp Asn Ile Ile Phe Ser
        115                 120                 125

Glu Glu Tyr Asn Thr Ser Asn Pro Asp
    130                 135
```

<210> SEQ ID NO 2
<211> LENGTH: 5
<212> TYPE: PRT
<213> ORGANISM: Artificial Sequence
<220> FEATURE:
<223> OTHER INFORMATION: synthetic construct

<400> SEQUENCE: 2

```
Thr Tyr Gly Ile Asn
1               5
```

<210> SEQ ID NO 3
<211> LENGTH: 17
<212> TYPE: PRT
<213> ORGANISM: Artificial Sequence
<220> FEATURE:
<223> OTHER INFORMATION: synthetic construct

<400> SEQUENCE: 3

```
Tyr Ile Tyr Ile Gly Asn Ala Tyr Thr Glu Tyr Asn Glu Lys Phe Lys
1               5                   10                  15

Gly
```

<210> SEQ ID NO 4
<211> LENGTH: 12
<212> TYPE: PRT
<213> ORGANISM: Artificial Sequence
<220> FEATURE:
<223> OTHER INFORMATION: synthetic construct

<400> SEQUENCE: 4

```
Asp Leu Met Val Ile Ala Pro Lys Thr Met Asp Tyr
1               5                   10
```

<210> SEQ ID NO 5
<211> LENGTH: 11
<212> TYPE: PRT
<213> ORGANISM: Artificial Sequence
<220> FEATURE:
<223> OTHER INFORMATION: synthetic construct

<400> SEQUENCE: 5

```
Lys Ala Ser Gln Asp Val Gly Thr Ala Val Ala
1               5                   10
```

<210> SEQ ID NO 6
<211> LENGTH: 7
<212> TYPE: PRT
<213> ORGANISM: Artificial Sequence
<220> FEATURE:
<223> OTHER INFORMATION: synthetic construct

<400> SEQUENCE: 6

```
Trp Ala Ser Thr Arg His Thr
1               5
```

<210> SEQ ID NO 7
<211> LENGTH: 9
<212> TYPE: PRT
<213> ORGANISM: Artificial Sequence

```
<220> FEATURE:
<223> OTHER INFORMATION: synthetic construct

<400> SEQUENCE: 7

Gln Gln Tyr Ser Ser Tyr Pro Tyr Thr
1               5

<210> SEQ ID NO 8
<211> LENGTH: 5
<212> TYPE: PRT
<213> ORGANISM: Artificial Sequence
<220> FEATURE:
<223> OTHER INFORMATION: synthetic construct

<400> SEQUENCE: 8

Asp Tyr Tyr Ile Asn
1               5

<210> SEQ ID NO 9
<211> LENGTH: 17
<212> TYPE: PRT
<213> ORGANISM: Artificial Sequence
<220> FEATURE:
<223> OTHER INFORMATION: synthetic construct

<400> SEQUENCE: 9

Glu Thr Ile Pro Asn Thr Gly Gly Thr Thr Tyr Asn Gln Lys Phe Lys
1               5                   10                  15

Ala

<210> SEQ ID NO 10
<211> LENGTH: 9
<212> TYPE: PRT
<213> ORGANISM: Artificial Sequence
<220> FEATURE:
<223> OTHER INFORMATION: synthetic construct

<400> SEQUENCE: 10

Tyr Gln Ser Gly Ser Pro Phe Ala Tyr
1               5

<210> SEQ ID NO 11
<211> LENGTH: 11
<212> TYPE: PRT
<213> ORGANISM: Artificial Sequence
<220> FEATURE:
<223> OTHER INFORMATION: synthetic construct

<400> SEQUENCE: 11

Lys Ala Ser Gln Asn Val Gly Thr Ala Val Ala
1               5                   10

<210> SEQ ID NO 12
<211> LENGTH: 7
<212> TYPE: PRT
<213> ORGANISM: Artificial Sequence
<220> FEATURE:
<223> OTHER INFORMATION: synthetic construct

<400> SEQUENCE: 12

Ser Ala Ser Asn Arg Tyr Thr
1               5

<210> SEQ ID NO 13
<211> LENGTH: 9
<212> TYPE: PRT
```

<213> ORGANISM: Artificial Sequence
<220> FEATURE:
<223> OTHER INFORMATION: synthetic construct

<400> SEQUENCE: 13

Gln Gln His Tyr Ser Thr Pro Tyr Thr
1               5

<210> SEQ ID NO 14
<211> LENGTH: 5
<212> TYPE: PRT
<213> ORGANISM: Artificial Sequence
<220> FEATURE:
<223> OTHER INFORMATION: synthetic construct

<400> SEQUENCE: 14

Ser His Ser Ile Asn
1               5

<210> SEQ ID NO 15
<211> LENGTH: 17
<212> TYPE: PRT
<213> ORGANISM: Artificial Sequence
<220> FEATURE:
<223> OTHER INFORMATION: synthetic construct

<400> SEQUENCE: 15

Tyr Met Tyr Ile Gly Asn Ala Tyr Thr Glu Tyr Asn Glu Lys Phe Lys
1               5                   10                  15

Gly

<210> SEQ ID NO 16
<211> LENGTH: 12
<212> TYPE: PRT
<213> ORGANISM: Artificial Sequence
<220> FEATURE:
<223> OTHER INFORMATION: synthetic construct

<400> SEQUENCE: 16

Ile Thr Pro Val Val Ala Pro Tyr Val Met Asp Tyr
1               5                   10

<210> SEQ ID NO 17
<211> LENGTH: 11
<212> TYPE: PRT
<213> ORGANISM: Artificial Sequence
<220> FEATURE:
<223> OTHER INFORMATION: synthetic construct

<400> SEQUENCE: 17

Lys Ala Ser Gln Asp Val Gly Thr Ala Val Ala
1               5                   10

<210> SEQ ID NO 18
<211> LENGTH: 7
<212> TYPE: PRT
<213> ORGANISM: Artificial Sequence
<220> FEATURE:
<223> OTHER INFORMATION: synthetic construct

<400> SEQUENCE: 18

Trp Ala Ser Thr Arg His Thr
1               5

<210> SEQ ID NO 19
<211> LENGTH: 9

```
<212> TYPE: PRT
<213> ORGANISM: Artificial Sequence
<220> FEATURE:
<223> OTHER INFORMATION: synthetic construct

<400> SEQUENCE: 19

Gln Gln Tyr Ser Ser Tyr Pro Tyr Thr
1               5

<210> SEQ ID NO 20
<211> LENGTH: 121
<212> TYPE: PRT
<213> ORGANISM: Artificial Sequence
<220> FEATURE:
<223> OTHER INFORMATION: synthetic construct

<400> SEQUENCE: 20

Glu Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Thr Tyr
            20                  25                  30

Gly Ile Asn Trp Val Arg Gln Ala Pro Gly Gln Gly Leu Glu Trp Ile
        35                  40                  45

Gly Tyr Ile Tyr Ile Gly Asn Ala Tyr Thr Glu Tyr Asn Glu Lys Phe
    50                  55                  60

Lys Gly Lys Ala Thr Leu Thr Ser Asp Pro Ser Thr Arg Thr Ala Tyr
65                  70                  75                  80

Met Glu Leu Ser Ser Leu Arg Ser Asp Asp Thr Ala Val Tyr Tyr Cys
                85                  90                  95

Ala Arg Asp Leu Met Val Ile Ala Pro Lys Thr Met Asp Tyr Trp Gly
            100                 105                 110

Gln Gly Thr Thr Val Thr Val Ser Ser
        115                 120

<210> SEQ ID NO 21
<211> LENGTH: 107
<212> TYPE: PRT
<213> ORGANISM: Artificial Sequence
<220> FEATURE:
<223> OTHER INFORMATION: synthetic construct

<400> SEQUENCE: 21

Asp Ile Gln Met Thr Gln Ser Pro Ser Ser Val Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Asp Arg Phe Thr Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gly Gly Thr Lys Val Glu Ile Lys
            100                 105

<210> SEQ ID NO 22
<211> LENGTH: 118
<212> TYPE: PRT
```

<213> ORGANISM: Artificial Sequence
<220> FEATURE:
<223> OTHER INFORMATION: synthetic construct

<400> SEQUENCE: 22

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
                20                  25                  30

Tyr Ile Asn Trp Val Arg Gln Ala Pro Gly Gln Gly Leu Glu Trp Met
            35                  40                  45

Gly Glu Thr Ile Pro Asn Thr Gly Gly Thr Thr Tyr Asn Gln Lys Phe
        50                  55                  60

Lys Ala Arg Val Thr Met Thr Val Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Gln Ser Gly Ser Pro Phe Ala Tyr Trp Gly Gln Gly Thr
            100                 105                 110

Thr Val Thr Val Ser Ser
            115

<210> SEQ ID NO 23
<211> LENGTH: 107
<212> TYPE: PRT
<213> ORGANISM: Artificial Sequence
<220> FEATURE:
<223> OTHER INFORMATION: synthetic construct

<400> SEQUENCE: 23

Asp Ile Val Met Thr Gln Ser Pro Asp Ser Leu Ala Val Ser Leu Gly
1               5                   10                  15

Glu Arg Ala Thr Ile Asn Cys Lys Ala Ser Gln Asn Val Gly Thr Ala
                20                  25                  30

Val Ala Trp Tyr Gln Gln Lys Pro Gly Gln Pro Pro Lys Leu Leu Ile
            35                  40                  45

Tyr Ser Ala Ser Asn Arg Tyr Thr Gly Val Pro Asp Arg Phe Thr Gly
        50                  55                  60

Ser Gly Ser Gly Thr Asp Phe Thr Leu Thr Ile Ser Ser Leu Gln Ala
65                  70                  75                  80

Glu Asp Val Ala Val Tyr Tyr Cys Gln Gln His Tyr Ser Thr Pro Tyr
                85                  90                  95

Thr Phe Gly Gly Gly Thr Lys Leu Glu Ile Lys
            100                 105

<210> SEQ ID NO 24
<211> LENGTH: 121
<212> TYPE: PRT
<213> ORGANISM: Artificial Sequence
<220> FEATURE:
<223> OTHER INFORMATION: synthetic construct

<400> SEQUENCE: 24

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser His
                20                  25                  30

Ser Ile Asn Trp Val Arg Gln Ala Thr Gly Gln Gly Leu Glu Trp Met
            35                  40                  45

Gly Tyr Met Tyr Ile Gly Asn Ala Tyr Thr Glu Tyr Asn Glu Lys Phe
            50                  55                  60

Lys Gly Arg Val Thr Leu Thr Ser Asn Thr Ser Ile Ser Thr Ala Tyr
 65                  70                  75                  80

Met Glu Leu Ser Ser Leu Arg Ser Glu Asp Thr Ala Val Tyr Tyr Cys
                 85                  90                  95

Ala Lys Ile Thr Pro Val Val Ala Pro Tyr Val Met Asp Tyr Trp Gly
                100                 105                 110

Gln Gly Thr Ser Val Thr Val Ser Ser
                115                 120

<210> SEQ ID NO 25
<211> LENGTH: 107
<212> TYPE: PRT
<213> ORGANISM: Artificial Sequence
<220> FEATURE:
<223> OTHER INFORMATION: synthetic construct

<400> SEQUENCE: 25

Asp Ile Gln Leu Thr Gln Ser Pro Ser Phe Leu Ser Ala Ser Val Gly
 1               5                  10                  15

Asp Arg Val Thr Ile Thr Cys Lys Ala Ser Gln Asp Val Gly Thr Ala
                 20                  25                  30

Val Ala Trp Tyr Gln Gln Lys Pro Gly Lys Ala Pro Lys Leu Leu Ile
             35                  40                  45

Tyr Trp Ala Ser Thr Arg His Thr Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Gln Gln Tyr Ser Ser Tyr Pro Tyr
                 85                  90                  95

Thr Phe Gly Gln Gly Thr Lys Leu Glu Ile Lys
                100                 105

<210> SEQ ID NO 26
<211> LENGTH: 695
<212> TYPE: PRT
<213> ORGANISM: Artificial Sequence
<220> FEATURE:
<223> OTHER INFORMATION: synthetic construct

<400> SEQUENCE: 26

Thr Ile Pro Pro His Val Gln Lys Ser Val Asn Asn Asp Met Ile Val
 1               5                  10                  15

Thr Asp Asn Asn Gly Ala Val Lys Phe Pro Gln Leu Cys Lys Phe Cys
                 20                  25                  30

Asp Val Arg Phe Ser Thr Cys Asp Asn Gln Lys Ser Cys Met Ser Asn
             35                  40                  45

Cys Ser Ile Thr Ser Ile Cys Glu Lys Pro Gln Glu Val Cys Val Ala
             50                  55                  60

Val Trp Arg Lys Asn Asp Glu Asn Ile Thr Leu Glu Thr Val Cys His
 65                  70                  75                  80

Asp Pro Lys Leu Pro Tyr His Asp Phe Ile Leu Glu Asp Ala Ala Ser
                 85                  90                  95

Pro Lys Cys Ile Met Lys Glu Lys Lys Lys Pro Gly Glu Thr Phe Phe
                100                 105                 110

Met Cys Ser Cys Ser Ser Asp Glu Cys Asn Asp Asn Ile Ile Phe Ser

```
            115                 120                 125
Glu Glu Tyr Asn Thr Ser Asn Pro Asp Arg Thr Val Ala Ala Pro Ser
    130                 135                 140

Val Phe Ile Phe Pro Pro Ser Asp Glu Gln Leu Lys Ser Gly Thr Ala
145                 150                 155                 160

Ser Val Val Cys Leu Leu Asn Asn Phe Tyr Pro Arg Glu Ala Lys Val
                165                 170                 175

Gln Trp Lys Val Asp Asn Ala Leu Gln Ser Gly Asn Ser Gln Glu Ser
            180                 185                 190

Val Thr Glu Gln Asp Ser Lys Asp Ser Thr Tyr Ser Leu Ser Ser Thr
        195                 200                 205

Leu Thr Leu Ser Lys Ala Asp Tyr Glu Lys His Lys Val Tyr Ala Cys
    210                 215                 220

Glu Val Thr His Gln Gly Leu Ser Ser Pro Val Thr Lys Ser Phe Asn
225                 230                 235                 240

Arg Gly Glu Cys Glu Val Gln Leu Val Gln Ser Gly Ala Glu Val Lys
                245                 250                 255

Lys Pro Gly Ala Ser Val Lys Val Ser Cys Lys Thr Ser Gly Tyr Thr
            260                 265                 270

Phe Thr Thr Tyr Gly Ile Asn Trp Val Arg Gln Ala Pro Gly Gln Gly
        275                 280                 285

Leu Glu Trp Ile Gly Tyr Ile Tyr Ile Gly Asn Ala Tyr Thr Glu Tyr
    290                 295                 300

Asn Glu Lys Phe Lys Gly Lys Ala Thr Leu Thr Ser Asp Pro Ser Thr
305                 310                 315                 320

Arg Thr Ala Tyr Met Glu Leu Ser Ser Leu Arg Ser Asp Asp Thr Ala
                325                 330                 335

Val Tyr Tyr Cys Ala Arg Asp Leu Met Val Ile Ala Pro Lys Thr Met
            340                 345                 350

Asp Tyr Trp Gly Gln Gly Thr Thr Val Thr Val Ser Ser Ala Ser Thr
        355                 360                 365

Lys Gly Pro Ser Val Phe Pro Leu Ala Pro Ser Ser Lys Ser Thr Ser
    370                 375                 380

Gly Gly Thr Ala Ala Leu Gly Cys Leu Val Lys Asp Tyr Phe Pro Glu
385                 390                 395                 400

Pro Val Thr Val Ser Trp Asn Ser Gly Ala Leu Thr Ser Gly Val His
                405                 410                 415

Thr Phe Pro Ala Val Leu Gln Ser Ser Gly Leu Tyr Ser Leu Ser Ser
            420                 425                 430

Val Val Thr Val Pro Ser Ser Ser Leu Gly Thr Gln Thr Tyr Ile Cys
        435                 440                 445

Asn Val Asn His Lys Pro Ser Asn Thr Lys Val Asp Lys Lys Val Glu
    450                 455                 460

Pro Lys Ser Cys Asp Lys Thr His Thr Cys Pro Pro Cys Pro Ala Pro
465                 470                 475                 480

Glu Leu Leu Gly Gly Pro Ser Val Phe Leu Phe Pro Pro Lys Pro Lys
                485                 490                 495

Asp Thr Leu Met Ile Ser Arg Thr Pro Glu Val Thr Cys Val Val Val
            500                 505                 510

Asp Val Ser His Glu Asp Pro Glu Val Lys Phe Asn Trp Tyr Val Asp
        515                 520                 525

Gly Val Glu Val His Asn Ala Lys Thr Lys Pro Arg Glu Glu Gln Tyr
    530                 535                 540
```

Asn Ser Thr Tyr Arg Val Val Ser Val Leu Thr Val Leu His Gln Asp
545                 550                 555                 560

Trp Leu Asn Gly Lys Glu Tyr Lys Cys Lys Val Ser Asn Lys Ala Leu
            565                 570                 575

Pro Ala Pro Ile Glu Lys Thr Ile Ser Lys Ala Lys Gly Gln Pro Arg
        580                 585                 590

Glu Pro Gln Val Tyr Thr Leu Pro Pro Ser Arg Glu Glu Met Thr Lys
    595                 600                 605

Asn Gln Val Ser Leu Thr Cys Leu Val Lys Gly Phe Tyr Pro Ser Asp
610                 615                 620

Ile Ala Val Glu Trp Glu Ser Asn Gly Gln Pro Glu Asn Asn Tyr Lys
625                 630                 635                 640

Thr Thr Pro Pro Val Leu Asp Ser Asp Gly Ser Phe Phe Leu Tyr Ser
            645                 650                 655

Lys Leu Thr Val Asp Lys Ser Arg Trp Gln Gln Gly Asn Val Phe Ser
            660                 665                 670

Cys Ser Val Met His Glu Ala Leu His Asn His Tyr Thr Gln Lys Ser
            675                 680                 685

Leu Ser Leu Ser Pro Gly Lys
690                 695

<210> SEQ ID NO 27
<211> LENGTH: 240
<212> TYPE: PRT
<213> ORGANISM: Artificial Sequence
<220> FEATURE:
<223> OTHER INFORMATION: synthetic construct

<400> SEQUENCE: 27

Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
        35                  40                  45

Cys Ser Ile Thr Ser Ile Cys Glu Lys Pro Gln Glu Val Cys Val Ala
    50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
            85                  90                  95

Pro Lys Cys Ile Met Lys Glu Lys Lys Lys Pro Gly Glu Thr Phe Phe
        100                 105                 110

Met Cys Ser Cys Ser Ser Asp Glu Cys Asn Asp Asn Ile Ile Phe Ser
    115                 120                 125

Glu Glu Tyr Asn Thr Ser Asn Pro Asp Ala Ser Thr Lys Gly Pro Ser
130                 135                 140

Val Phe Pro Leu Ala Pro Ser Ser Lys Ser Thr Ser Gly Gly Thr Ala
145                 150                 155                 160

Ala Leu Gly Cys Leu Val Lys Asp Tyr Phe Pro Glu Pro Val Thr Val
            165                 170                 175

Ser Trp Asn Ser Gly Ala Leu Thr Ser Gly Val His Thr Phe Pro Ala
            180                 185                 190

Val Leu Gln Ser Ser Gly Leu Tyr Ser Leu Ser Ser Val Val Thr Val
            195                 200                 205

Pro Ser Ser Ser Leu Gly Thr Gln Thr Tyr Ile Cys Asn Val Asn His
    210                 215                 220

Lys Pro Ser Asn Thr Lys Val Asp Lys Val Glu Pro Lys Ser Cys
225                 230                 235                 240

<210> SEQ ID NO 28
<211> LENGTH: 214
<212> TYPE: PRT
<213> ORGANISM: Artificial Sequence
<220> FEATURE:
<223> OTHER INFORMATION: synthetic construct

<400> SEQUENCE: 28

Asp Ile Gln Met Thr Gln Ser Pro Ser Ser Val Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Asp Arg Phe Thr Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 29
<211> LENGTH: 692
<212> TYPE: PRT
<213> ORGANISM: Artificial Sequence
<220> FEATURE:
<223> OTHER INFORMATION: synthetic construct

<400> SEQUENCE: 29

Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
            35                  40                  45

Cys Ser Ile Thr Ser Ile Cys Glu Lys Pro Gln Glu Val Cys Val Ala

-continued

```
                50                  55                  60
Val Trp Arg Lys Asn Asp Glu Asn Ile Thr Leu Glu Thr Val Cys His
 65                  70                  75                  80

Asp Pro Lys Leu Pro Tyr His Asp Phe Ile Leu Glu Asp Ala Ala Ser
                 85                  90                  95

Pro Lys Cys Ile Met Lys Glu Lys Lys Pro Gly Glu Thr Phe Phe
                100                 105                 110

Met Cys Ser Cys Ser Ser Asp Glu Cys Asn Asp Asn Ile Ile Phe Ser
                115                 120                 125

Glu Glu Tyr Asn Thr Ser Asn Pro Asp Arg Thr Val Ala Ala Pro Ser
            130                 135                 140

Val Phe Ile Phe Pro Pro Ser Asp Glu Gln Leu Lys Ser Gly Thr Ala
145                 150                 155                 160

Ser Val Val Cys Leu Leu Asn Asn Phe Tyr Pro Arg Glu Ala Lys Val
                165                 170                 175

Gln Trp Lys Val Asp Asn Ala Leu Gln Ser Gly Asn Ser Gln Glu Ser
                180                 185                 190

Val Thr Glu Gln Asp Ser Lys Asp Ser Thr Tyr Ser Leu Ser Ser Thr
            195                 200                 205

Leu Thr Leu Ser Lys Ala Asp Tyr Glu Lys His Lys Val Tyr Ala Cys
            210                 215                 220

Glu Val Thr His Gln Gly Leu Ser Ser Pro Val Thr Lys Ser Phe Asn
225                 230                 235                 240

Arg Gly Glu Cys Glu Val Gln Leu Val Gln Ser Gly Ala Glu Val Lys
                245                 250                 255

Lys Pro Gly Ala Ser Val Lys Val Ser Cys Lys Ala Ser Gly Tyr Thr
                260                 265                 270

Phe Thr Asp Tyr Tyr Ile Asn Trp Val Arg Gln Ala Pro Gly Gln Gly
            275                 280                 285

Leu Glu Trp Met Gly Glu Thr Ile Pro Asn Thr Gly Gly Thr Thr Tyr
            290                 295                 300

Asn Gln Lys Phe Lys Ala Arg Val Thr Met Thr Val Asp Thr Ser Thr
305                 310                 315                 320

Ser Thr Val Tyr Met Glu Leu Ser Ser Leu Arg Ser Glu Asp Thr Ala
                325                 330                 335

Val Tyr Tyr Cys Ala Arg Tyr Gln Ser Gly Ser Pro Phe Ala Tyr Trp
                340                 345                 350

Gly Gln Gly Thr Thr Val Thr Val Ser Ser Ala Ser Thr Lys Gly Pro
            355                 360                 365

Ser Val Phe Pro Leu Ala Pro Ser Ser Lys Ser Thr Ser Gly Gly Thr
            370                 375                 380

Ala Ala Leu Gly Cys Leu Val Lys Asp Tyr Phe Pro Glu Pro Val Thr
385                 390                 395                 400

Val Ser Trp Asn Ser Gly Ala Leu Thr Ser Gly Val His Thr Phe Pro
                405                 410                 415

Ala Val Leu Gln Ser Ser Gly Leu Tyr Ser Leu Ser Ser Val Val Thr
                420                 425                 430

Val Pro Ser Ser Ser Leu Gly Thr Gln Thr Tyr Ile Cys Asn Val Asn
            435                 440                 445

His Lys Pro Ser Asn Thr Lys Val Asp Lys Lys Val Glu Pro Lys Ser
            450                 455                 460

Cys Asp Lys Thr His Thr Cys Pro Pro Cys Pro Ala Pro Glu Leu Leu
465                 470                 475                 480
```

```
Gly Gly Pro Ser Val Phe Leu Phe Pro Pro Lys Pro Asp Thr Leu
            485                 490                 495

Met Ile Ser Arg Thr Pro Glu Val Thr Cys Val Val Val Asp Val Ser
            500                 505                 510

His Glu Asp Pro Glu Val Lys Phe Asn Trp Tyr Val Asp Gly Val Glu
            515                 520                 525

Val His Asn Ala Lys Thr Lys Pro Arg Glu Glu Gln Tyr Asn Ser Thr
            530                 535                 540

Tyr Arg Val Val Ser Val Leu Thr Val Leu His Gln Asp Trp Leu Asn
545                 550                 555                 560

Gly Lys Glu Tyr Lys Cys Lys Val Ser Asn Lys Ala Leu Pro Ala Pro
            565                 570                 575

Ile Glu Lys Thr Ile Ser Lys Ala Lys Gly Gln Pro Arg Glu Pro Gln
            580                 585                 590

Val Tyr Thr Leu Pro Pro Ser Arg Glu Glu Met Thr Lys Asn Gln Val
            595                 600                 605

Ser Leu Thr Cys Leu Val Lys Gly Phe Tyr Pro Ser Asp Ile Ala Val
            610                 615                 620

Glu Trp Glu Ser Asn Gly Gln Pro Glu Asn Asn Tyr Lys Thr Thr Pro
625                 630                 635                 640

Pro Val Leu Asp Ser Asp Gly Ser Phe Phe Leu Tyr Ser Lys Leu Thr
            645                 650                 655

Val Asp Lys Ser Arg Trp Gln Gln Gly Asn Val Phe Ser Cys Ser Val
            660                 665                 670

Met His Glu Ala Leu His Asn His Tyr Thr Gln Lys Ser Leu Ser Leu
            675                 680                 685

Ser Pro Gly Lys
        690

<210> SEQ ID NO 30
<211> LENGTH: 214
<212> TYPE: PRT
<213> ORGANISM: Artificial Sequence
<220> FEATURE:
<223> OTHER INFORMATION: synthetic construct

<400> SEQUENCE: 30

Asp Ile Val Met Thr Gln Ser Pro Asp Ser Leu Ala Val Ser Leu Gly
1               5                   10                  15

Glu Arg Ala Thr Ile Asn Cys Lys Ala Ser Gln Asn Val Gly Thr Ala
            20                  25                  30

Val Ala Trp Tyr Gln Gln Lys Pro Gly Gln Pro Pro Lys Leu Leu Ile
            35                  40                  45

Tyr Ser Ala Ser Asn Arg Tyr Thr Gly Val Pro Asp Arg Phe Thr Gly
        50                  55                  60

Ser Gly Ser Gly Thr Asp Phe Thr Leu Thr Ile Ser Ser Leu Gln Ala
65                  70                  75                  80

Glu Asp Val Ala Val Tyr Tyr Cys Gln Gln His Tyr Ser Thr Pro Tyr
            85                  90                  95

Thr Phe Gly Gly Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140
```

-continued

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 31
<211> LENGTH: 695
<212> TYPE: PRT
<213> ORGANISM: Artificial Sequence
<220> FEATURE:
<223> OTHER INFORMATION: synthetic construct

<400> SEQUENCE: 31

Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
                20                  25                  30

Asp Val Arg Phe Ser Thr Cys Asp Asn Gln Lys Ser Cys Met Ser Asn
            35                  40                  45

Cys Ser Ile Thr Ser Ile Cys Glu Lys Pro Gln Glu Val Cys Val Ala
        50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Lys Pro Gly Glu Thr Phe Phe
            100                 105                 110

Met Cys Ser Cys Ser Ser Asp Glu Cys Asn Asp Asn Ile Ile Phe Ser
        115                 120                 125

Glu Glu Tyr Asn Thr Ser Asn Pro Asp Arg Thr Val Ala Ala Pro Ser
    130                 135                 140

Val Phe Ile Phe Pro Pro Ser Asp Glu Gln Leu Lys Ser Gly Thr Ala
145                 150                 155                 160

Ser Val Val Cys Leu Leu Asn Asn Phe Tyr Pro Arg Glu Ala Lys Val
                165                 170                 175

Gln Trp Lys Val Asp Asn Ala Leu Gln Ser Gly Asn Ser Gln Glu Ser
            180                 185                 190

Val Thr Glu Gln Asp Ser Lys Asp Ser Thr Tyr Ser Leu Ser Ser Thr
        195                 200                 205

Leu Thr Leu Ser Lys Ala Asp Tyr Glu Lys His Lys Val Tyr Ala Cys
    210                 215                 220

Glu Val Thr His Gln Gly Leu Ser Ser Pro Val Thr Lys Ser Phe Asn
225                 230                 235                 240

Arg Gly Glu Cys Glu Val Gln Leu Val Gln Ser Gly Ala Glu Val Lys
                245                 250                 255

Lys Pro Gly Ala Ser Val Lys Val Ser Cys Lys Ala Ser Gly Tyr Thr
            260                 265                 270

Phe Thr Ser His Ser Ile Asn Trp Val Arg Gln Ala Thr Gly Gln Gly
        275                 280                 285

```
Leu Glu Trp Met Gly Tyr Met Tyr Ile Gly Asn Ala Tyr Thr Glu Tyr
290                 295                 300

Asn Glu Lys Phe Lys Gly Arg Val Thr Leu Thr Ser Asn Thr Ser Ile
305                 310                 315                 320

Ser Thr Ala Tyr Met Glu Leu Ser Ser Leu Arg Ser Glu Asp Thr Ala
                325                 330                 335

Val Tyr Tyr Cys Ala Lys Ile Thr Pro Val Val Ala Pro Tyr Val Met
                340                 345                 350

Asp Tyr Trp Gly Gln Gly Thr Ser Val Thr Val Ser Ser Ala Ser Thr
            355                 360                 365

Lys Gly Pro Ser Val Phe Pro Leu Ala Pro Ser Ser Lys Ser Thr Ser
    370                 375                 380

Gly Gly Thr Ala Ala Leu Gly Cys Leu Val Lys Asp Tyr Phe Pro Glu
385                 390                 395                 400

Pro Val Thr Val Ser Trp Asn Ser Gly Ala Leu Thr Ser Gly Val His
                405                 410                 415

Thr Phe Pro Ala Val Leu Gln Ser Ser Gly Leu Tyr Ser Leu Ser Ser
                420                 425                 430

Val Val Thr Val Pro Ser Ser Leu Gly Thr Gln Thr Tyr Ile Cys
                435                 440                 445

Asn Val Asn His Lys Pro Ser Asn Thr Lys Val Asp Lys Lys Val Glu
450                 455                 460

Pro Lys Ser Cys Asp Lys Thr His Thr Cys Pro Pro Cys Pro Ala Pro
465                 470                 475                 480

Glu Leu Leu Gly Gly Pro Ser Val Phe Leu Phe Pro Pro Lys Pro Lys
                485                 490                 495

Asp Thr Leu Met Ile Ser Arg Thr Pro Glu Val Thr Cys Val Val Val
                500                 505                 510

Asp Val Ser His Glu Asp Pro Glu Val Lys Phe Asn Trp Tyr Val Asp
                515                 520                 525

Gly Val Glu Val His Asn Ala Lys Thr Lys Pro Arg Glu Glu Gln Tyr
            530                 535                 540

Asn Ser Thr Tyr Arg Val Val Ser Val Leu Thr Val Leu His Gln Asp
545                 550                 555                 560

Trp Leu Asn Gly Lys Glu Tyr Lys Cys Lys Val Ser Asn Lys Ala Leu
                565                 570                 575

Pro Ala Pro Ile Glu Lys Thr Ile Ser Lys Ala Lys Gly Gln Pro Arg
            580                 585                 590

Glu Pro Gln Val Tyr Thr Leu Pro Pro Ser Arg Glu Glu Met Thr Lys
    595                 600                 605

Asn Gln Val Ser Leu Thr Cys Leu Val Lys Gly Phe Tyr Pro Ser Asp
610                 615                 620

Ile Ala Val Glu Trp Glu Ser Asn Gly Gln Pro Glu Asn Asn Tyr Lys
625                 630                 635                 640

Thr Thr Pro Pro Val Leu Asp Ser Asp Gly Ser Phe Phe Leu Tyr Ser
                645                 650                 655

Lys Leu Thr Val Asp Lys Ser Arg Trp Gln Gln Gly Asn Val Phe Ser
                660                 665                 670

Cys Ser Val Met His Glu Ala Leu His Asn His Tyr Thr Gln Lys Ser
            675                 680                 685

Leu Ser Leu Ser Pro Gly Lys
690                 695
```

```
<210> SEQ ID NO 32
<211> LENGTH: 214
<212> TYPE: PRT
<213> ORGANISM: Artificial Sequence
<220> FEATURE:
<223> OTHER INFORMATION: synthetic construct

<400> SEQUENCE: 32

Asp Ile Gln Leu Thr Gln Ser Pro Ser Phe Leu Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 33
<211> LENGTH: 459
<212> TYPE: PRT
<213> ORGANISM: Artificial Sequence
<220> FEATURE:
<223> OTHER INFORMATION: synthetic construct

<400> SEQUENCE: 33

Phe Thr Val Thr Val Pro Lys Asp Leu Tyr Val Val Glu Tyr Gly Ser
1               5                   10                  15

Asn Met Thr Ile Glu Cys Lys Phe Pro Val Glu Lys Gln Leu Asp Leu
            20                  25                  30

Ala Ala Leu Ile Val Tyr Trp Glu Met Glu Asp Lys Asn Ile Ile Gln
        35                  40                  45

Phe Val His Gly Glu Glu Asp Leu Lys Val Gln His Ser Ser Tyr Arg
    50                  55                  60

Gln Arg Ala Arg Leu Leu Lys Asp Gln Leu Ser Leu Gly Asn Ala Ala
65                  70                  75                  80

Leu Gln Ile Thr Asp Val Lys Leu Gln Asp Ala Gly Val Tyr Arg Cys
                85                  90                  95
```

Met Ile Ser Tyr Gly Gly Ala Asp Tyr Lys Arg Ile Thr Val Lys Val
                100                 105                 110

Asn Ala Pro Tyr Asn Lys Ile Asn Gln Arg Ile Leu Val Val Asp Pro
            115                 120                 125

Val Thr Ser Glu His Glu Leu Thr Cys Gln Ala Glu Gly Tyr Pro Lys
        130                 135                 140

Ala Glu Val Ile Trp Thr Ser Ser Asp His Gln Val Leu Ser Gly Lys
145                 150                 155                 160

Thr Thr Thr Thr Asn Ser Lys Arg Glu Glu Lys Leu Phe Asn Val Thr
                165                 170                 175

Ser Thr Leu Arg Ile Asn Thr Thr Thr Asn Glu Ile Phe Tyr Cys Thr
            180                 185                 190

Phe Arg Arg Leu Asp Pro Glu Glu Asn His Thr Ala Glu Leu Val Ile
        195                 200                 205

Pro Glu Leu Pro Leu Ala His Pro Pro Asn Glu Arg Thr Asp Ile Glu
    210                 215                 220

Gly Arg Met Asp Pro Lys Ser Ser Asp Lys Thr His Thr Cys Pro Pro
225                 230                 235                 240

Cys Pro Ala Pro Glu Leu Leu Gly Gly Pro Ser Val Phe Leu Phe Pro
                245                 250                 255

Pro Lys Pro Lys Asp Thr Leu Met Ile Ser Arg Thr Pro Glu Val Thr
            260                 265                 270

Cys Val Val Val Asp Val Ser His Glu Asp Pro Glu Val Lys Phe Asn
        275                 280                 285

Trp Tyr Val Asp Gly Val Glu Val His Asn Ala Lys Thr Lys Pro Arg
    290                 295                 300

Glu Glu Gln Tyr Asn Ser Thr Tyr Arg Val Val Ser Val Leu Thr Val
305                 310                 315                 320

Leu His Gln Asp Trp Leu Asn Gly Lys Glu Tyr Lys Cys Lys Val Ser
                325                 330                 335

Asn Lys Ala Leu Pro Ala Pro Ile Glu Lys Thr Ile Ser Lys Ala Lys
            340                 345                 350

Gly Gln Pro Arg Glu Pro Gln Val Tyr Thr Leu Pro Pro Ser Arg Glu
        355                 360                 365

Glu Met Thr Lys Asn Gln Val Ser Leu Thr Cys Leu Val Lys Gly Phe
    370                 375                 380

Tyr Pro Ser Asp Ile Ala Val Glu Trp Glu Ser Asn Gly Gln Pro Glu
385                 390                 395                 400

Asn Asn Tyr Lys Thr Thr Pro Pro Val Leu Asp Ser Asp Gly Ser Phe
                405                 410                 415

Phe Leu Tyr Ser Lys Leu Thr Val Asp Lys Ser Arg Trp Gln Gln Gly
            420                 425                 430

Asn Val Phe Ser Cys Ser Val Met His Glu Ala Leu His Asn His Tyr
        435                 440                 445

Thr Gln Lys Ser Leu Ser Leu Ser Pro Gly Lys
    450                 455

<210> SEQ ID NO 34
<211> LENGTH: 380
<212> TYPE: PRT
<213> ORGANISM: Artificial Sequence
<220> FEATURE:
<223> OTHER INFORMATION: synthetic construct

<400> SEQUENCE: 34

Leu Asp Ser Pro Asp Arg Pro Trp Asn Pro Pro Thr Phe Ser Pro Ala
1               5                   10                  15

Leu Leu Val Val Thr Glu Gly Asp Asn Ala Thr Phe Thr Cys Ser Phe
            20                  25                  30

Ser Asn Thr Ser Glu Ser Phe Val Leu Asn Trp Tyr Arg Met Ser Pro
        35                  40                  45

Ser Asn Gln Thr Asp Lys Leu Ala Ala Phe Pro Glu Asp Arg Ser Gln
    50                  55                  60

Pro Gly Gln Asp Cys Arg Phe Arg Val Thr Gln Leu Pro Asn Gly Arg
65                  70                  75                  80

Asp Phe His Met Ser Val Val Arg Ala Arg Arg Asn Asp Ser Gly Thr
                85                  90                  95

Tyr Leu Cys Gly Ala Ile Ser Leu Ala Pro Lys Ala Gln Ile Lys Glu
            100                 105                 110

Ser Leu Arg Ala Glu Leu Arg Val Thr Glu Arg Arg Ala Glu Val Pro
        115                 120                 125

Thr Ala His Pro Ser Pro Ser Pro Arg Pro Ala Gly Gln Phe Gln Ile
    130                 135                 140

Glu Gly Arg Met Asp Pro Lys Ser Ser Asp Lys Thr His Thr Cys Pro
145                 150                 155                 160

Pro Cys Pro Ala Pro Glu Leu Leu Gly Gly Pro Ser Val Phe Leu Phe
                165                 170                 175

Pro Pro Lys Pro Lys Asp Thr Leu Met Ile Ser Arg Thr Pro Glu Val
            180                 185                 190

Thr Cys Val Val Val Asp Val Ser His Glu Asp Pro Glu Val Lys Phe
        195                 200                 205

Asn Trp Tyr Val Asp Gly Val Glu Val His Asn Ala Lys Thr Lys Pro
    210                 215                 220

Arg Glu Glu Gln Tyr Asn Ser Thr Tyr Arg Val Val Ser Val Leu Thr
225                 230                 235                 240

Val Leu His Gln Asp Trp Leu Asn Gly Lys Glu Tyr Lys Cys Lys Val
                245                 250                 255

Ser Asn Lys Ala Leu Pro Ala Pro Ile Glu Lys Thr Ile Ser Lys Ala
            260                 265                 270

Lys Gly Gln Pro Arg Glu Pro Gln Val Tyr Thr Leu Pro Pro Ser Arg
        275                 280                 285

Glu Glu Met Thr Lys Asn Gln Val Ser Leu Thr Cys Leu Val Lys Gly
    290                 295                 300

Phe Tyr Pro Ser Asp Ile Ala Val Glu Trp Glu Ser Asn Gly Gln Pro
305                 310                 315                 320

Glu Asn Asn Tyr Lys Thr Thr Pro Pro Val Leu Asp Ser Asp Gly Ser
                325                 330                 335

Phe Phe Leu Tyr Ser Lys Leu Thr Val Asp Lys Ser Arg Trp Gln Gln
            340                 345                 350

Gly Asn Val Phe Ser Cys Ser Val Met His Glu Ala Leu His Asn His
        355                 360                 365

Tyr Thr Gln Lys Ser Leu Ser Leu Ser Pro Gly Lys
    370                 375                 380

<210> SEQ ID NO 35
<211> LENGTH: 227
<212> TYPE: PRT
<213> ORGANISM: Artificial Sequence
<220> FEATURE:

<223> OTHER INFORMATION: synthetic construct

<400> SEQUENCE: 35

```
Phe Thr Val Thr Val Pro Lys Asp Leu Tyr Val Val Glu Tyr Gly Ser
1               5                   10                  15
Asn Met Thr Ile Glu Cys Lys Phe Pro Val Glu Lys Gln Leu Asp Leu
            20                  25                  30
Ala Ala Leu Ile Val Tyr Trp Glu Met Glu Asp Lys Asn Ile Ile Gln
        35                  40                  45
Phe Val His Gly Glu Glu Asp Leu Lys Val Gln His Ser Ser Tyr Arg
    50                  55                  60
Gln Arg Ala Arg Leu Leu Lys Asp Gln Leu Ser Leu Gly Asn Ala Ala
65                  70                  75                  80
Leu Gln Ile Thr Asp Val Lys Leu Gln Asp Ala Gly Val Tyr Arg Cys
                85                  90                  95
Met Ile Ser Tyr Gly Gly Ala Asp Tyr Lys Arg Ile Thr Val Lys Val
            100                 105                 110
Asn Ala Pro Tyr Asn Lys Ile Asn Gln Arg Ile Leu Val Val Asp Pro
        115                 120                 125
Val Thr Ser Glu His Glu Leu Thr Cys Gln Ala Glu Gly Tyr Pro Lys
    130                 135                 140
Ala Glu Val Ile Trp Thr Ser Ser Asp His Gln Val Leu Ser Gly Lys
145                 150                 155                 160
Thr Thr Thr Thr Asn Ser Lys Arg Glu Glu Lys Leu Phe Asn Val Thr
                165                 170                 175
Ser Thr Leu Arg Ile Asn Thr Thr Asn Glu Ile Phe Tyr Cys Thr
            180                 185                 190
Phe Arg Arg Leu Asp Pro Glu Glu Asn His Thr Ala Glu Leu Val Ile
        195                 200                 205
Pro Glu Leu Pro Leu Ala His Pro Pro Asn Glu Arg Thr His His His
    210                 215                 220
His His His
225
```

<210> SEQ ID NO 36
<211> LENGTH: 320
<212> TYPE: PRT
<213> ORGANISM: Artificial Sequence
<220> FEATURE:
<223> OTHER INFORMATION: synthetic construct

<400> SEQUENCE: 36

```
Met Ser Pro Ile Leu Gly Tyr Trp Lys Ile Lys Gly Leu Val Gln Pro
1               5                   10                  15
Thr Arg Leu Leu Leu Glu Tyr Leu Glu Glu Lys Tyr Glu Glu His Leu
            20                  25                  30
Tyr Glu Arg Asp Glu Gly Asp Lys Trp Arg Asn Lys Lys Phe Glu Leu
        35                  40                  45
Gly Leu Glu Phe Pro Asn Leu Pro Tyr Tyr Ile Asp Gly Asp Val Lys
    50                  55                  60
Leu Thr Gln Ser Met Ala Ile Ile Arg Tyr Ile Ala Asp Lys His Asn
65                  70                  75                  80
Met Leu Gly Gly Cys Pro Lys Glu Arg Ala Glu Ile Ser Met Leu Glu
                85                  90                  95
Gly Ala Val Leu Asp Ile Arg Tyr Gly Val Ser Arg Ile Ala Tyr Ser
            100                 105                 110
```

```
Lys Asp Phe Glu Thr Leu Lys Val Asp Phe Leu Ser Lys Leu Pro Glu
            115                 120                 125

Met Leu Lys Met Phe Glu Asp Arg Leu Cys His Lys Thr Tyr Leu Asn
130                 135                 140

Gly Asp His Val Thr His Pro Asp Phe Met Leu Tyr Asp Ala Leu Asp
145                 150                 155                 160

Val Val Leu Tyr Met Asp Pro Met Cys Leu Asp Ala Phe Pro Lys Leu
                165                 170                 175

Val Cys Phe Lys Lys Arg Ile Glu Ala Ile Pro Gln Ile Asp Lys Tyr
            180                 185                 190

Leu Lys Ser Ser Lys Tyr Ile Ala Trp Pro Leu Gln Gly Trp Gln Ala
            195                 200                 205

Thr Phe Gly Gly Gly Asp His Pro Pro Lys Ser Asp Ile Leu Val Val
            210                 215                 220

Asp Pro Val Thr Ser Glu His Glu Leu Thr Cys Gln Ala Glu Gly Tyr
225                 230                 235                 240

Pro Lys Ala Glu Val Ile Trp Thr Ser Ser Asp His Gln Val Leu Ser
                245                 250                 255

Gly Lys Thr Thr Thr Thr Asn Ser Lys Arg Glu Glu Lys Leu Phe Asn
            260                 265                 270

Val Thr Ser Thr Leu Arg Ile Asn Thr Thr Asn Glu Ile Phe Tyr
            275                 280                 285

Cys Thr Phe Arg Arg Leu Asp Pro Glu Glu Asn His Thr Ala Glu Leu
            290                 295                 300

Val Ile Pro Glu Leu Pro Leu Ala His Pro Pro Asn Glu Arg Thr His
305                 310                 315                 320

<210> SEQ ID NO 37
<211> LENGTH: 243
<212> TYPE: PRT
<213> ORGANISM: Artificial Sequence
<220> FEATURE:
<223> OTHER INFORMATION: synthetic construct

<400> SEQUENCE: 37

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Ser
            20                  25                  30

Trp Ile His Trp Val Arg Gln Ala Pro Gly Lys Gly Leu Glu Trp Val
        35                  40                  45

Ala Trp Ile Ser Pro Tyr Gly Gly Ser Thr Tyr Tyr Ala Asp Ser Val
50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ala Arg Arg His Trp Pro Gly Gly Phe Asp Tyr Trp Gly Gln Gly Thr
            100                 105                 110

Leu Val Thr Val Ser Ser Gly Gly Gly Gly Ser Gly Gly Gly Gly Ser
            115                 120                 125

Gly Gly Gly Gly Ser Asp Ile Gln Met Thr Gln Ser Pro Ser Ser Leu
        130                 135                 140

Ser Ala Ser Val Gly Asp Arg Val Thr Ile Thr Cys Arg Ala Ser Gln
145                 150                 155                 160
```

```
Asp Val Ser Thr Ala Val Ala Trp Tyr Gln Gln Lys Pro Gly Lys Ala
                165                 170                 175

Pro Lys Leu Leu Ile Tyr Ser Ala Ser Phe Leu Tyr Ser Gly Val Pro
            180                 185                 190

Ser Arg Phe Ser Gly Ser Gly Ser Gly Thr Asp Phe Thr Leu Thr Ile
        195                 200                 205

Ser Ser Leu Gln Pro Glu Asp Phe Ala Thr Tyr Tyr Cys Gln Gln Tyr
    210                 215                 220

Leu Tyr His Pro Ala Thr Phe Gly Gln Gly Thr Lys Val Glu Ile Lys
225                 230                 235                 240

Arg Thr Val

<210> SEQ ID NO 38
<211> LENGTH: 10
<212> TYPE: PRT
<213> ORGANISM: Artificial Sequence
<220> FEATURE:
<223> OTHER INFORMATION: synthetic construct

<400> SEQUENCE: 38

Glu Gln Lys Leu Ile Ser Glu Glu Asp Leu
1               5                   10

<210> SEQ ID NO 39
<211> LENGTH: 6
<212> TYPE: PRT
<213> ORGANISM: Artificial Sequence
<220> FEATURE:
<223> OTHER INFORMATION: synthetic construct

<400> SEQUENCE: 39

His His His His His His
1               5

<210> SEQ ID NO 40
<211> LENGTH: 15
<212> TYPE: PRT
<213> ORGANISM: Artificial Sequence
<220> FEATURE:
<223> OTHER INFORMATION: synthetic construct

<400> SEQUENCE: 40

Gly Gly Gly Gly Ser Gly Gly Gly Ser Gly Gly Gly Gly Ser
1               5                   10                  15

<210> SEQ ID NO 41
<211> LENGTH: 121
<212> TYPE: PRT
<213> ORGANISM: Artificial Sequence
<220> FEATURE:
<223> OTHER INFORMATION: synthetic construct

<400> SEQUENCE: 41

Gln Val Gln Leu Gln Gln Ser Gly Ala Glu Leu Val Arg Pro Gly Ser
1               5                   10                  15

Ser Val Lys Met Ser Cys Lys Thr Ser Gly Tyr Thr Phe Thr Thr Tyr
            20                  25                  30

Gly Ile Asn Trp Val Lys Gln Arg Pro Gly Gln Gly Leu Glu Trp Ile
        35                  40                  45

Gly Tyr Ile Tyr Ile Gly Asn Gly Tyr Thr Glu Tyr Asn Glu Lys Phe
    50                  55                  60
```

```
Lys Gly Lys Ala Thr Leu Thr Ser Asp Pro Ser Ser Arg Thr Ala Tyr
 65                  70                  75                  80

Met Gln Leu Ser Ser Leu Thr Ser Glu Asp Ser Ala Ile Tyr Phe Cys
                 85                  90                  95

Ala Arg Asp Leu Met Val Ile Ala Pro Lys Thr Met Asp Tyr Trp Gly
            100                 105                 110

Gln Gly Thr Ser Val Thr Val Ser Ser
            115                 120

<210> SEQ ID NO 42
<211> LENGTH: 107
<212> TYPE: PRT
<213> ORGANISM: Artificial Sequence
<220> FEATURE:
<223> OTHER INFORMATION: synthetic construct

<400> SEQUENCE: 42

Asp Ile Gln Met Asn Gln Ser His Lys Phe Met Ser Thr Ser Val Gly
 1               5                  10                  15

Asp Arg Val Ser Ile Thr Cys Lys Ala Ser Gln Asp Val Gly Thr Ala
                 20                  25                  30

Val Ala Trp Tyr Gln Gln Lys Pro Gly Gln Ser Pro Lys Leu Leu Ile
             35                  40                  45

Tyr Trp Ala Ser Thr Arg His Thr Gly Val Pro Asp Arg Phe Thr Gly
 50                  55                  60

Gly Gly Ser Gly Thr Asp Phe Thr Leu Thr Ile Ser Asn Val Gln Ser
 65                  70                  75                  80

Glu Asp Leu Ala Asp Tyr Phe Cys Gln Gln Tyr Ser Ser Tyr Pro Tyr
                 85                  90                  95

Thr Phe Gly Gly Gly Thr Lys Leu Glu Met Lys
            100                 105

<210> SEQ ID NO 43
<211> LENGTH: 118
<212> TYPE: PRT
<213> ORGANISM: Artificial Sequence
<220> FEATURE:
<223> OTHER INFORMATION: synthetic construct

<400> SEQUENCE: 43

Glu Val Gln Leu Gln Gln Ser Gly Pro Glu Leu Val Lys Pro Gly Ala
 1               5                  10                  15

Ser Val Lys Ile Ser Cys Lys Ala Ser Gly Tyr Ser Phe Thr Asp Tyr
                 20                  25                  30

Tyr Ile Asn Trp Val Lys Gln Ser Pro Glu Lys Ser Leu Glu Trp Ile
             35                  40                  45

Gly Glu Thr Ile Pro Asn Thr Gly Gly Thr Thr Tyr Asn Gln Lys Phe
 50                  55                  60

Lys Ala Lys Ala Thr Leu Thr Val Asp Lys Ser Ser Ser Thr Ala Tyr
 65                  70                  75                  80

Met Gln Leu Lys Ser Leu Thr Ser Glu Asp Ser Ala Val Tyr Tyr Cys
                 85                  90                  95

Ala Arg Tyr Gln Ser Gly Ser Pro Phe Ala Tyr Trp Gly Gln Gly Thr
            100                 105                 110

Pro Val Thr Val Ser Ser
            115

<210> SEQ ID NO 44
```

```
<211> LENGTH: 107
<212> TYPE: PRT
<213> ORGANISM: Artificial Sequence
<220> FEATURE:
<223> OTHER INFORMATION: synthetic construct

<400> SEQUENCE: 44

Asp Ile Val Met Thr Gln Ser Gln Lys Phe Met Ser Thr Thr Val Gly
1               5                   10                  15

Asp Arg Val Ser Ile Thr Cys Lys Ala Ser Gln Asn Val Gly Thr Ala
            20                  25                  30

Val Ala Trp Tyr Gln Gln Lys Pro Gly Gln Ser Pro Lys Leu Leu Ile
        35                  40                  45

Tyr Ser Ala Ser Asn Arg Tyr Thr Gly Val Pro Asp Arg Phe Thr Gly
50                  55                  60

Ser Gly Ser Gly Thr Asp Phe Thr Leu Thr Ile Ser Asn Met Gln Ser
65                  70                  75                  80

Glu Asp Leu Ala Asp Tyr Phe Cys Gln Gln His Tyr Ser Thr Pro Tyr
                85                  90                  95

Thr Phe Gly Gly Gly Thr Lys Leu Glu Ile Lys
            100                 105

<210> SEQ ID NO 45
<211> LENGTH: 121
<212> TYPE: PRT
<213> ORGANISM: Artificial Sequence
<220> FEATURE:
<223> OTHER INFORMATION: synthetic construct

<400> SEQUENCE: 45

Gln Val Gln Leu Lys Gln Ser Gly Ala Glu Leu Val Arg Pro Gly Ser
1               5                   10                  15

Ser Val Lys Met Ser Cys Lys Thr Ser Gly Tyr Thr Phe Thr Ser His
            20                  25                  30

Ser Ile Asn Trp Val Lys Gln Arg Pro Gly Gln Gly Leu Glu Trp Ile
        35                  40                  45

Gly Tyr Met Tyr Ile Gly Asn Gly Tyr Thr Glu Tyr Asn Glu Lys Phe
50                  55                  60

Lys Gly Lys Ala Thr Leu Thr Ser Asp Thr Ser Ser Thr Thr Ala Tyr
65                  70                  75                  80

Met Gln Leu Ser Ser Leu Thr Ser Glu Asp Ser Ala Ile Tyr Phe Cys
                85                  90                  95

Ala Lys Ile Thr Pro Val Val Ala Pro Tyr Val Met Asp Tyr Trp Gly
            100                 105                 110

Gln Gly Thr Ser Val Thr Val Ser Ser
        115                 120

<210> SEQ ID NO 46
<211> LENGTH: 107
<212> TYPE: PRT
<213> ORGANISM: Artificial Sequence
<220> FEATURE:
<223> OTHER INFORMATION: synthetic construct

<400> SEQUENCE: 46

Asp Ile Val Met Thr Gln Thr His Lys Phe Met Ser Thr Ser Val Gly
1               5                   10                  15

Asp Arg Val Ser Ile Thr Cys Lys Ala Ser Gln Asp Val Gly Thr Ala
            20                  25                  30
```

```
Val Ala Trp Tyr Gln Gln Lys Pro Gly Gln Ser Pro Lys Leu Leu Ile
         35                  40                  45

Tyr Trp Ala Ser Thr Arg His Thr Gly Val Pro Asp Arg Phe Thr Gly
 50                  55                  60

Ser Gly Ser Gly Thr Asp Phe Thr Leu Thr Ile Ser Asn Val Gln Ser
65                   70                  75                  80

Glu Asp Leu Ala Asp Tyr Phe Cys Gln Gln Tyr Ser Ser Tyr Pro Tyr
                 85                  90                  95

Thr Phe Gly Gly Gly Thr Lys Leu Glu Leu Lys
                100                 105

<210> SEQ ID NO 47
<211> LENGTH: 330
<212> TYPE: PRT
<213> ORGANISM: Artificial Sequence
<220> FEATURE:
<223> OTHER INFORMATION: synthetic construct

<400> SEQUENCE: 47

Ala Ser Thr Lys Gly Pro Ser Val Phe Pro Leu Ala Pro Ser Ser Lys
1                5                  10                  15

Ser Thr Ser Gly Gly Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
             35                  40                  45

Gly Val His Thr Phe Pro Ala Val Leu Gln Ser Ser Gly Leu Tyr Ser
         50                  55                  60

Leu Ser Ser Val Val Thr Val Pro Ser Ser Ser Leu Gly Thr Gln Thr
65                   70                  75                  80

Tyr Ile Cys Asn Val Asn His Lys Pro Ser Asn Thr Lys Val Asp Lys
                 85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285
```

```
Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
            325                 330

<210> SEQ ID NO 48
<211> LENGTH: 107
<212> TYPE: PRT
<213> ORGANISM: Artificial Sequence
<220> FEATURE:
<223> OTHER INFORMATION: synthetic construct

<400> SEQUENCE: 48

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 49
<211> LENGTH: 121
<212> TYPE: PRT
<213> ORGANISM: Artificial Sequence
<220> FEATURE:
<223> OTHER INFORMATION: synthetic construct

<400> SEQUENCE: 49

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Gly Ile Asn Trp Val Arg Gln Ala Pro Gly Gln Gly Leu Glu Trp Met
        35                  40                  45

Gly Tyr Ile Tyr Ile Gly Asn Gly Tyr Thr Glu Tyr Asn Glu Lys Phe
    50                  55                  60

Lys Gly Arg Val Thr Met Thr Thr Asp Thr Ser Thr Ser Thr Ala Tyr
65                  70                  75                  80

Met Glu Leu Ser Ser Leu Arg Ser Asp Asp Thr Ala Val Tyr Tyr Cys
                85                  90                  95

Ala Arg Asp Leu Met Val Ile Ala Pro Lys Thr Met Asp Tyr Trp Gly
            100                 105                 110

Gln Gly Thr Thr Val Thr Val Ser Ser
            115                 120

<210> SEQ ID NO 50
<211> LENGTH: 121
<212> TYPE: PRT
<213> ORGANISM: Artificial Sequence
```

-continued

```
<220> FEATURE:
<223> OTHER INFORMATION: synthetic construct

<400> SEQUENCE: 50

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Gly Ile Asn Trp Val Arg Gln Ala Pro Gly Gln Gly Leu Glu Trp Met
        35                  40                  45

Gly Tyr Ile Tyr Ile Gly Asn Gly Tyr Thr Glu Tyr Asn Glu Lys Phe
    50                  55                  60

Lys Gly Arg Val Thr Met Thr Ser Asp Thr Ser Ser Thr Ala Tyr
65                  70                  75                  80

Met Glu Leu Ser Ser Leu Arg Ser Asp Asp Thr Ala Val Tyr Tyr Cys
                85                  90                  95

Ala Arg Asp Leu Met Val Ile Ala Pro Lys Thr Met Asp Tyr Trp Gly
            100                 105                 110

Gln Gly Thr Thr Val Thr Val Ser Ser
        115                 120

<210> SEQ ID NO 51
<211> LENGTH: 121
<212> TYPE: PRT
<213> ORGANISM: Artificial Sequence
<220> FEATURE:
<223> OTHER INFORMATION: synthetic construct

<400> SEQUENCE: 51

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Gly Ile Asn Trp Val Arg Gln Ala Pro Gly Gln Gly Leu Glu Trp Met
        35                  40                  45

Gly Tyr Ile Tyr Ile Gly Asn Gly Tyr Thr Glu Tyr Asn Glu Lys Phe
    50                  55                  60

Lys Gly Arg Val Thr Leu Thr Ser Asp Thr Ser Ser Thr Ala Tyr
65                  70                  75                  80

Met Glu Leu Ser Ser Leu Arg Ser Asp Asp Thr Ala Val Tyr Tyr Cys
                85                  90                  95

Ala Arg Asp Leu Met Val Ile Ala Pro Lys Thr Met Asp Tyr Trp Gly
            100                 105                 110

Gln Gly Thr Thr Val Thr Val Ser Ser
        115                 120

<210> SEQ ID NO 52
<211> LENGTH: 121
<212> TYPE: PRT
<213> ORGANISM: Artificial Sequence
<220> FEATURE:
<223> OTHER INFORMATION: synthetic construct

<400> SEQUENCE: 52

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30
```

Gly Ile Asn Trp Val Arg Gln Ala Pro Gly Gln Gly Leu Glu Trp Ile
            35                  40                  45

Gly Tyr Ile Tyr Ile Gly Asn Gly Tyr Thr Glu Tyr Asn Glu Lys Phe
        50                  55                  60

Lys Gly Arg Val Thr Leu Thr Ser Asp Thr Ser Thr Ser Thr Ala Tyr
65                  70                  75                  80

Met Glu Leu Ser Ser Leu Arg Ser Asp Asp Thr Ala Val Tyr Tyr Cys
                85                  90                  95

Ala Arg Asp Leu Met Val Ile Ala Pro Lys Thr Met Asp Tyr Trp Gly
                100                 105                 110

Gln Gly Thr Thr Val Thr Val Ser Ser
        115                 120

<210> SEQ ID NO 53
<211> LENGTH: 121
<212> TYPE: PRT
<213> ORGANISM: Artificial Sequence
<220> FEATURE:
<223> OTHER INFORMATION: synthetic construct

<400> SEQUENCE: 53

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Gly Ile Asn Trp Val Arg Gln Ala Pro Gly Gln Gly Leu Glu Trp Ile
            35                  40                  45

Gly Tyr Ile Tyr Ile Gly Asn Gly Tyr Thr Glu Tyr Asn Glu Lys Phe
        50                  55                  60

Lys Gly Lys Ala Thr Leu Thr Ser Asp Thr Ser Thr Ser Thr Ala Tyr
65                  70                  75                  80

Met Glu Leu Ser Ser Leu Arg Ser Asp Asp Thr Ala Val Tyr Tyr Cys
                85                  90                  95

Ala Arg Asp Leu Met Val Ile Ala Pro Lys Thr Met Asp Tyr Trp Gly
                100                 105                 110

Gln Gly Thr Thr Val Thr Val Ser Ser
        115                 120

<210> SEQ ID NO 54
<211> LENGTH: 121
<212> TYPE: PRT
<213> ORGANISM: Artificial Sequence
<220> FEATURE:
<223> OTHER INFORMATION: synthetic construct

<400> SEQUENCE: 54

Glu Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Thr Tyr
            20                  25                  30

Gly Ile Asn Trp Val Arg Gln Ala Pro Gly Gln Gly Leu Glu Trp Ile
            35                  40                  45

Gly Tyr Ile Tyr Ile Gly Asn Gly Tyr Thr Glu Tyr Asn Glu Lys Phe
        50                  55                  60

Lys Gly Lys Ala Thr Leu Thr Ser Asp Pro Ser Thr Arg Thr Ala Tyr
65                  70                  75                  80

Met Glu Leu Ser Ser Leu Arg Ser Asp Asp Thr Ala Val Tyr Tyr Cys
                85                  90                  95

```
Ala Arg Asp Leu Met Val Ile Ala Pro Lys Thr Met Asp Tyr Trp Gly
            100                 105                 110

Gln Gly Thr Thr Val Thr Val Ser Ser
        115                 120

<210> SEQ ID NO 55
<211> LENGTH: 121
<212> TYPE: PRT
<213> ORGANISM: Artificial Sequence
<220> FEATURE:
<223> OTHER INFORMATION: synthetic construct

<400> SEQUENCE: 55

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Gly Ile Asn Trp Val Arg Gln Ala Pro Gly Gln Gly Leu Glu Trp Ile
        35                  40                  45

Gly Tyr Ile Tyr Ile Gly Asn Gly Tyr Thr Glu Tyr Asn Glu Lys Phe
    50                  55                  60

Lys Gly Arg Val Thr Leu Thr Ser Asp Pro Ser Thr Arg Thr Ala Tyr
65                  70                  75                  80

Met Glu Leu Ser Ser Leu Arg Ser Asp Asp Thr Ala Val Tyr Tyr Cys
                85                  90                  95

Ala Arg Asp Leu Met Val Ile Ala Pro Lys Thr Met Asp Tyr Trp Gly
            100                 105                 110

Gln Gly Thr Thr Val Thr Val Ser Ser
        115                 120

<210> SEQ ID NO 56
<211> LENGTH: 121
<212> TYPE: PRT
<213> ORGANISM: Artificial Sequence
<220> FEATURE:
<223> OTHER INFORMATION: synthetic construct

<400> SEQUENCE: 56

Gln Val Gln Leu Gln Gln Ser Gly Ala Glu Leu Val Arg Pro Gly Ser
1               5                   10                  15

Ser Val Lys Met Ser Cys Lys Thr Ser Gly Tyr Thr Phe Thr Thr Tyr
            20                  25                  30

Gly Ile Asn Trp Val Lys Gln Arg Pro Gly Gln Gly Leu Glu Trp Ile
        35                  40                  45

Gly Tyr Ile Tyr Ile Gly Asn Ala Tyr Thr Glu Tyr Asn Glu Lys Phe
    50                  55                  60

Lys Gly Lys Ala Thr Leu Thr Ser Asp Pro Ser Ser Arg Thr Ala Tyr
65                  70                  75                  80

Met Gln Leu Ser Ser Leu Thr Ser Glu Asp Ser Ala Ile Tyr Phe Cys
                85                  90                  95

Ala Arg Asp Leu Met Val Ile Ala Pro Lys Thr Met Asp Tyr Trp Gly
            100                 105                 110

Gln Gly Thr Ser Val Thr Val Ser Ser
        115                 120

<210> SEQ ID NO 57
<211> LENGTH: 107
<212> TYPE: PRT
```

<210> SEQ ID NO 58
<211> LENGTH: 107
<212> TYPE: PRT
<213> ORGANISM: Artificial Sequence
<220> FEATURE:
<223> OTHER INFORMATION: synthetic construct

<400> SEQUENCE: 57

```
Asp Ile Gln Met Thr Gln Ser Pro Ser Ser Val Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Asp Arg Phe Thr Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gly Gly Thr Lys Val Glu Ile Lys
            100                 105
```

<210> SEQ ID NO 58
<211> LENGTH: 107
<212> TYPE: PRT
<213> ORGANISM: Artificial Sequence
<220> FEATURE:
<223> OTHER INFORMATION: synthetic construct

<400> SEQUENCE: 58

```
Asp Ile Gln Met Thr Gln Ser Pro Ser Ser Val Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ser Pro Lys Leu Leu Ile
        35                  40                  45

Tyr Trp Ala Ser Thr Arg His Thr Gly Val Pro Asp Arg Phe Thr Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Phe Cys Gln Gln Tyr Ser Ser Tyr Pro Tyr
                85                  90                  95

Thr Phe Gly Gly Gly Thr Lys Val Glu Ile Lys
            100                 105
```

<210> SEQ ID NO 59
<211> LENGTH: 118
<212> TYPE: PRT
<213> ORGANISM: Artificial Sequence
<220> FEATURE:
<223> OTHER INFORMATION: synthetic construct

<400> SEQUENCE: 59

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Tyr Ile Asn Trp Val Arg Gln Ala Pro Gly Gln Gly Leu Glu Trp Met
        35                  40                  45

Gly Glu Thr Ile Pro Asn Thr Gly Gly Thr Thr Tyr Asn Gln Lys Phe
    50                  55                  60
```

Lys Ala Arg Val Thr Met Thr Val Asp Thr Ser Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Gln Ser Gly Ser Pro Phe Ala Tyr Trp Gly Gln Gly Thr
            100                 105                 110

Thr Val Thr Val Ser Ser
        115

<210> SEQ ID NO 60
<211> LENGTH: 118
<212> TYPE: PRT
<213> ORGANISM: Artificial Sequence
<220> FEATURE:
<223> OTHER INFORMATION: synthetic construct

<400> SEQUENCE: 60

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Tyr Ile Asn Trp Val Arg Gln Ala Pro Gly Gln Gly Leu Glu Trp Met
        35                  40                  45

Gly Glu Thr Ile Pro Asn Thr Gly Gly Thr Thr Tyr Asn Gln Lys Phe
    50                  55                  60

Lys Ala Arg Val Thr Leu Thr Val Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Gln Ser Gly Ser Pro Phe Ala Tyr Trp Gly Gln Gly Thr
            100                 105                 110

Thr Val Thr Val Ser Ser
        115

<210> SEQ ID NO 61
<211> LENGTH: 118
<212> TYPE: PRT
<213> ORGANISM: Artificial Sequence
<220> FEATURE:
<223> OTHER INFORMATION: synthetic construct

<400> SEQUENCE: 61

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Tyr Ile Asn Trp Val Arg Gln Ala Pro Gly Gln Gly Leu Glu Trp Ile
        35                  40                  45

Gly Glu Thr Ile Pro Asn Thr Gly Gly Thr Thr Tyr Asn Gln Lys Phe
    50                  55                  60

Lys Ala Arg Val Thr Leu Thr Val Asp Lys Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Gln Ser Gly Ser Pro Phe Ala Tyr Trp Gly Gln Gly Thr
            100                 105                 110

Thr Val Thr Val Ser Ser

115

<210> SEQ ID NO 62
<211> LENGTH: 118
<212> TYPE: PRT
<213> ORGANISM: Artificial Sequence
<220> FEATURE:
<223> OTHER INFORMATION: synthetic construct

<400> SEQUENCE: 62

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Asp Tyr
            20                  25                  30

Tyr Ile Asn Trp Val Arg Gln Ala Pro Gly Gln Gly Leu Glu Trp Ile
        35                  40                  45

Gly Glu Thr Ile Pro Asn Thr Gly Gly Thr Thr Tyr Asn Gln Lys Phe
50                  55                  60

Lys Ala Lys Ala Thr Leu Thr Val Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Tyr Gln Ser Gly Ser Pro Phe Ala Tyr Trp Gly Gln Gly Thr
            100                 105                 110

Thr Val Thr Val Ser Ser
        115

<210> SEQ ID NO 63
<211> LENGTH: 118
<212> TYPE: PRT
<213> ORGANISM: Artificial Sequence
<220> FEATURE:
<223> OTHER INFORMATION: synthetic construct

<400> SEQUENCE: 63

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Asp Tyr
            20                  25                  30

Tyr Ile Asn Trp Val Lys Gln Ala Pro Gly Gln Gly Leu Glu Trp Ile
        35                  40                  45

Gly Glu Thr Ile Pro Asn Thr Gly Gly Thr Thr Tyr Asn Gln Lys Phe
50                  55                  60

Lys Ala Lys Ala Thr Leu Thr Arg Asp Lys Ser Thr Ser Thr Ala Tyr
65                  70                  75                  80

Met Glu Leu Lys Ser Leu Arg Ser Glu Asp Thr Ala Val Tyr Tyr Cys
                85                  90                  95

Ala Arg Tyr Gln Ser Gly Ser Pro Phe Ala Tyr Trp Gly Gln Gly Thr
            100                 105                 110

Thr Val Thr Val Ser Ser
        115

<210> SEQ ID NO 64
<211> LENGTH: 107
<212> TYPE: PRT
<213> ORGANISM: Artificial Sequence
<220> FEATURE:
<223> OTHER INFORMATION: synthetic construct

<400> SEQUENCE: 64

Asp Ile Val Met Thr Gln Ser Pro Asp Ser Leu Ala Val Ser Leu Gly
1               5                   10                  15

Glu Arg Ala Thr Ile Asn Cys Lys Ala Ser Gln Asn Val Gly Thr Ala
            20                  25                  30

Val Ala Trp Tyr Gln Gln Lys Pro Gly Gln Pro Pro Lys Leu Leu Ile
        35                  40                  45

Tyr Ser Ala Ser Asn Arg Tyr Thr Gly Val Pro Asp Arg Phe Thr Gly
    50                  55                  60

Ser Gly Ser Gly Thr Asp Phe Thr Leu Thr Ile Ser Ser Leu Gln Ala
65                  70                  75                  80

Glu Asp Val Ala Val Tyr Tyr Cys Gln Gln His Tyr Ser Thr Pro Tyr
                85                  90                  95

Thr Phe Gly Gly Gly Thr Lys Leu Glu Ile Lys
            100                 105

<210> SEQ ID NO 65
<211> LENGTH: 107
<212> TYPE: PRT
<213> ORGANISM: Artificial Sequence
<220> FEATURE:
<223> OTHER INFORMATION: synthetic construct

<400> SEQUENCE: 65

Glu Ile Val Met Thr Gln Ser Pro Ala Thr Leu Ser Val Ser Pro Gly
1               5                   10                  15

Glu Arg Ala Thr Leu Ser Cys Lys Ala Ser Gln Asn Val Gly Thr Ala
            20                  25                  30

Val Ala Trp Tyr Gln Gln Lys Pro Gly Gln Ala Pro Arg Leu Leu Ile
        35                  40                  45

Tyr Ser Ala Ser Asn Arg Tyr Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln His Tyr Ser Thr Pro Tyr
                85                  90                  95

Thr Phe Gly Gly Gly Thr Lys Leu Glu Ile Lys
            100                 105

<210> SEQ ID NO 66
<211> LENGTH: 107
<212> TYPE: PRT
<213> ORGANISM: Artificial Sequence
<220> FEATURE:
<223> OTHER INFORMATION: synthetic construct

<400> SEQUENCE: 66

Glu Ile Val Met Thr Gln Ser Pro Ala Thr Leu Ser Val Ser Pro Gly
1               5                   10                  15

Glu Arg Ala Thr Leu Ser Cys Lys Ala Ser Gln Asn Val Gly Thr Ala
            20                  25                  30

Val Ala Trp Tyr Gln Gln Lys Pro Gly Gln Ala Pro Arg Leu Leu Ile
        35                  40                  45

Tyr Ser Ala Ser Asn Arg Tyr Thr Gly Val Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln His Tyr Ser Thr Pro Tyr

```
                    85                  90                  95

Thr Phe Gly Gly Gly Thr Lys Leu Glu Ile Lys
                100                 105

<210> SEQ ID NO 67
<211> LENGTH: 107
<212> TYPE: PRT
<213> ORGANISM: Artificial Sequence
<220> FEATURE:
<223> OTHER INFORMATION: synthetic construct

<400> SEQUENCE: 67

Glu Ile Val Met Thr Gln Ser Pro Ala Thr Leu Ser Val Ser Pro Gly
1               5                   10                  15

Glu Arg Ala Thr Leu Ser Cys Lys Ala Ser Gln Asn Val Gly Thr Ala
            20                  25                  30

Val Ala Trp Tyr Gln Gln Lys Pro Gly Gln Ala Pro Arg Leu Leu Ile
        35                  40                  45

Tyr Ser Ala Ser Asn Arg Tyr Thr Gly Val Pro Asp Arg Phe Thr Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln His Tyr Ser Thr Pro Tyr
                85                  90                  95

Thr Phe Gly Gly Gly Thr Lys Leu Glu Ile Lys
                100                 105

<210> SEQ ID NO 68
<211> LENGTH: 107
<212> TYPE: PRT
<213> ORGANISM: Artificial Sequence
<220> FEATURE:
<223> OTHER INFORMATION: synthetic construct

<400> SEQUENCE: 68

Asp Ile Val Met Thr Gln Ser Pro Ala Thr Leu Ser Val Ser Pro Gly
1               5                   10                  15

Glu Arg Ala Thr Leu Ser Cys Lys Ala Ser Gln Asn Val Gly Thr Ala
            20                  25                  30

Val Ala Trp Tyr Gln Gln Lys Pro Gly Gln Ala Pro Arg Leu Leu Ile
        35                  40                  45

Tyr Ser Ala Ser Asn Arg Tyr Thr Gly Val Pro Asp Arg Phe Thr Gly
    50                  55                  60

Ser Gly Ser Gly Thr Asp Phe Thr Leu Thr Ile Ser Ser Leu Gln Ser
65                  70                  75                  80

Glu Asp Phe Ala Val Tyr Tyr Cys Gln Gln His Tyr Ser Thr Pro Tyr
                85                  90                  95

Thr Phe Gly Gly Gly Thr Lys Leu Glu Ile Lys
                100                 105

<210> SEQ ID NO 69
<211> LENGTH: 121
<212> TYPE: PRT
<213> ORGANISM: Artificial Sequence
<220> FEATURE:
<223> OTHER INFORMATION: synthetic construct

<400> SEQUENCE: 69

Gln Val Gln Leu Lys Gln Ser Gly Ala Glu Leu Val Arg Pro Gly Ser
1               5                   10                  15
```

```
Ser Val Lys Met Ser Cys Lys Thr Ser Gly Tyr Thr Phe Thr Ser His
            20                  25                  30

Ser Ile Asn Trp Val Lys Gln Arg Pro Gly Gln Gly Leu Glu Trp Ile
        35                  40                  45

Gly Tyr Met Tyr Ile Gly Asn Ala Tyr Thr Glu Tyr Asn Glu Lys Phe
    50                  55                  60

Lys Gly Lys Ala Thr Leu Thr Ser Asp Thr Ser Ser Thr Thr Ala Tyr
65                  70                  75                  80

Met Gln Leu Ser Ser Leu Thr Ser Glu Asp Ser Ala Ile Tyr Phe Cys
                85                  90                  95

Ala Lys Ile Thr Pro Val Val Ala Pro Tyr Val Met Asp Tyr Trp Gly
            100                 105                 110

Gln Gly Thr Ser Val Thr Val Ser Ser
            115                 120

<210> SEQ ID NO 70
<211> LENGTH: 121
<212> TYPE: PRT
<213> ORGANISM: Artificial Sequence
<220> FEATURE:
<223> OTHER INFORMATION: synthetic construct

<400> SEQUENCE: 70

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser His
            20                  25                  30

Ser Ile Asn Trp Val Arg Gln Ala Thr Gly Gln Gly Leu Glu Trp Met
        35                  40                  45

Gly Tyr Met Tyr Ile Gly Asn Gly Tyr Thr Glu Tyr Asn Glu Lys Phe
    50                  55                  60

Lys Gly Arg Val Thr Leu Thr Ser Asn Thr Ser Ile Ser Thr Ala Tyr
65                  70                  75                  80

Met Glu Leu Ser Ser Leu Arg Ser Glu Asp Thr Ala Val Tyr Tyr Cys
                85                  90                  95

Ala Lys Ile Thr Pro Val Val Ala Pro Tyr Val Met Asp Tyr Trp Gly
            100                 105                 110

Gln Gly Thr Ser Val Thr Val Ser Ser
            115                 120

<210> SEQ ID NO 71
<211> LENGTH: 121
<212> TYPE: PRT
<213> ORGANISM: Artificial Sequence
<220> FEATURE:
<223> OTHER INFORMATION: synthetic construct

<400> SEQUENCE: 71

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser His
            20                  25                  30

Ser Ile Asn Trp Val Arg Gln Ala Thr Gly Gln Gly Leu Glu Trp Ile
        35                  40                  45

Gly Tyr Met Tyr Ile Gly Asn Gly Tyr Thr Glu Tyr Asn Glu Lys Phe
    50                  55                  60

Lys Gly Arg Ala Thr Leu Thr Ser Asn Thr Ser Ile Ser Thr Ala Tyr
```

```
                65                  70                  75                  80
Met Glu Leu Ser Ser Leu Arg Ser Glu Asp Thr Ala Val Tyr Tyr Cys
                    85                  90                  95

Ala Lys Ile Thr Pro Val Val Ala Pro Tyr Val Met Asp Tyr Trp Gly
                100                 105                 110

Gln Gly Thr Ser Val Thr Val Ser Ser
                115                 120

<210> SEQ ID NO 72
<211> LENGTH: 121
<212> TYPE: PRT
<213> ORGANISM: Artificial Sequence
<220> FEATURE:
<223> OTHER INFORMATION: synthetic construct

<400> SEQUENCE: 72

Glu Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Ser His
                20                  25                  30

Ser Ile Asn Trp Val Arg Gln Ala Thr Gly Gln Gly Leu Glu Trp Met
            35                  40                  45

Gly Tyr Met Tyr Ile Gly Asn Gly Tyr Thr Glu Tyr Asn Glu Lys Phe
        50                  55                  60

Lys Gly Arg Val Thr Met Thr Ser Asn Thr Ser Ile Ser Thr Ala Tyr
65                  70                  75                  80

Met Glu Leu Ser Ser Leu Arg Ser Glu Asp Thr Ala Val Tyr Tyr Cys
                    85                  90                  95

Ala Lys Ile Thr Pro Val Val Ala Pro Tyr Val Met Asp Tyr Trp Gly
                100                 105                 110

Gln Gly Thr Ser Val Thr Val Ser Ser
                115                 120

<210> SEQ ID NO 73
<211> LENGTH: 121
<212> TYPE: PRT
<213> ORGANISM: Artificial Sequence
<220> FEATURE:
<223> OTHER INFORMATION: synthetic construct

<400> SEQUENCE: 73

Glu Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Ser His
                20                  25                  30

Ser Ile Asn Trp Val Arg Gln Ala Thr Gly Gln Gly Leu Glu Trp Ile
            35                  40                  45

Gly Tyr Met Tyr Ile Gly Asn Gly Tyr Thr Glu Tyr Asn Glu Lys Phe
        50                  55                  60

Lys Gly Arg Ala Thr Leu Thr Ser Asn Thr Ser Ile Ser Thr Ala Tyr
65                  70                  75                  80

Met Glu Leu Ser Ser Leu Arg Ser Glu Asp Thr Ala Val Tyr Tyr Cys
                    85                  90                  95

Ala Lys Ile Thr Pro Val Val Ala Pro Tyr Val Met Asp Tyr Trp Gly
                100                 105                 110

Gln Gly Thr Ser Val Thr Val Ser Ser
                115                 120
```

<210> SEQ ID NO 74
<211> LENGTH: 107
<212> TYPE: PRT
<213> ORGANISM: Artificial Sequence
<220> FEATURE:
<223> OTHER INFORMATION: synthetic construct

<400> SEQUENCE: 74

```
Asp Ile Gln Leu Thr Gln Ser Pro Ser Phe Leu Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gln Gly Thr Lys Leu Glu Ile Lys
            100                 105
```

<210> SEQ ID NO 75
<211> LENGTH: 107
<212> TYPE: PRT
<213> ORGANISM: Artificial Sequence
<220> FEATURE:
<223> OTHER INFORMATION: synthetic construct

<400> SEQUENCE: 75

```
Asp Ile Gln Met Thr Gln Ser Pro Ser Phe Leu Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gln Gly Thr Lys Leu Glu Ile Lys
            100                 105
```

<210> SEQ ID NO 76
<211> LENGTH: 107
<212> TYPE: PRT
<213> ORGANISM: Artificial Sequence
<220> FEATURE:
<223> OTHER INFORMATION: synthetic construct

<400> SEQUENCE: 76

```
Asp Ile Val Met Thr Gln Ser Pro Ser Phe Leu Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
```

```
                35                  40                  45

Tyr Trp Ala Ser Thr Arg His Thr Gly Val Pro Ser Arg Phe Ser Gly
 50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gln Gly Thr Lys Leu Glu Ile Lys
            100                 105

<210> SEQ ID NO 77
<211> LENGTH: 107
<212> TYPE: PRT
<213> ORGANISM: Artificial Sequence
<220> FEATURE:
<223> OTHER INFORMATION: synthetic construct

<400> SEQUENCE: 77

Asp Ile Gln Met Thr Gln Ser Pro Ser Phe Leu Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Asp Arg Phe Thr Gly
 50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gln Gly Thr Lys Leu Glu Ile Lys
            100                 105

<210> SEQ ID NO 78
<211> LENGTH: 107
<212> TYPE: PRT
<213> ORGANISM: Artificial Sequence
<220> FEATURE:
<223> OTHER INFORMATION: synthetic construct

<400> SEQUENCE: 78

Asp Ile Val Met Thr Gln Ser Pro Ser Phe Leu Ser Ala Ser Val Gly
1               5                   10                  15

Asp Arg Val Thr Ile Thr Cys Lys Ala Ser Gln Asp Val Gly Thr Ala
            20                  25                  30

Val Ala Trp Tyr Gln Gln Lys Pro Gly Lys Ala Pro Lys Leu Leu Ile
        35                  40                  45

Tyr Trp Ala Ser Thr Arg His Thr Gly Val Pro Asp Arg Phe Thr Gly
 50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Ser Tyr Pro Tyr
                85                  90                  95

Thr Phe Gly Gln Gly Thr Lys Leu Glu Ile Lys
            100                 105

<210> SEQ ID NO 79
<211> LENGTH: 22
```

```
<212> TYPE: PRT
<213> ORGANISM: Artificial Sequence
<220> FEATURE:
<223> OTHER INFORMATION: synthetic construct

<400> SEQUENCE: 79

Met Asp Met Arg Val Pro Ala Gln Leu Leu Gly Leu Leu Leu Leu Trp
1               5                   10                  15

Phe Pro Gly Ser Arg Cys
            20

<210> SEQ ID NO 80
<211> LENGTH: 19
<212> TYPE: PRT
<213> ORGANISM: Artificial Sequence
<220> FEATURE:
<223> OTHER INFORMATION: synthetic construct

<400> SEQUENCE: 80

Met Glu Phe Gly Leu Ser Trp Leu Phe Leu Val Ala Ile Leu Lys Gly
1               5                   10                  15

Val Gln Cys

<210> SEQ ID NO 81
<211> LENGTH: 21
<212> TYPE: PRT
<213> ORGANISM: Artificial Sequence
<220> FEATURE:
<223> OTHER INFORMATION: synthetic construct

<400> SEQUENCE: 81

Gly Gly Gly Gly Ser Gly Gly Gly Ser Gly Gly Gly Gly Ser Gly
1               5                   10                  15

Gly Gly Gly Ser Gly
            20

<210> SEQ ID NO 82
<211> LENGTH: 20
<212> TYPE: PRT
<213> ORGANISM: Artificial Sequence
<220> FEATURE:
<223> OTHER INFORMATION: synthetic construct

<400> SEQUENCE: 82

Met Thr Trp Thr Pro Leu Leu Phe Leu Thr Leu Leu His Cys Thr
1               5                   10                  15

Gly Ser Leu Ser
            20

<210> SEQ ID NO 83
<211> LENGTH: 19
<212> TYPE: PRT
<213> ORGANISM: Artificial Sequence
<220> FEATURE:
<223> OTHER INFORMATION: synthetic construct

<400> SEQUENCE: 83

Met Glu Phe Gly Leu Ser Trp Leu Phe Leu Val Ala Ile Leu Lys Gly
1               5                   10                  15

Val Gln Cys

<210> SEQ ID NO 84
<211> LENGTH: 216
<212> TYPE: PRT
```

<213> ORGANISM: Artificial Sequence
<220> FEATURE:
<223> OTHER INFORMATION: synthetic construct

<400> SEQUENCE: 84

```
Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Gly Tyr
            20                  25                  30

Asn Tyr Val Ser Trp Tyr Gln Gln His Pro Gly Lys Ala Pro Lys Leu
        35                  40                  45

Met Ile Tyr Asp Val Ser Asn Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Tyr Thr Ser Ser
                85                  90                  95

Ser Thr Arg Val Phe Gly Thr Gly Thr Lys Val Thr Val Leu Gly Gln
            100                 105                 110

Pro Lys Ala Asn Pro Thr Val Thr Leu Phe Pro Pro Ser Ser Glu Glu
        115                 120                 125

Leu Gln Ala Asn Lys Ala Thr Leu Val Cys Leu Ile Ser Asp Phe Tyr
130                 135                 140

Pro Gly Ala Val Thr Val Ala Trp Lys Ala Asp Gly Ser Pro Val Lys
145                 150                 155                 160

Ala Gly Val Glu Thr Thr Lys Pro Ser Lys Gln Ser Asn Asn Lys Tyr
                165                 170                 175

Ala Ala Ser Ser Tyr Leu Ser Leu Thr Pro Glu Gln Trp Lys Ser His
            180                 185                 190

Arg Ser Tyr Ser Cys Gln Val Thr His Glu Gly Ser Thr Val Glu Lys
        195                 200                 205

Thr Val Ala Pro Thr Glu Cys Ser
        210                 215
```

<210> SEQ ID NO 85
<211> LENGTH: 607
<212> TYPE: PRT
<213> ORGANISM: Artificial Sequence
<220> FEATURE:
<223> OTHER INFORMATION: synthetic construct

<400> SEQUENCE: 85

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ile Met Met Trp Val Arg Gln Ala Pro Gly Lys Gly Leu Glu Trp Val
        35                  40                  45

Ser Ser Ile Tyr Pro Ser Gly Gly Ile Thr Phe Tyr Ala Asp Thr Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ile Lys Leu Gly Thr Val Thr Thr Val Asp Tyr Trp Gly Gln
            100                 105                 110
```

```
Gly Thr Leu Val Thr Val Ser Ala Ser Thr Lys Gly Pro Ser Val
        115                 120                 125
Phe Pro Leu Ala Pro Ser Ser Lys Ser Thr Ser Gly Gly Thr Ala Ala
130                 135                 140
Leu Gly Cys Leu Val Lys Asp Tyr Phe Pro Glu Pro Val Thr Val Ser
145                 150                 155                 160
Trp Asn Ser Gly Ala Leu Thr Ser Gly Val His Thr Phe Pro Ala Val
                165                 170                 175
Leu Gln Ser Ser Gly Leu Tyr Ser Leu Ser Ser Val Val Thr Val Pro
            180                 185                 190
Ser Ser Ser Leu Gly Thr Gln Thr Tyr Ile Cys Asn Val Asn His Lys
        195                 200                 205
Pro Ser Asn Thr Lys Val Asp Lys Arg Val Glu Pro Lys Ser Cys Asp
210                 215                 220
Lys Thr His Thr Cys Pro Pro Cys Pro Ala Pro Glu Leu Leu Gly Gly
225                 230                 235                 240
Pro Ser Val Phe Leu Phe Pro Pro Lys Pro Lys Asp Thr Leu Met Ile
                245                 250                 255
Ser Arg Thr Pro Glu Val Thr Cys Val Val Val Asp Val Ser His Glu
            260                 265                 270
Asp Pro Glu Val Lys Phe Asn Trp Tyr Val Asp Gly Val Glu Val His
        275                 280                 285
Asn Ala Lys Thr Lys Pro Arg Glu Glu Gln Tyr Asn Ser Thr Tyr Arg
290                 295                 300
Val Val Ser Val Leu Thr Val Leu His Gln Asp Trp Leu Asn Gly Lys
305                 310                 315                 320
Glu Tyr Lys Cys Lys Val Ser Asn Lys Ala Leu Pro Ala Pro Ile Glu
                325                 330                 335
Lys Thr Ile Ser Lys Ala Lys Gly Gln Pro Arg Glu Pro Gln Val Tyr
            340                 345                 350
Thr Leu Pro Pro Ser Arg Glu Glu Met Thr Lys Asn Gln Val Ser Leu
        355                 360                 365
Thr Cys Leu Val Lys Gly Phe Tyr Pro Ser Asp Ile Ala Val Glu Trp
370                 375                 380
Glu Ser Asn Gly Gln Pro Glu Asn Asn Tyr Lys Thr Thr Pro Pro Val
385                 390                 395                 400
Leu Asp Ser Asp Gly Ser Phe Phe Leu Tyr Ser Lys Leu Thr Val Asp
                405                 410                 415
Lys Ser Arg Trp Gln Gln Gly Asn Val Phe Ser Cys Ser Val Met His
            420                 425                 430
Glu Ala Leu His Asn His Tyr Thr Gln Lys Ser Leu Ser Leu Ser Pro
        435                 440                 445
Gly Ala Gly Gly Gly Ser Gly Gly Gly Ser Gly Gly Gly
450                 455                 460
Ser Gly Gly Gly Ser Gly Ile Pro Pro His Val Gln Lys Ser Val
465                 470                 475                 480
Asn Asn Asp Met Ile Val Thr Asp Asn Asn Gly Ala Val Lys Phe Pro
                485                 490                 495
Gln Leu Cys Lys Phe Cys Asp Val Arg Phe Ser Thr Cys Asp Asn Gln
            500                 505                 510
Lys Ser Cys Met Ser Asn Cys Ser Ile Thr Ser Ile Cys Glu Lys Pro
        515                 520                 525
Gln Glu Val Cys Val Ala Val Trp Arg Lys Asn Asp Glu Asn Ile Thr
```

```
                530             535             540
Leu Glu Thr Val Cys His Asp Pro Lys Leu Pro Tyr His Asp Phe Ile
545                 550                 555                 560

Leu Glu Asp Ala Ala Ser Pro Lys Cys Ile Met Lys Glu Lys Lys Lys
                    565                 570                 575

Pro Gly Glu Thr Phe Phe Met Cys Ser Cys Ser Ser Asp Glu Cys Asn
                580                 585                 590

Asp Asn Ile Ile Phe Ser Glu Glu Tyr Asn Thr Ser Asn Pro Asp
                595                 600                 605
```